US012596316B2

(12) United States Patent
Wu et al.

(10) Patent No.: US 12,596,316 B2
(45) Date of Patent: Apr. 7, 2026

(54) DEVELOPING CARTRIDGE

(71) Applicant: Zhuhai Ninestar Information Technology Co., Ltd, Zhuhai (CN)

(72) Inventors: Xinyu Wu, Zhuhai (CN); Yuan Liu, Zhuhai (CN); Qin Luo, Zhuhai (CN); Hao Yang, Zhuhai (CN); Chen Cheng, Zhuhai (CN); Wenjie Zhao, Zhuhai (CN); Junyu Tao, Zhuhai (CN); Yu Chen, Zhuhai (CN); Baosheng Zhong, Zhuhai (CN); Mingdong Chen, Zhuhai (CN); Yinghao Li, Zhuhai (CN); Likun Zeng, Zhuhai (CN); Yongdi Chen, Zhuhai (CN); Luofa Su, Zhuhai (CN); Haoli Huang, Zhuhai (CN)

(73) Assignee: Zhuhai Ninestar Information Technology Co., Ltd, Zhuhai (CN)

( * ) Notice: Subject to any disclaimer, the term of this patent is extended or adjusted under 35 U.S.C. 154(b) by 0 days.

(21) Appl. No.: 18/661,661

(22) Filed: May 12, 2024

(65) Prior Publication Data

US 2024/0295837 A1 Sep. 5, 2024

Related U.S. Application Data

(63) Continuation of application No. PCT/CN2022/139598, filed on Dec. 16, 2022, and a (Continued)

(30) Foreign Application Priority Data

Dec. 16, 2021 (CN) ........................ 202123195786.1
Mar. 11, 2022 (CN) ........................ 202220538877.6

(Continued)

(51) Int. Cl.
*G03G 15/04* (2006.01)
*G03G 15/08* (2006.01)
*G03G 21/16* (2006.01)

(52) U.S. Cl.
CPC ..... *G03G 15/0863* (2013.01); *G03G 15/0808* (2013.01); *G03G 15/0812* (2013.01); *G03G 21/1652* (2013.01)

(58) Field of Classification Search
CPC ........... G03G 15/0808; G03G 15/0812; G03G 15/0863; G03G 21/1652

(Continued)

(56) References Cited

U.S. PATENT DOCUMENTS 10,254,708 B2 * 4/2019 Itabashi ............. G03G 21/1652
2011/0211866 A1 9/2011 Hashimoto
2021/0200140 A1 7/2021 Sano et al.

FOREIGN PATENT DOCUMENTS

CN 104950643 A 9/2015
CN 208126107 U 11/2018

(Continued)

OTHER PUBLICATIONS

The World Intellectual Property Organization (WIPO) International Search Report for PCT/CN2023/106848 Sep. 8, 2023 7 Pages (including translation).

(Continued)

*Primary Examiner* — Hoan H Tran
(74) *Attorney, Agent, or Firm* — Anova Law Group, PLLC

(57) ABSTRACT

A developing cartridge includes a casing configured to accommodate developer and having a first side and a second side oppositely arranged in a first direction, and a third side and a fourth side oppositely arranged in the second direction, the first direction and the second direction being intersected (Continued)

with each other. The developing cartridge further includes a developing roller, positioned at the third side, for rotating around a first axis extending in the first direction; a coupling, positioned at the first side, for receiving driving-force output from an image forming device to rotate; a driving surface, inclined to the first direction, including a first driving surface and a second driving surface; a detected part, at least partially positioned at the second side, for moving according to rotation of the coupling.

19 Claims, 74 Drawing Sheets

Related U.S. Application Data continuation-in-part of application No. PCT/CN2023/106848, filed on Jul. 11, 2023, and a continuation-in-part of application No. PCT/CN2023/087921, filed on Apr. 12, 2023.

(30) Foreign Application Priority Data

| | | |
|---|---|---|
| Mar. 24, 2022 | (CN) | 202210303371.1 |
| Mar. 28, 2022 | (CN) | 202220696654.2 |
| Apr. 12, 2022 | (CN) | 202220838764.8 |
| Apr. 19, 2022 | (CN) | 202220908818.3 |
| Apr. 22, 2022 | (CN) | 202220951609.7 |
| Apr. 22, 2022 | (CN) | 202220951969.7 |
| Apr. 26, 2022 | (CN) | 202220996901.0 |
| May 10, 2022 | (CN) | 202221127708.X |
| May 20, 2022 | (CN) | 202210553277.1 |
| Jun. 1, 2022 | (CN) | 202221363492.7 |
| Jul. 11, 2022 | (CN) | 202221791169.X |
| Aug. 4, 2022 | (CN) | 202222050794.5 |
| Aug. 15, 2022 | (CN) | 202222146027.4 |
| Aug. 22, 2022 | (CN) | 202222217669.9 |
| Aug. 31, 2022 | (CN) | 202222316708.0 |
| Sep. 22, 2022 | (CN) | 202222522985.7 |
| Sep. 26, 2022 | (CN) | 202222564932.1 |
| Sep. 28, 2022 | (CN) | 202222587340.1 |
| Oct. 14, 2022 | (CN) | 202222730289.5 |
| Nov. 17, 2022 | (CN) | 202223105178.1 |
| Jan. 6, 2023 | (CN) | 202320064347.7 |
| Jan. 18, 2023 | (CN) | 202320155353.3 |
| Feb. 9, 2023 | (CN) | 202320200658.1 |
| Feb. 24, 2023 | (CN) | 202320334037.2 |

(58) Field of Classification Search
USPC ................................. 399/107, 110, 111, 119
See application file for complete search history.

(56) References Cited

FOREIGN PATENT DOCUMENTS

| | | | | |
|---|---|---|---|---|
| CN | 110727188 | A | | 1/2020 |
| CN | 110824871 | A | | 2/2020 |
| CN | 210835597 | U | | 6/2020 |
| CN | 111367155 | A | | 7/2020 |
| CN | 211236563 | A | | 8/2020 |
| CN | 111694243 | A | | 9/2020 |
| CN | 212569423 | U | | 2/2021 |
| CN | 212569430 | U | | 2/2021 |
| CN | 213023951 | U | | 4/2021 |
| CN | 113671810 | A | | 11/2021 |
| CN | 113985714 | A | | 1/2022 |
| CN | 114236989 | A | | 3/2022 |
| CN | 114442453 | A | | 5/2022 |
| JP | H09258634 | A | | 10/1997 |
| JP | 2012108537 | A | | 6/2012 |
| JP | 2015197534 | | * | 11/2015 |
| JP | 2015197535 | | * | 11/2015 |

OTHER PUBLICATIONS

The World Intellectual Property Organization (WIPO) International Search Report for PCT/CN2023/087921 Jul. 20, 2023 5 Pages (including translation).
The World Intellectual Property Organization (WIPO) International Search Report for PCT/CN2022/139598 Mar. 13, 2023 6 Pages (including translation).

* cited by examiner

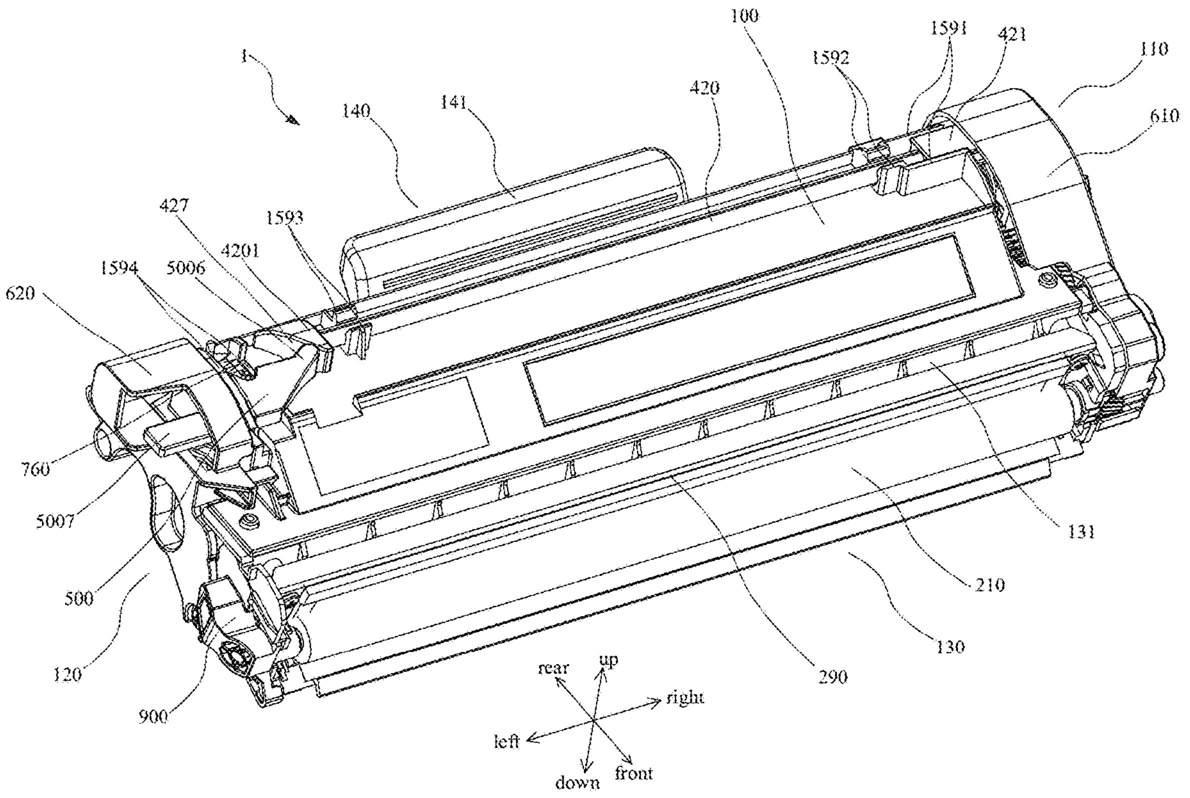
FIG. 1.1
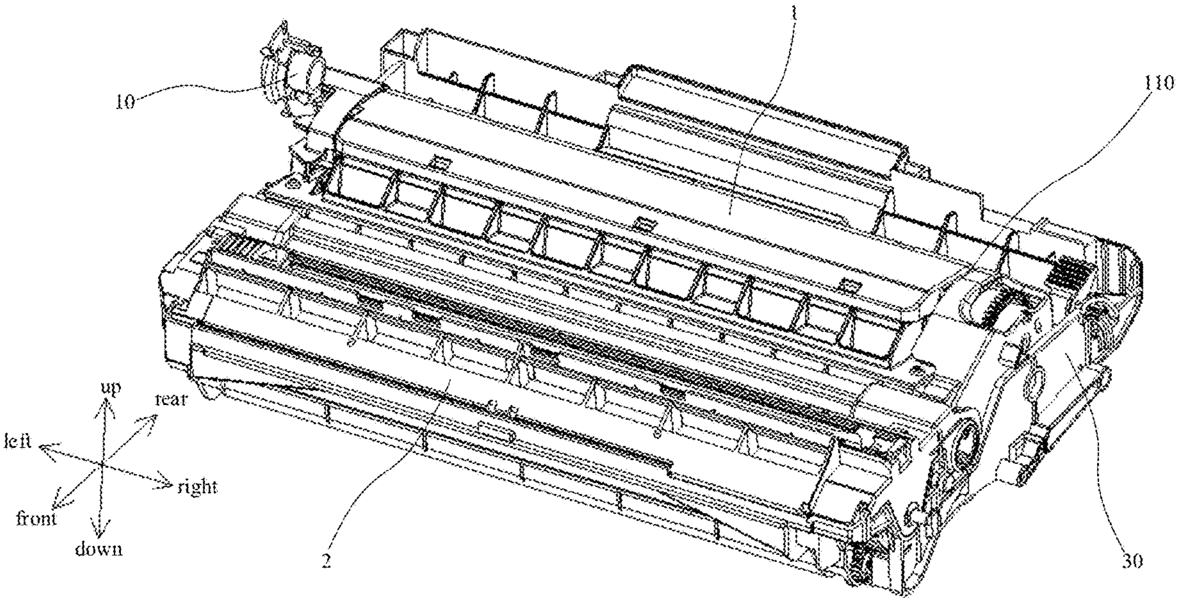
FIG. 1.2

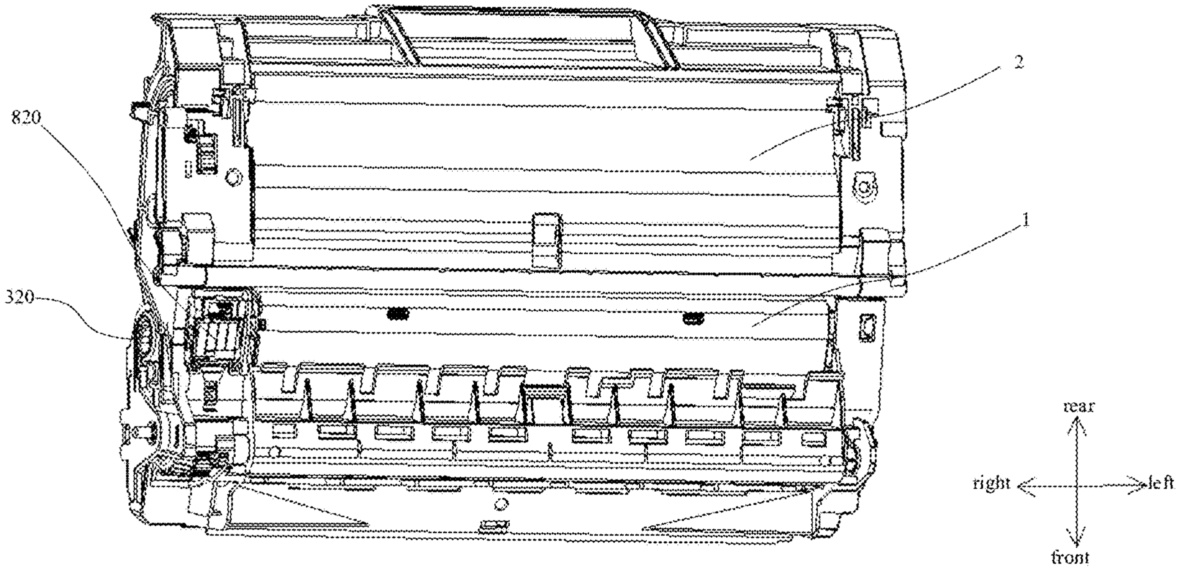
FIG. 1.3
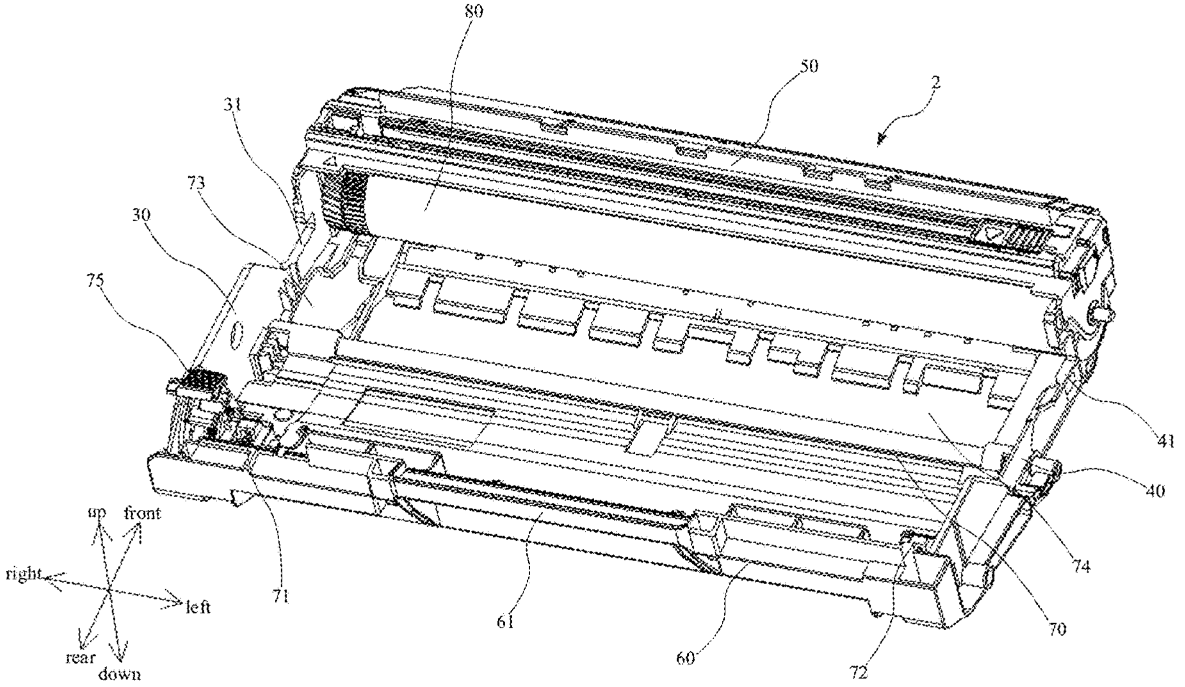
FIG. 1.4

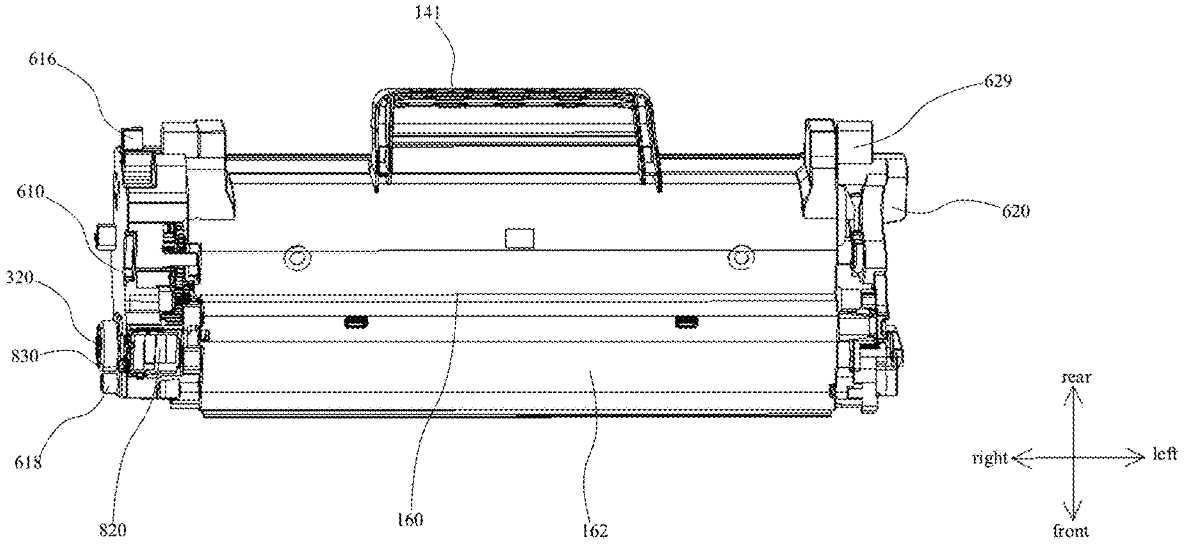
FIG. 1.5
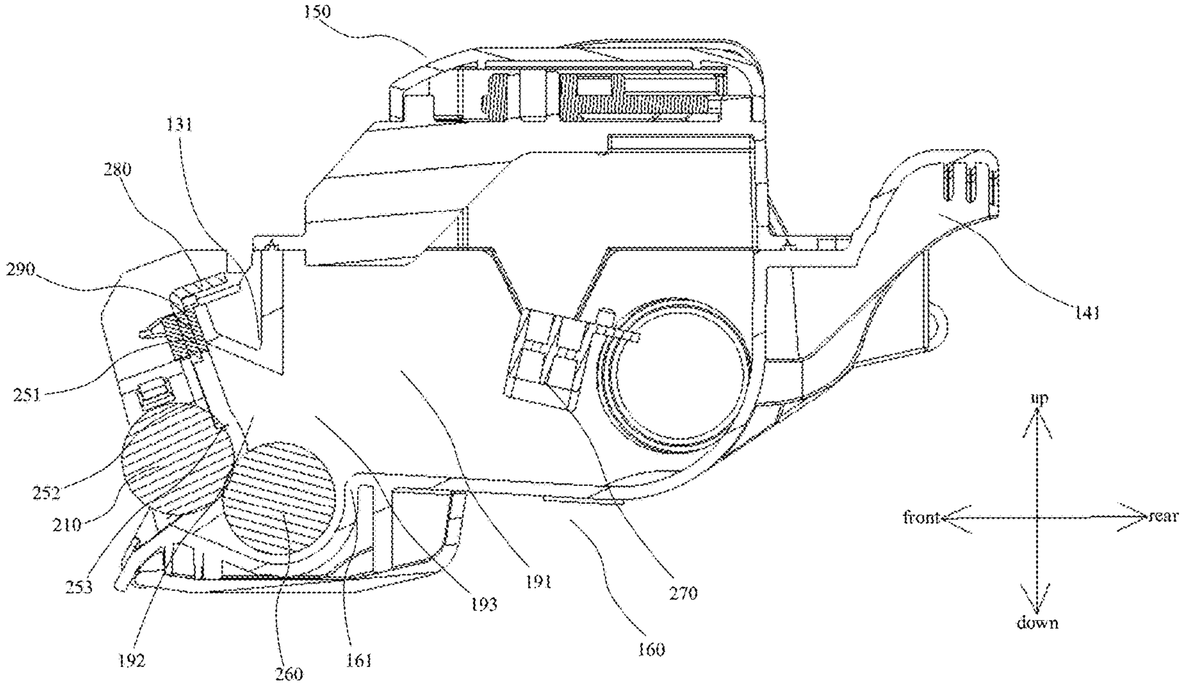
FIG. 1.6

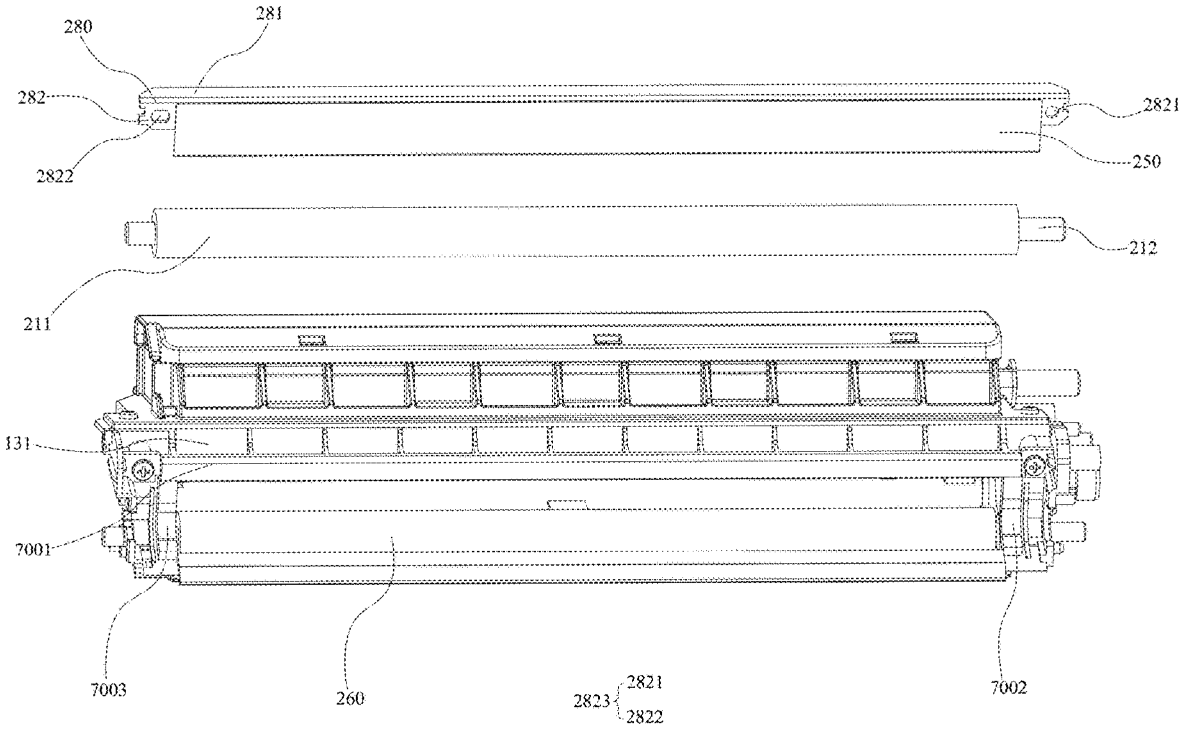
FIG. 1.7
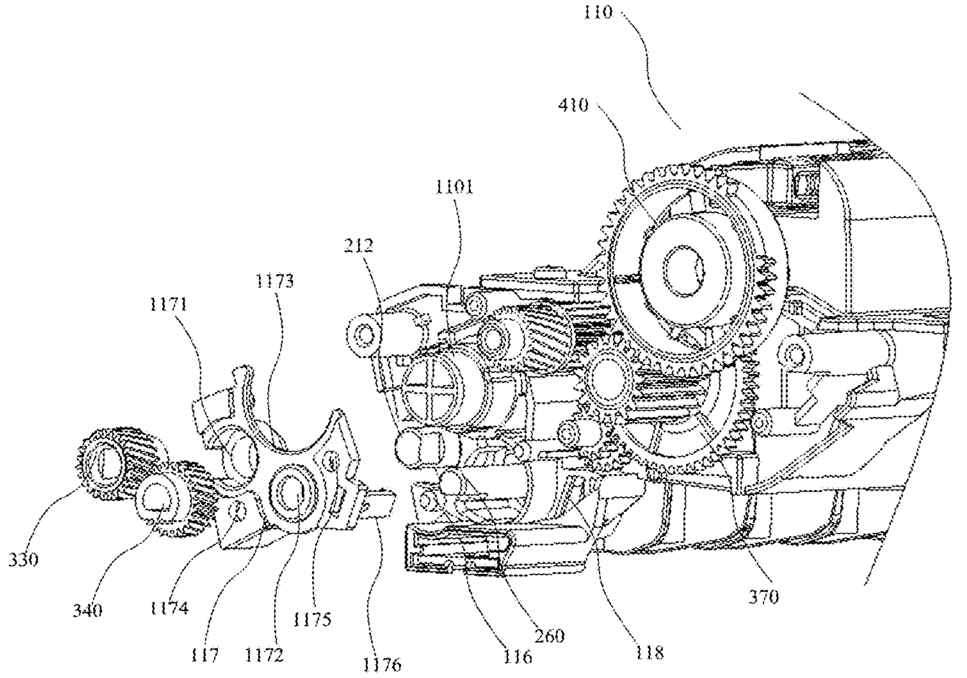
FIG. 1.8

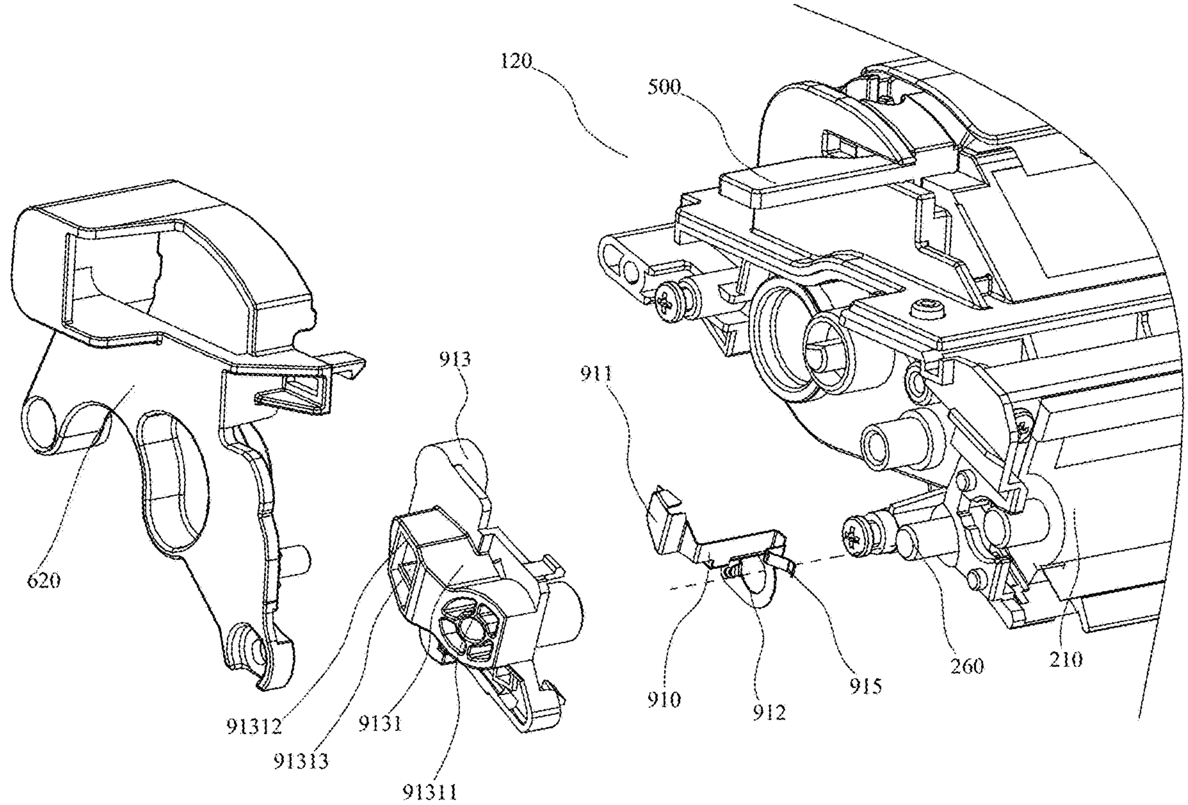
FIG. 1.9
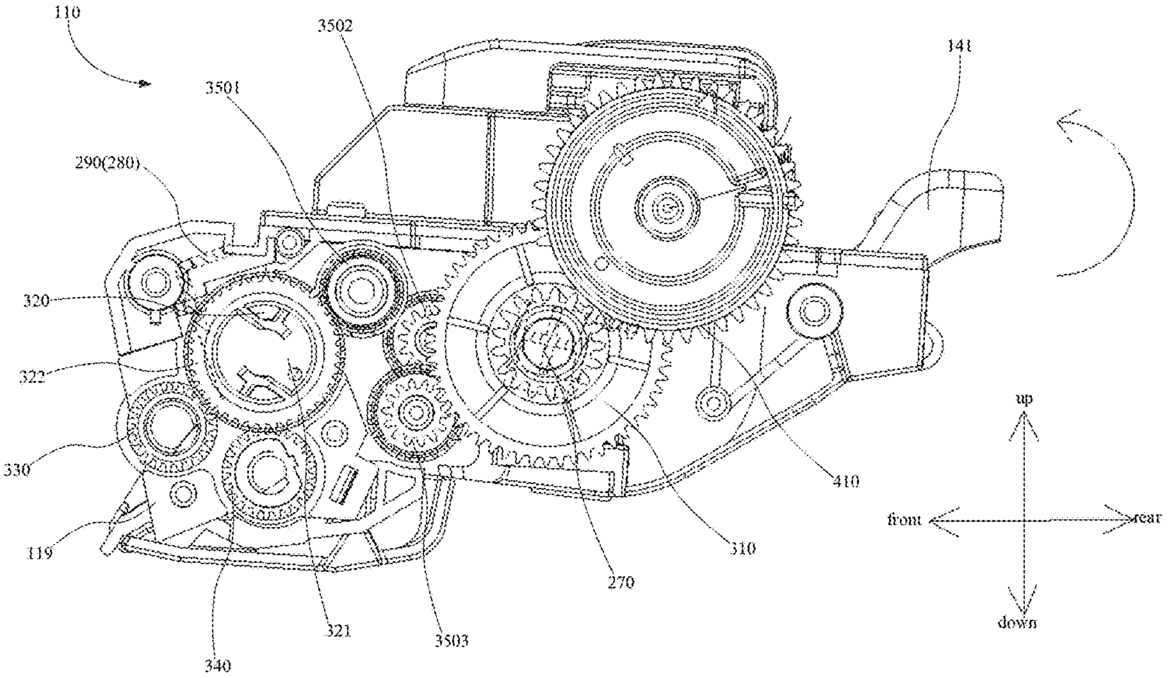
FIG. 1.10

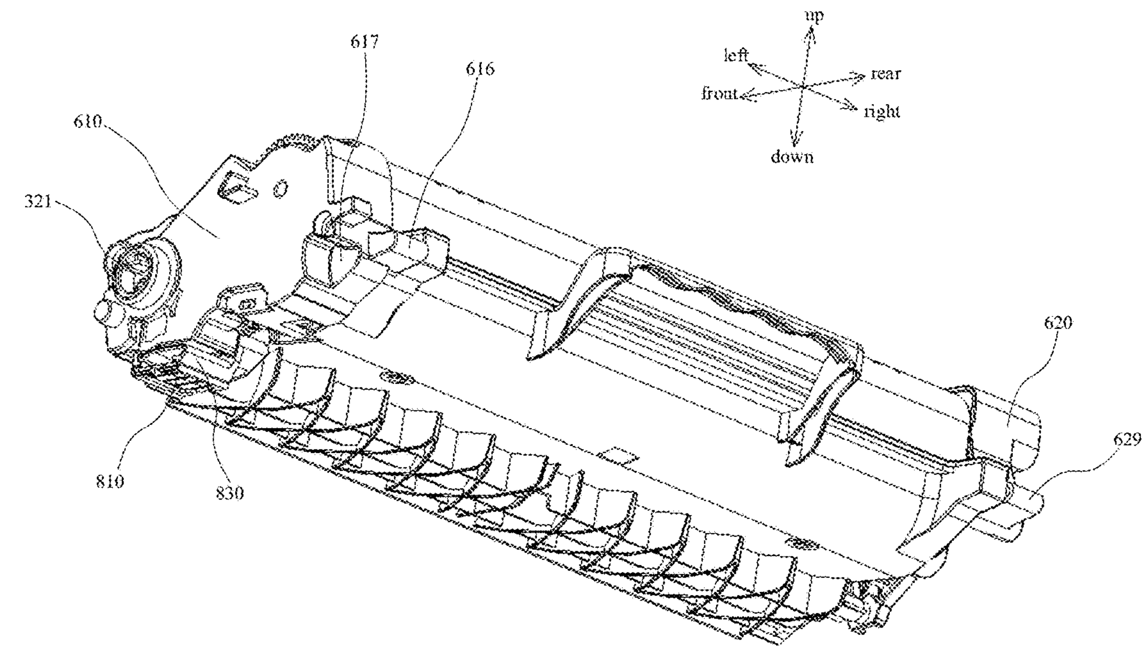
FIG. 1.11
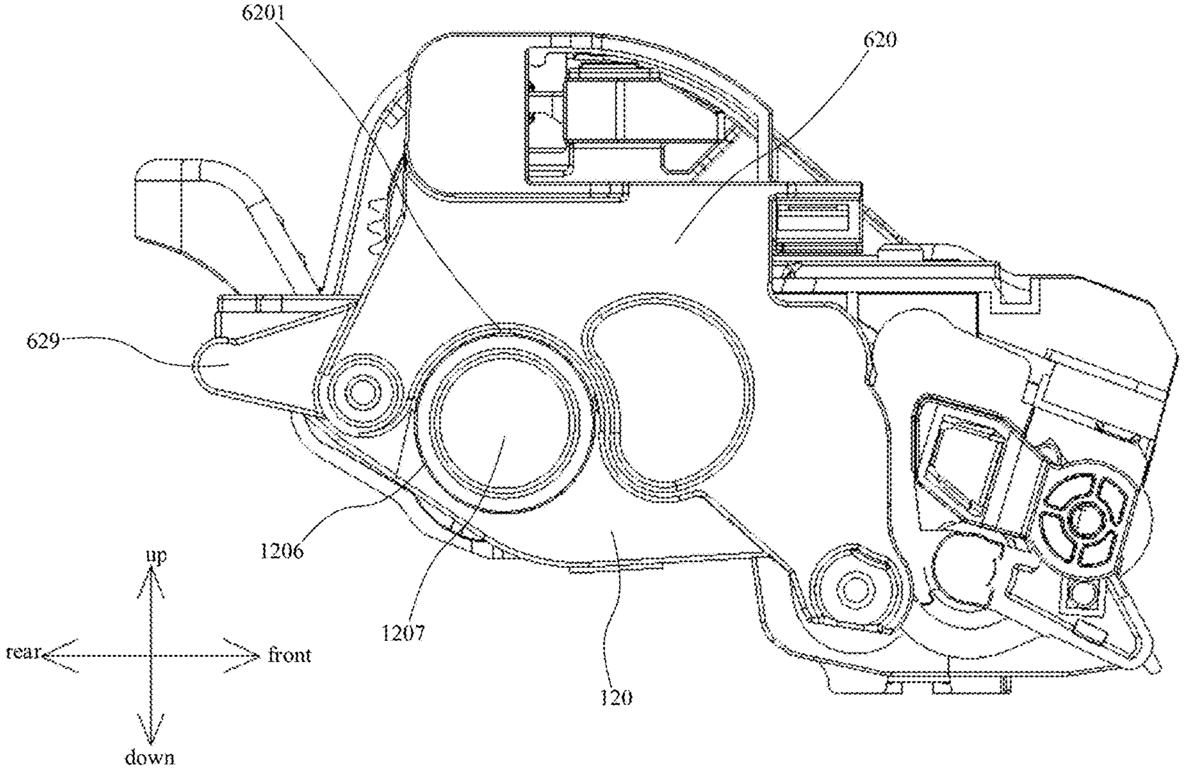
FIG. 1.12

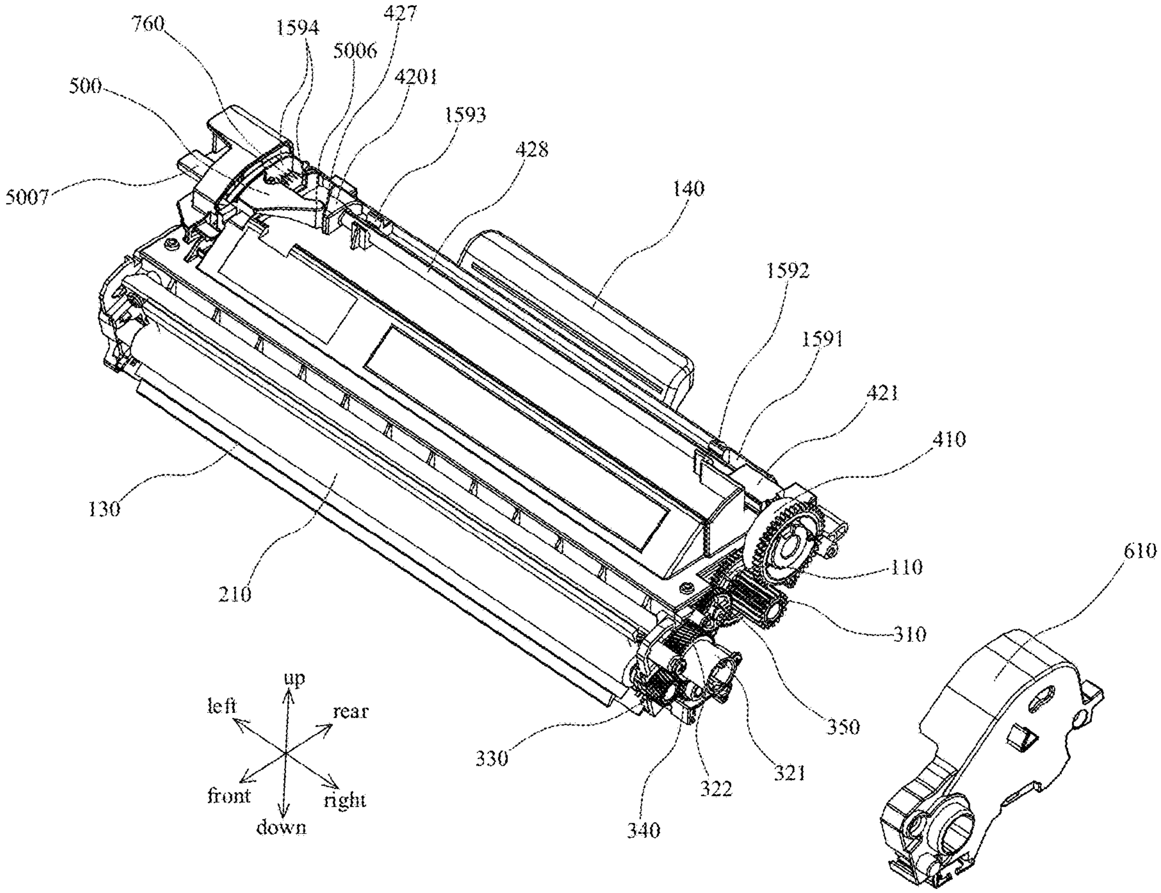
FIG. 1.13
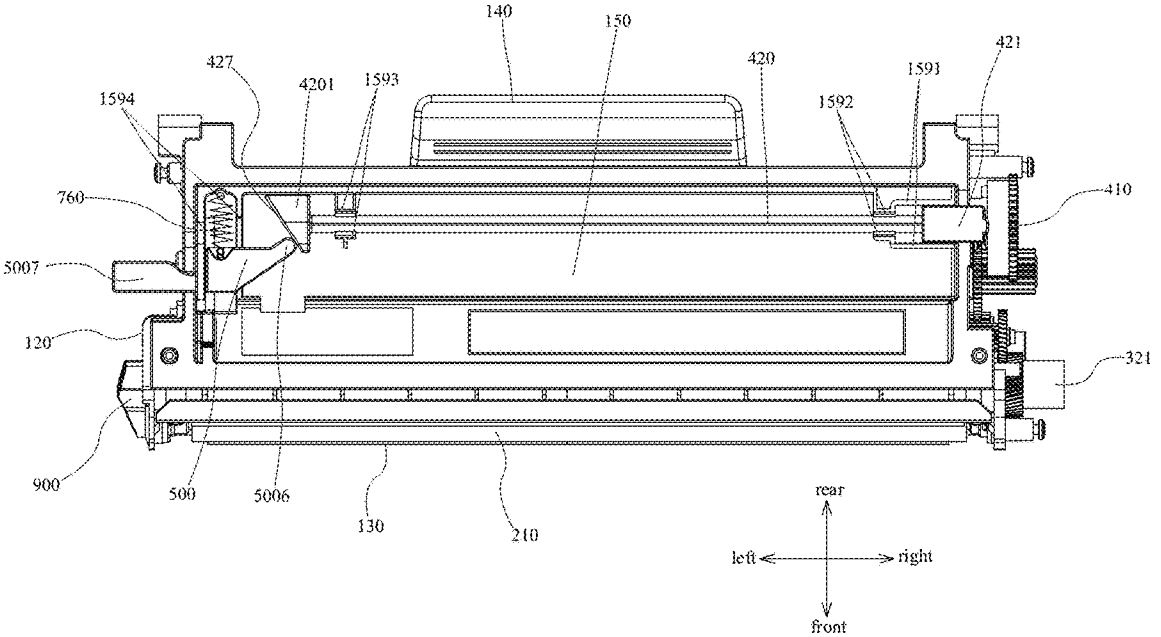
FIG. 1.14

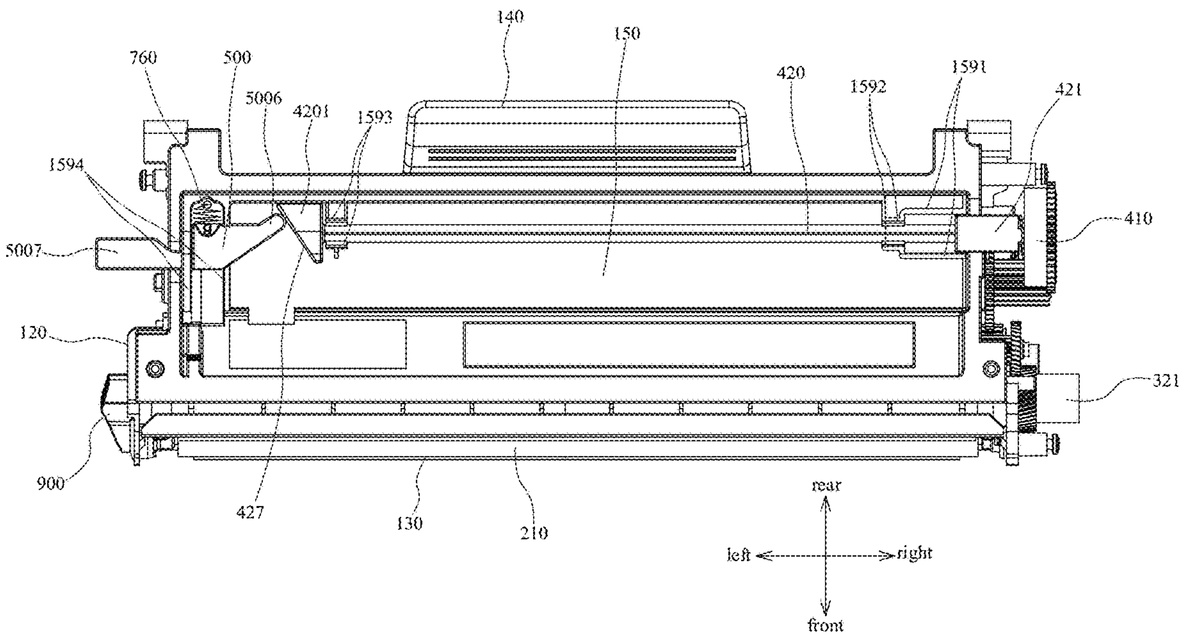
FIG. 1.15
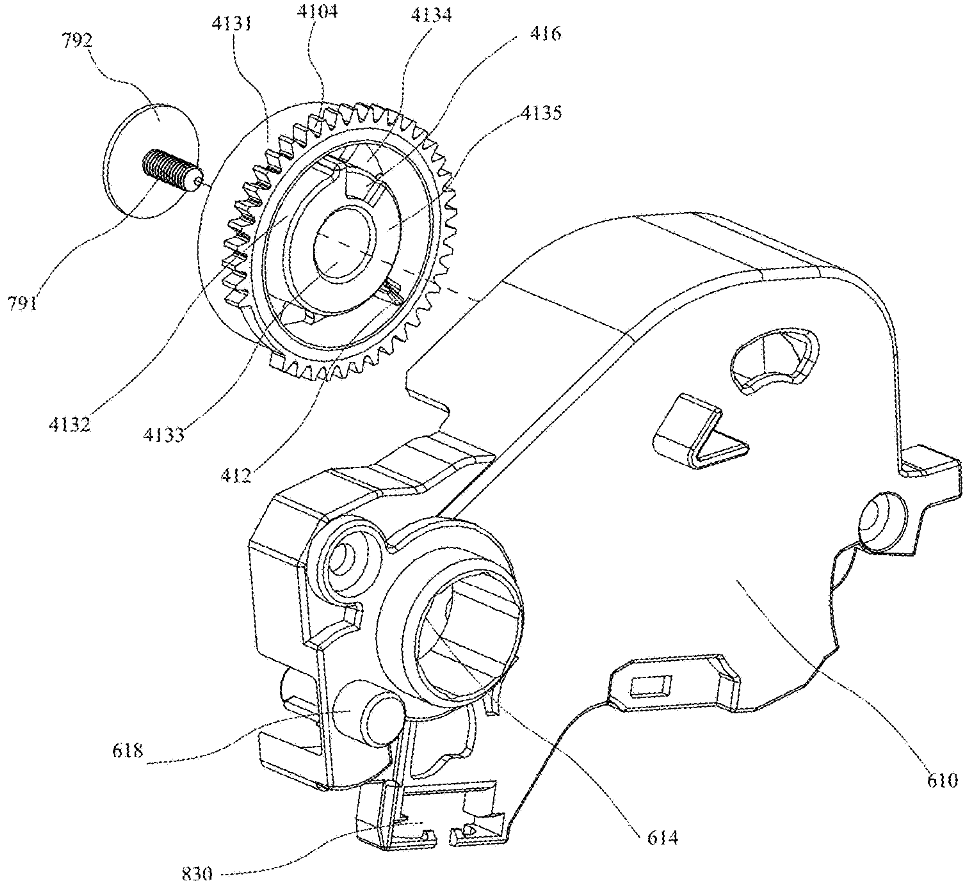
FIG. 1.16

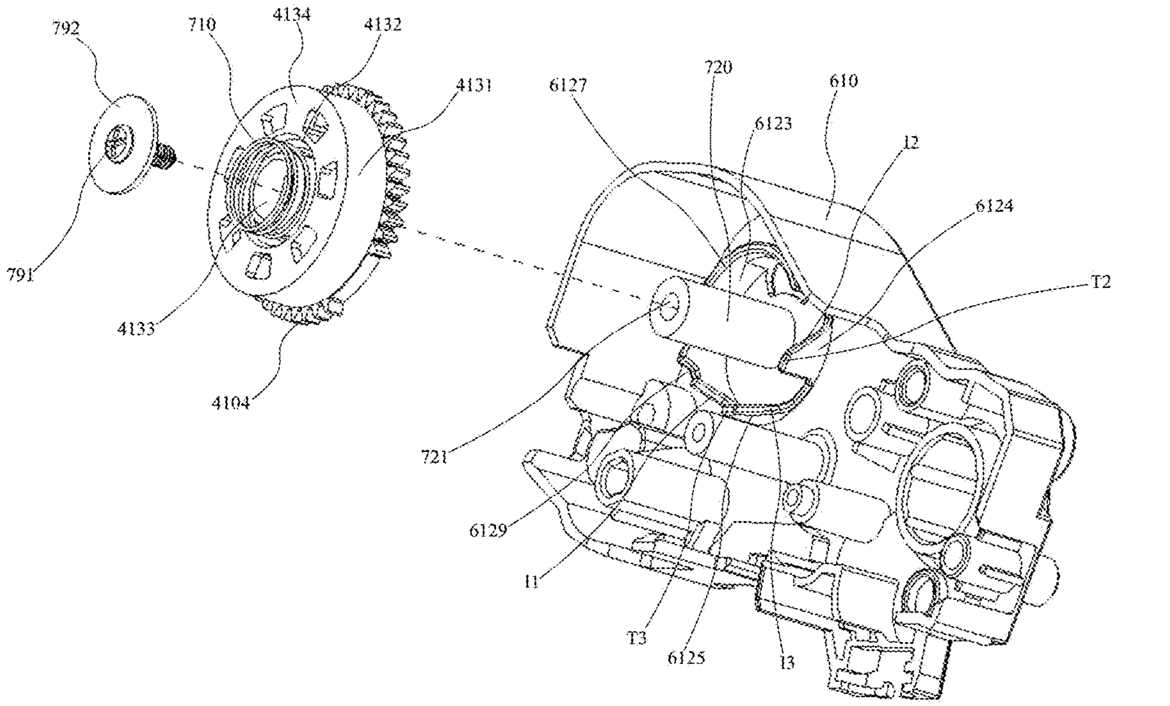
FIG. 1.17
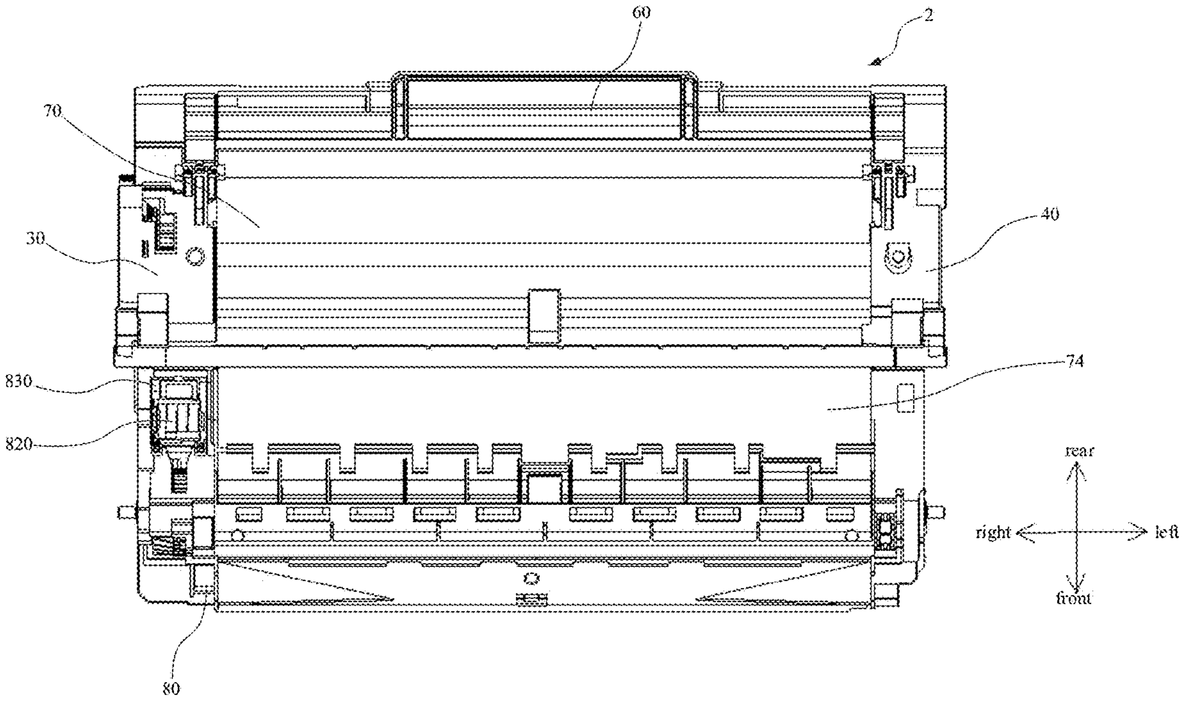
FIG. 1.18

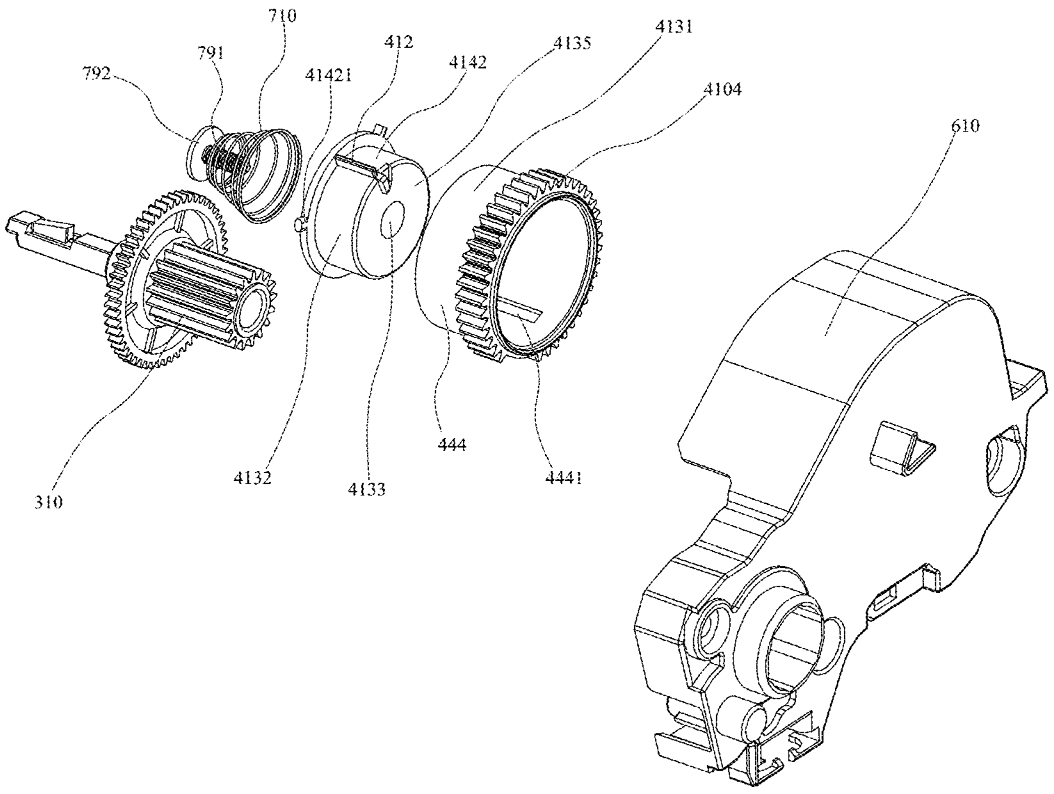
FIG. 2.1
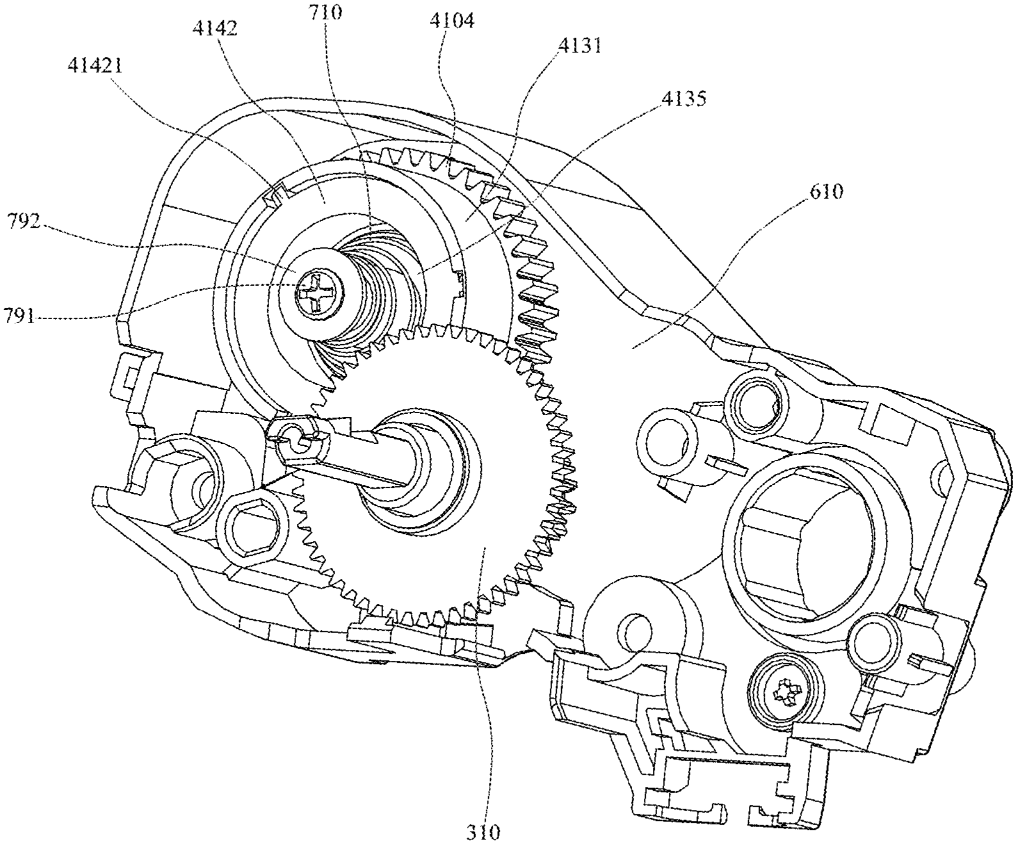
FIG. 2.2

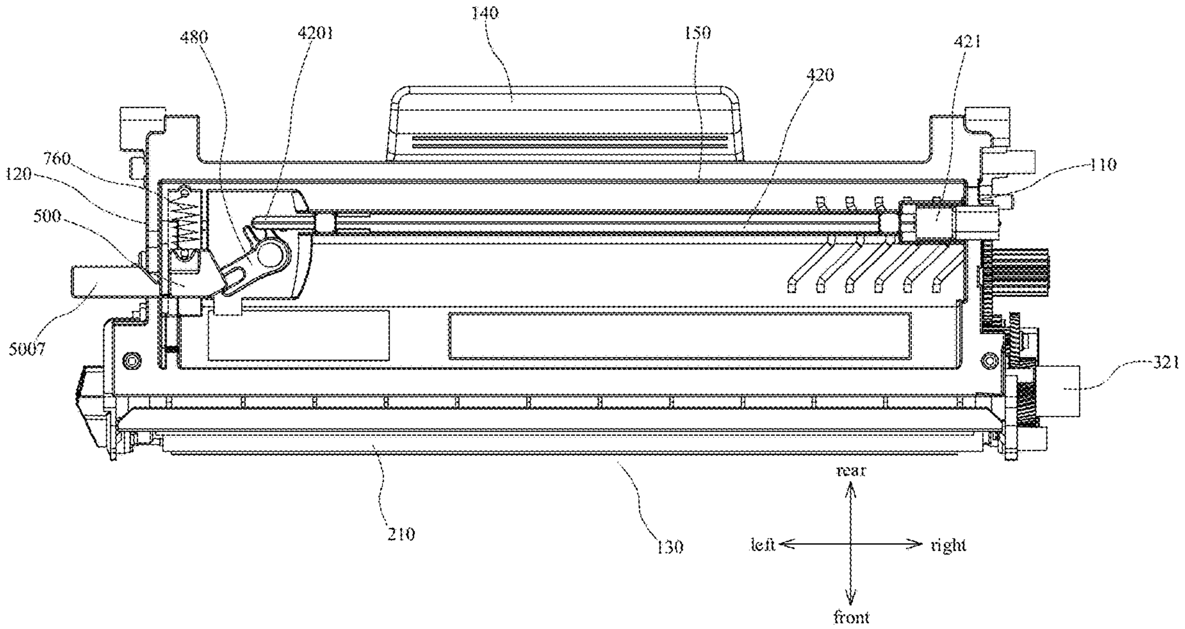
FIG. 3.1
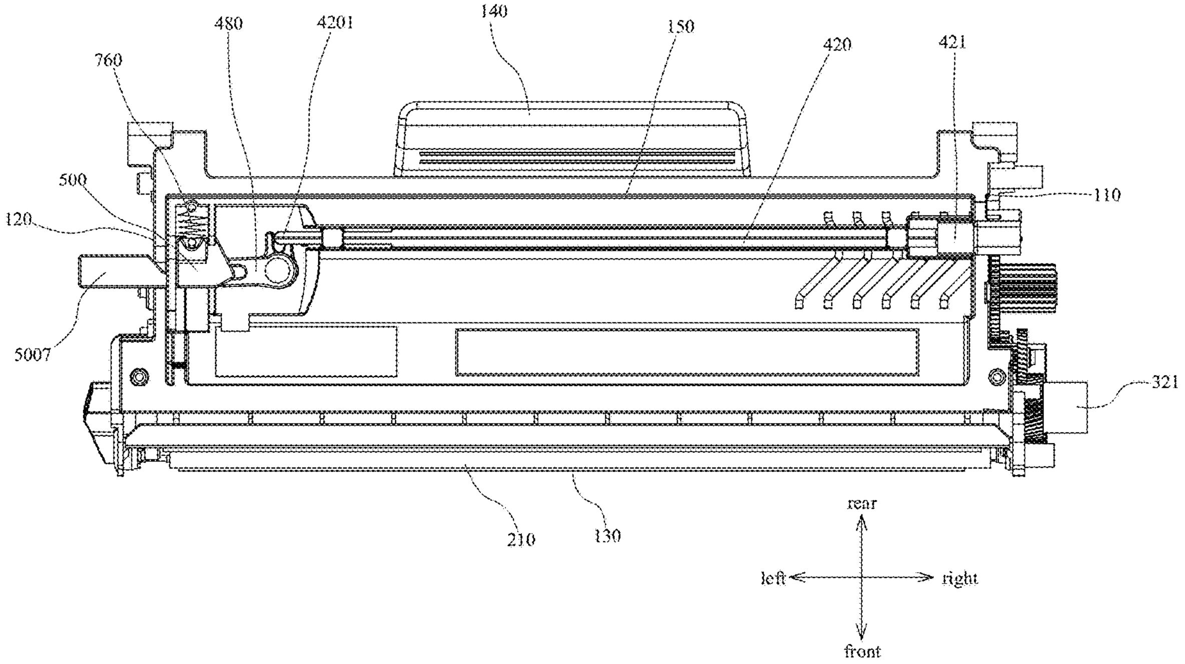
FIG. 3.2

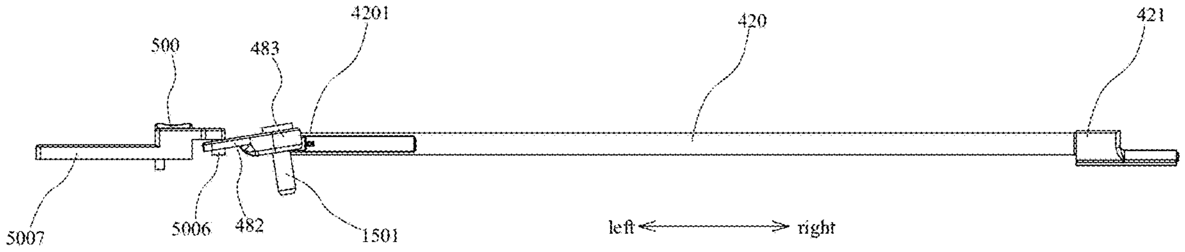
FIG. 3.3
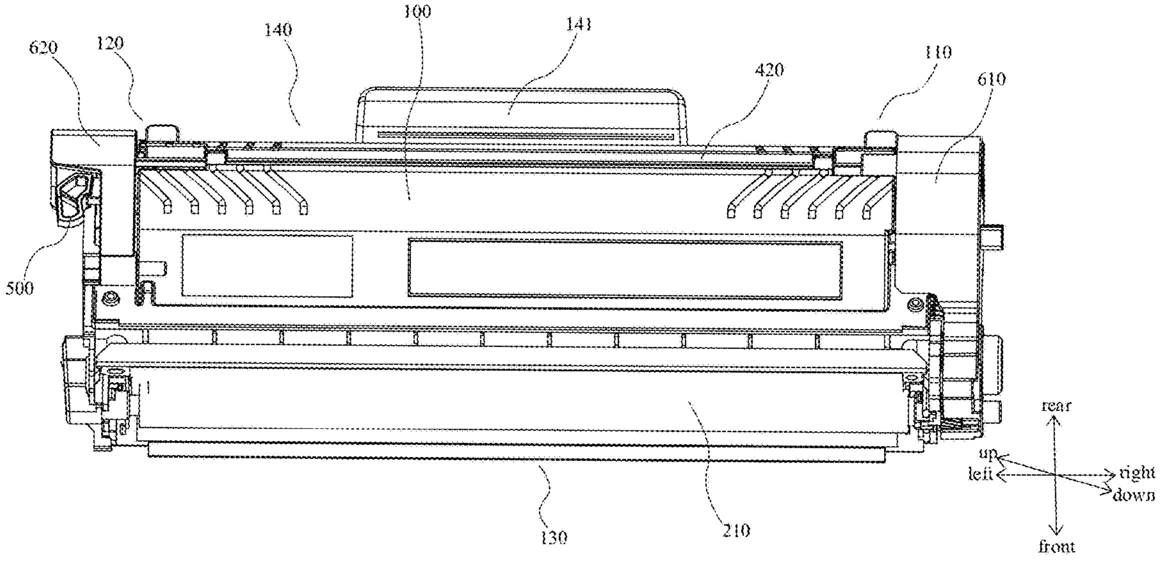
FIG. 4.1
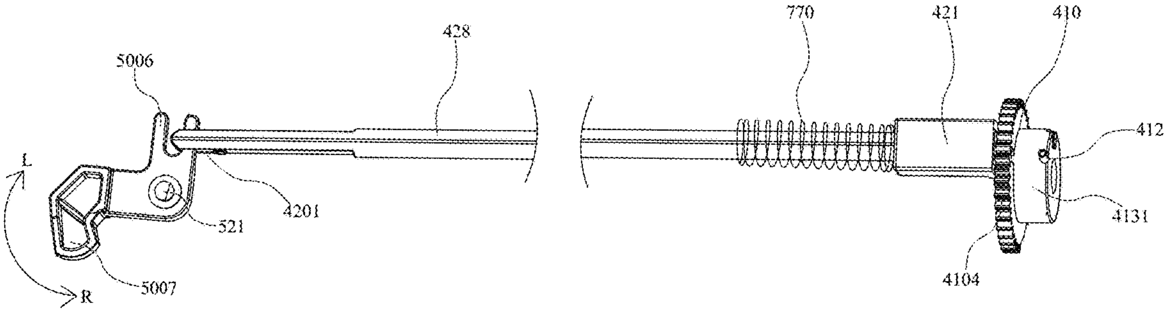
FIG. 4.2

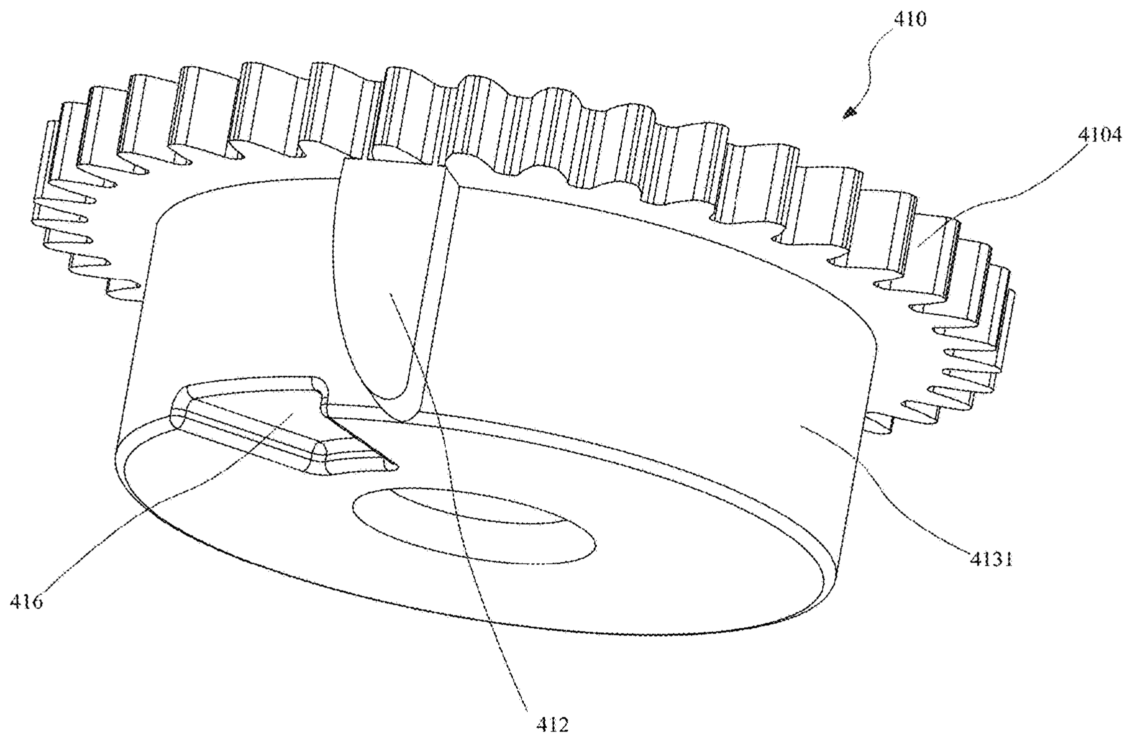
FIG. 4.3
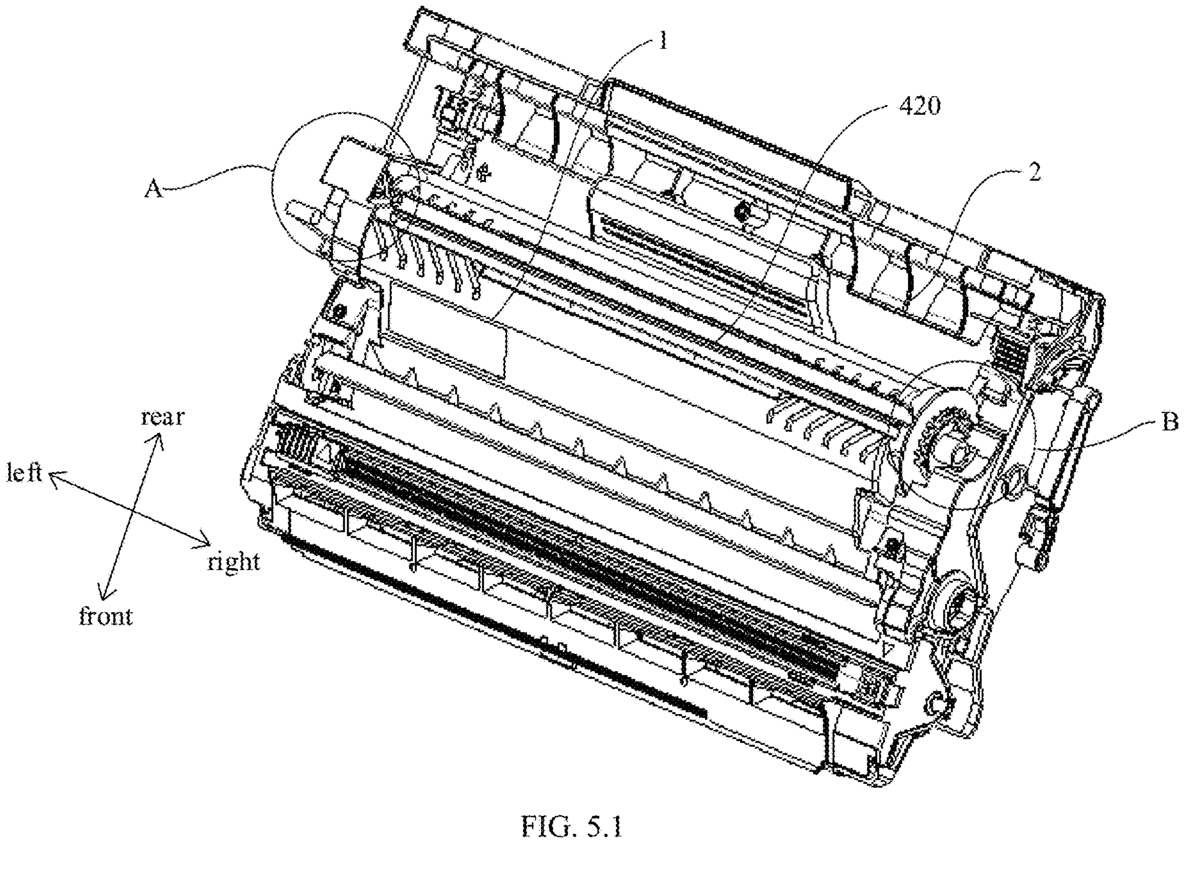
FIG. 5.1

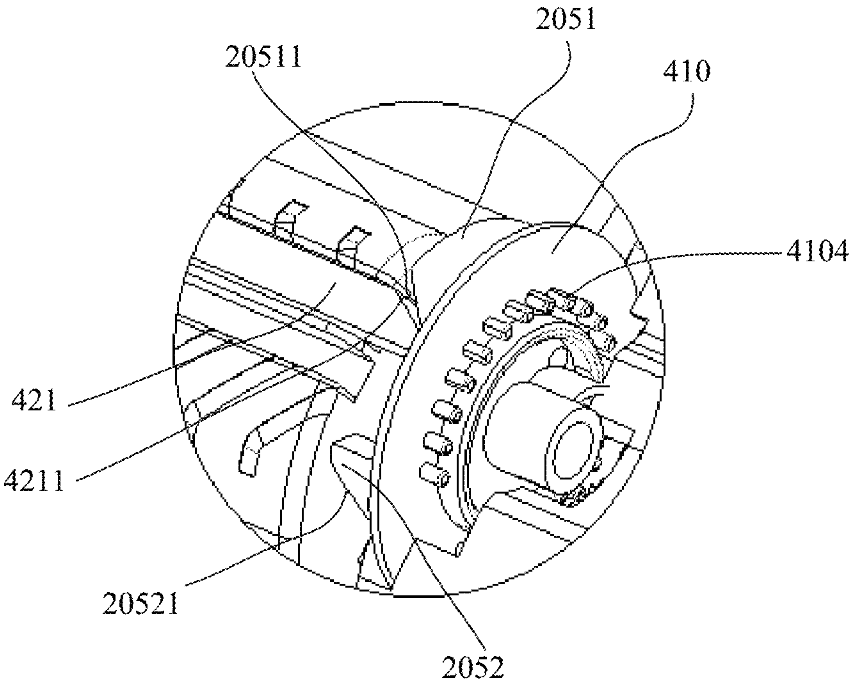
FIG. 5.2
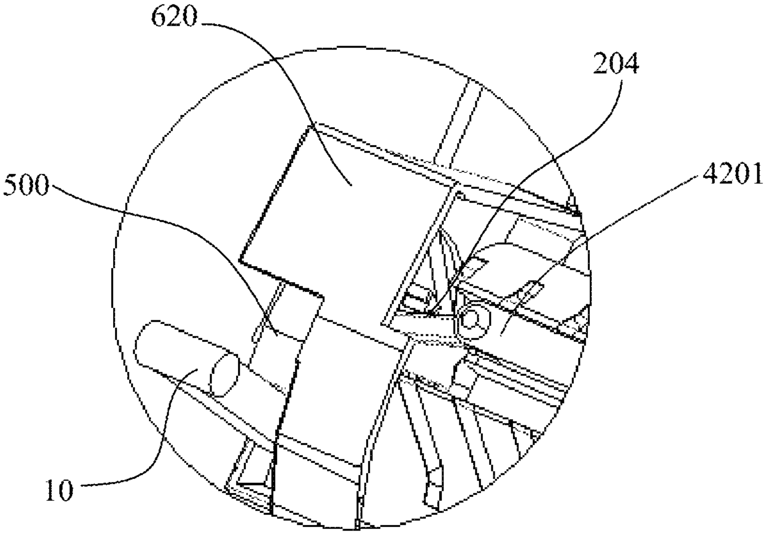
FIG. 5.3

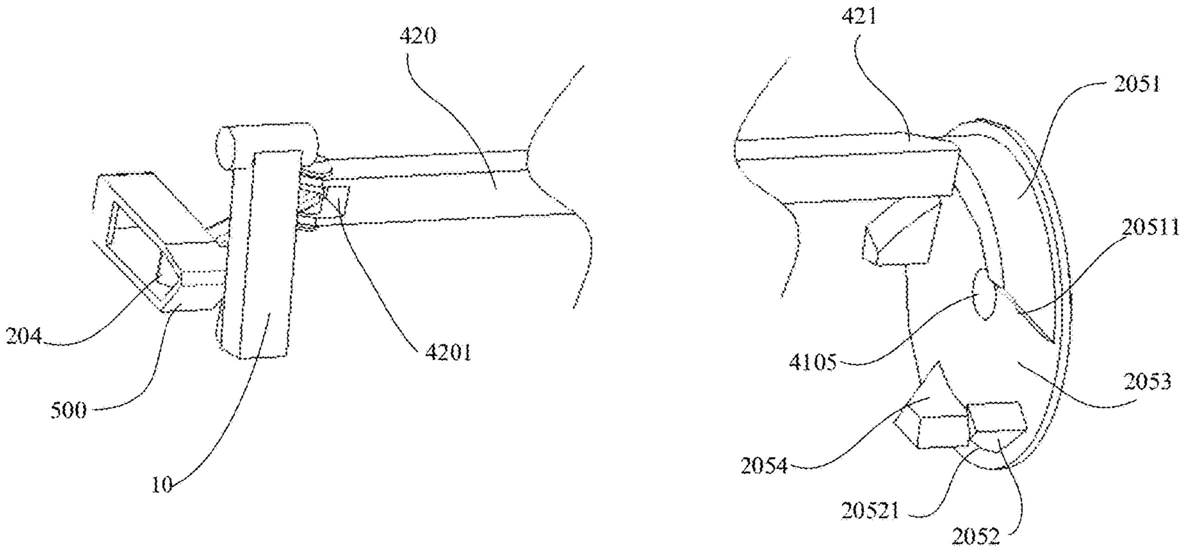
FIG. 5.4
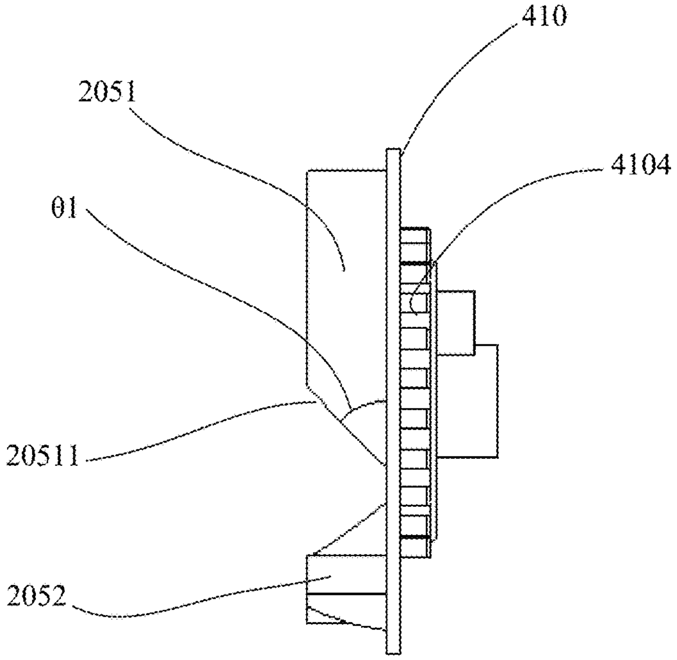
FIG. 5.5

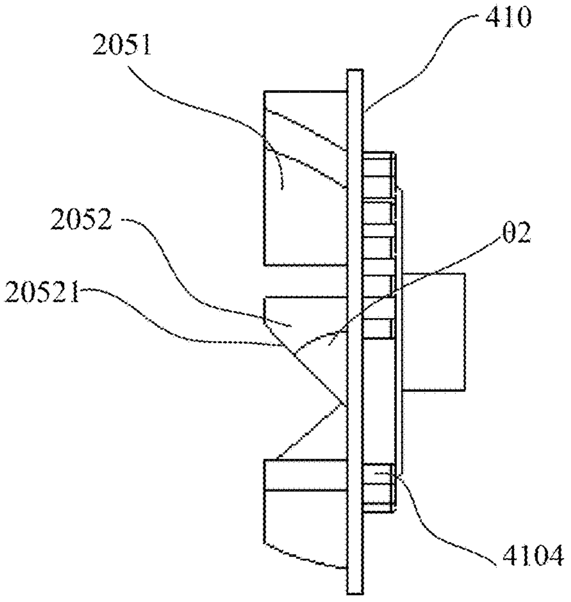
FIG. 5.6
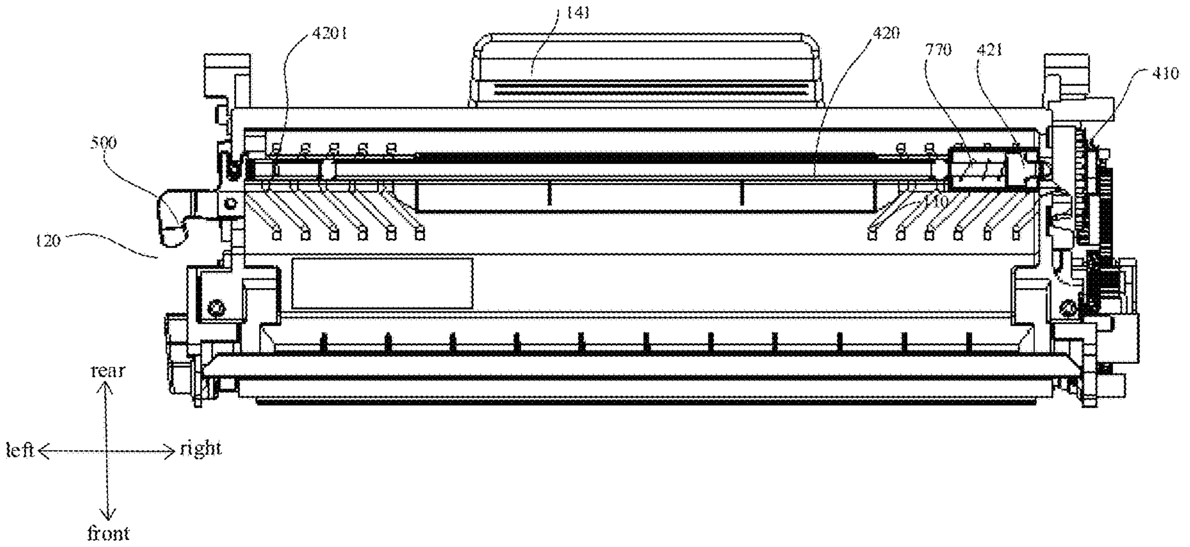
FIG. 5.7

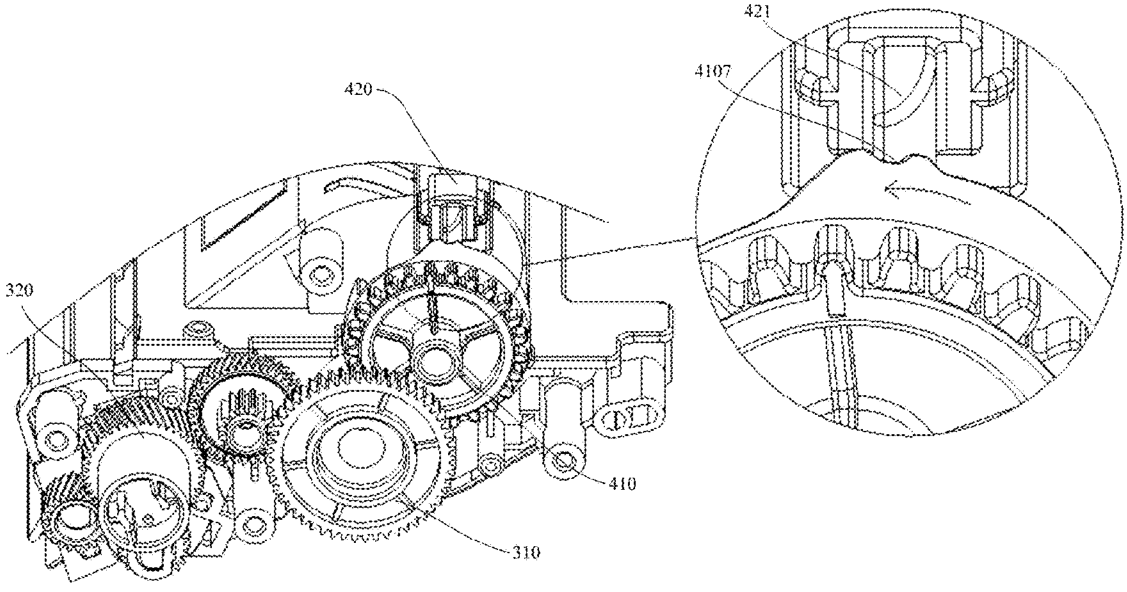
FIG. 5.8
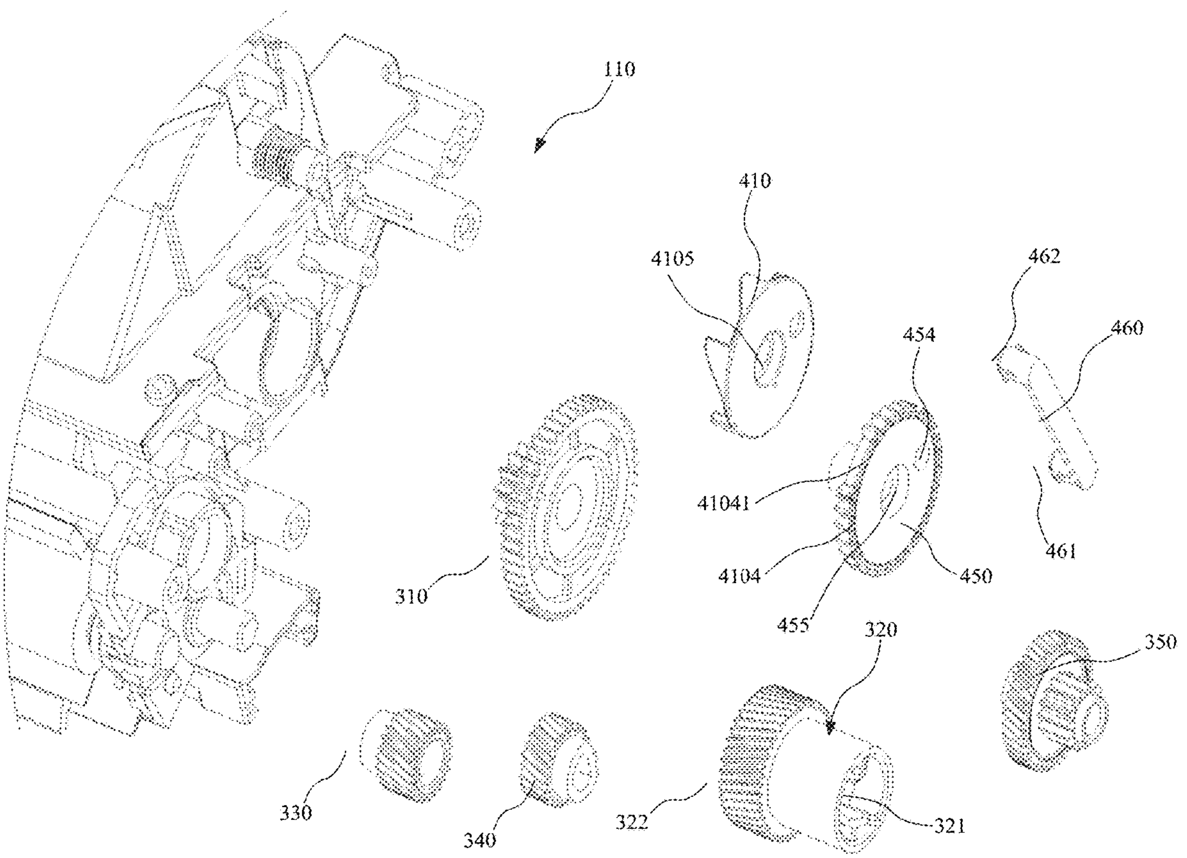
FIG. 6.1

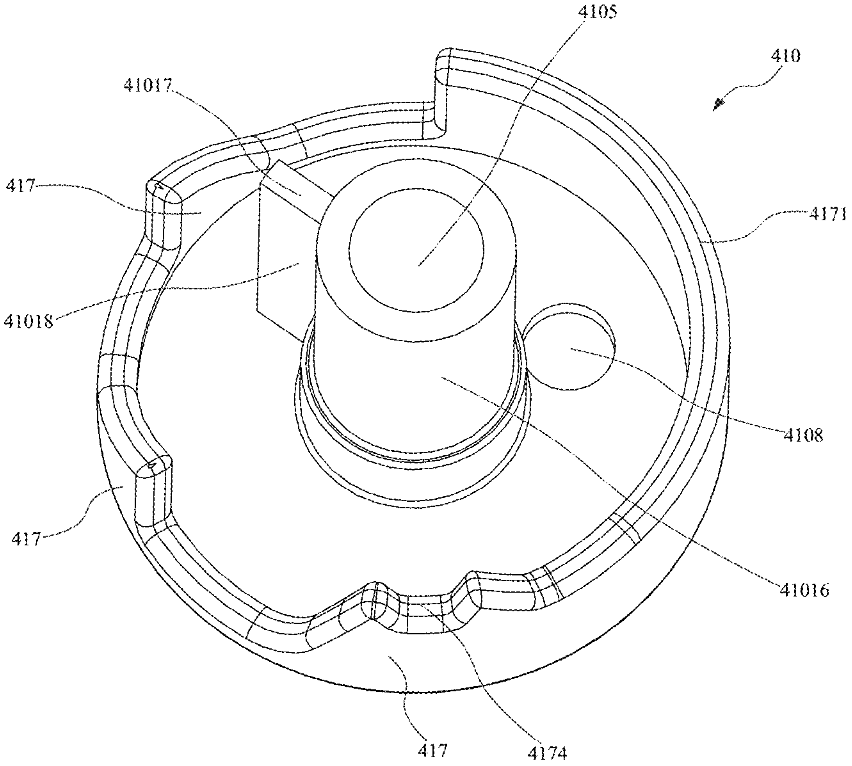
FIG. 6.2
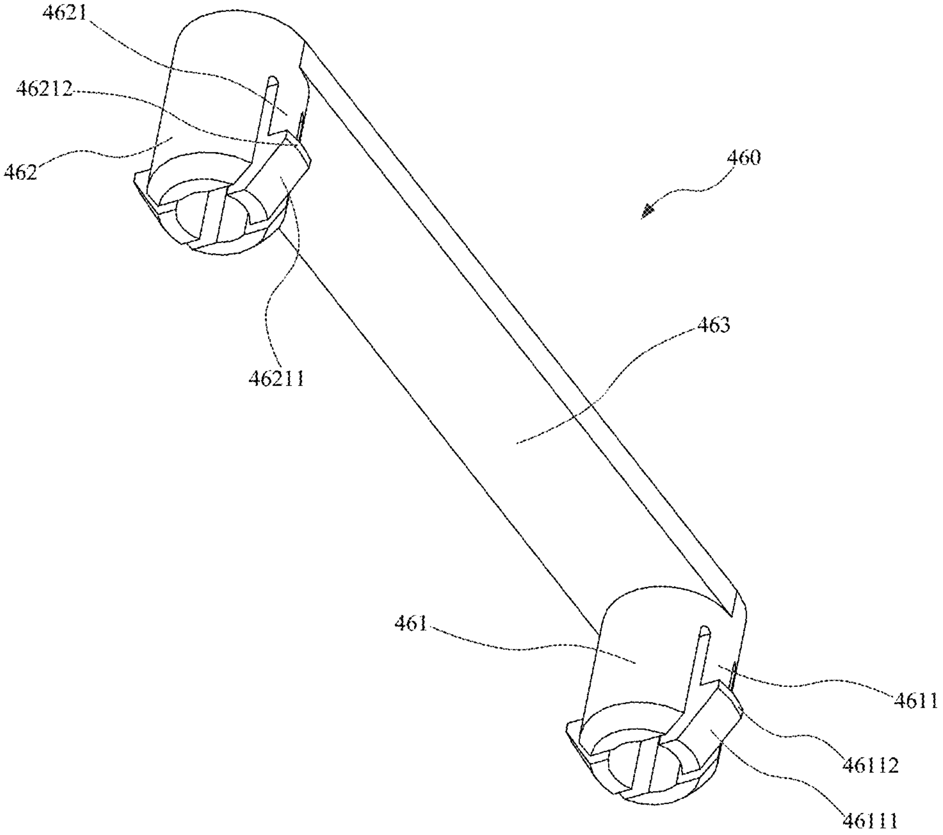
FIG. 6.3

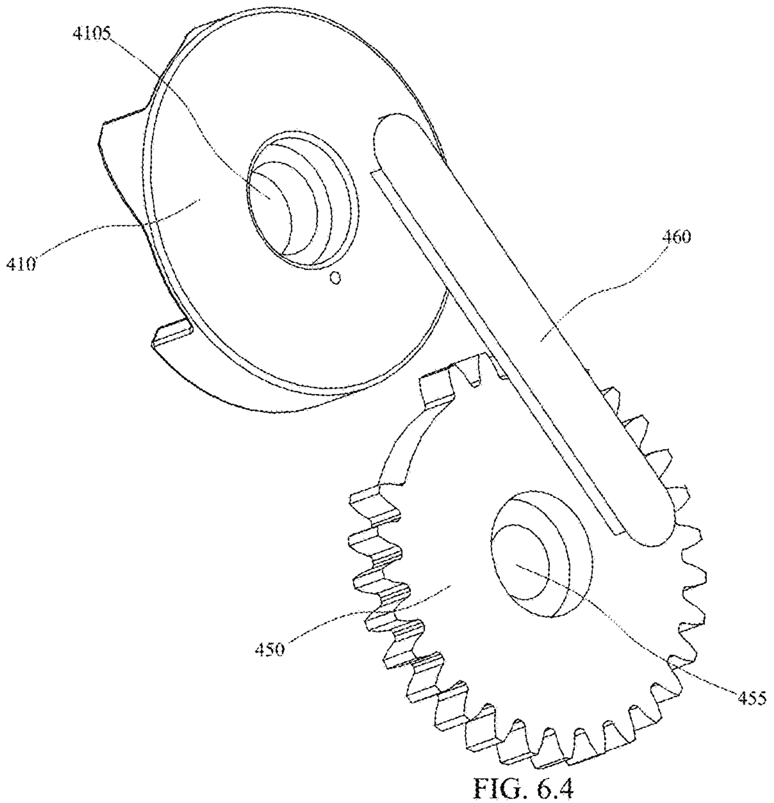
FIG. 6.4
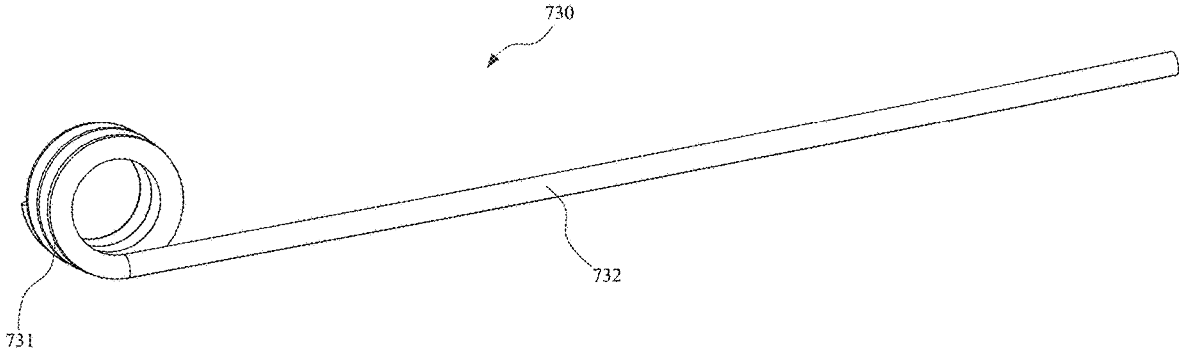
FIG. 6.5

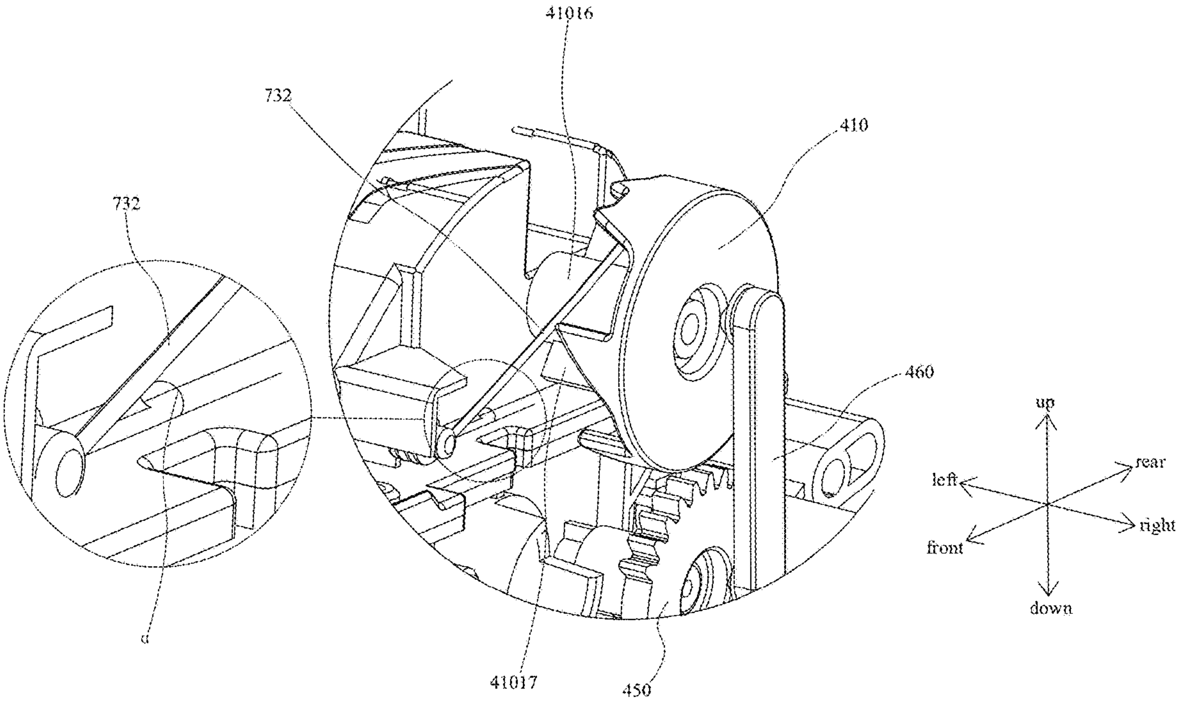
FIG. 6.6
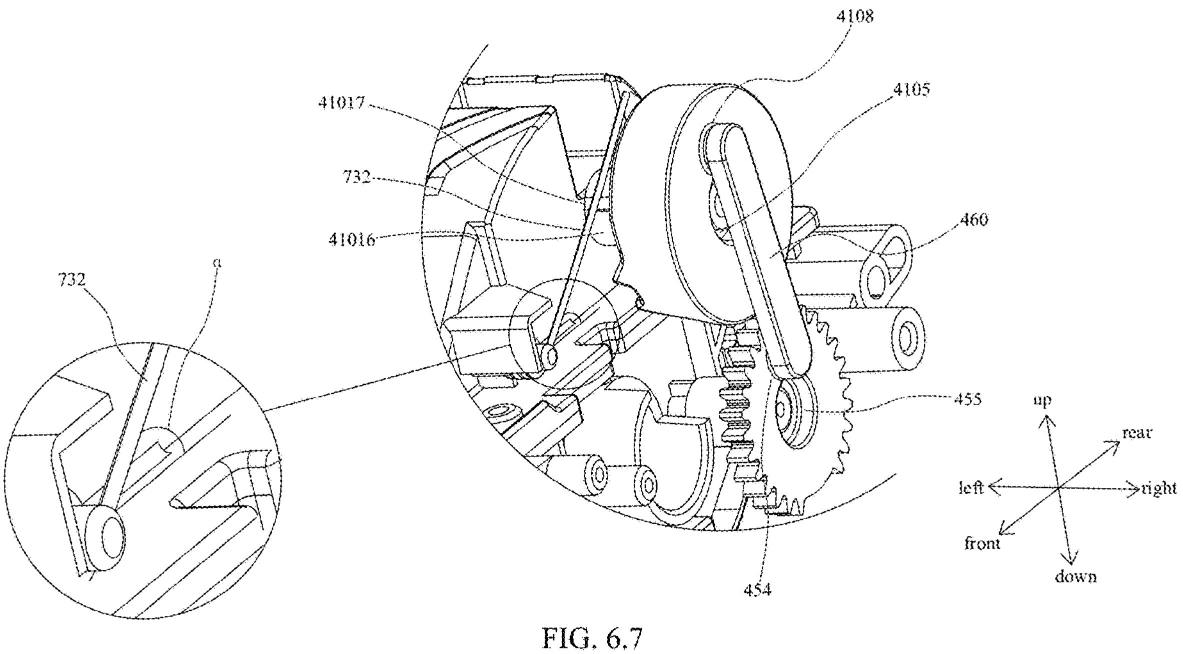
FIG. 6.7

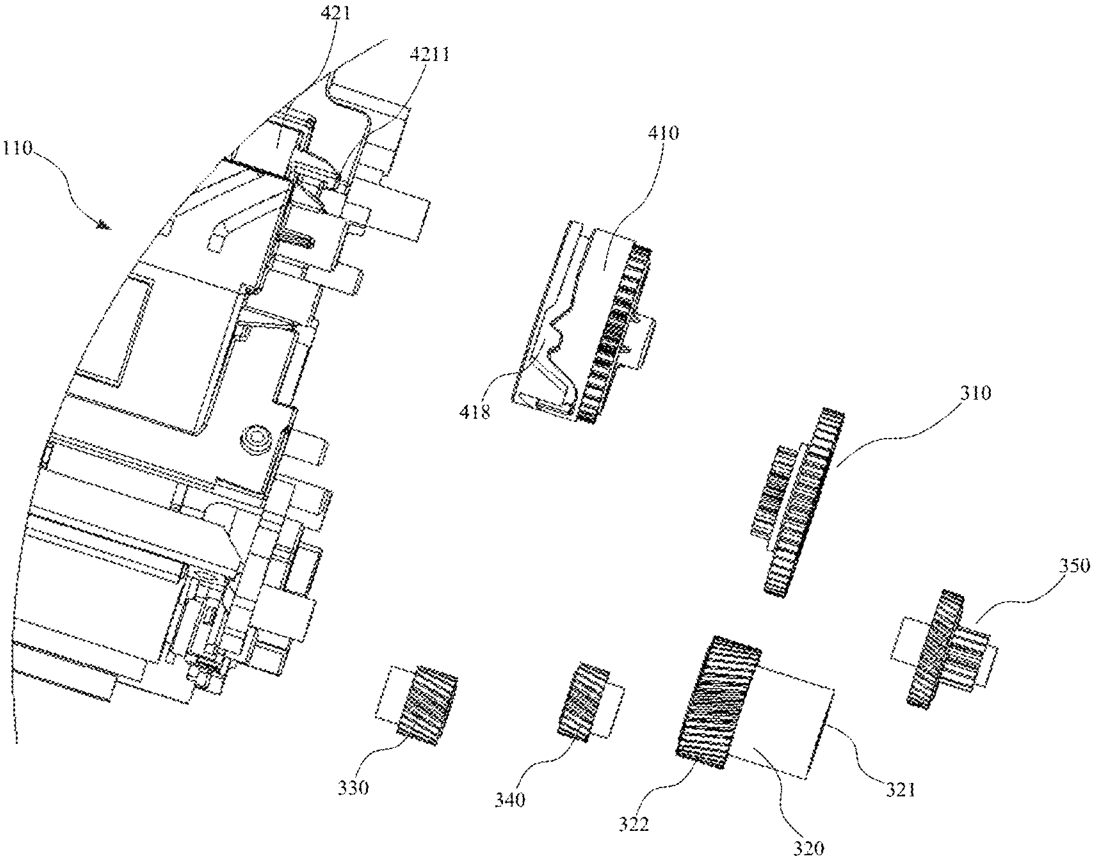
FIG. 7.1
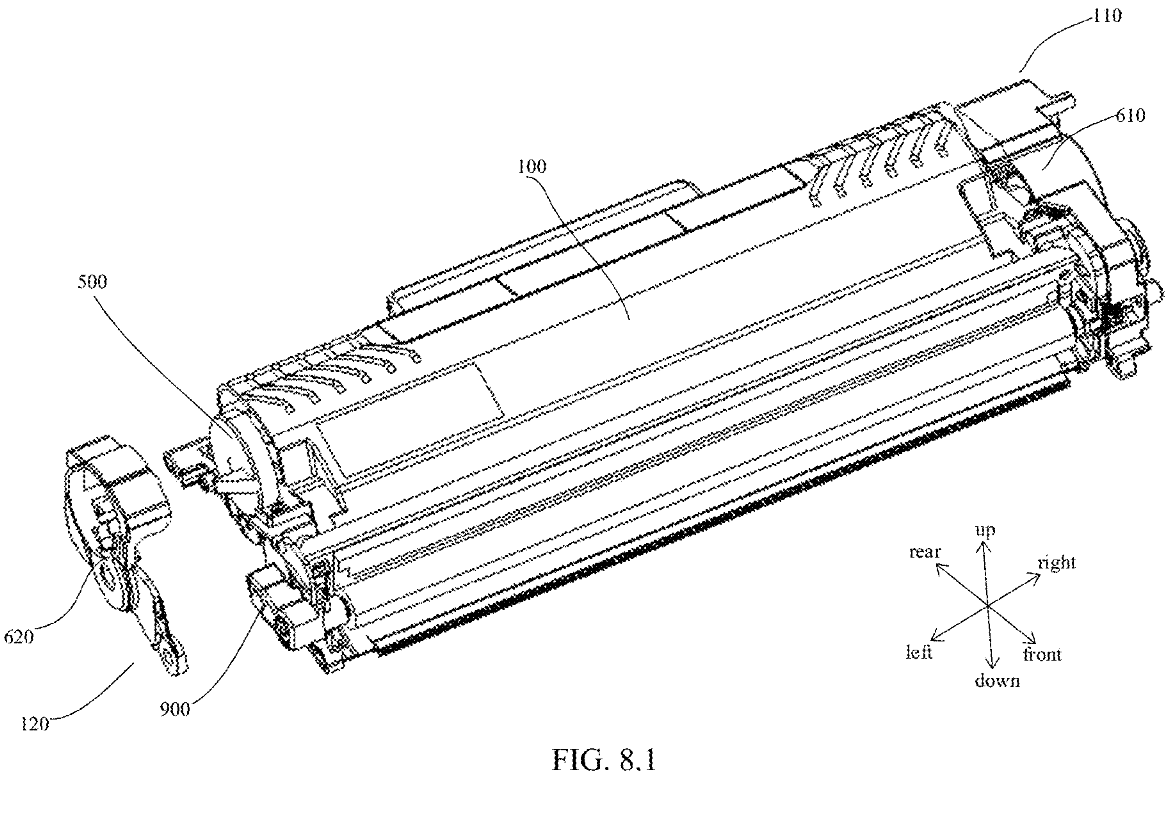
FIG. 8.1

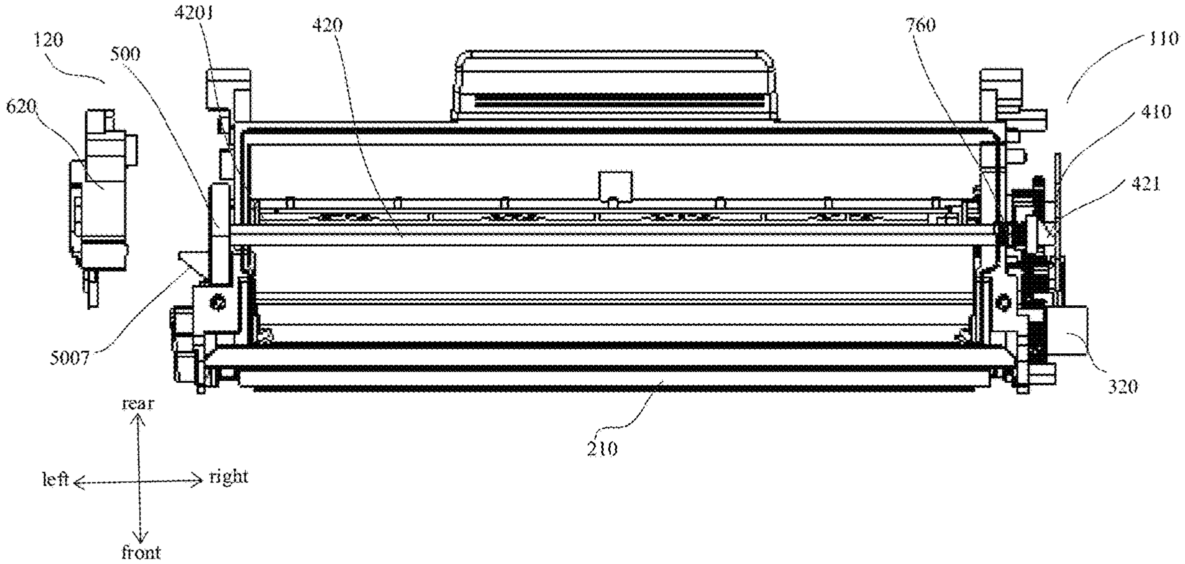
FIG. 8.2
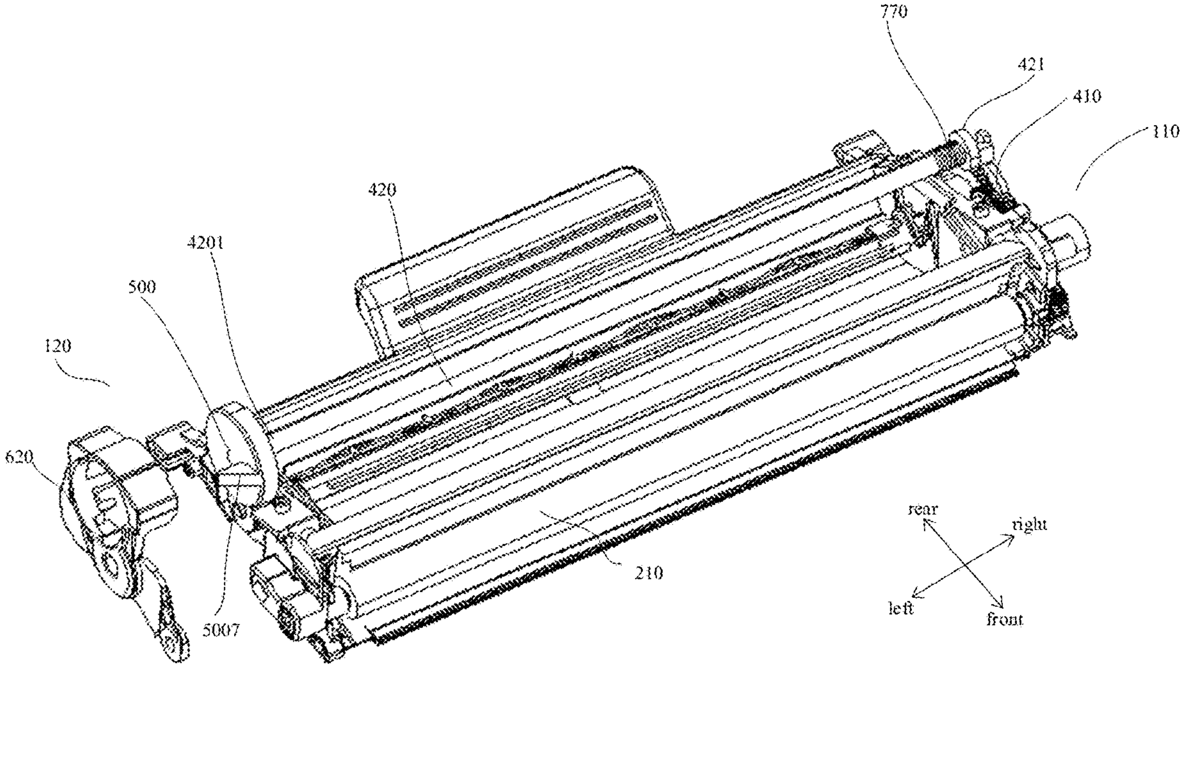
FIG. 8.3

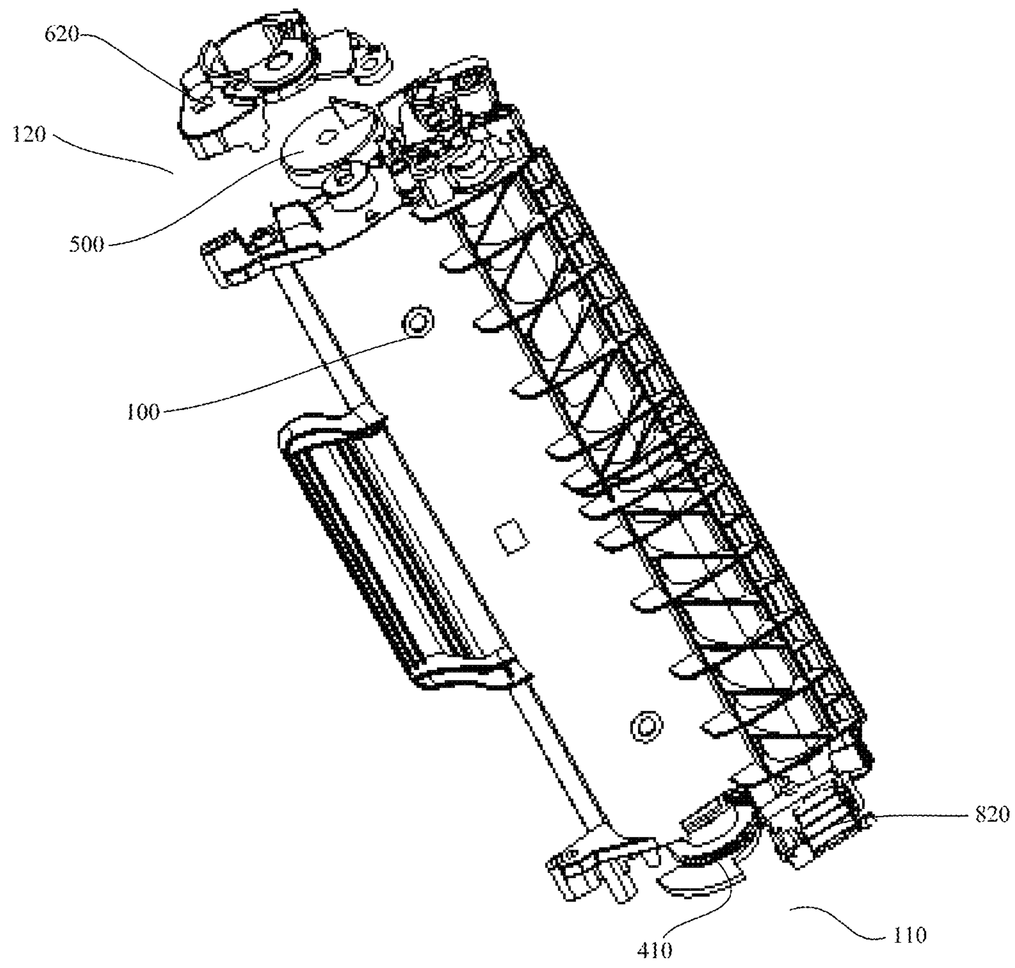
FIG. 8.4

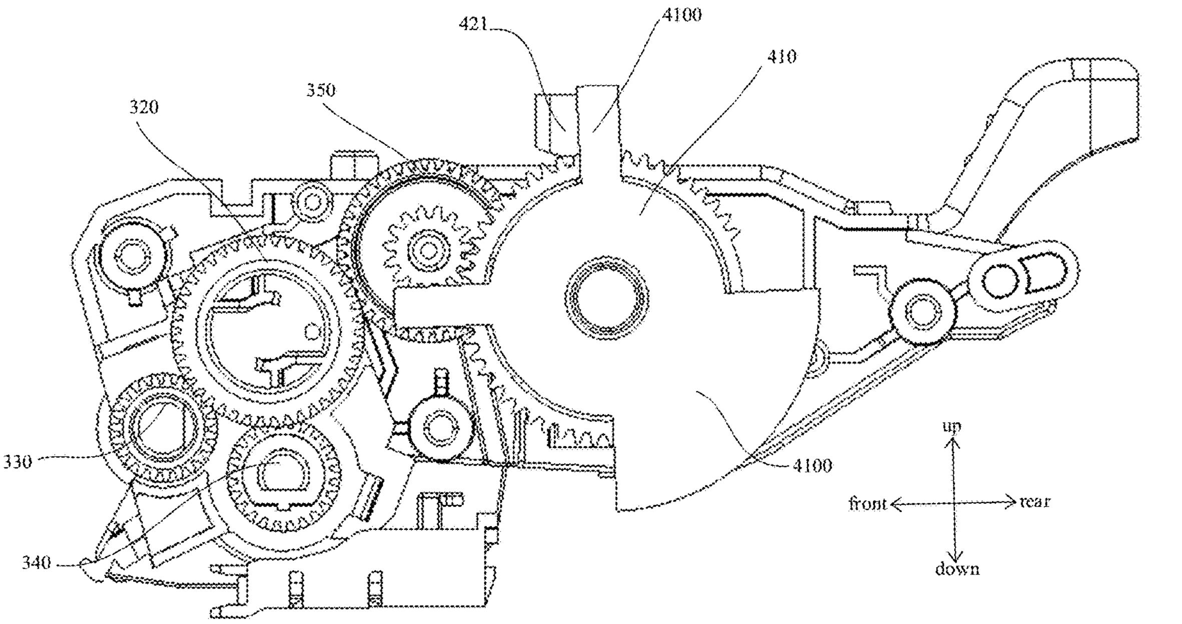
FIG. 8.5
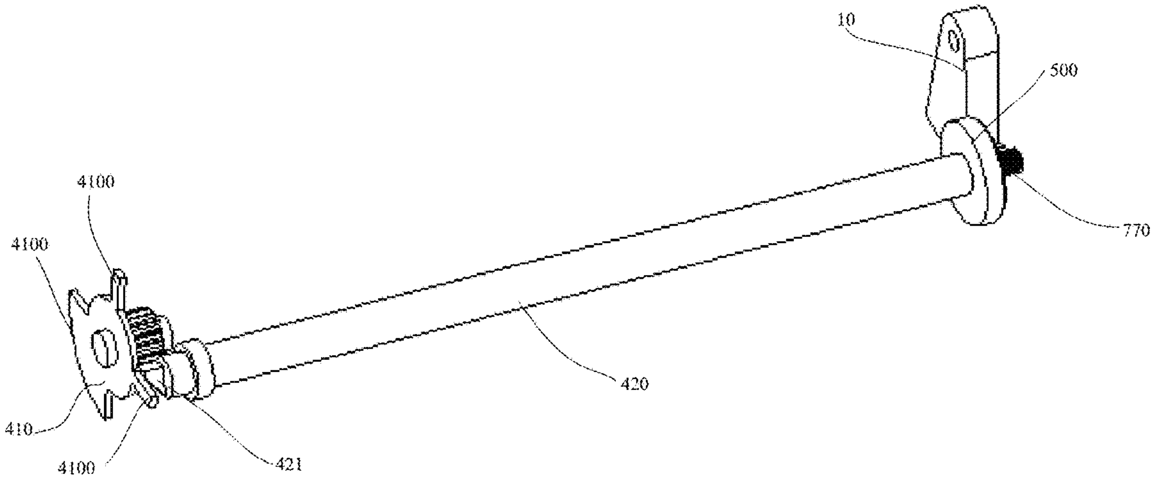
FIG. 8.6

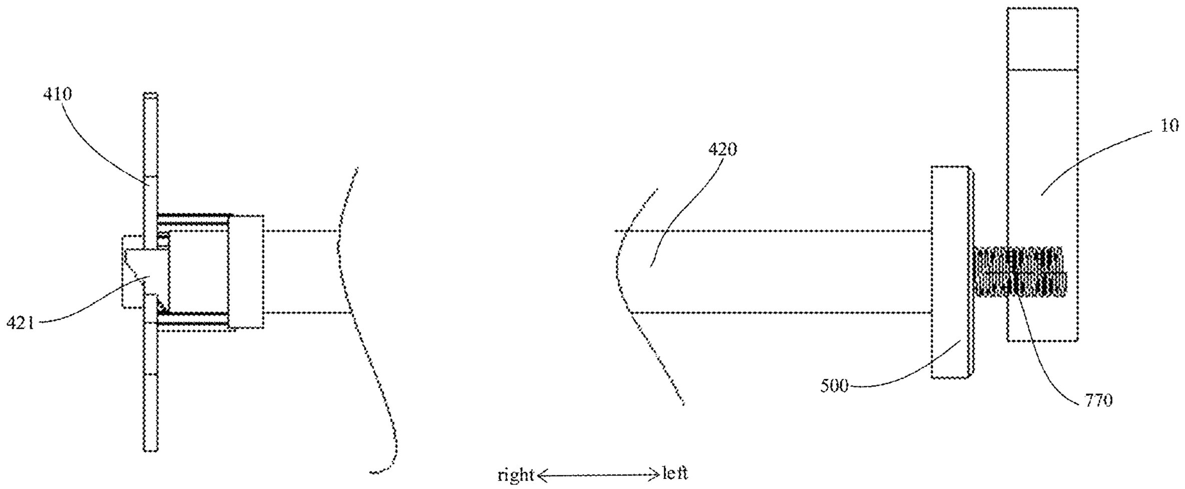
FIG. 8.7
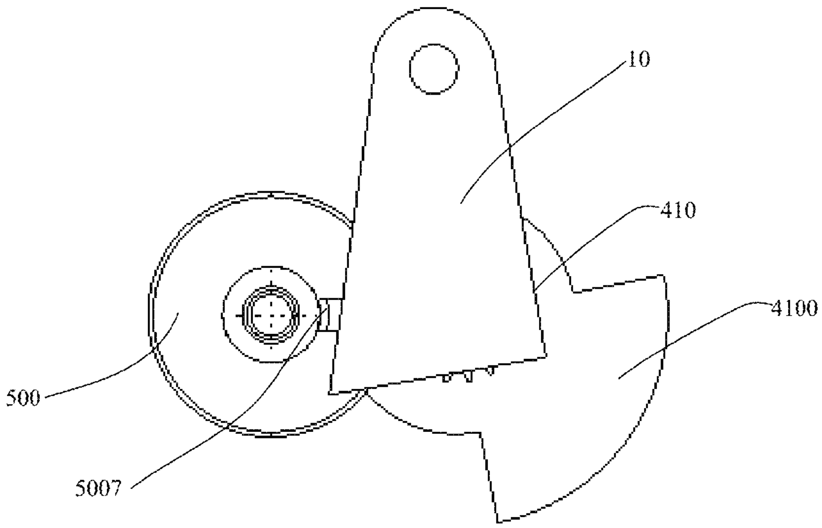
FIG. 8.8

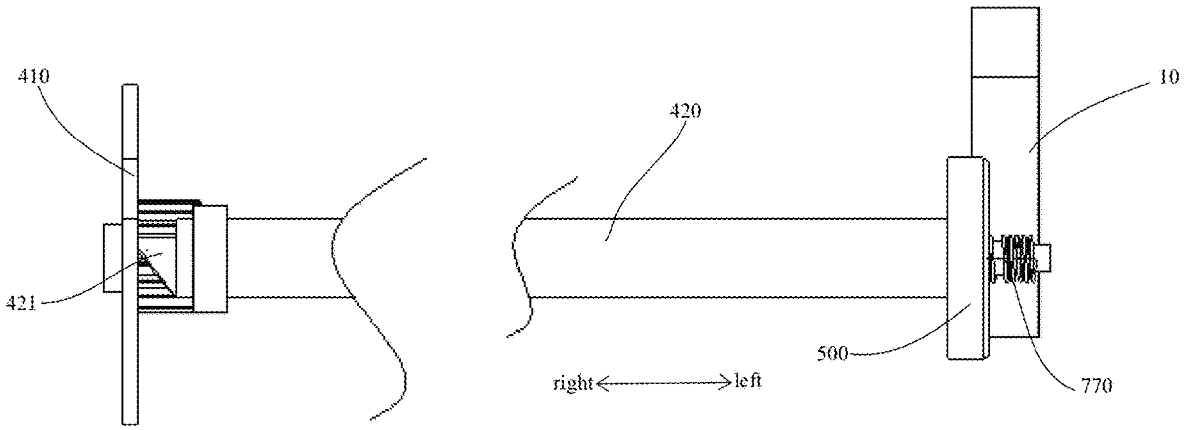
FIG. 8.9
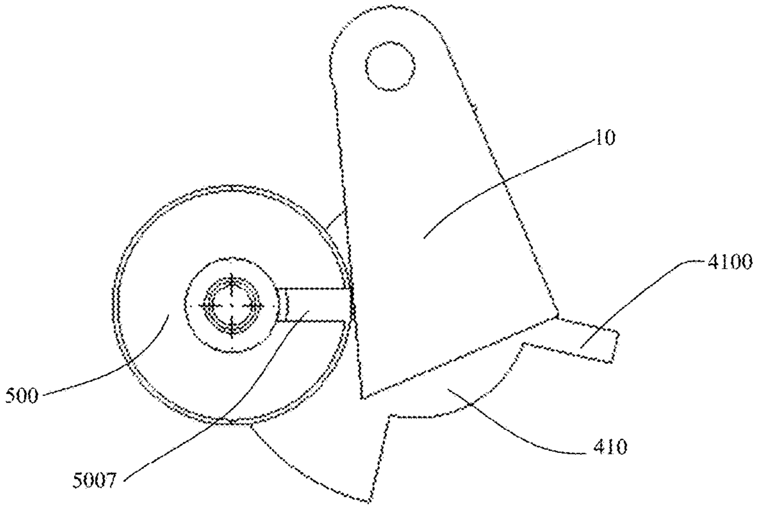
FIG. 8.10

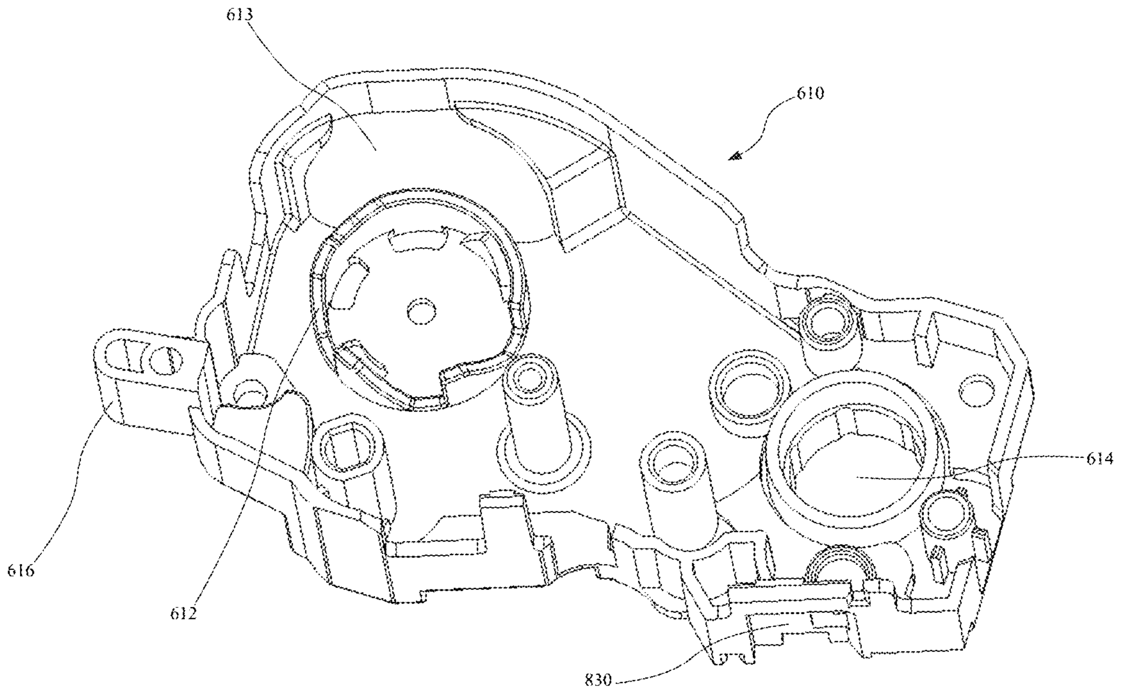
FIG. 9.1
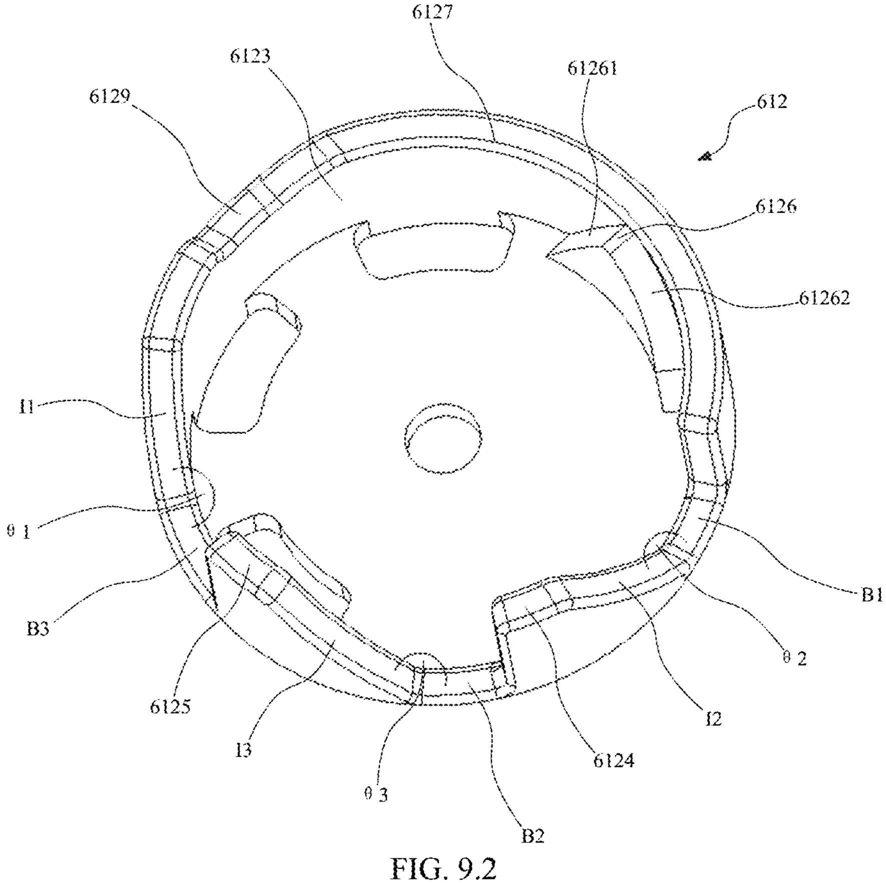
FIG. 9.2

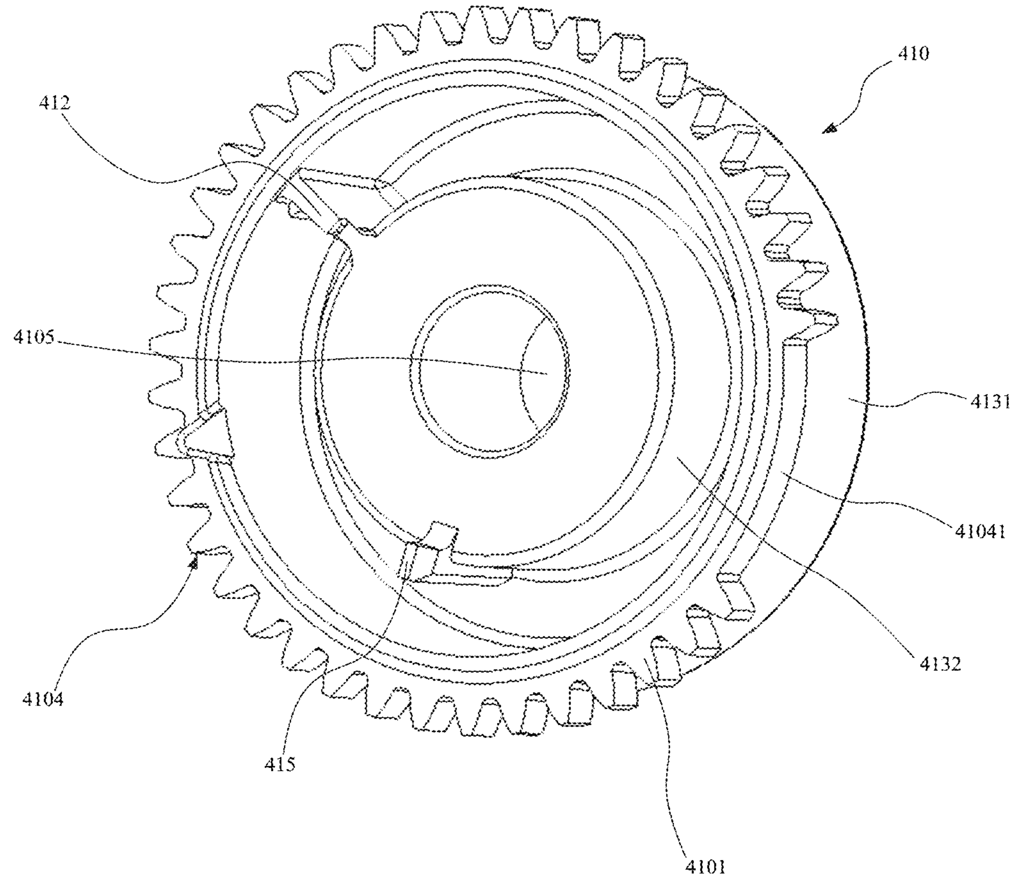
FIG. 9.3
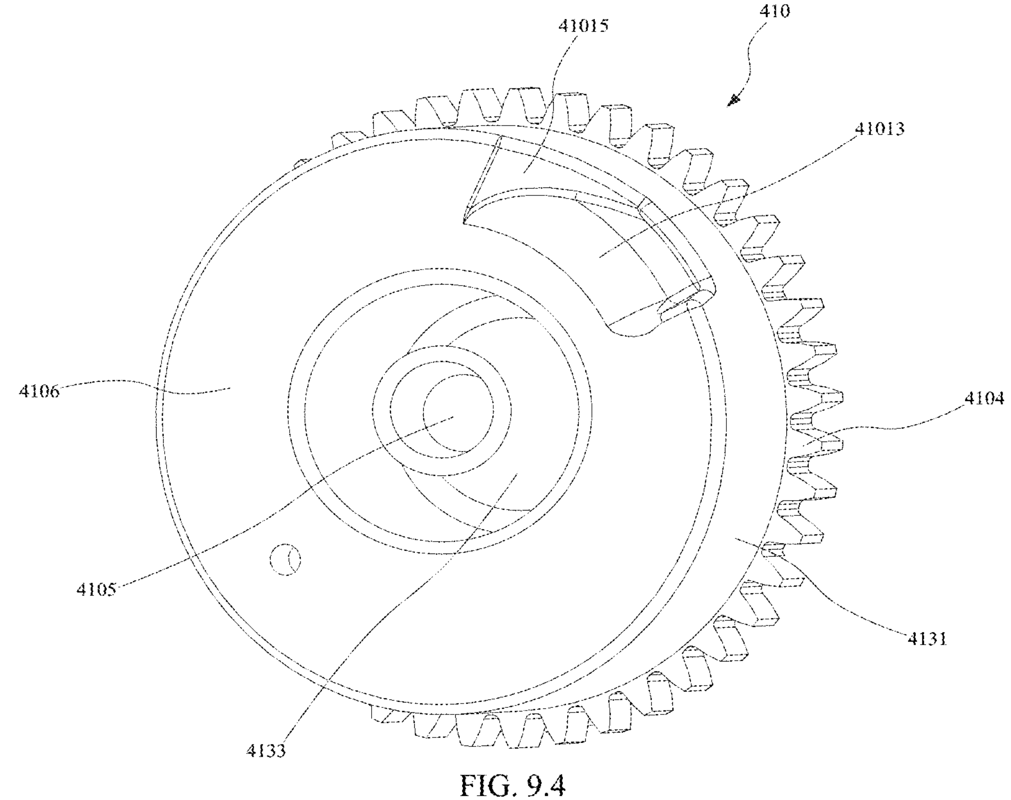
FIG. 9.4

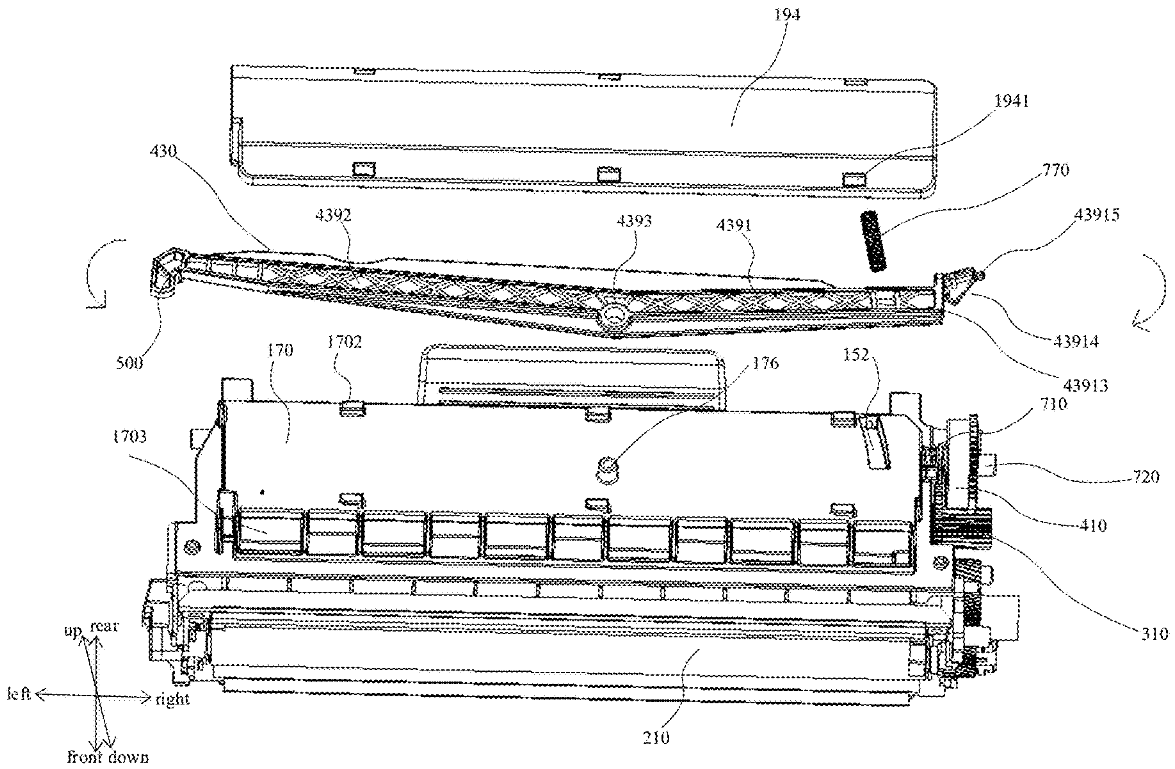
FIG. 9.5
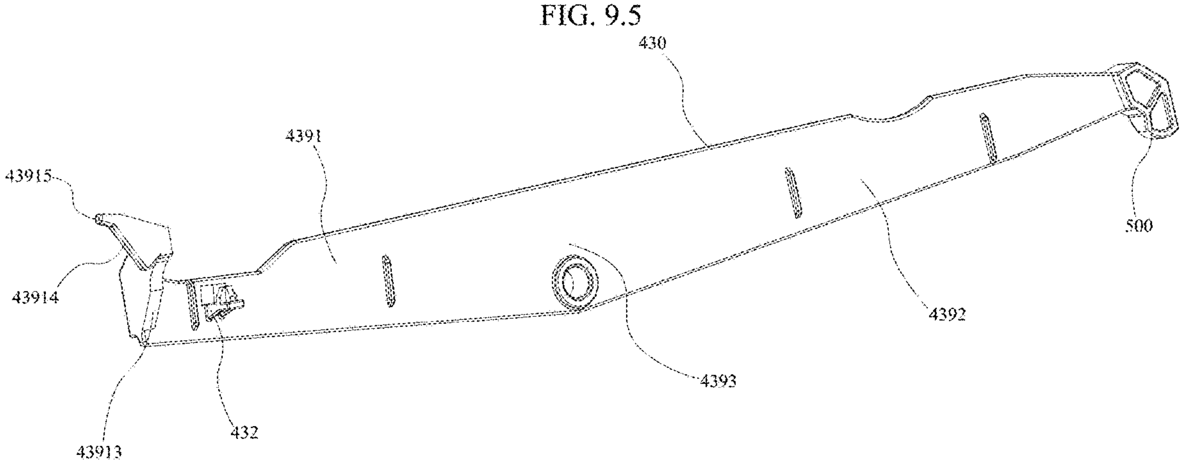
FIG. 9.6

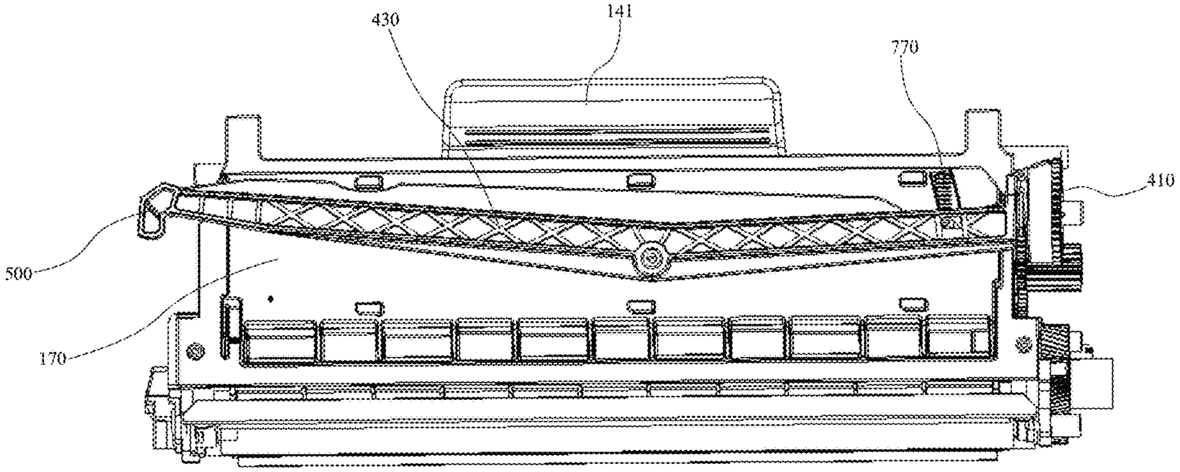
FIG. 9.7
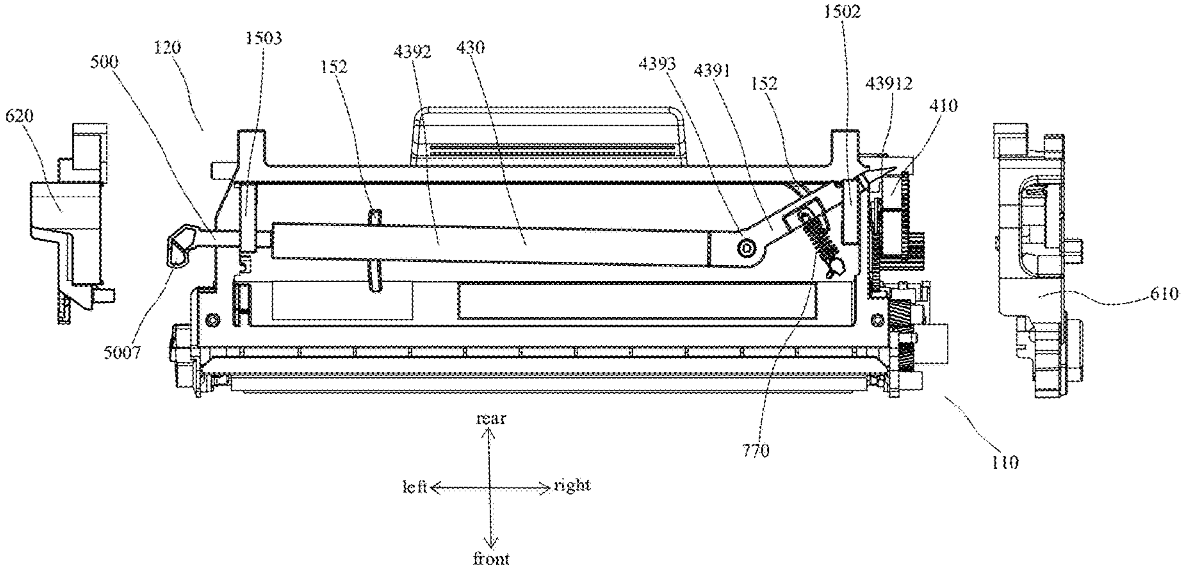
FIG. 10.1

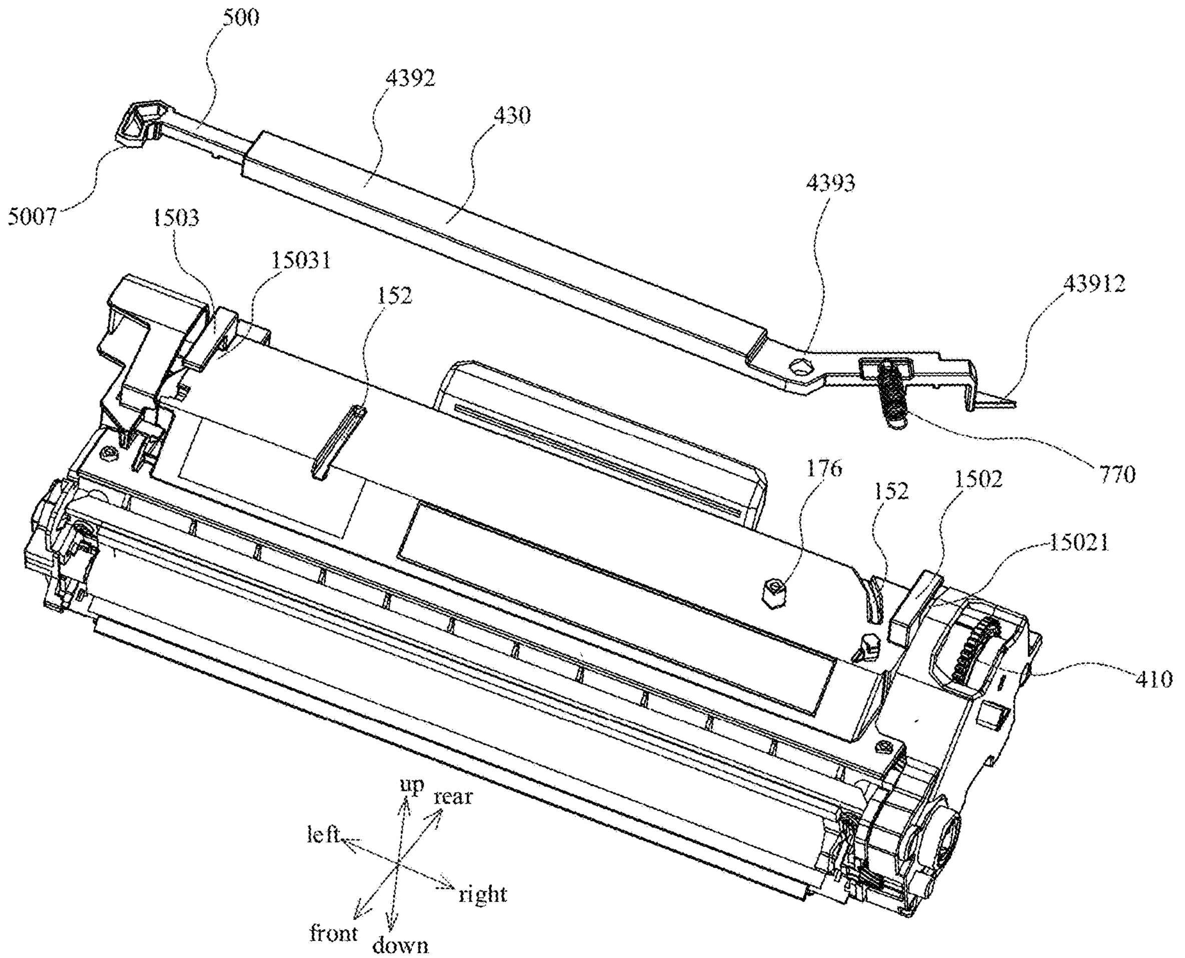
FIG. 10.2
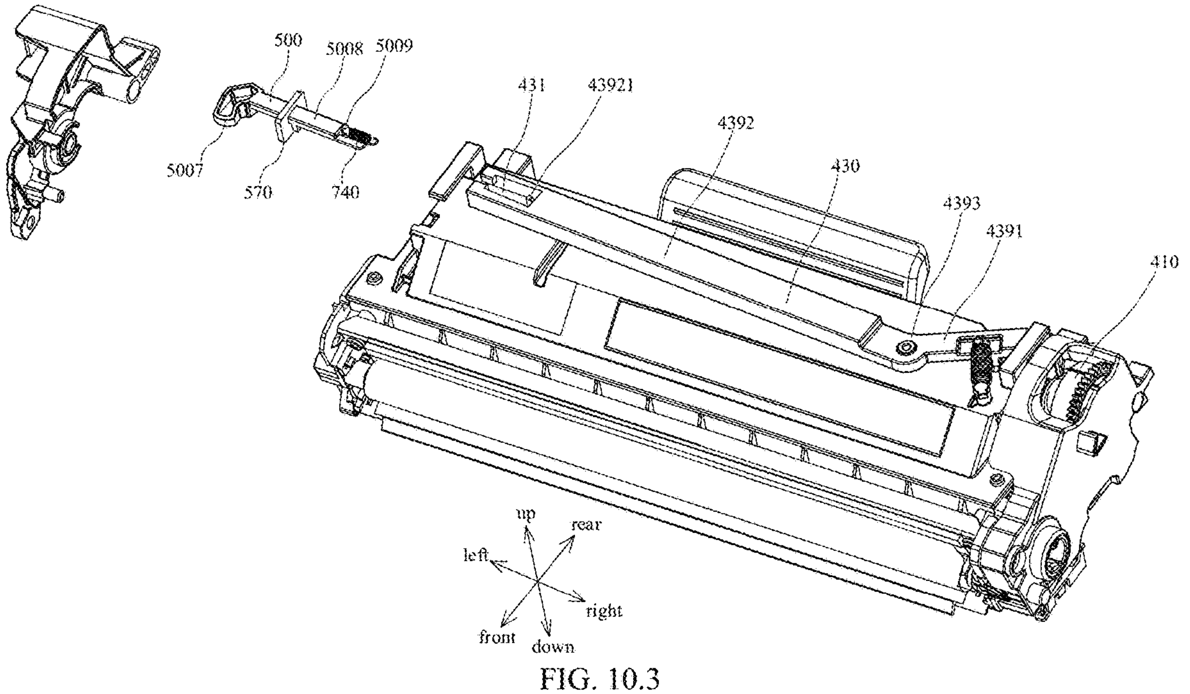
FIG. 10.3

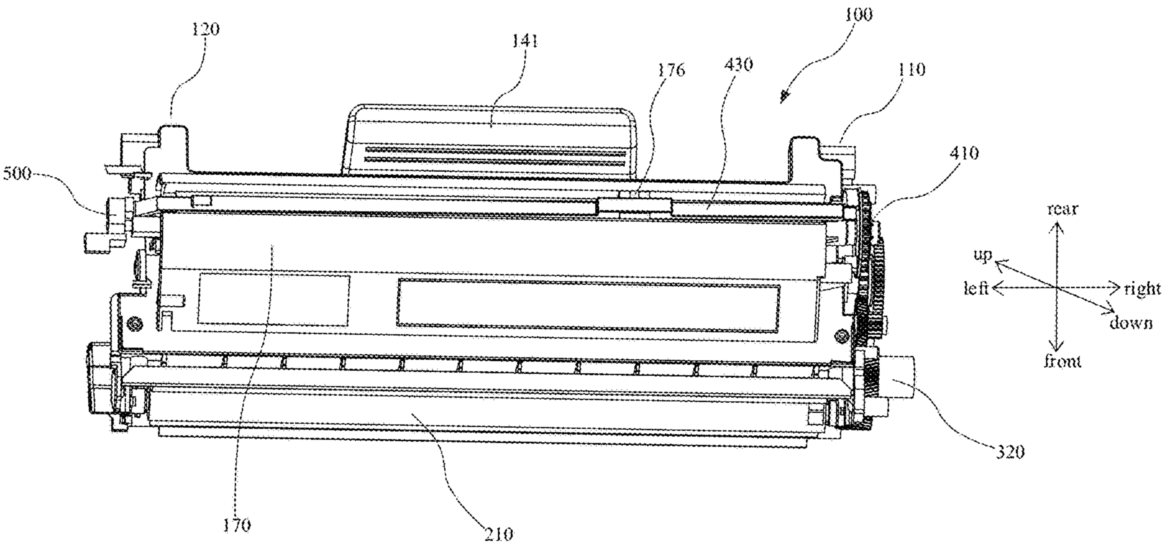
FIG. 11.1
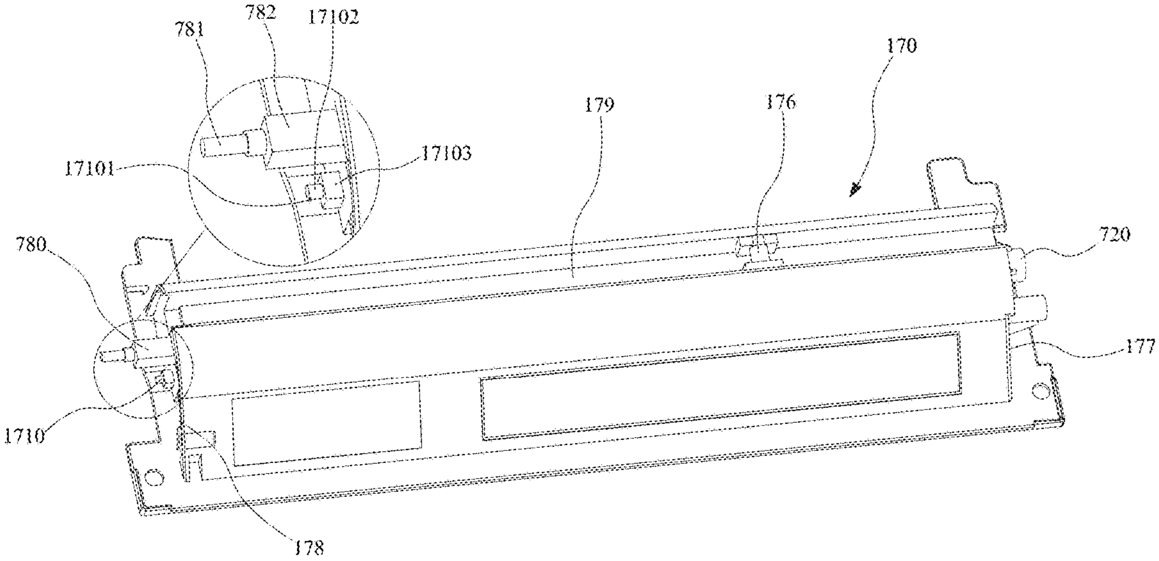
FIG. 11.2
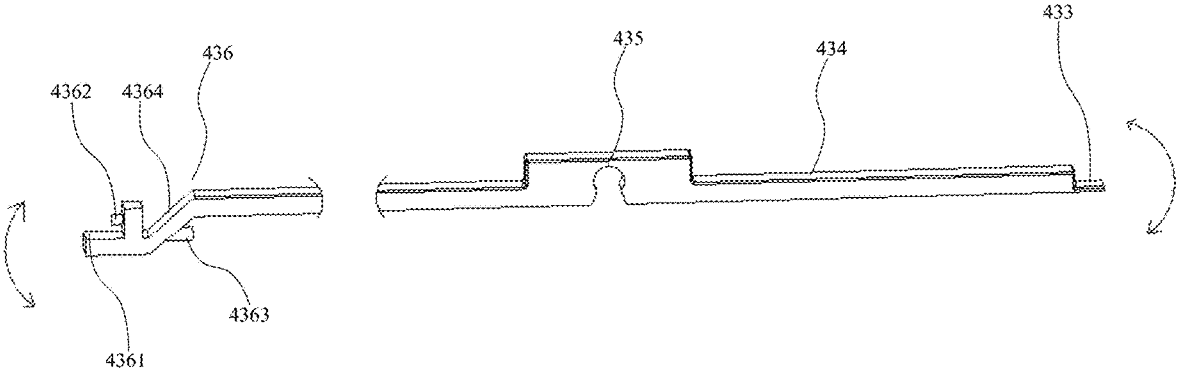
FIG. 11.3

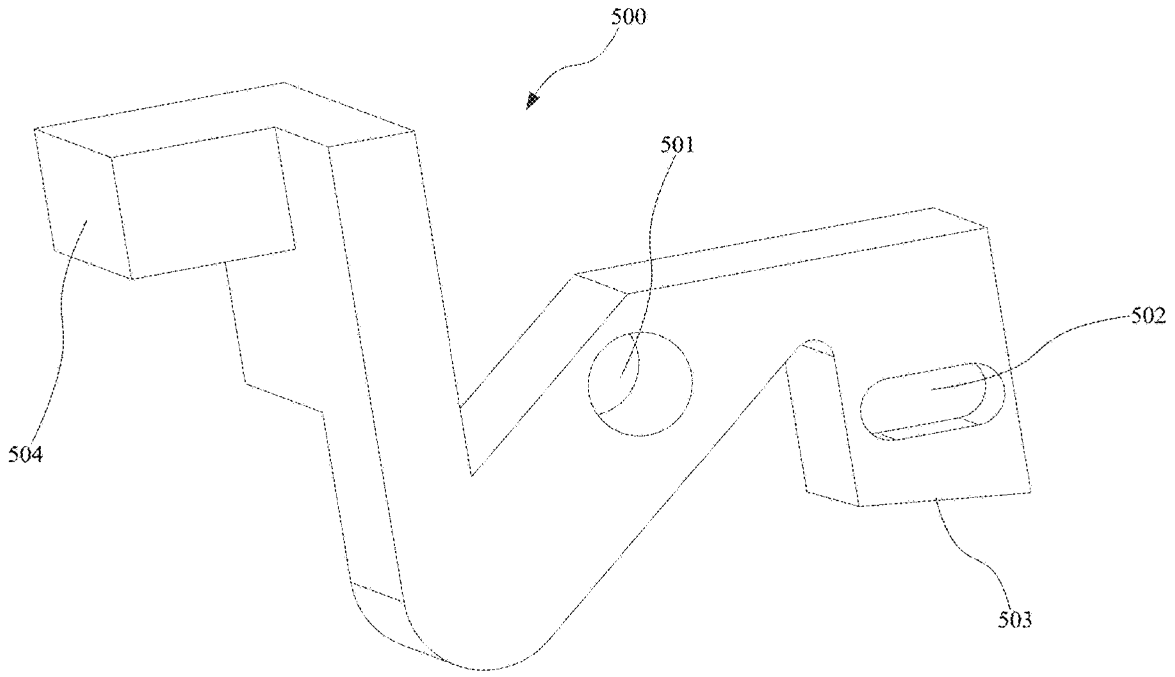
FIG. 11.4
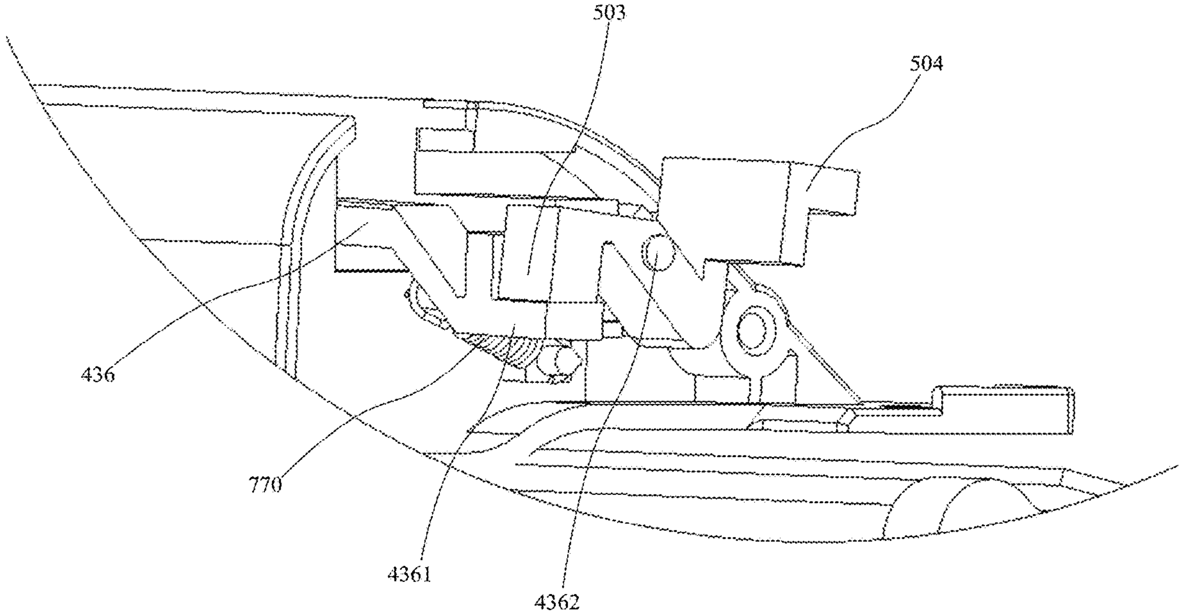
FIG. 11.5

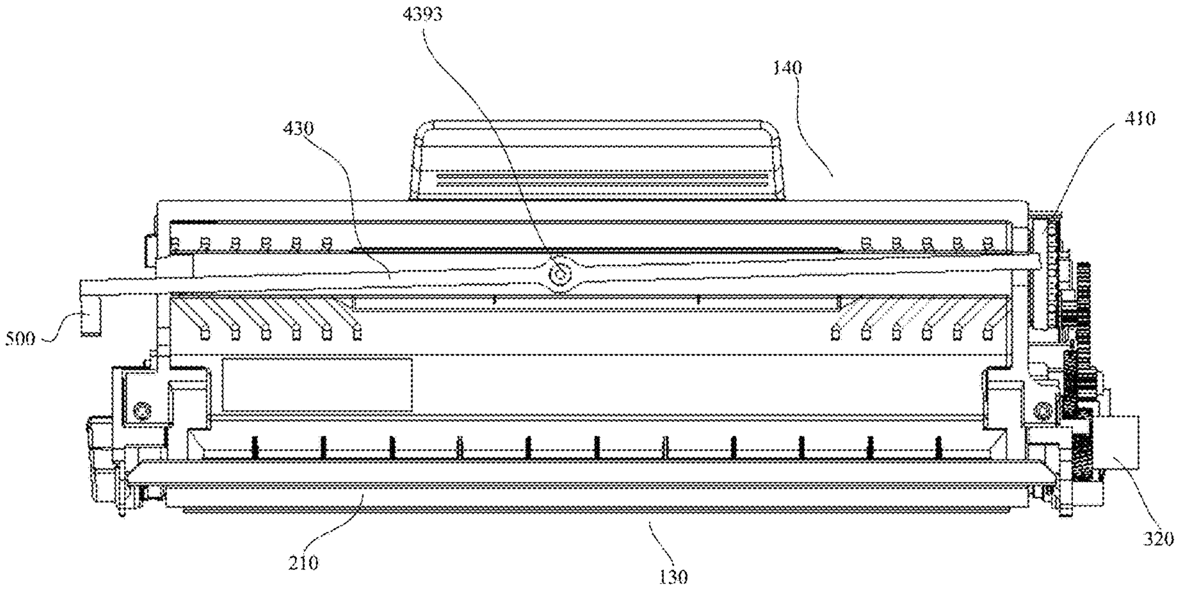
FIG. 12.1
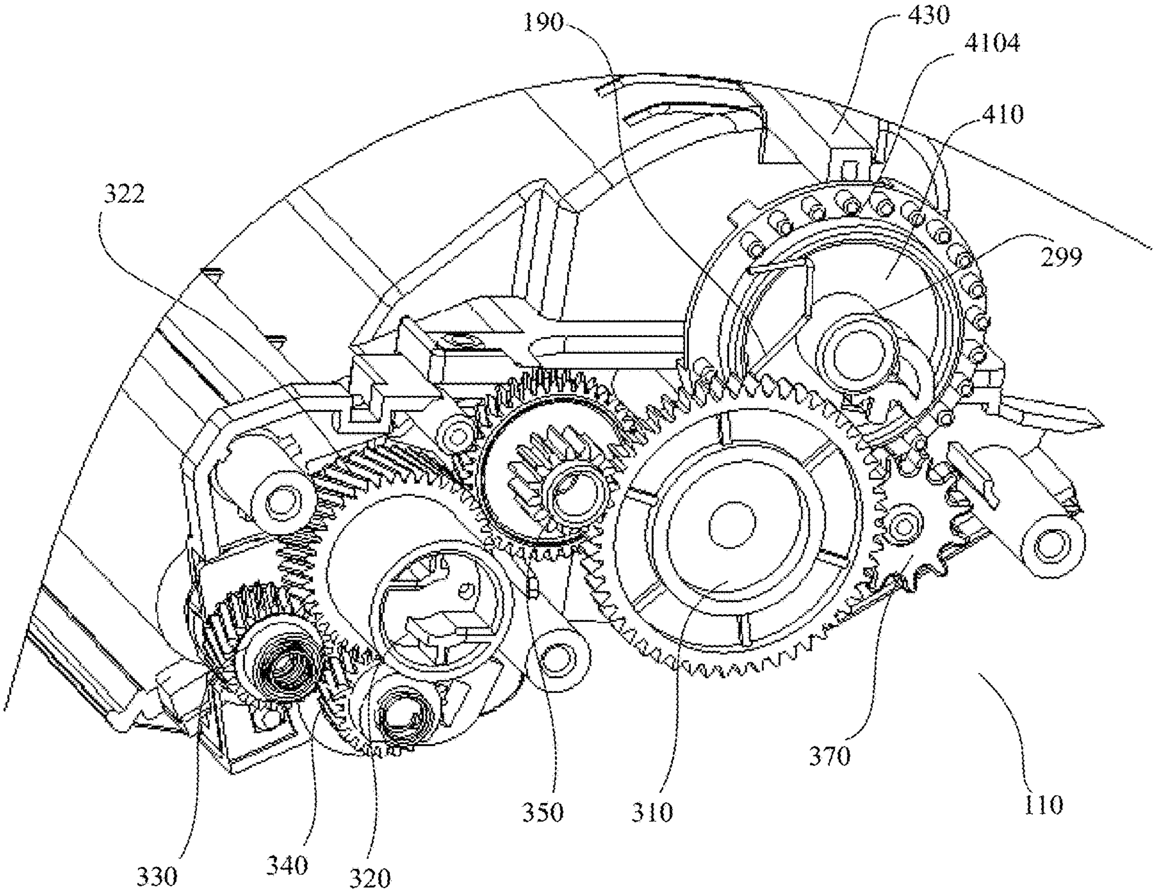
FIG. 12.2

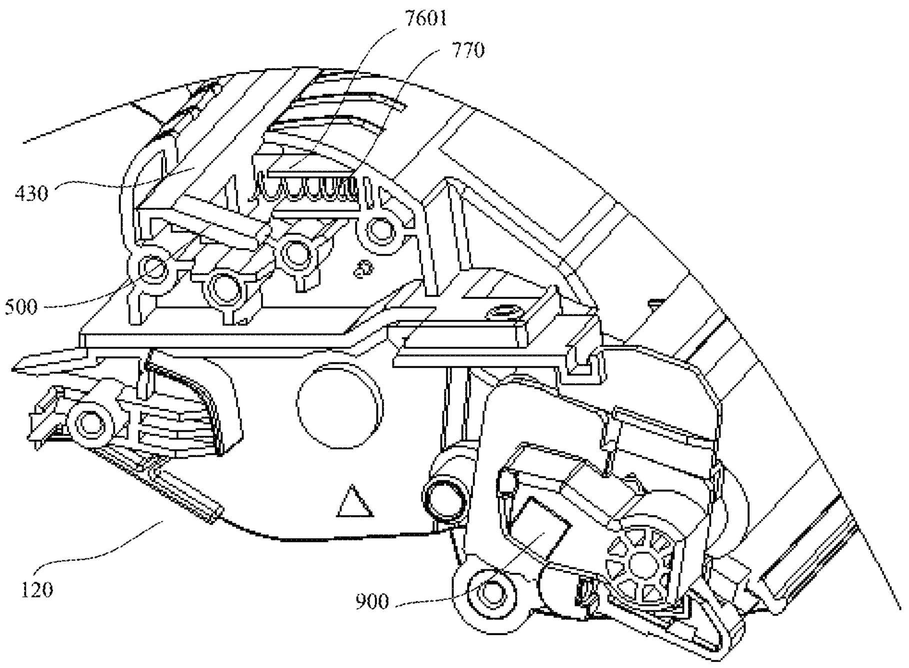
FIG. 12.3
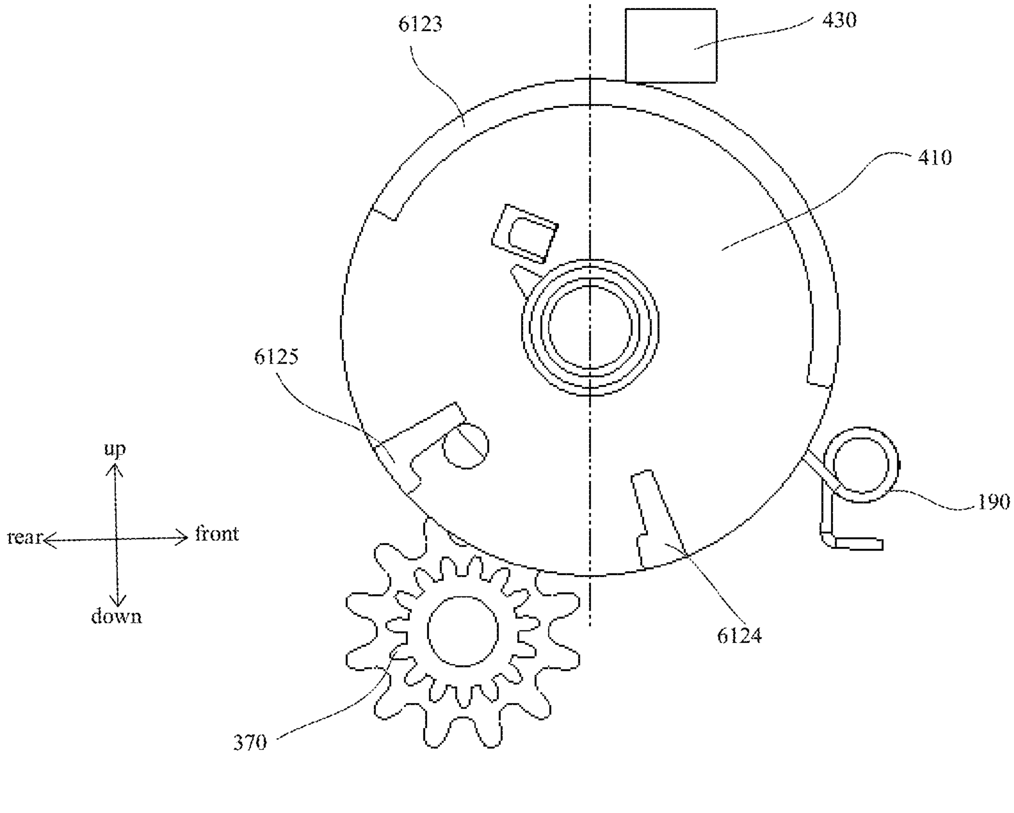
FIG. 12.4

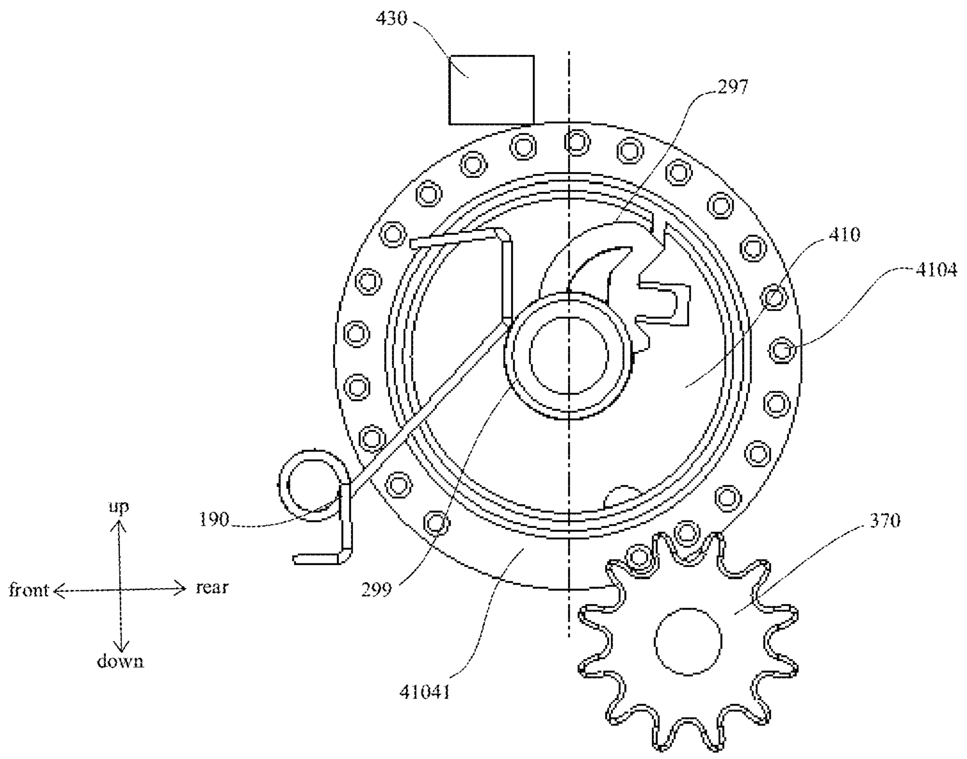
FIG. 12.5
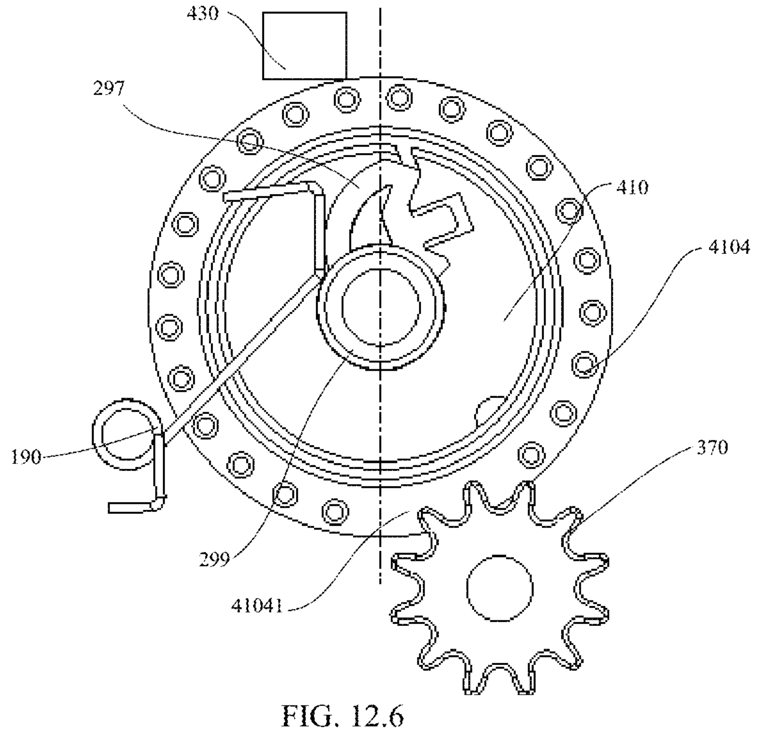
FIG. 12.6

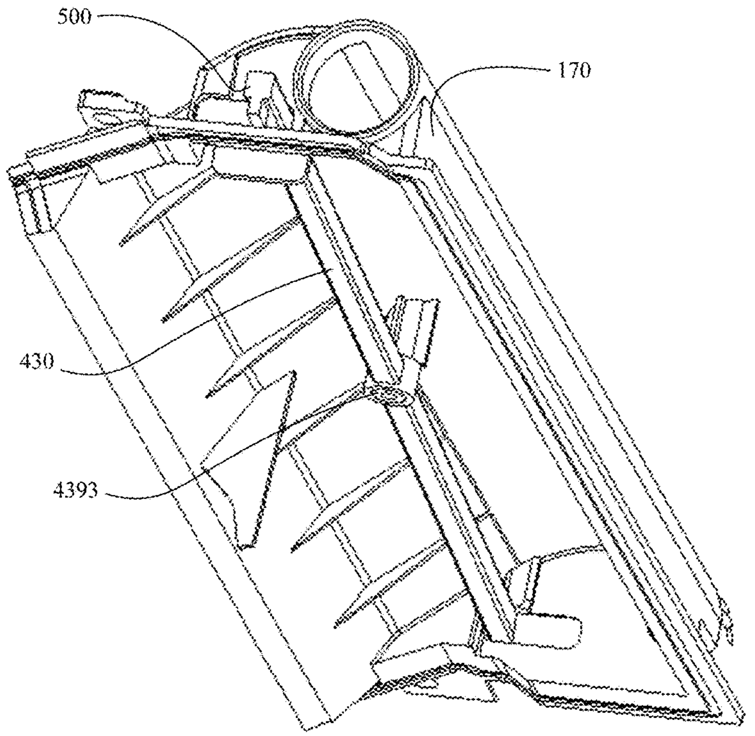
FIG. 12.7
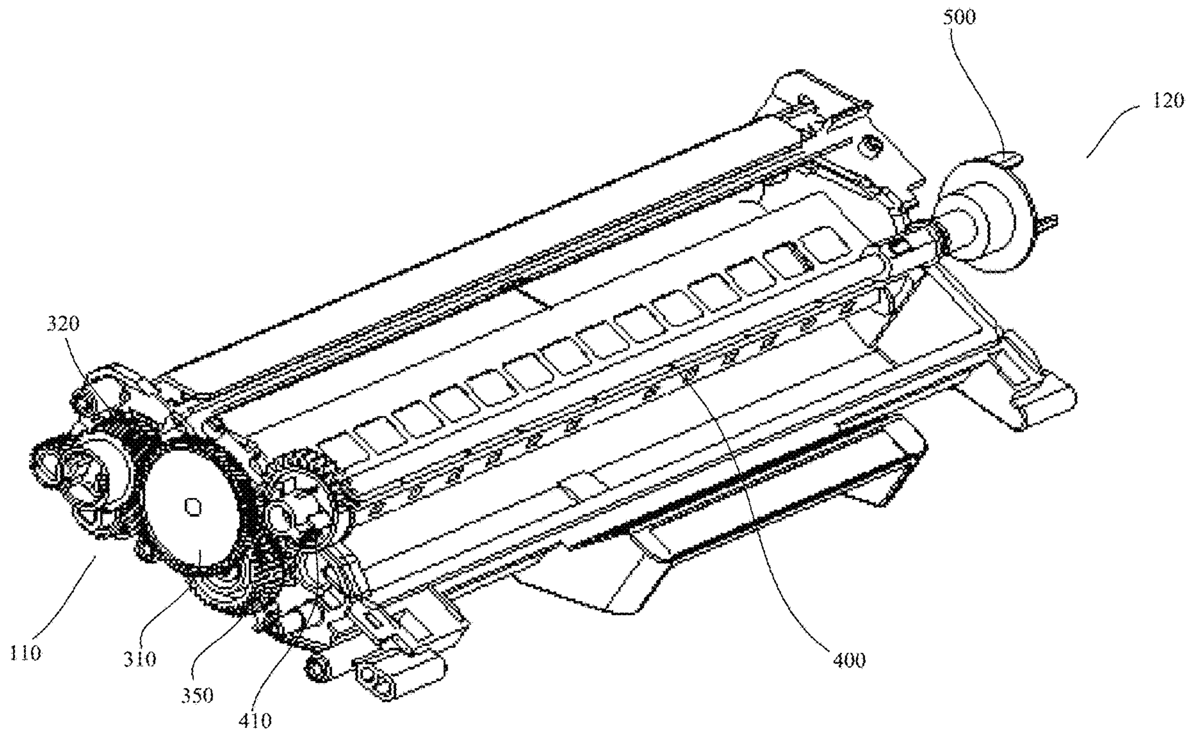
FIG. 13.1

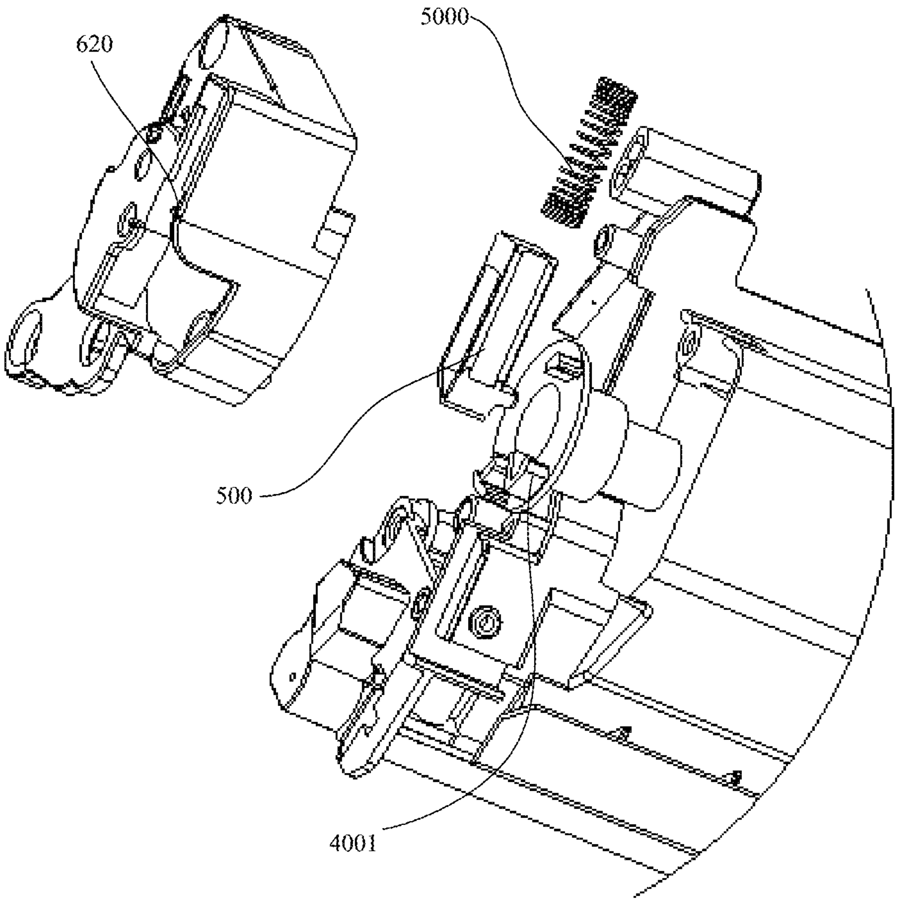
FIG. 13.2

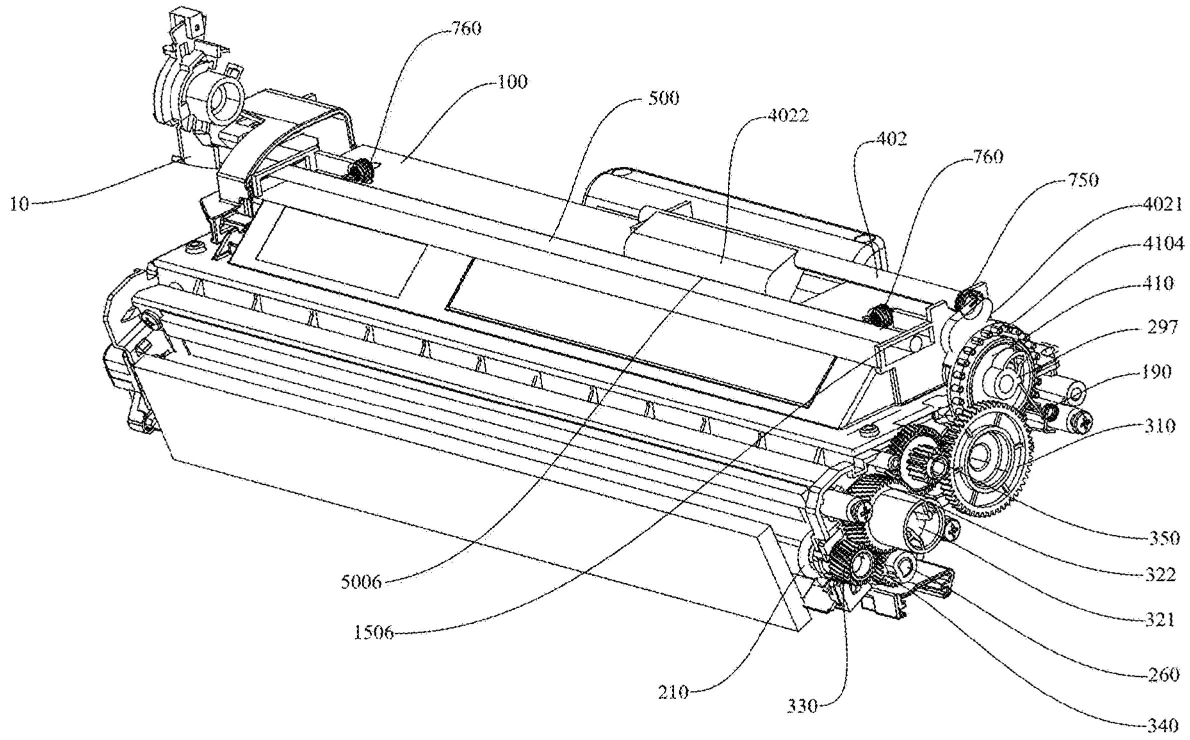
FIG. 14.1

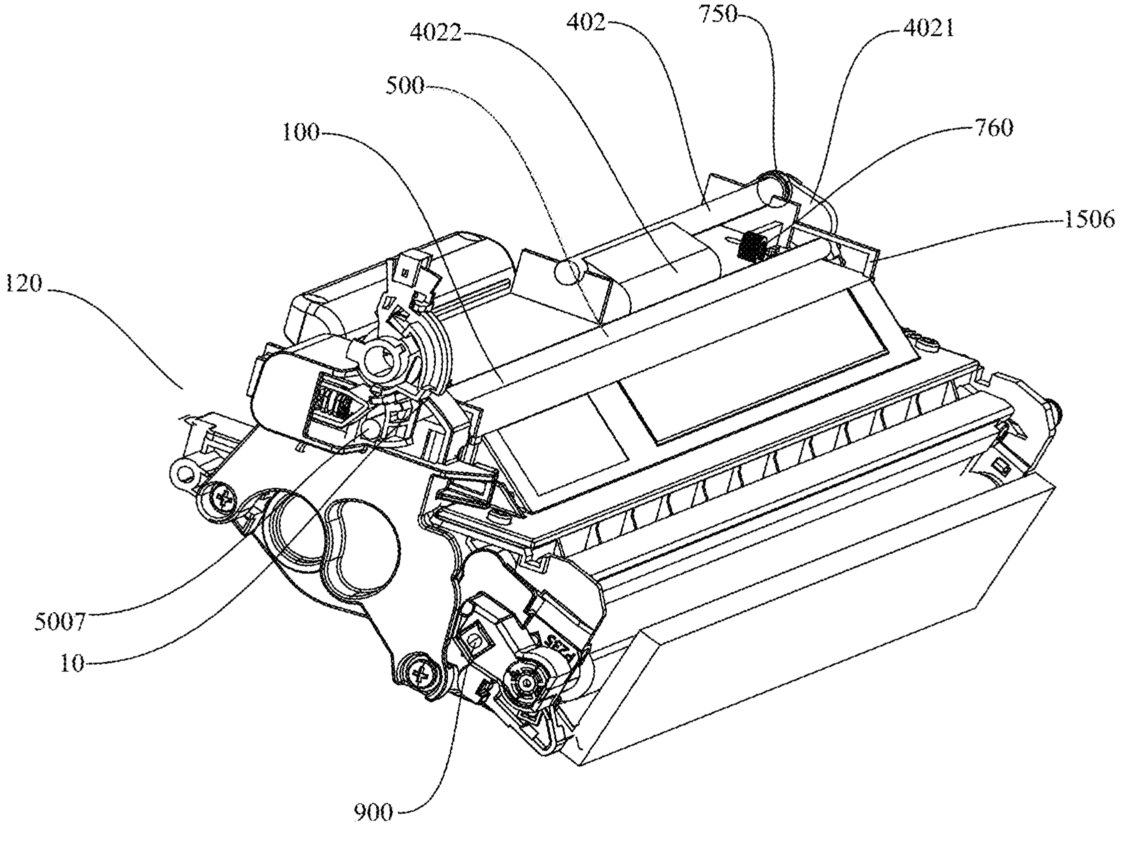
FIG. 14.2

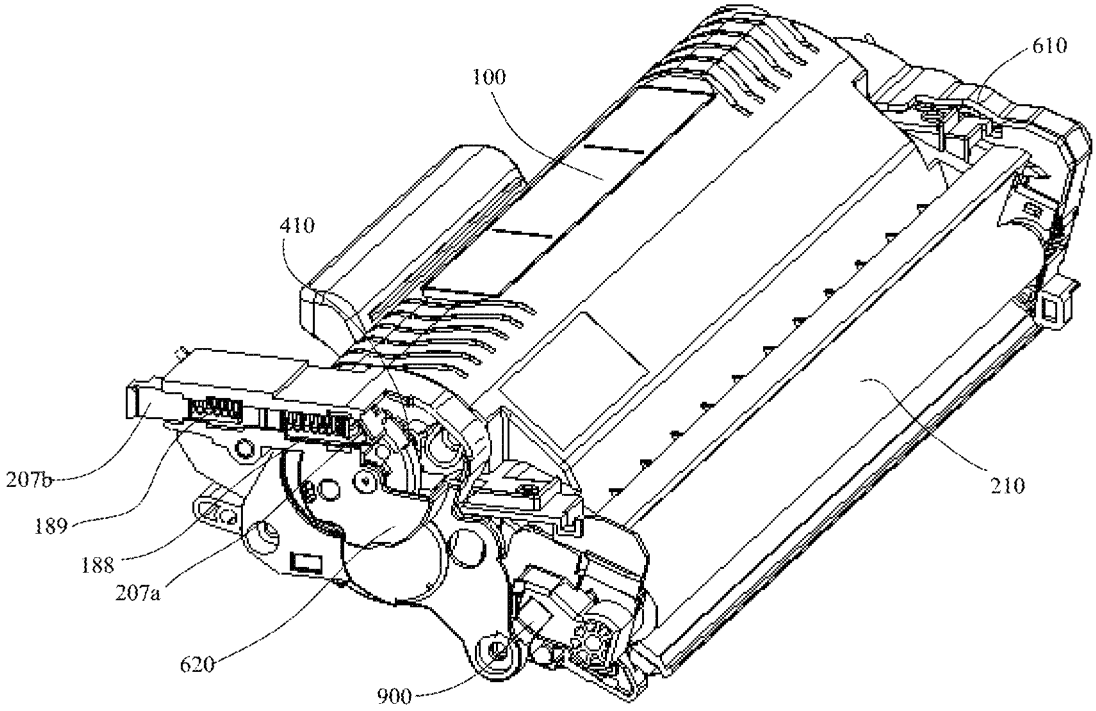
FIG. 15.1

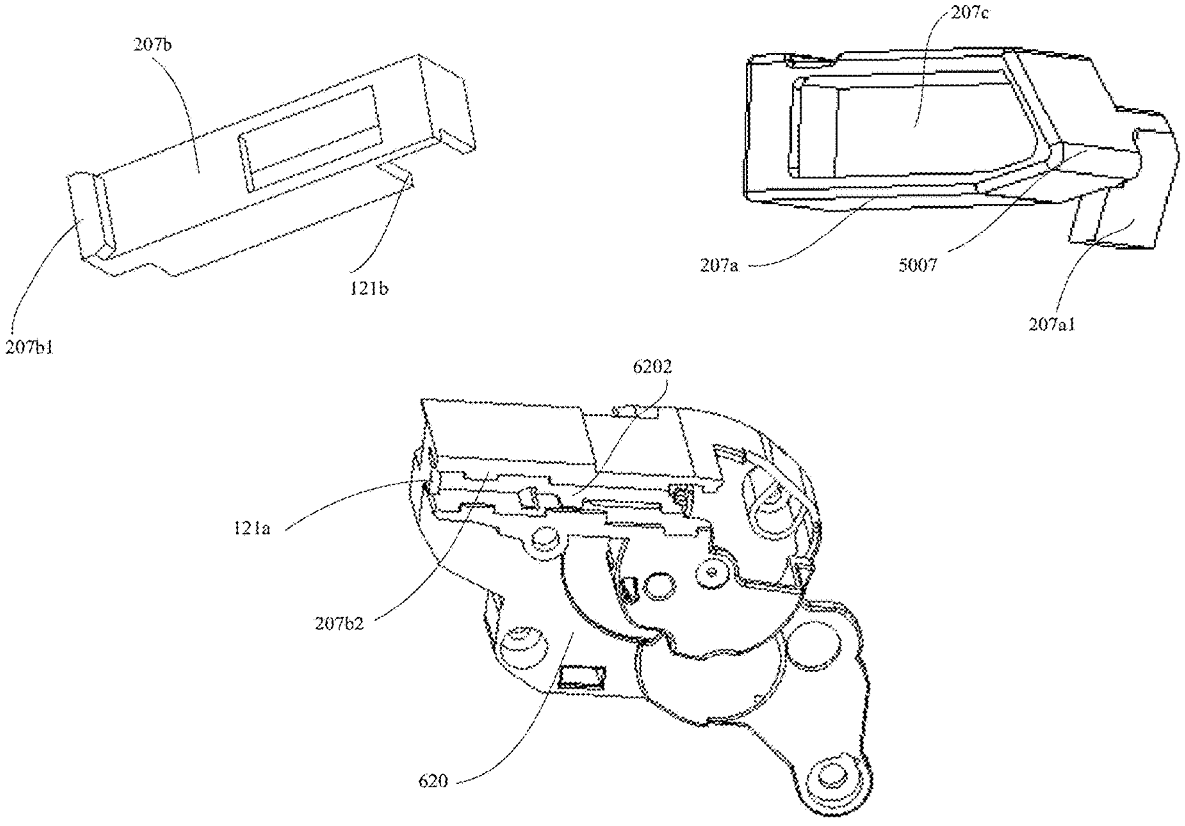
FIG. 15.2
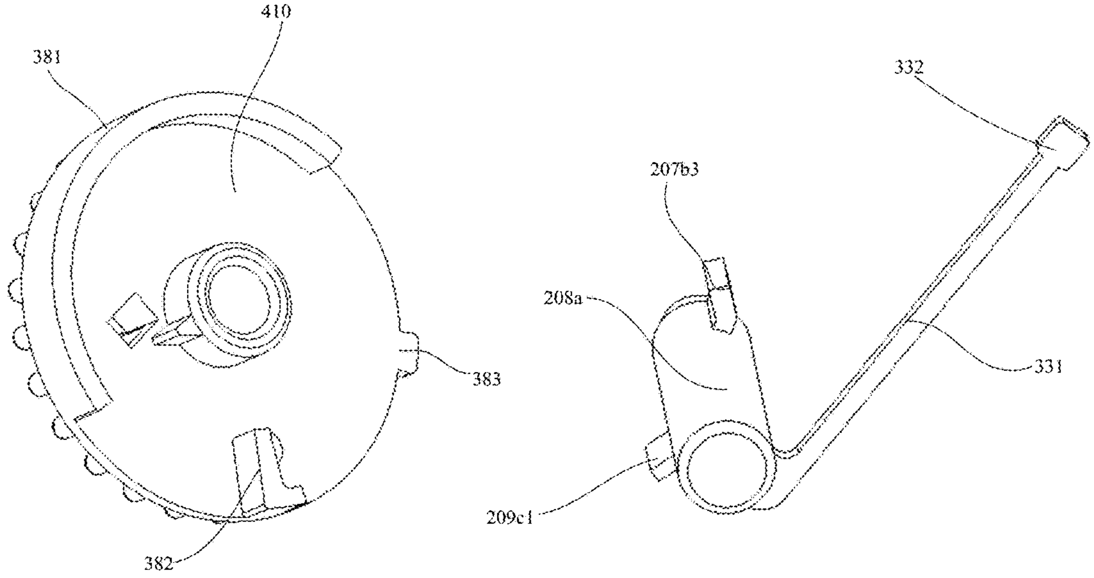
FIG. 15.3

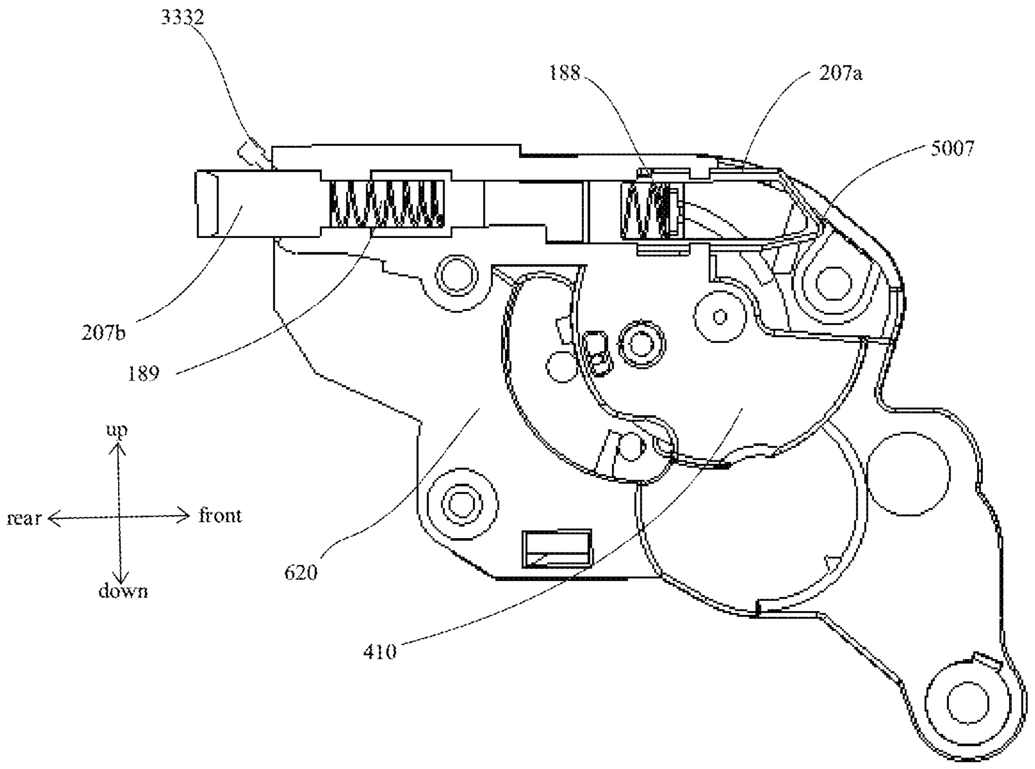
FIG. 15.4
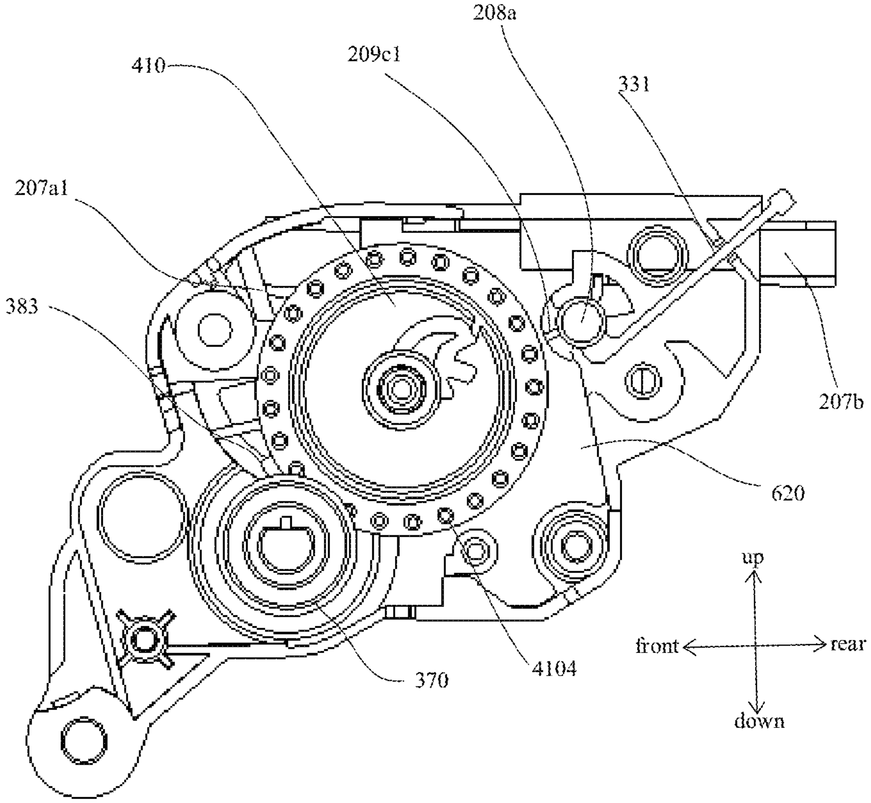
FIG. 15.5

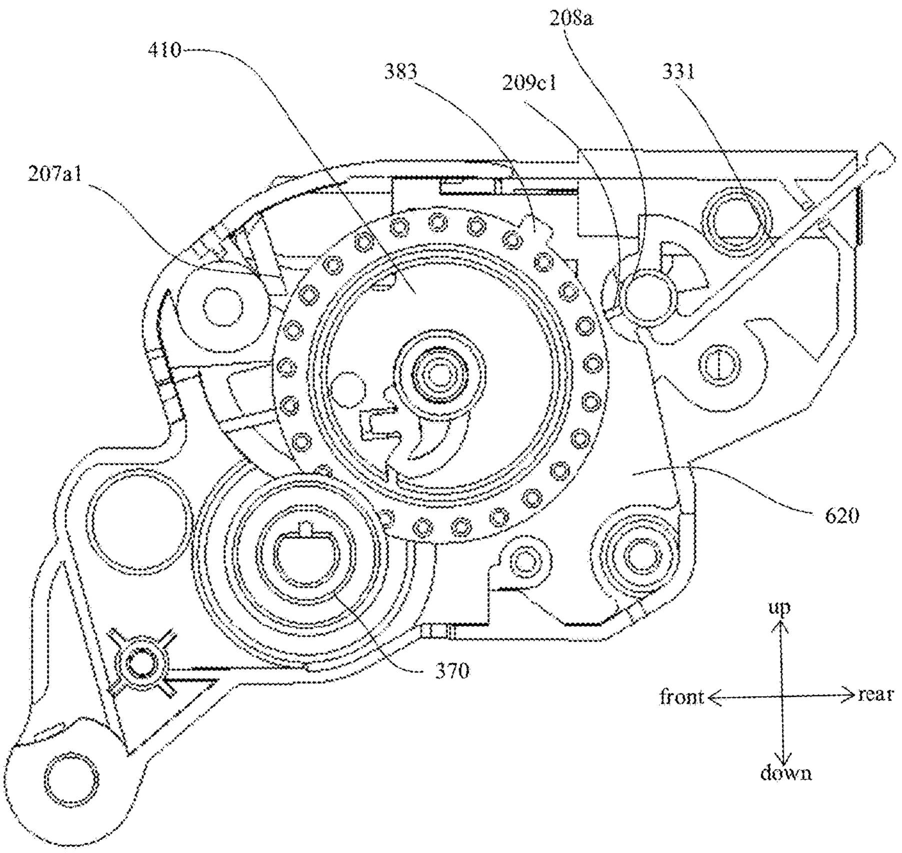
FIG. 15.6
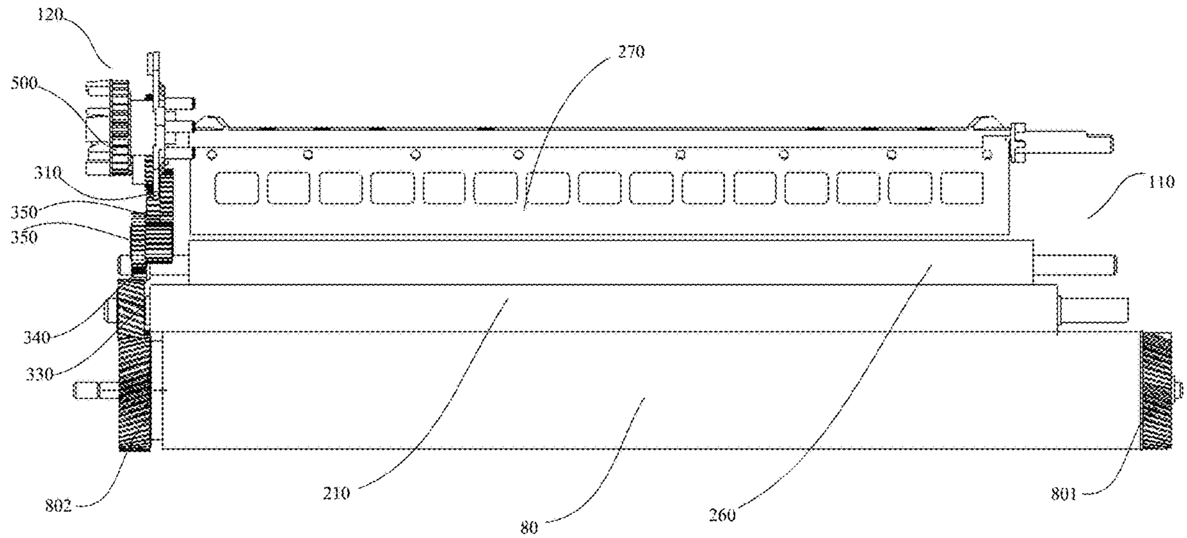
FIG. 16.1

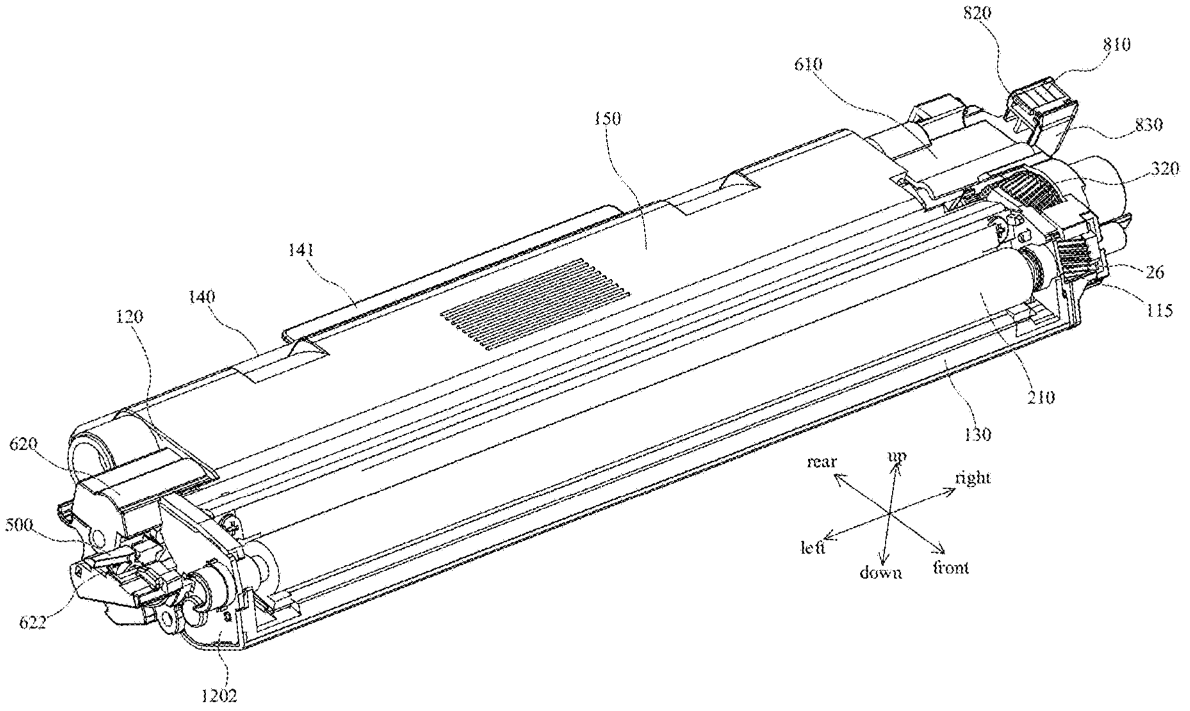
FIG. 17.1
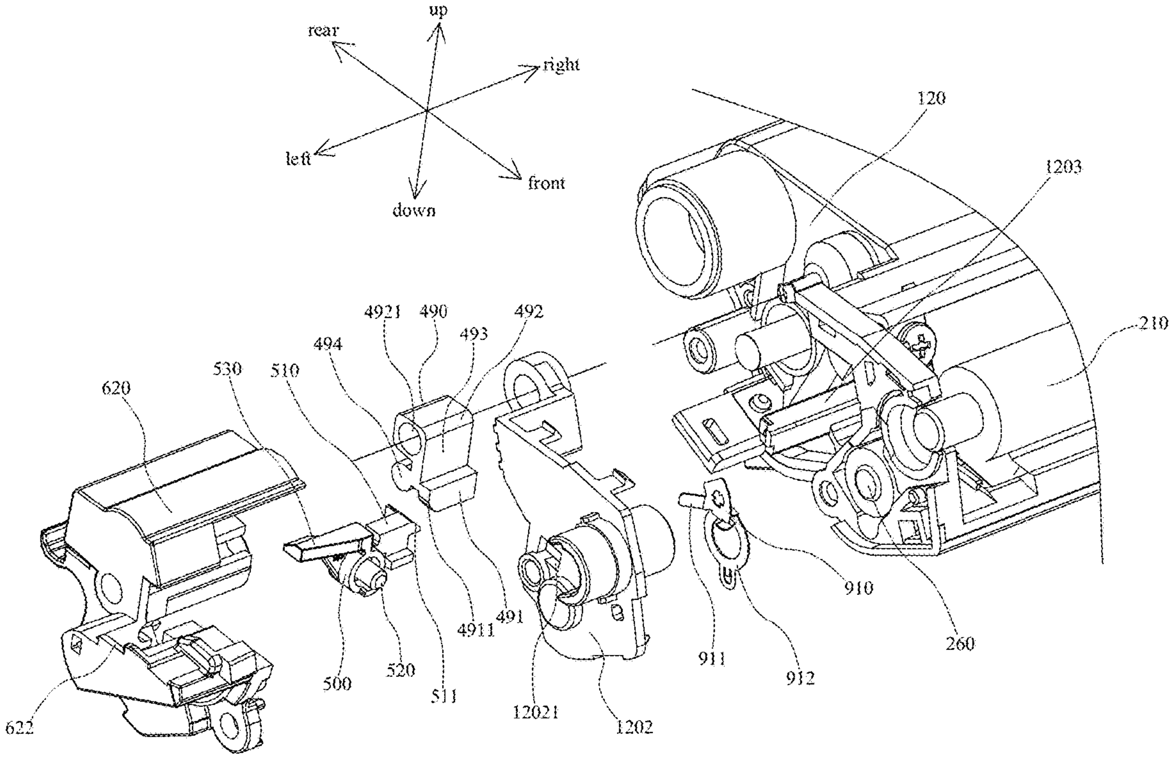
FIG. 17.2

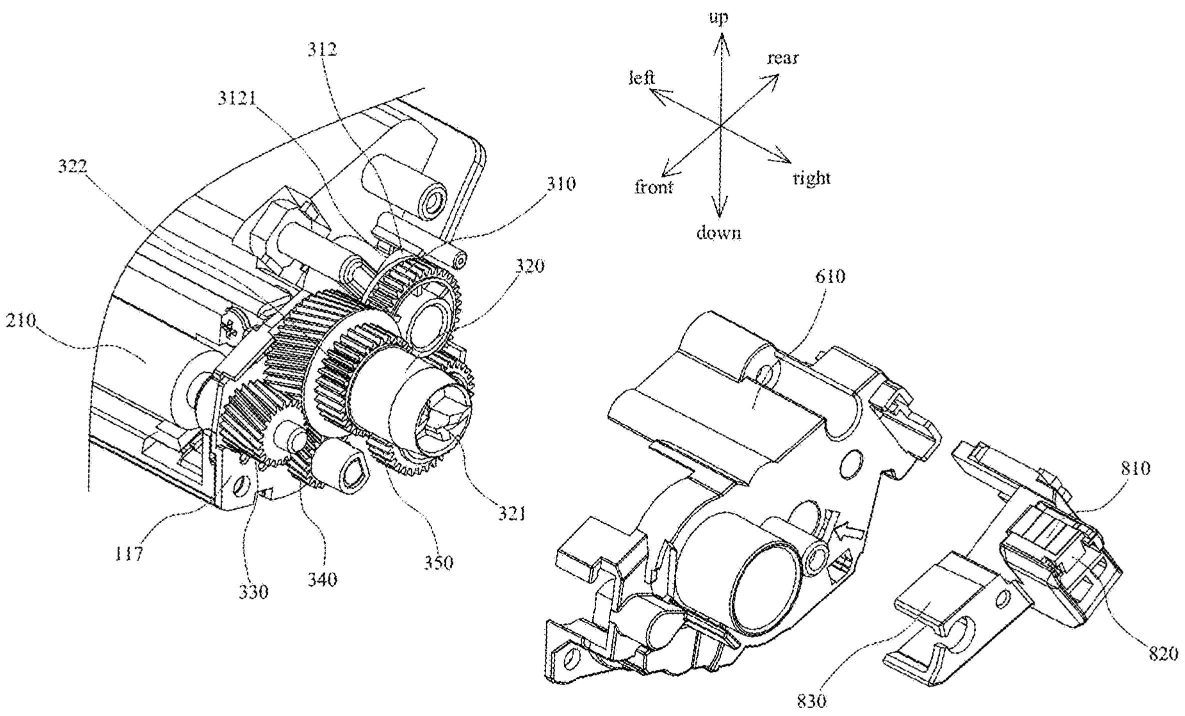
FIG. 17.3
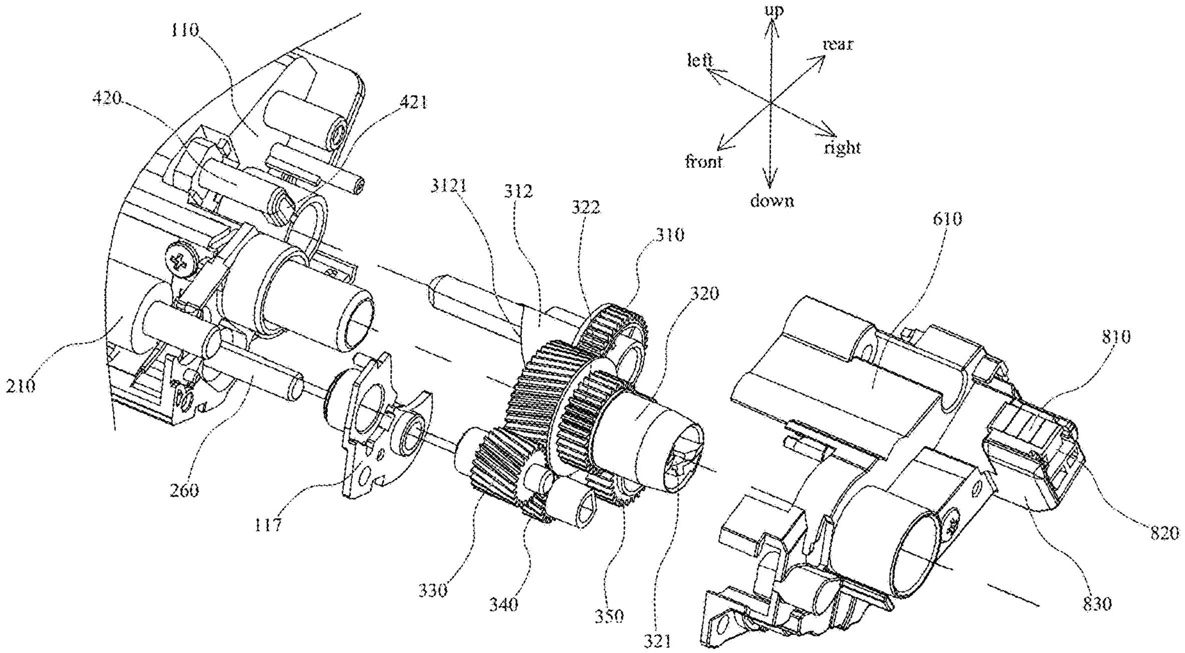
FIG. 17.4

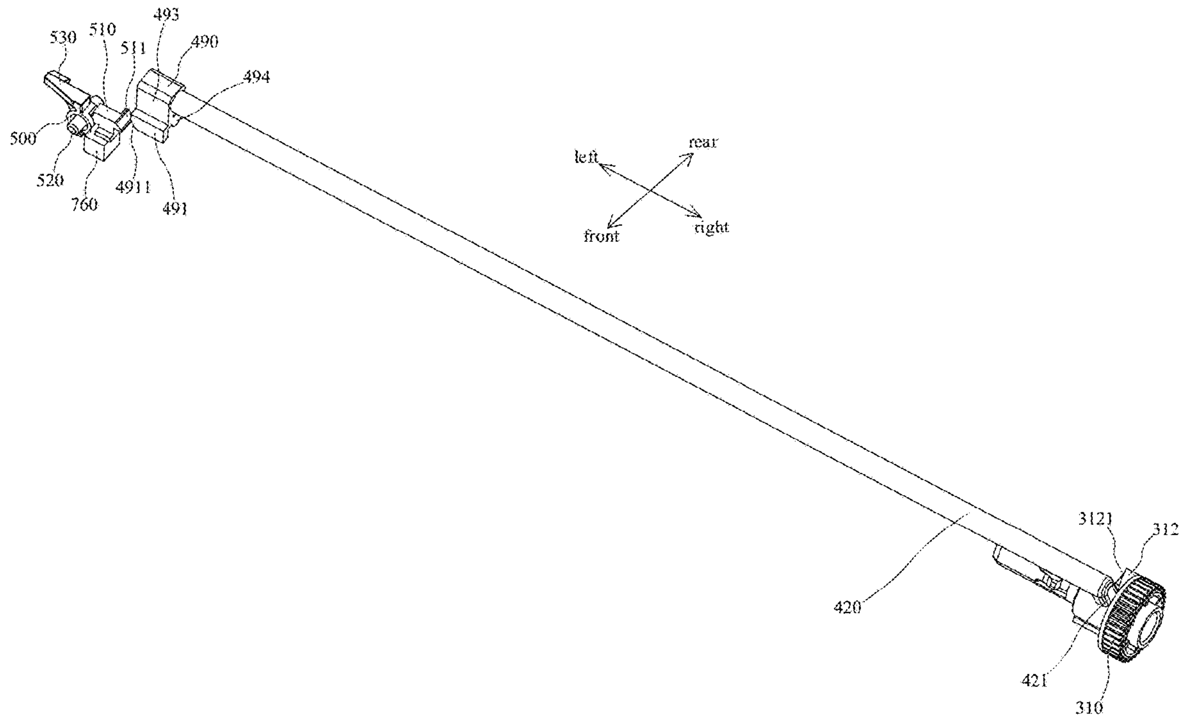
FIG. 17.5
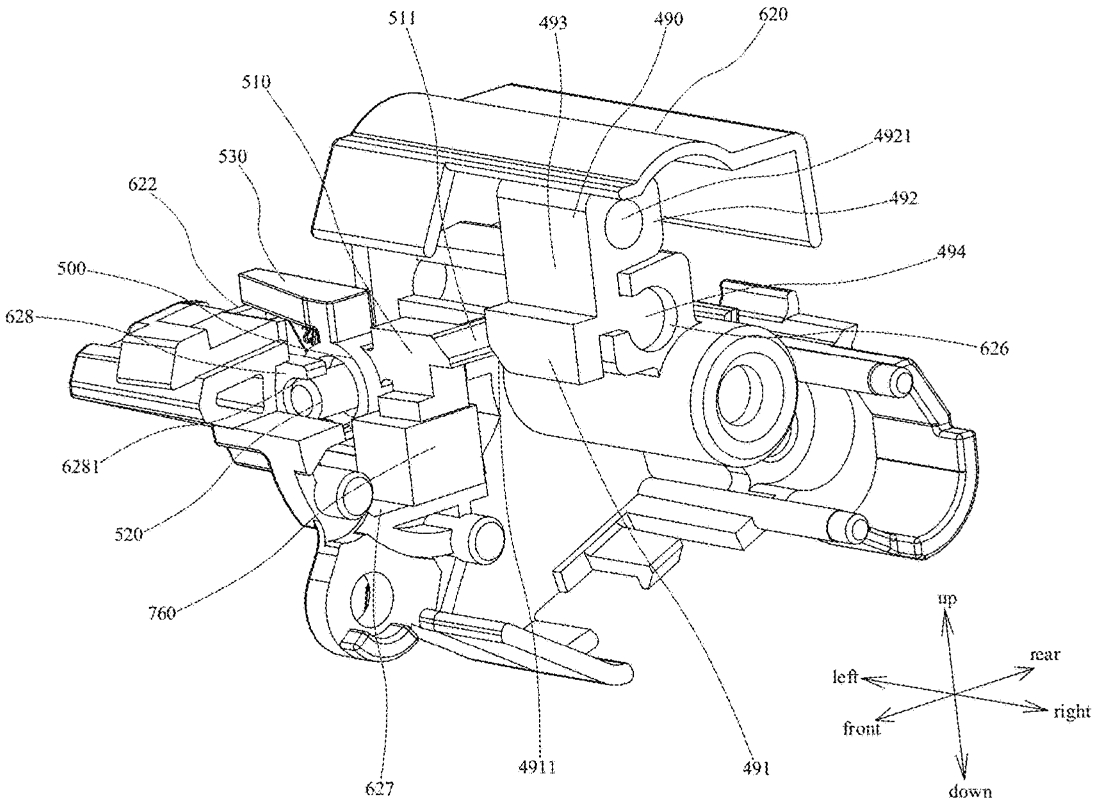
FIG. 17.6

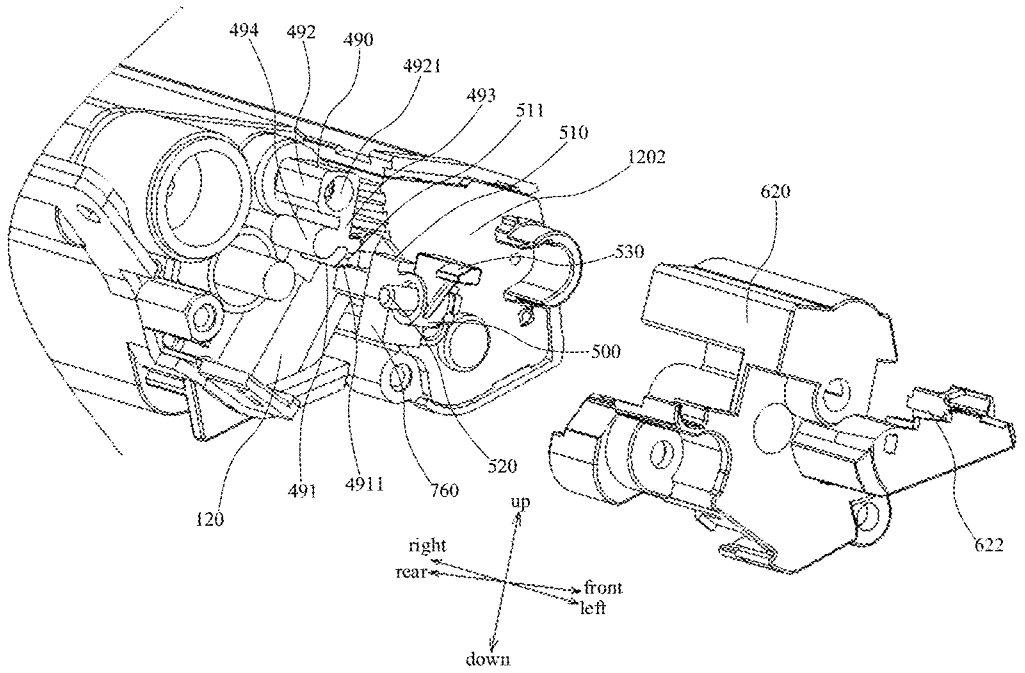
FIG. 17.7

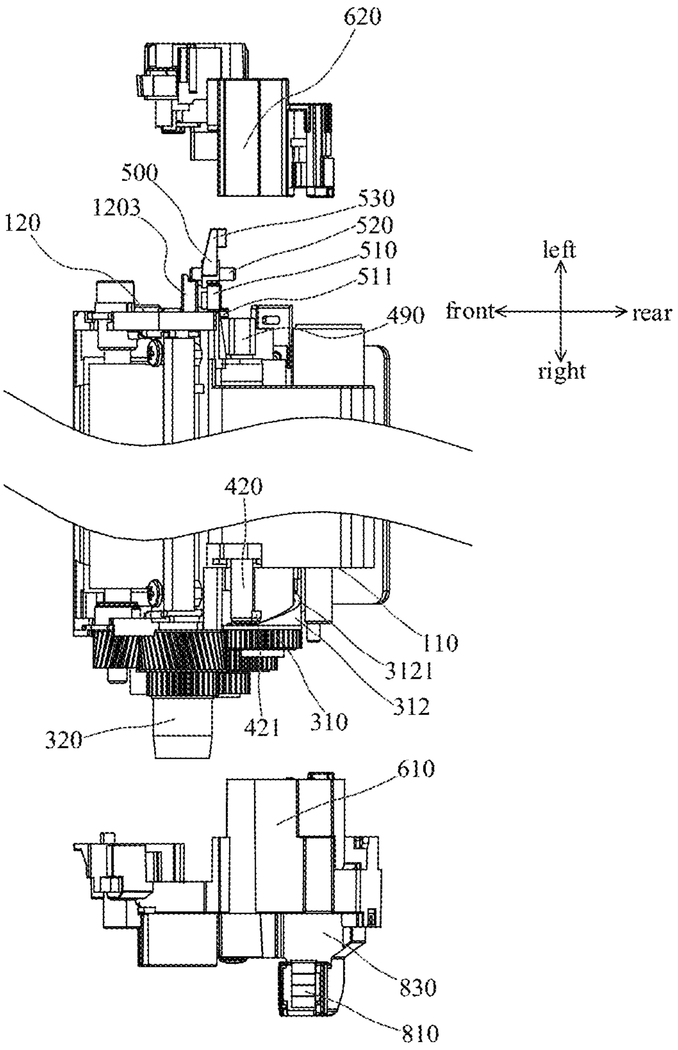
FIG. 17.8

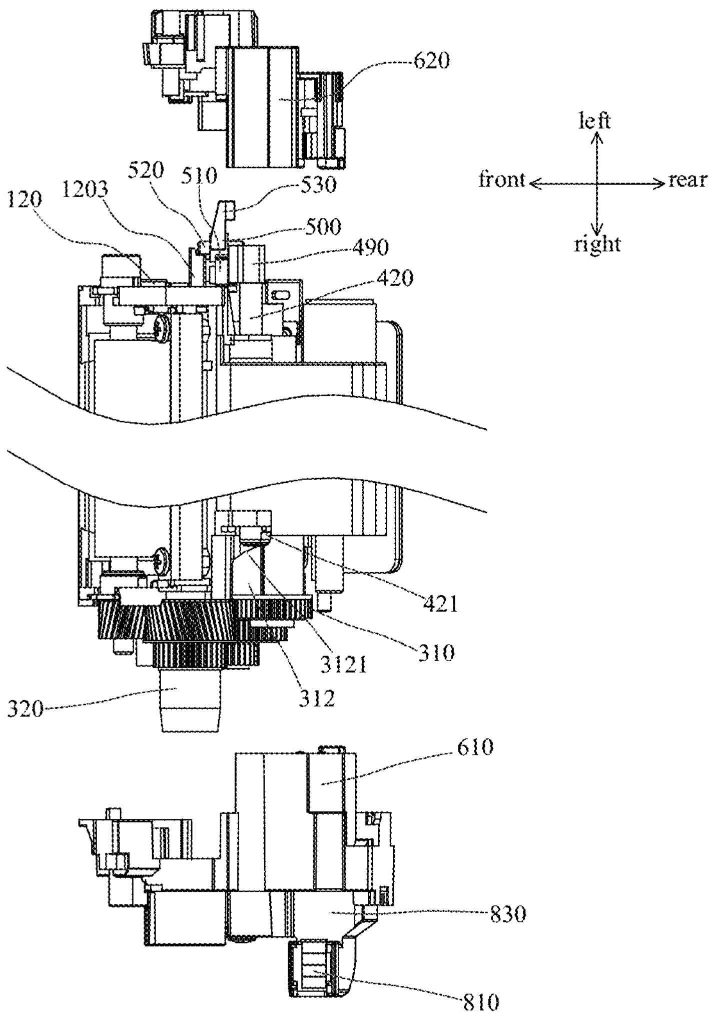
FIG. 17.9

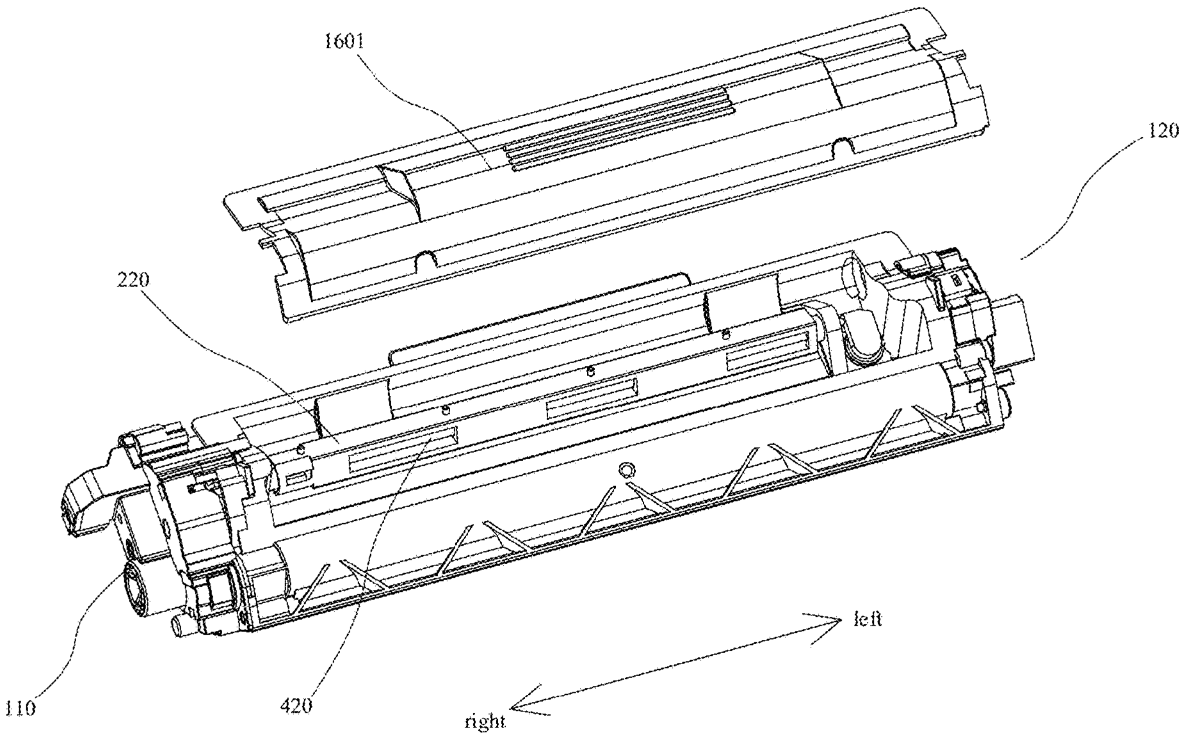
FIG. 17.10
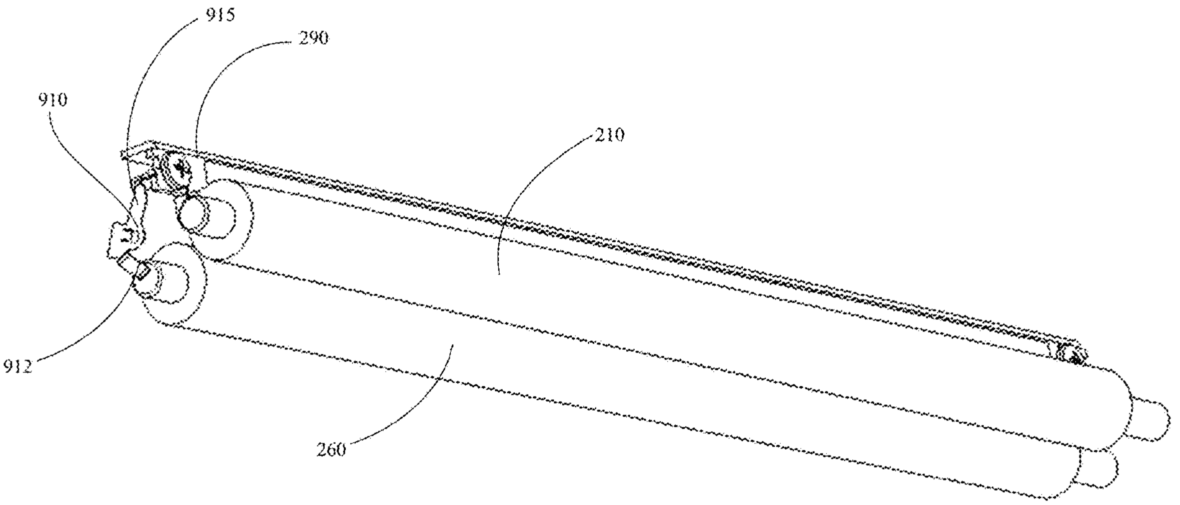
FIG. 17.11

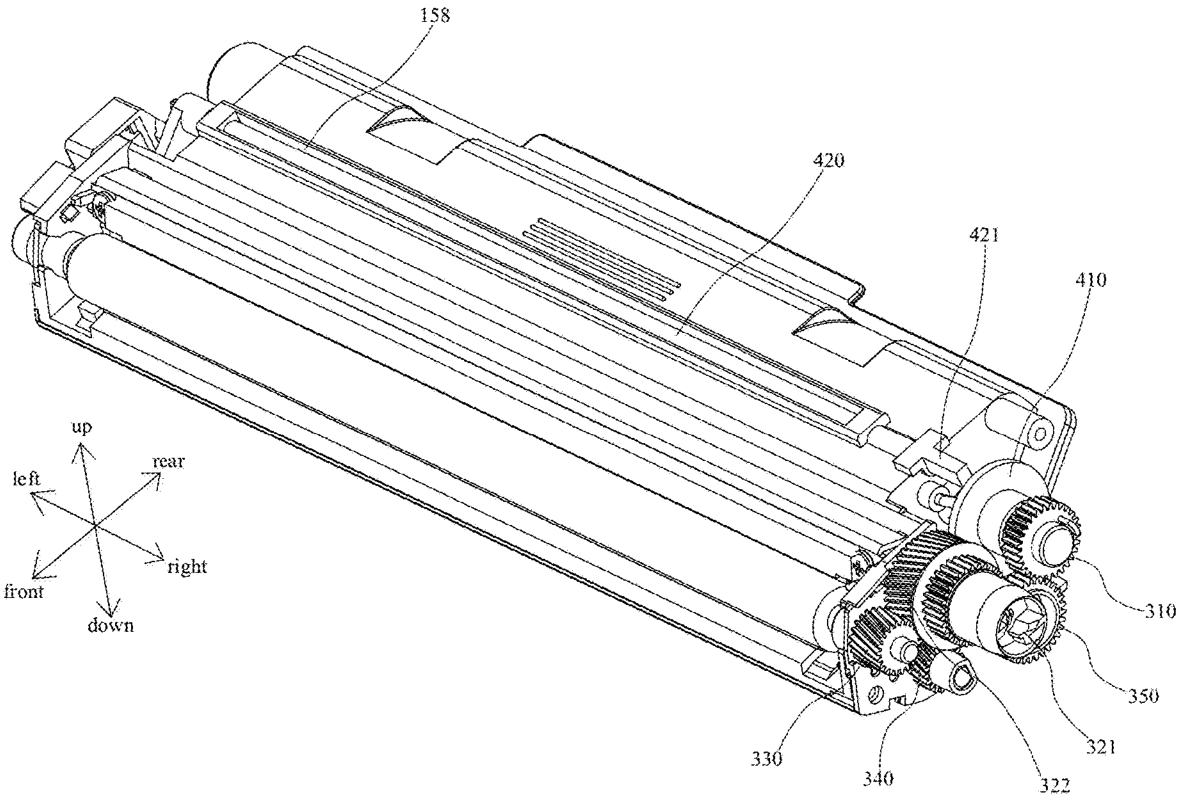
FIG. 18.1

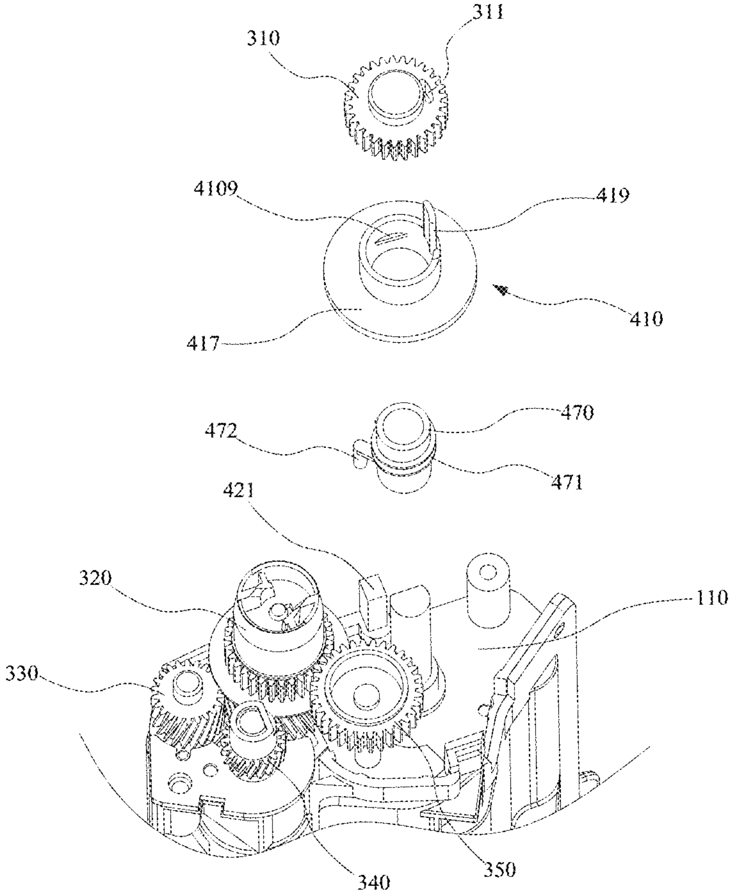
FIG. 18.2

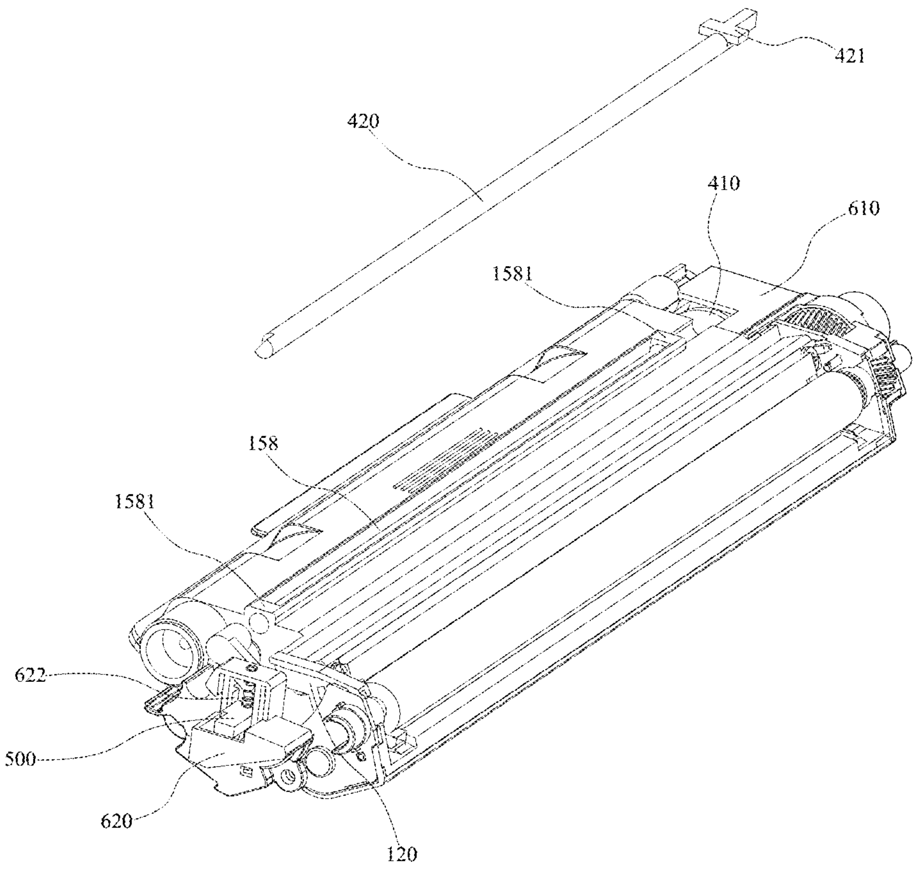
FIG. 18.3
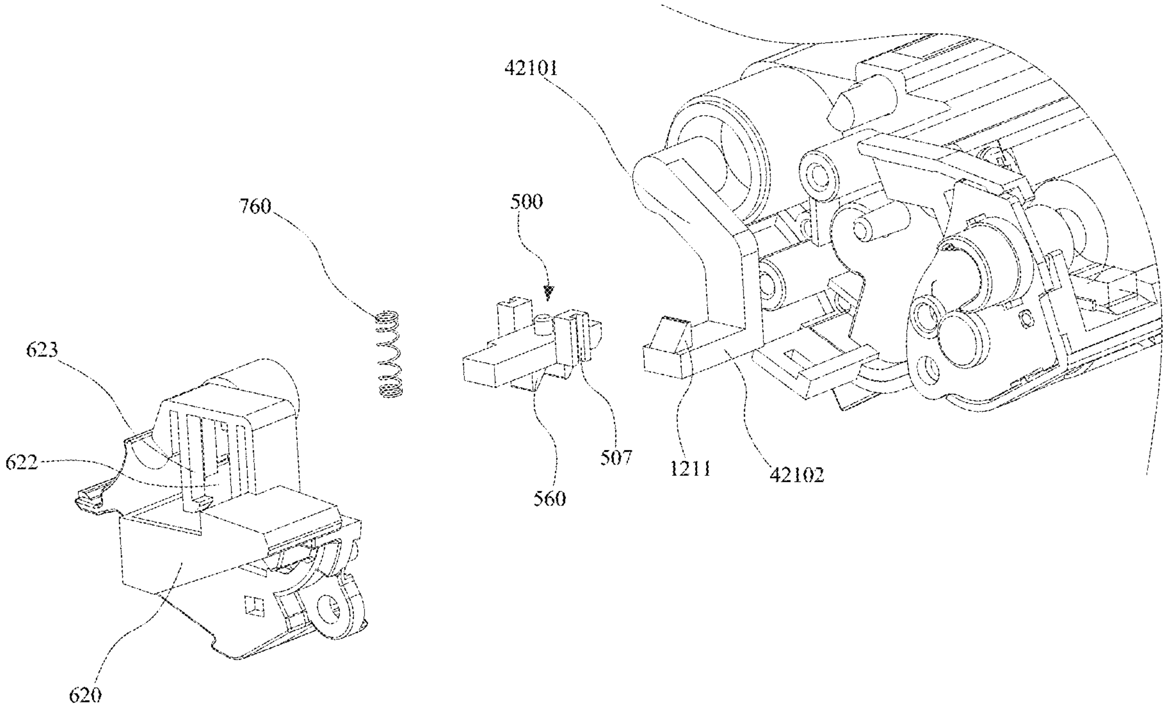
FIG. 18.4

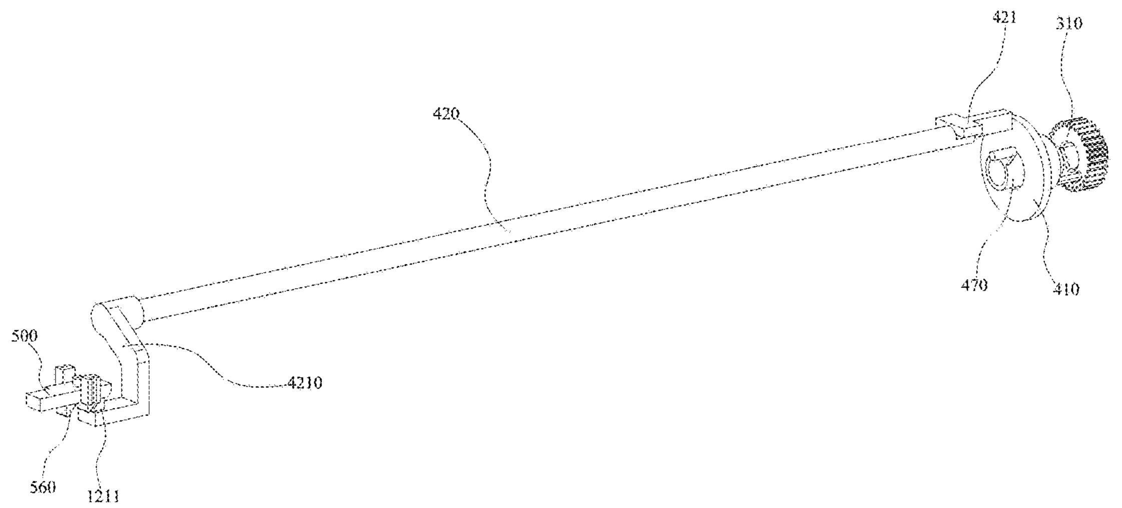
FIG. 18.5
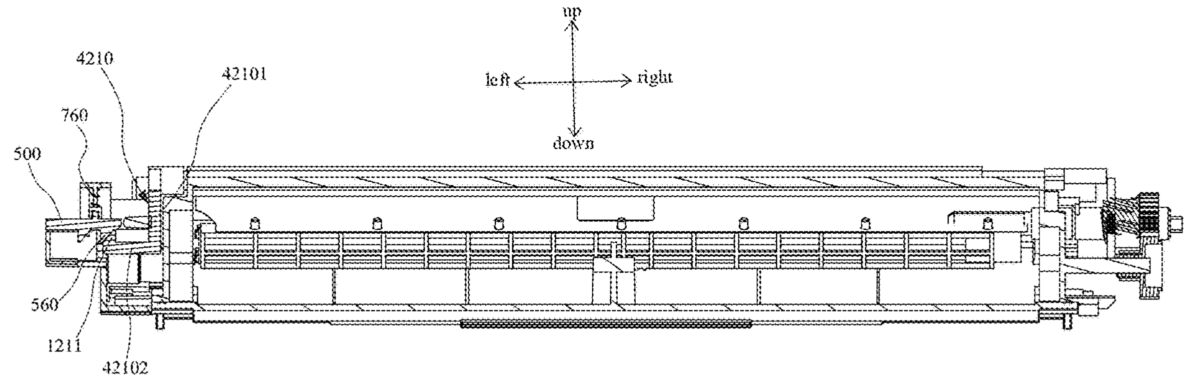
FIG. 18.6
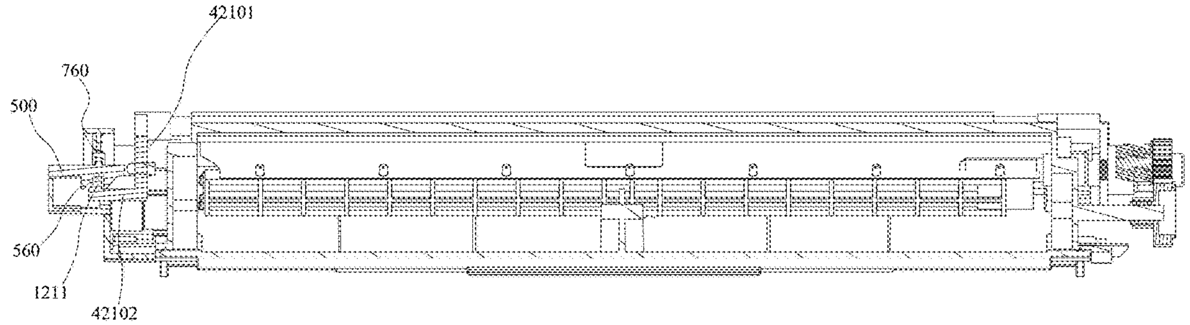
FIG. 18.7

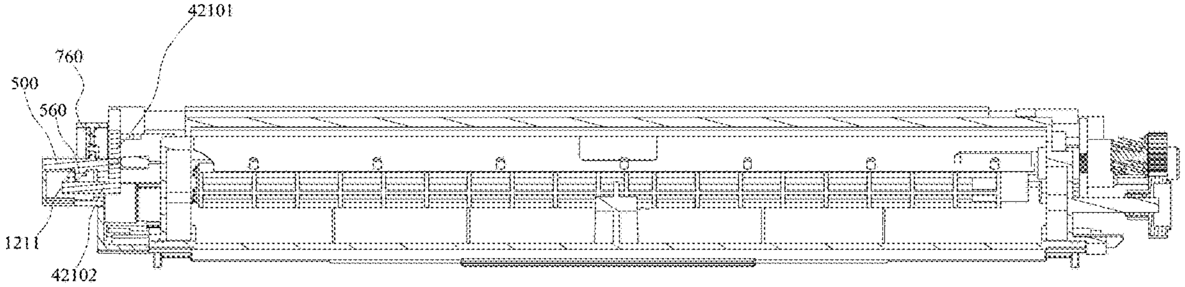
FIG. 18.8
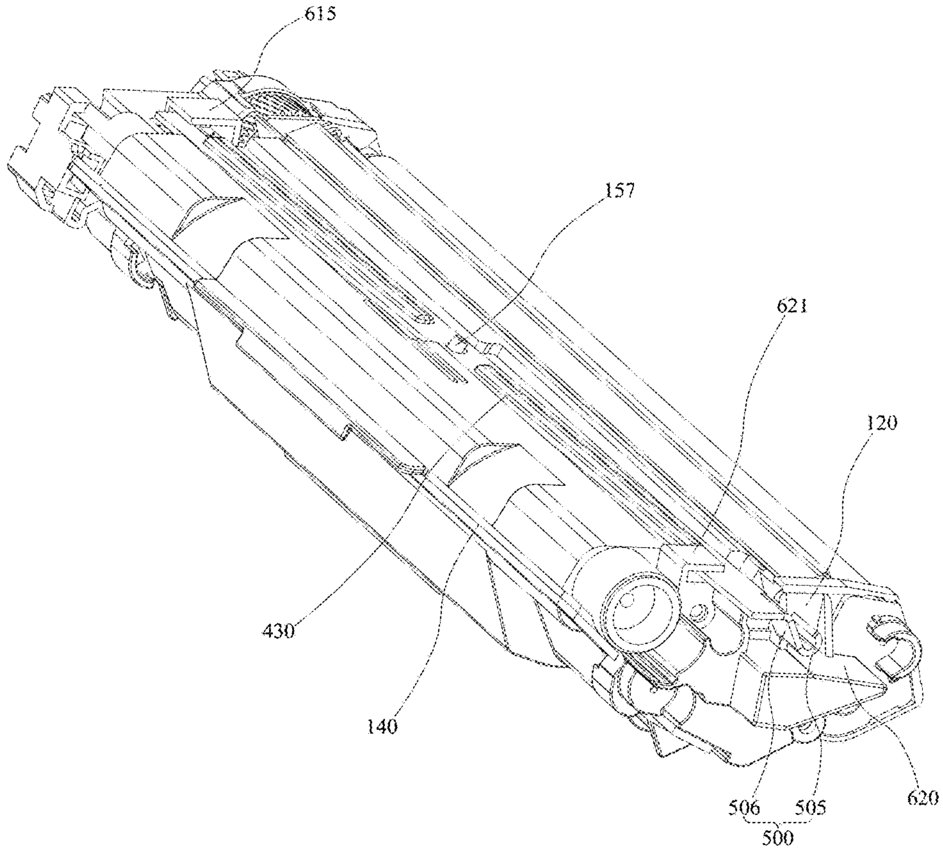
FIG. 19.1

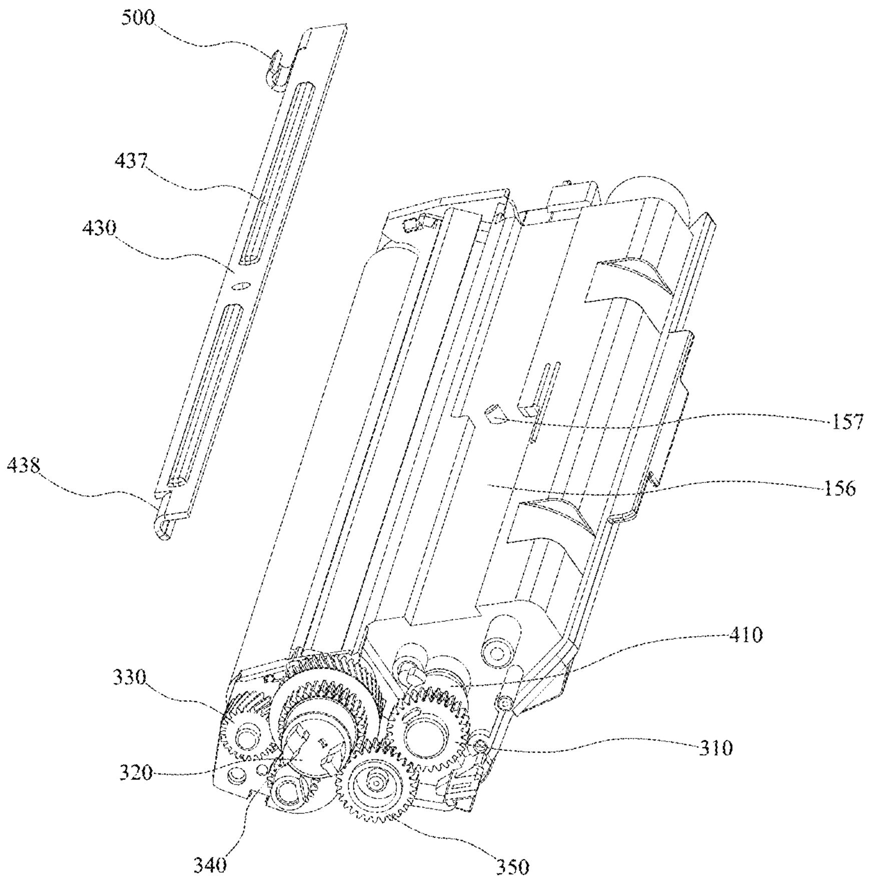
FIG. 19.2

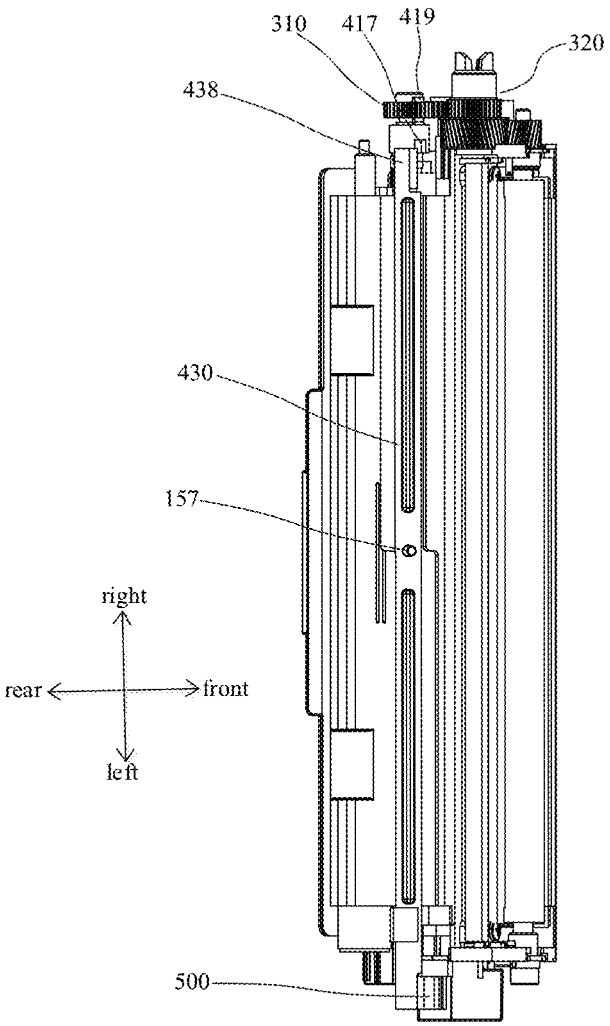
FIG. 19.3

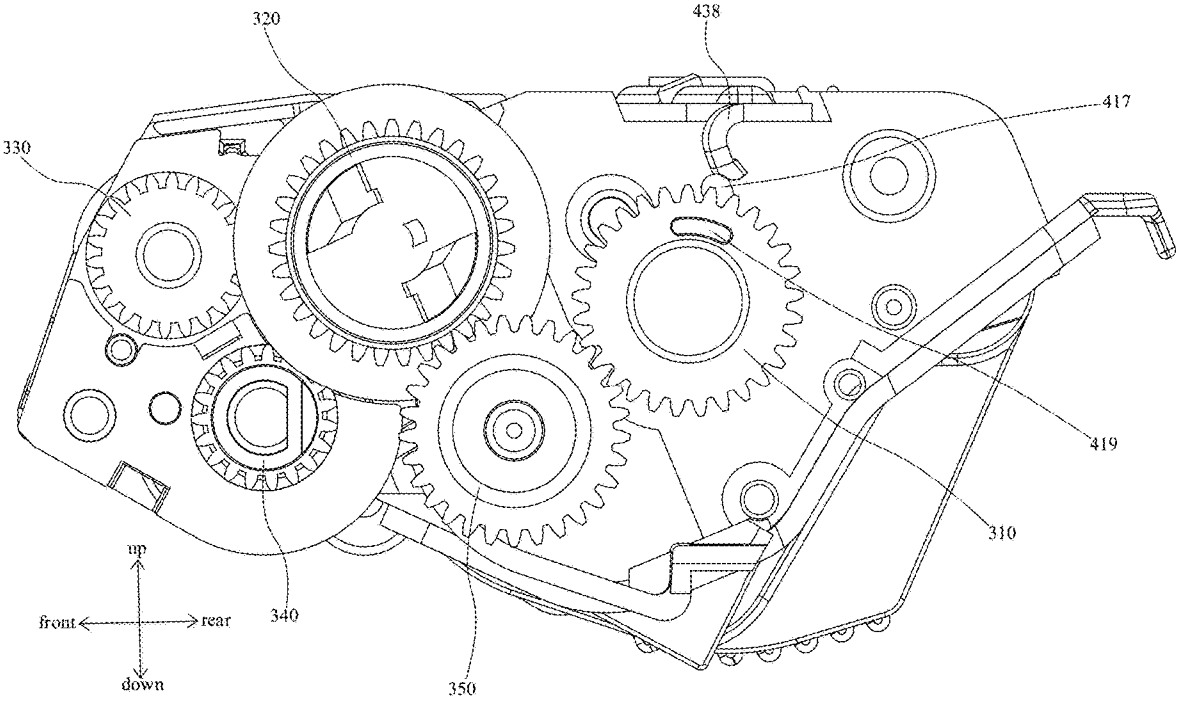
FIG. 19.4

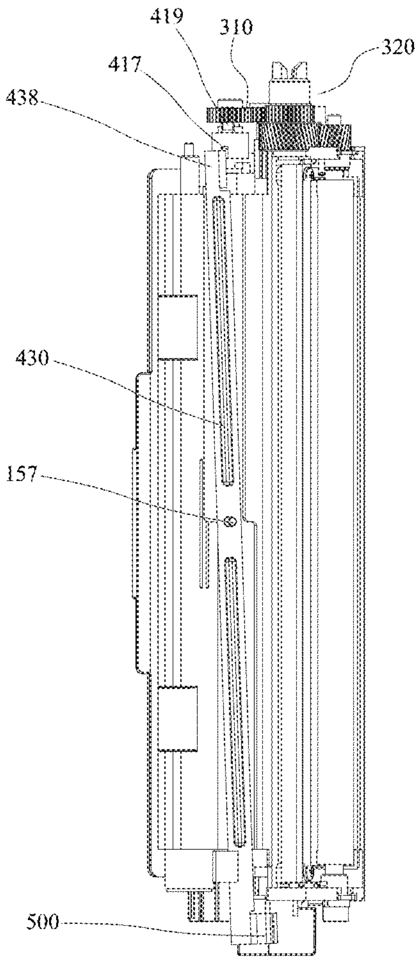
FIG. 19.5

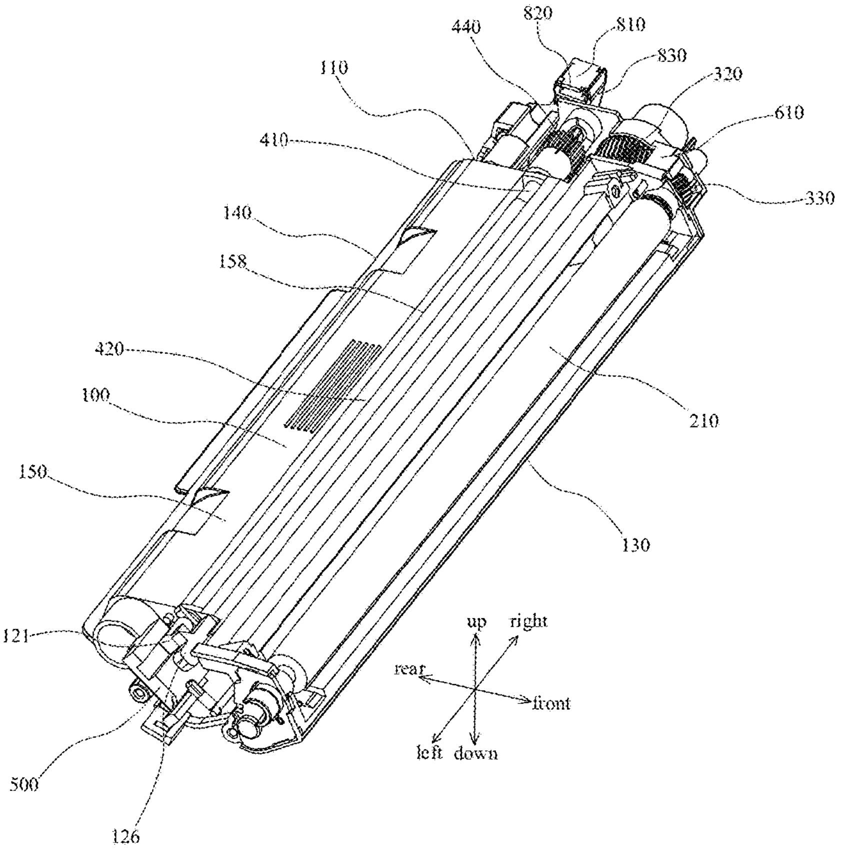
FIG. 20.1
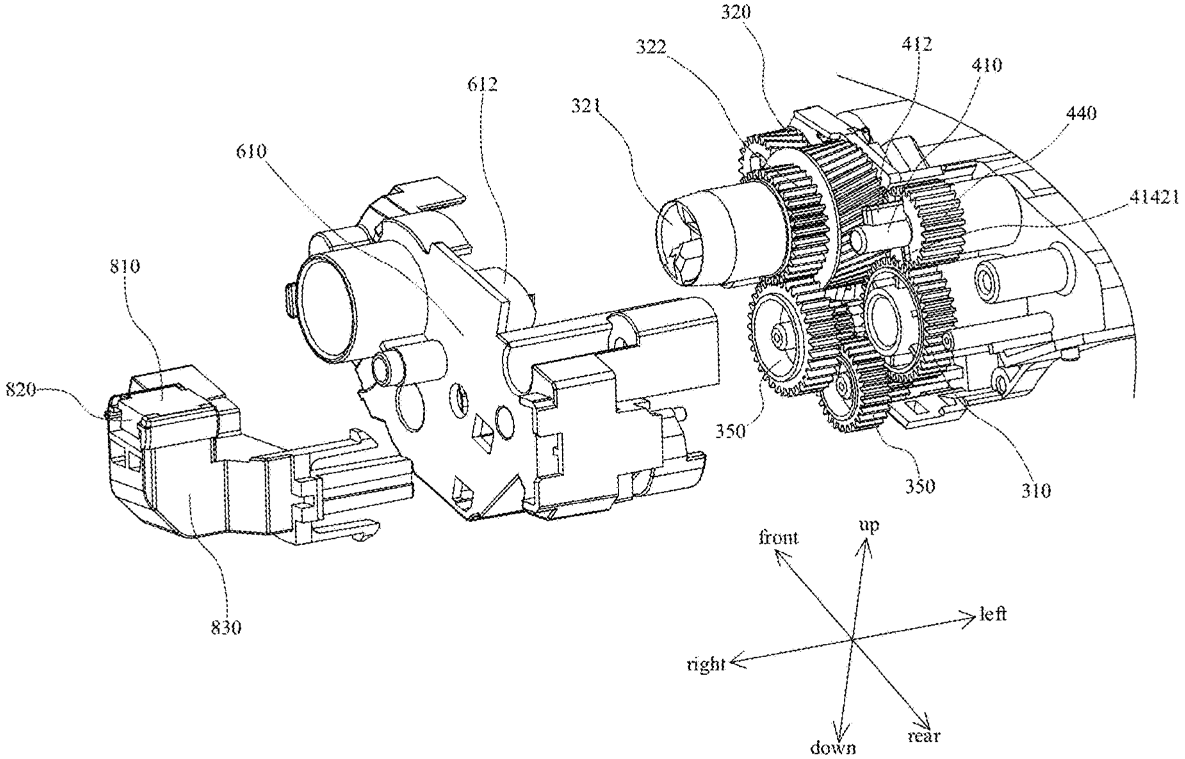
FIG. 20.2

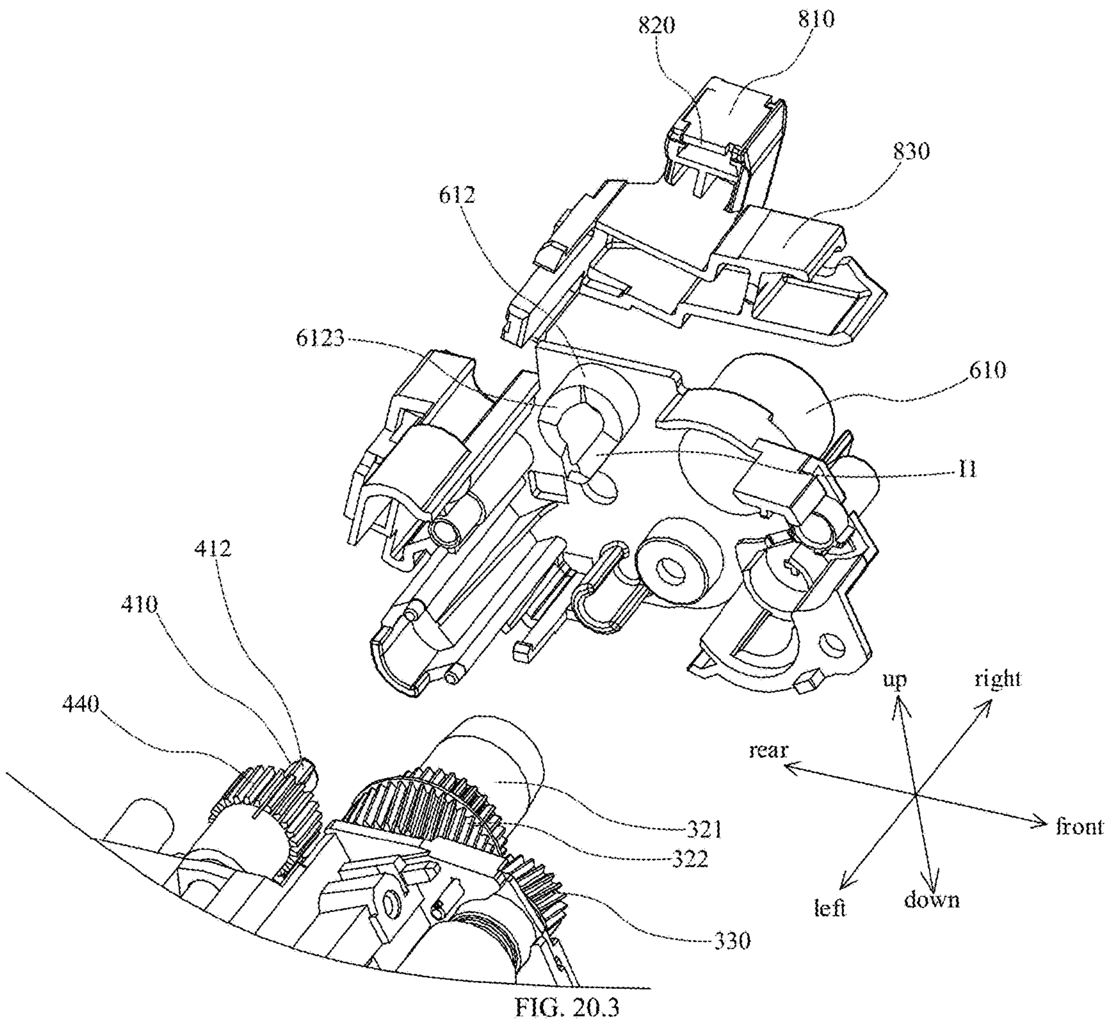
FIG. 20.3
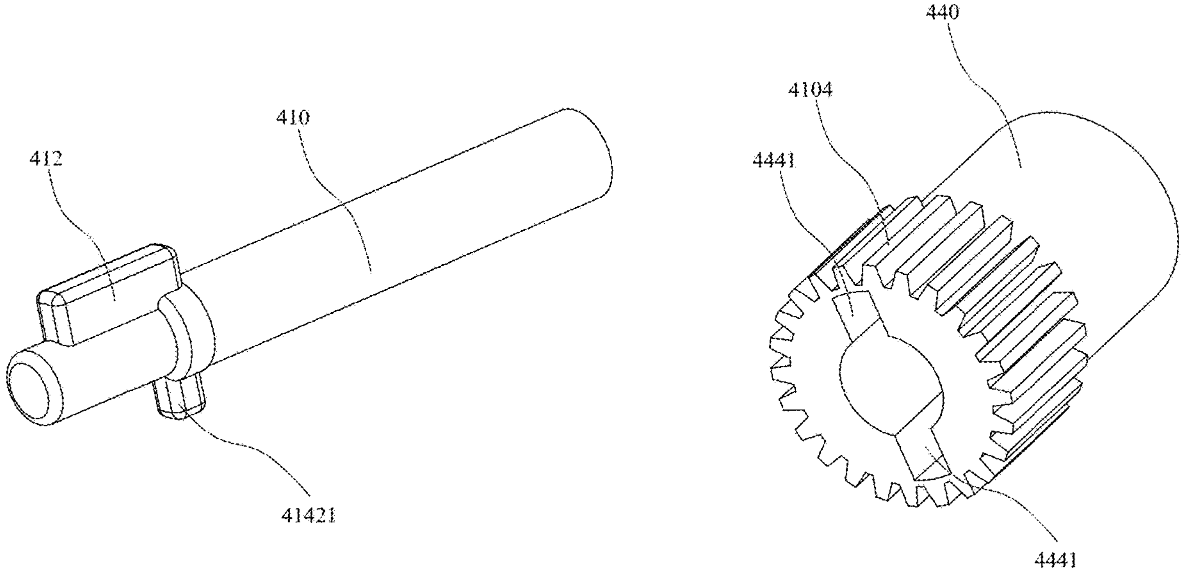
FIG. 20.4

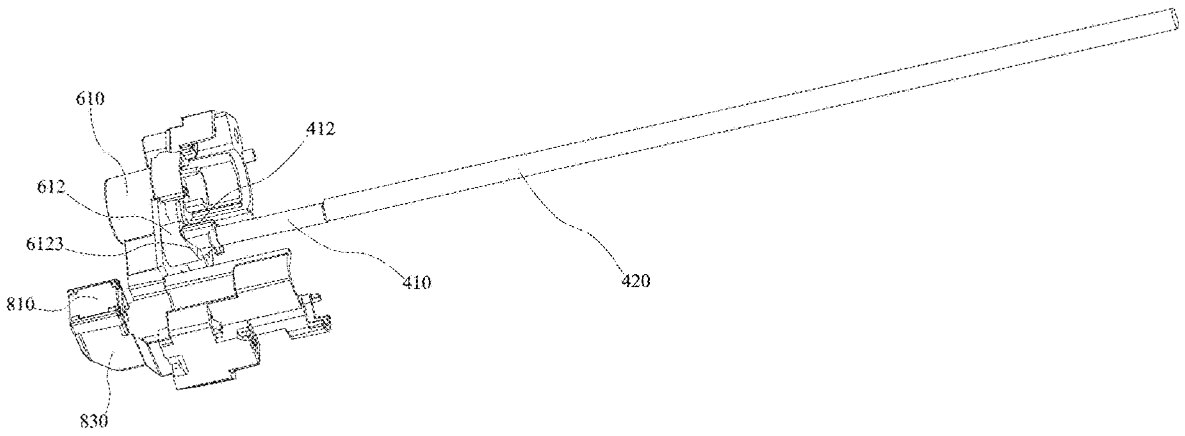
FIG. 20.5
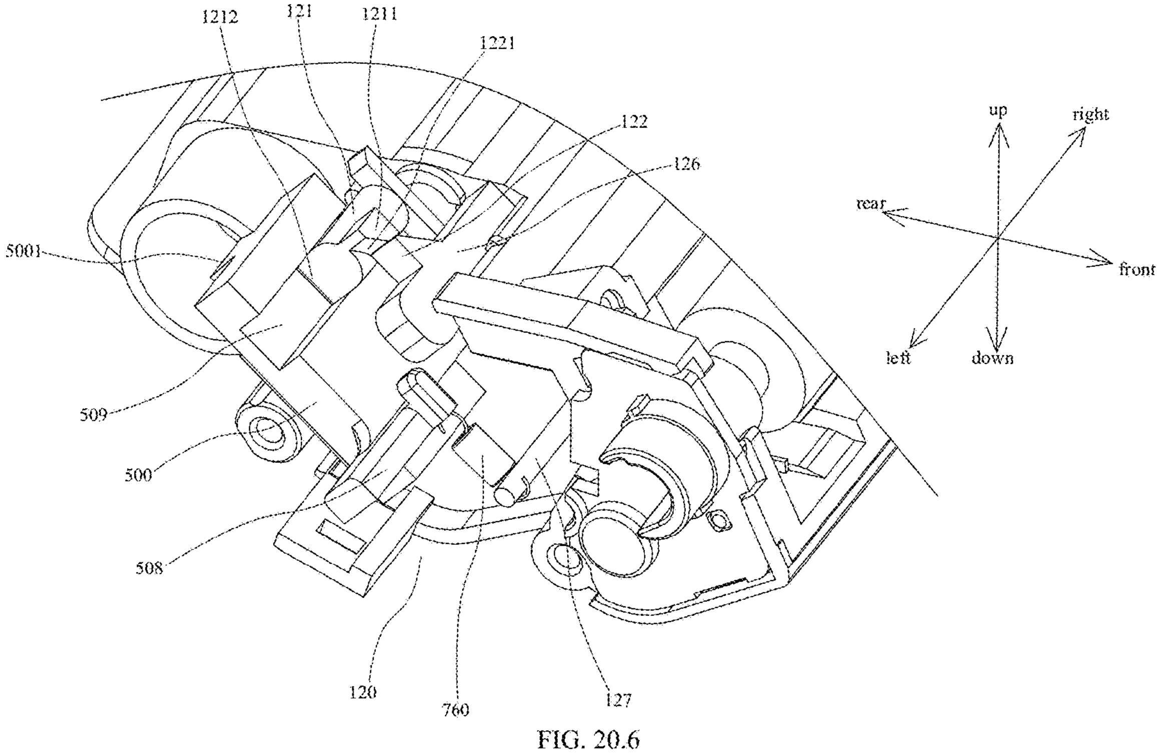
FIG. 20.6

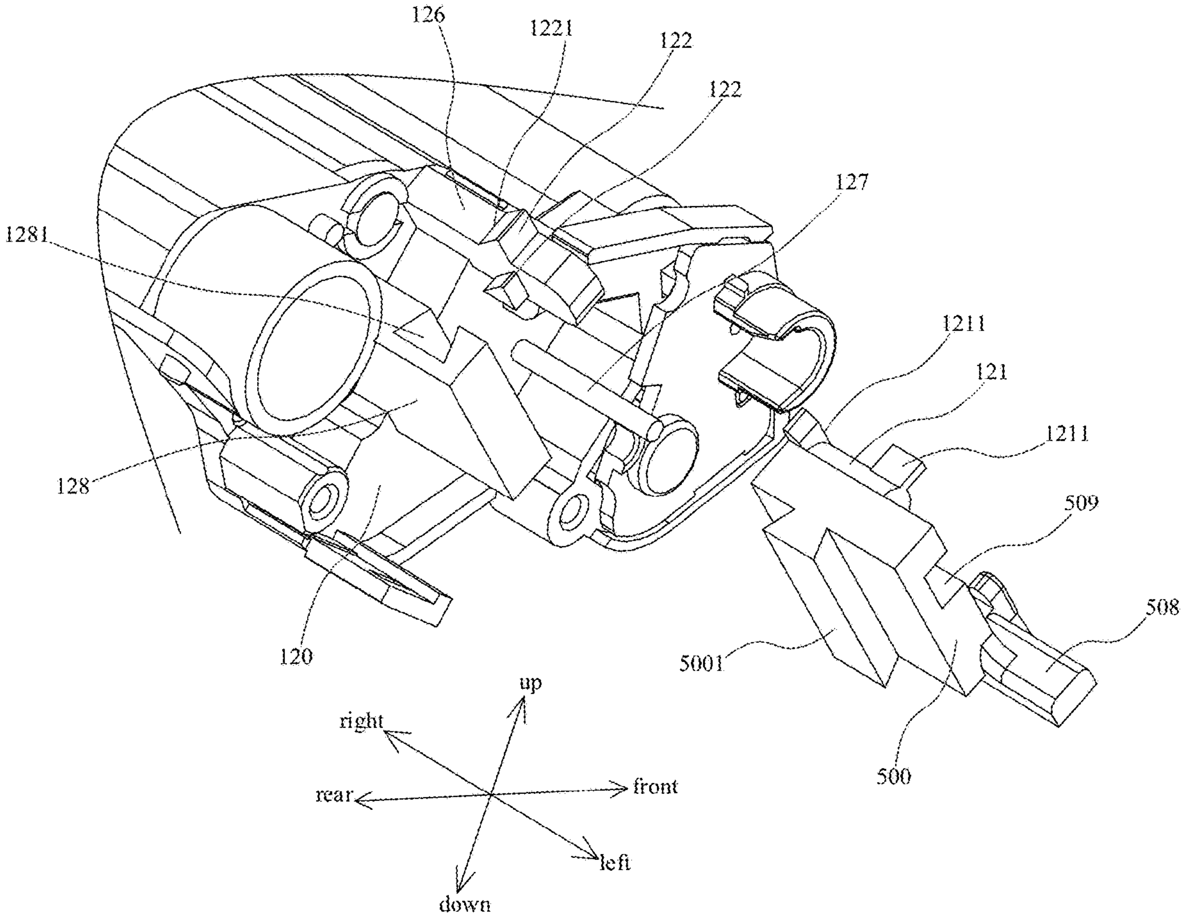
FIG. 20.7

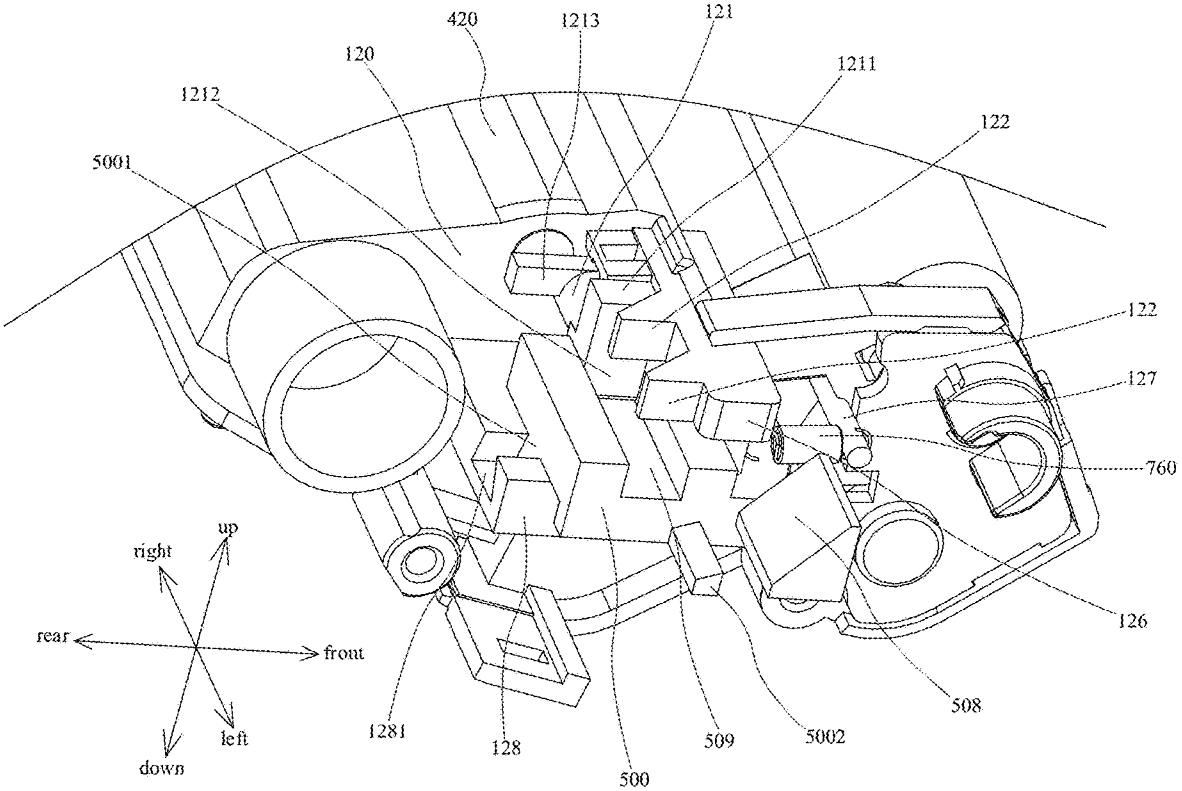
FIG. 20.8

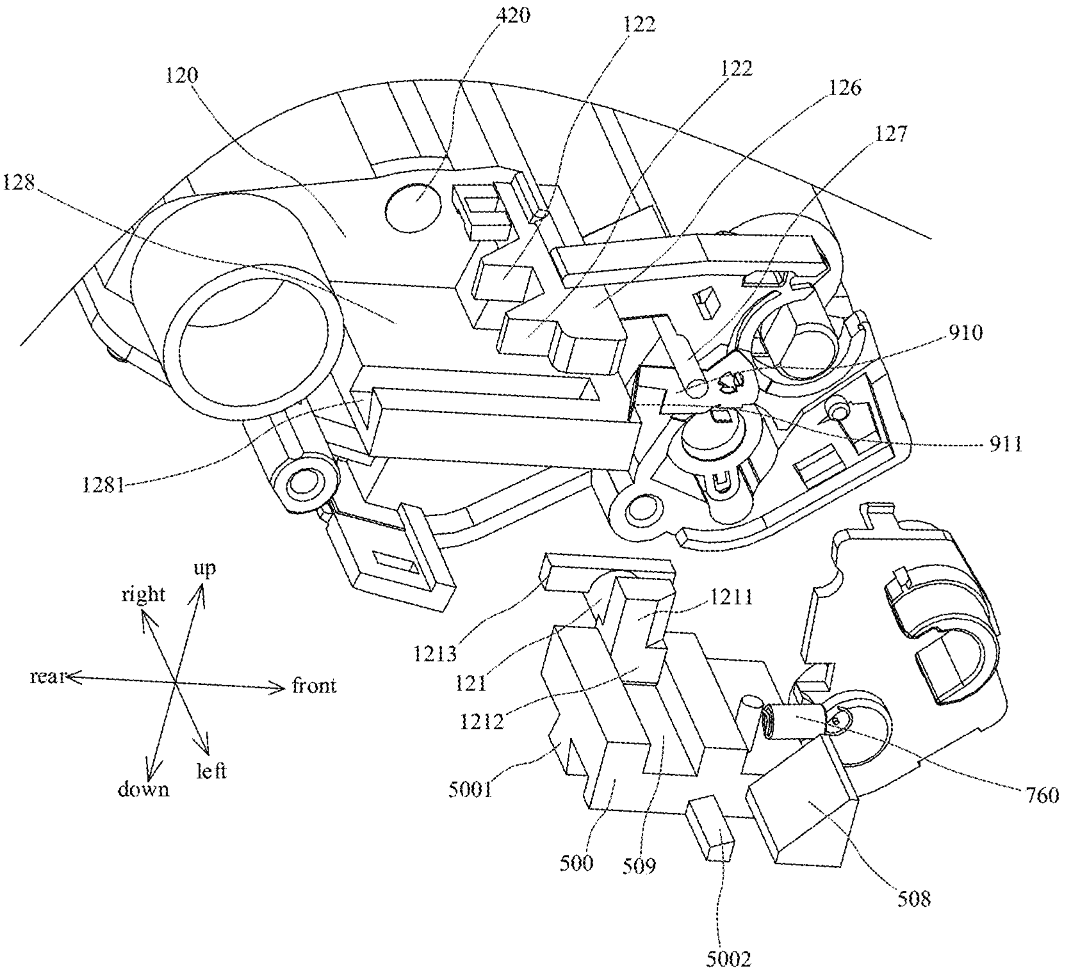
FIG. 20.9

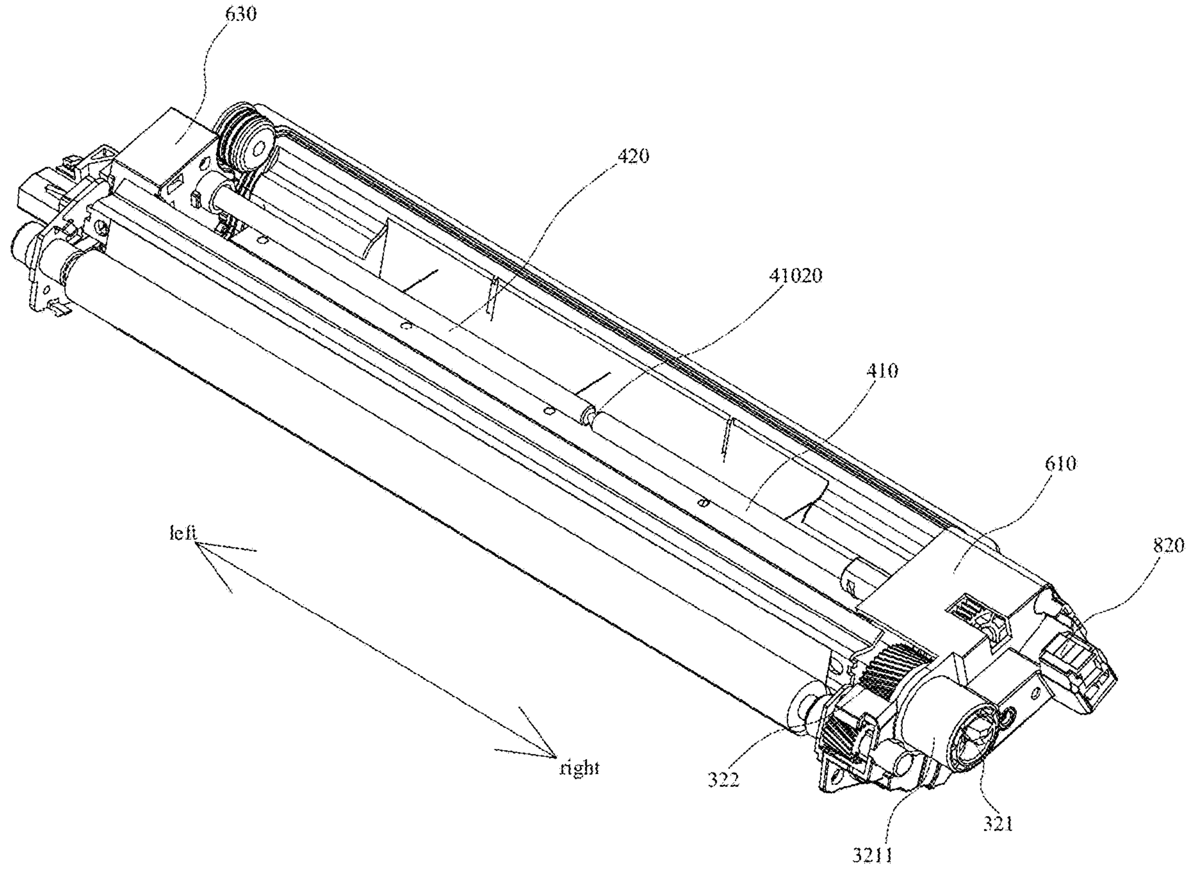
FIG. 21.1

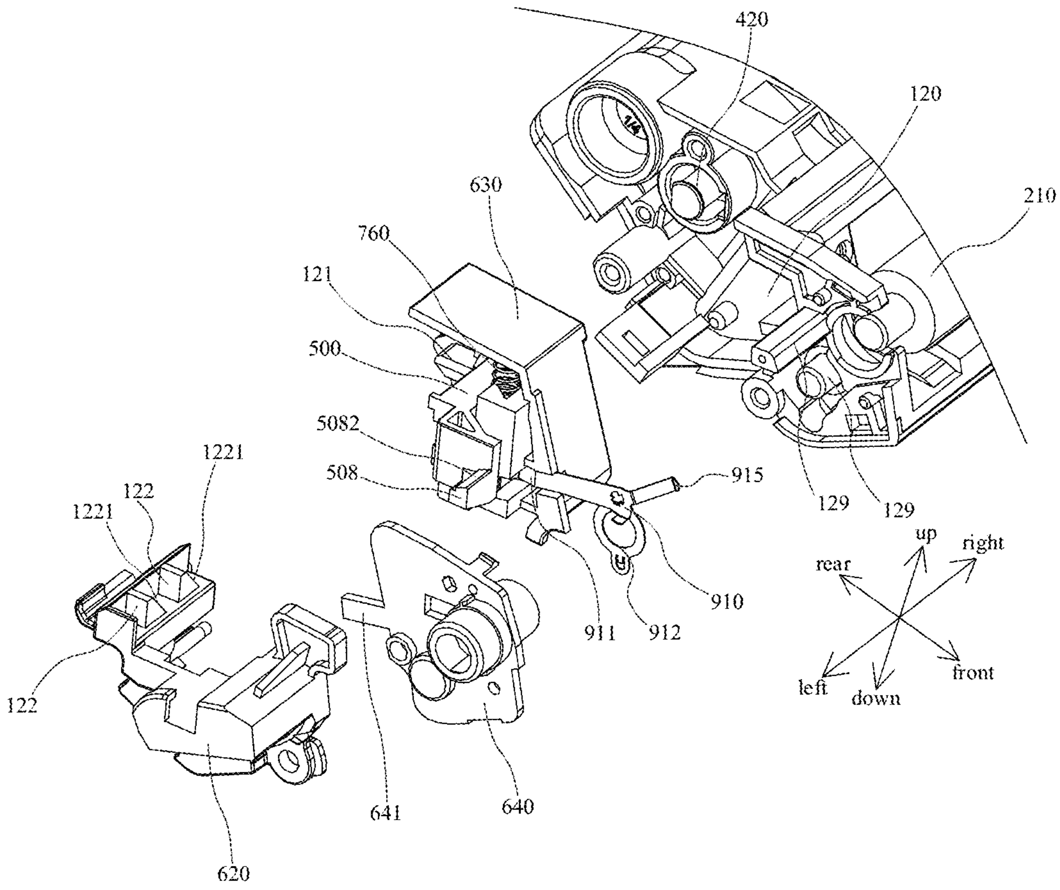
FIG. 21.2

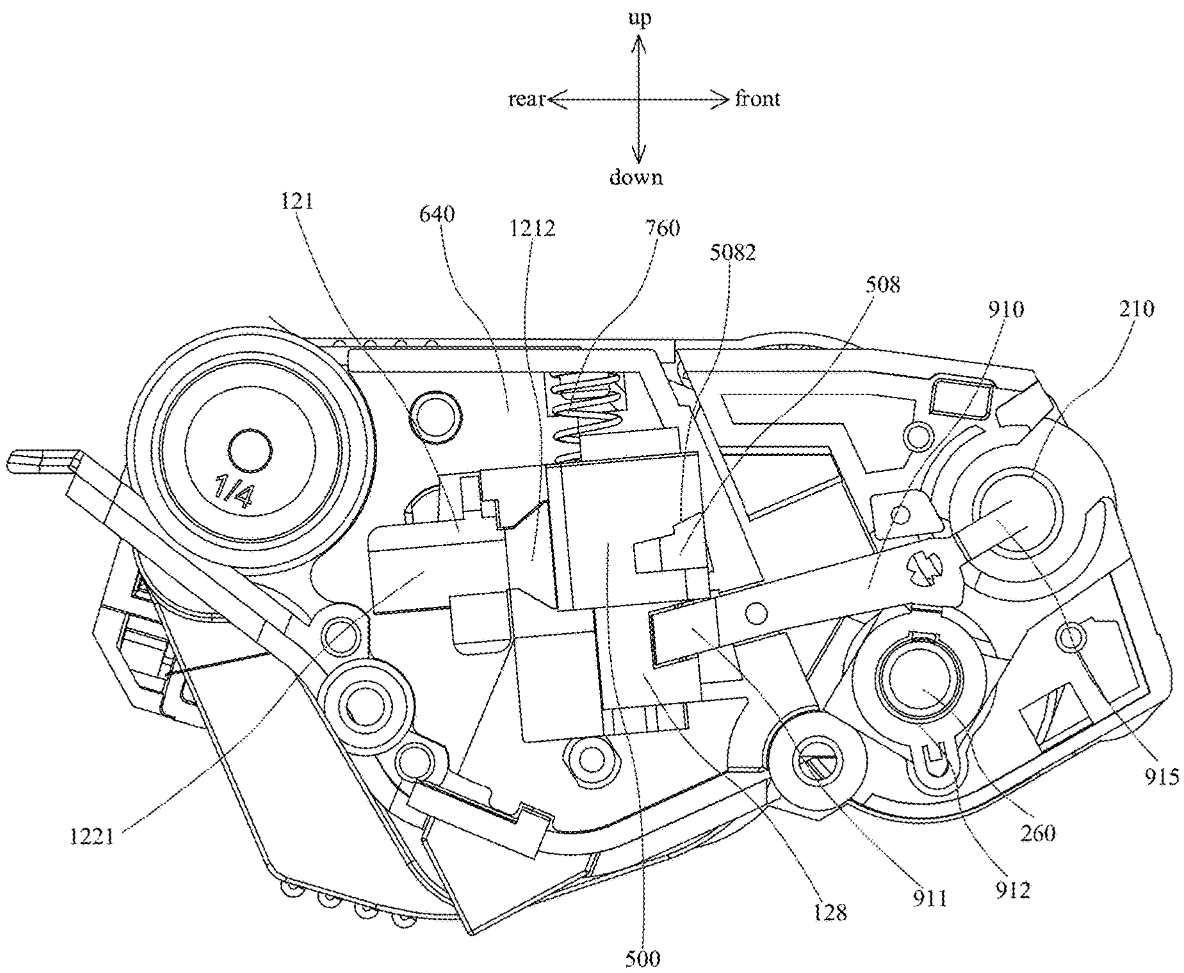
FIG. 21.3
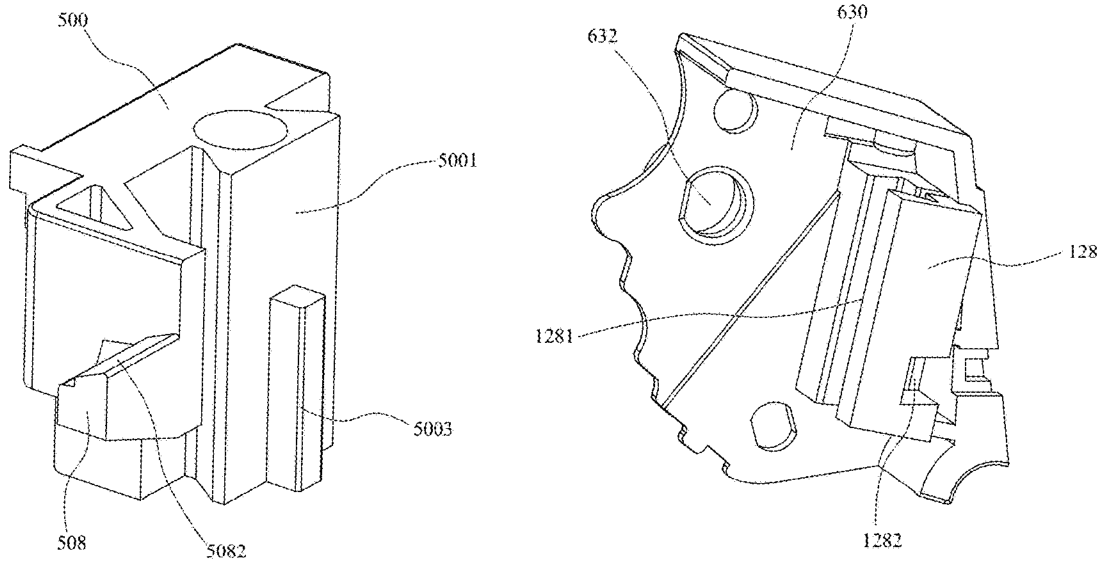
FIG. 21.4

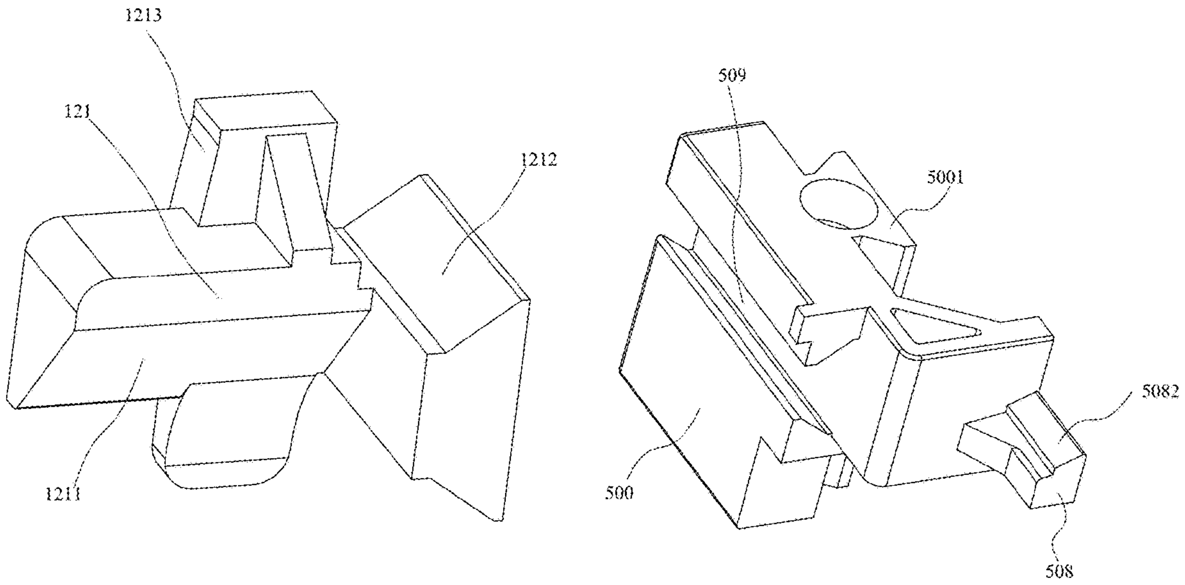
FIG. 21.5
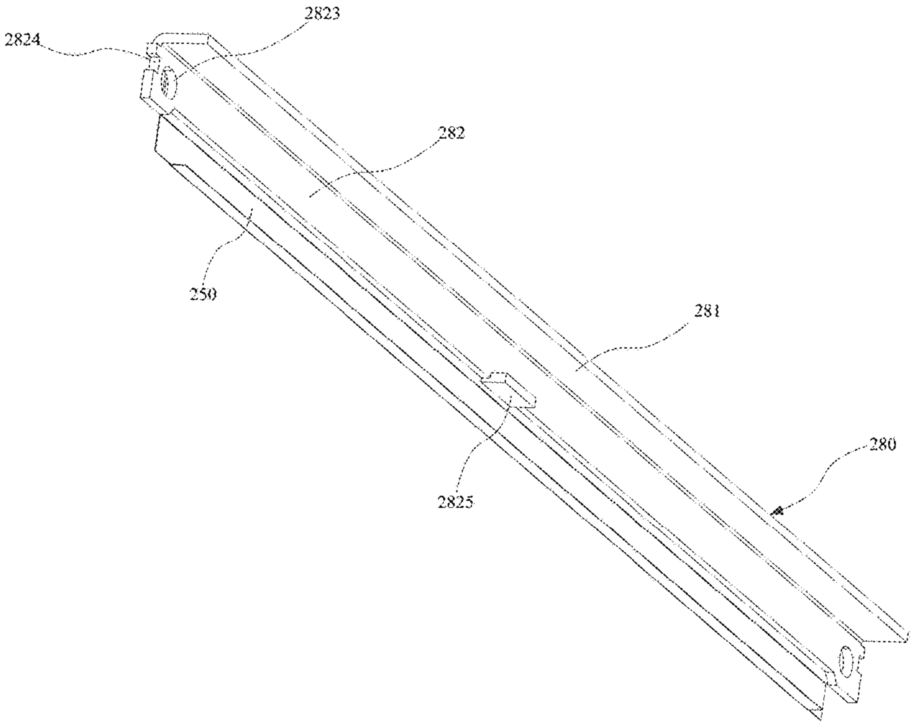
FIG. 21.6

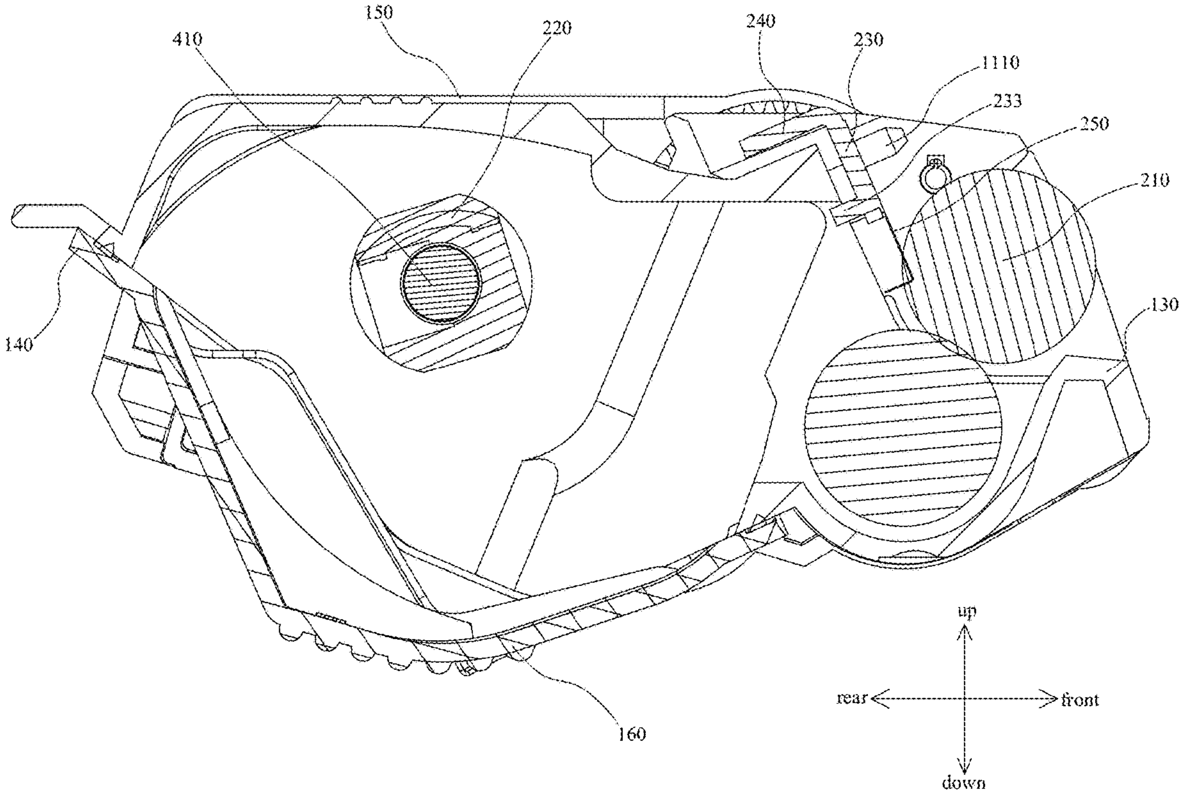
FIG. 21.7
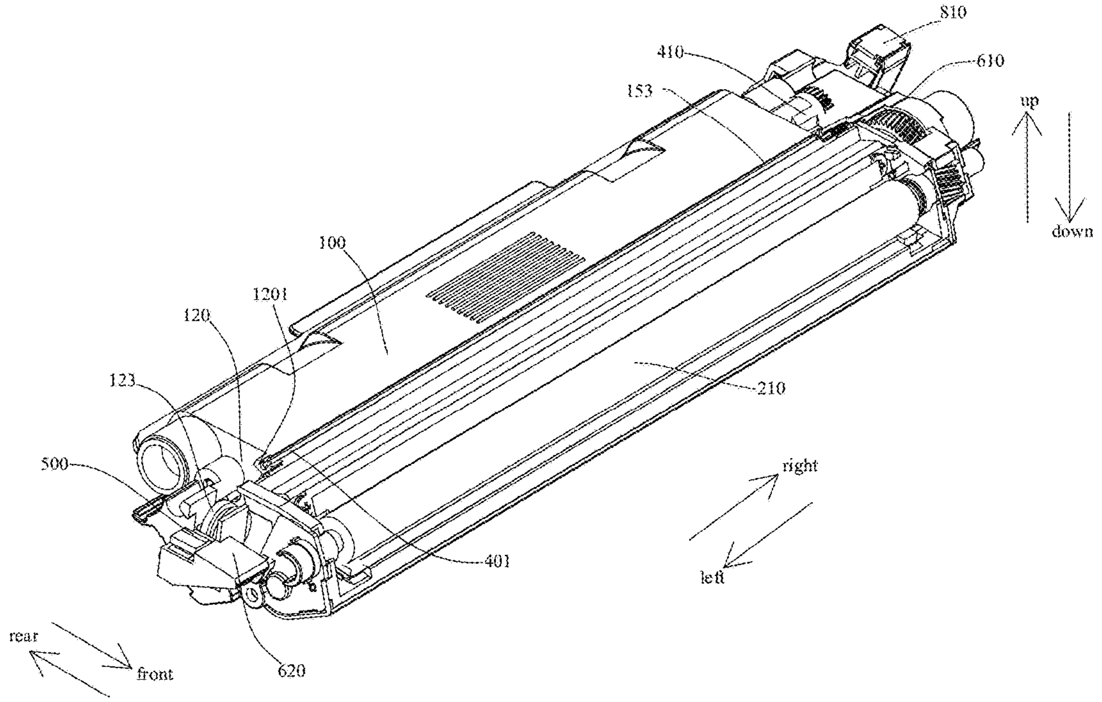
FIG. 22.1

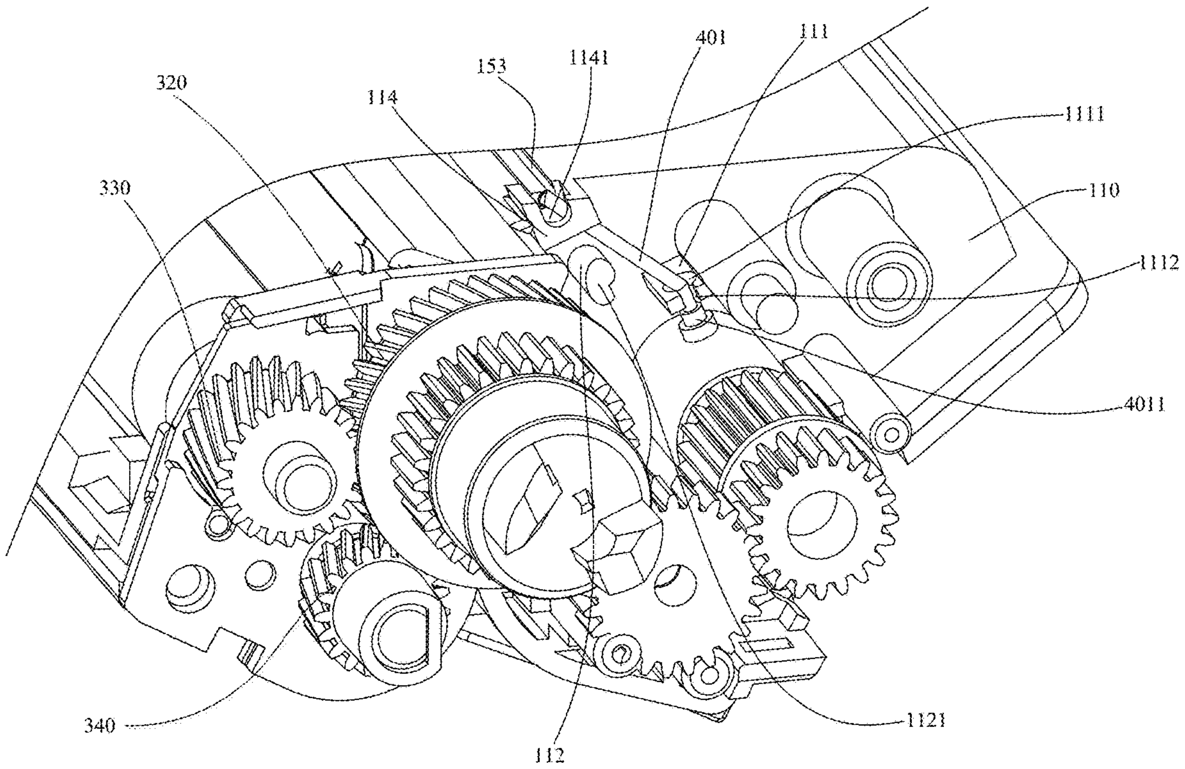
FIG. 22.2
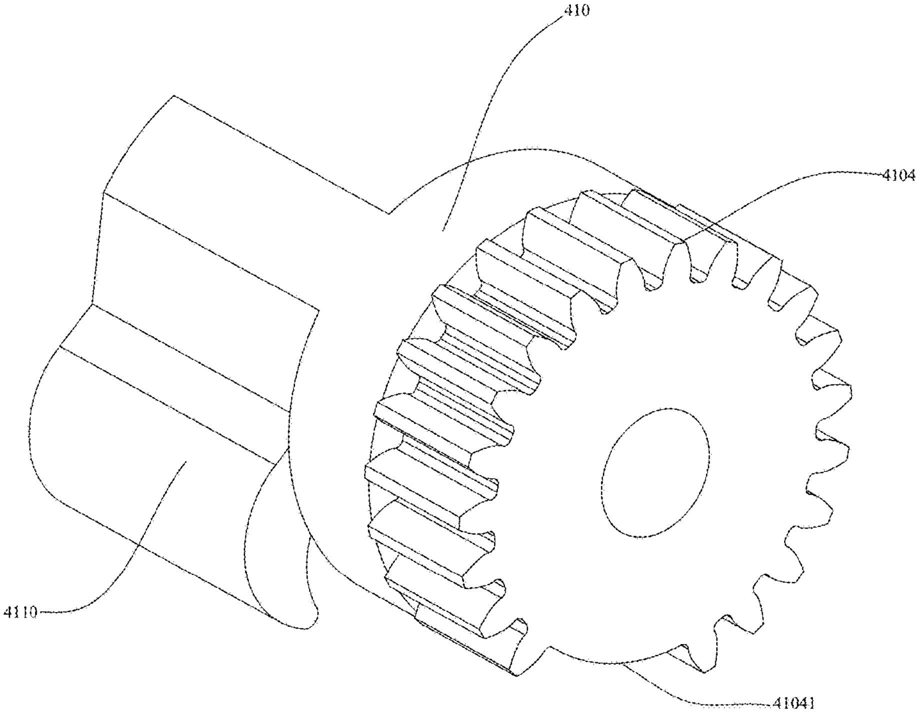
FIG. 22.3

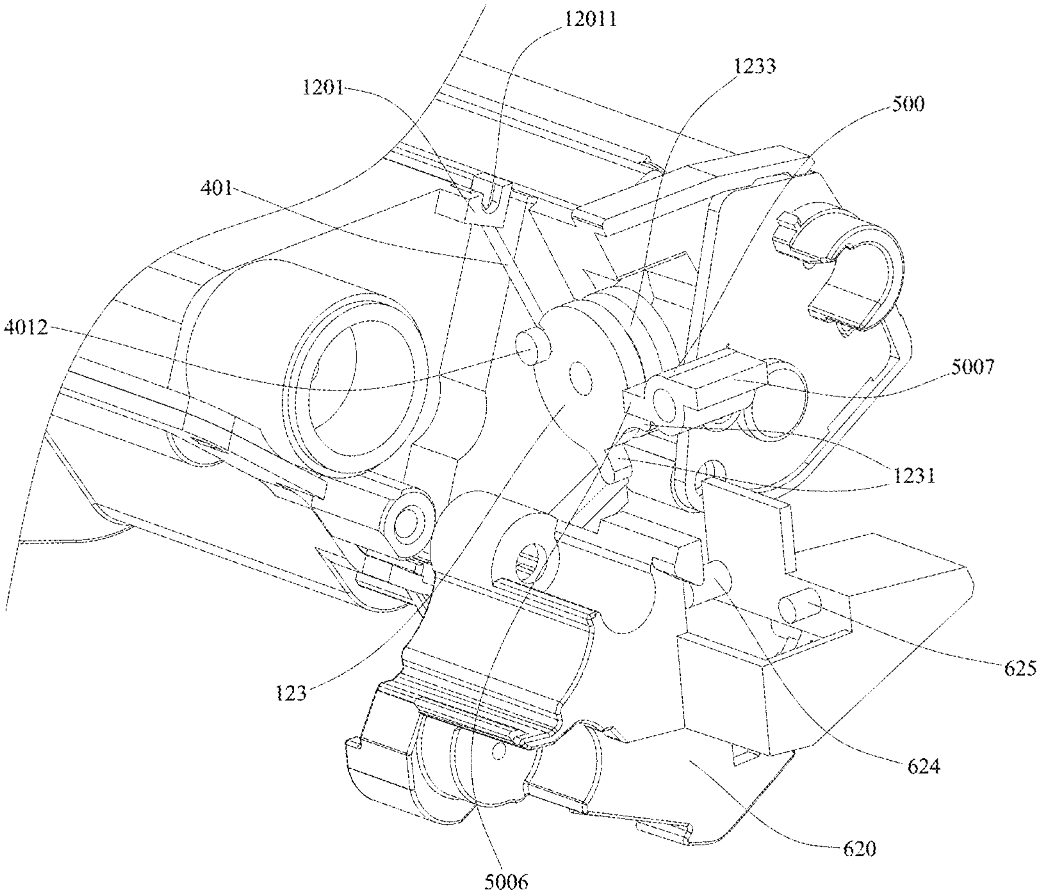
FIG. 22.4
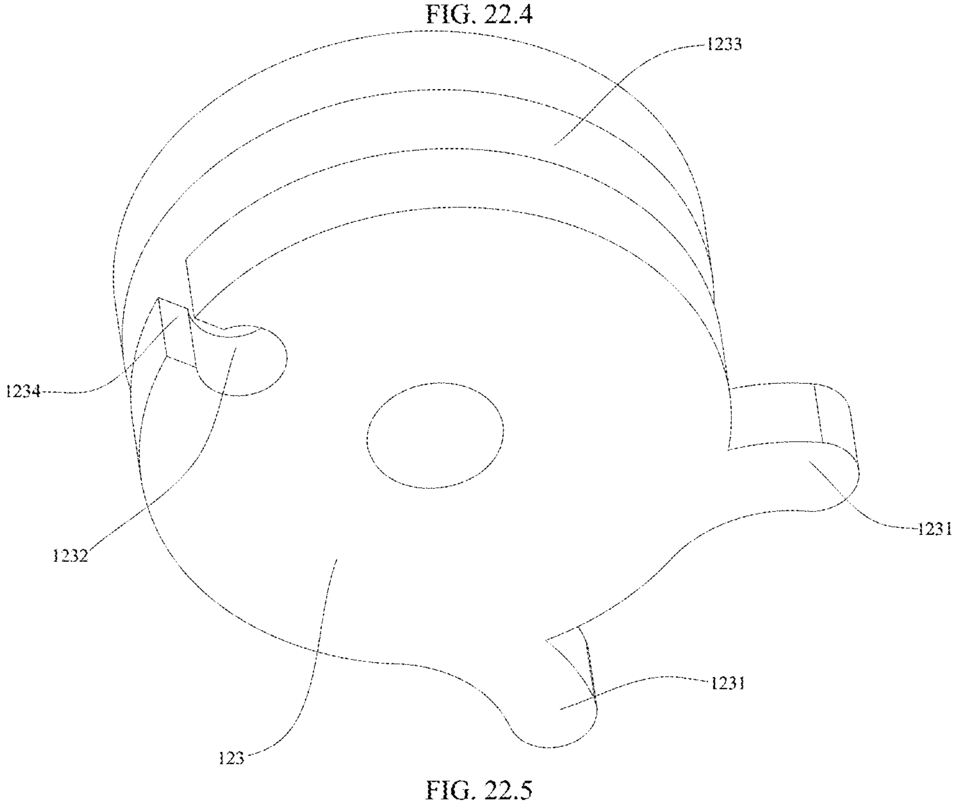
FIG. 22.5

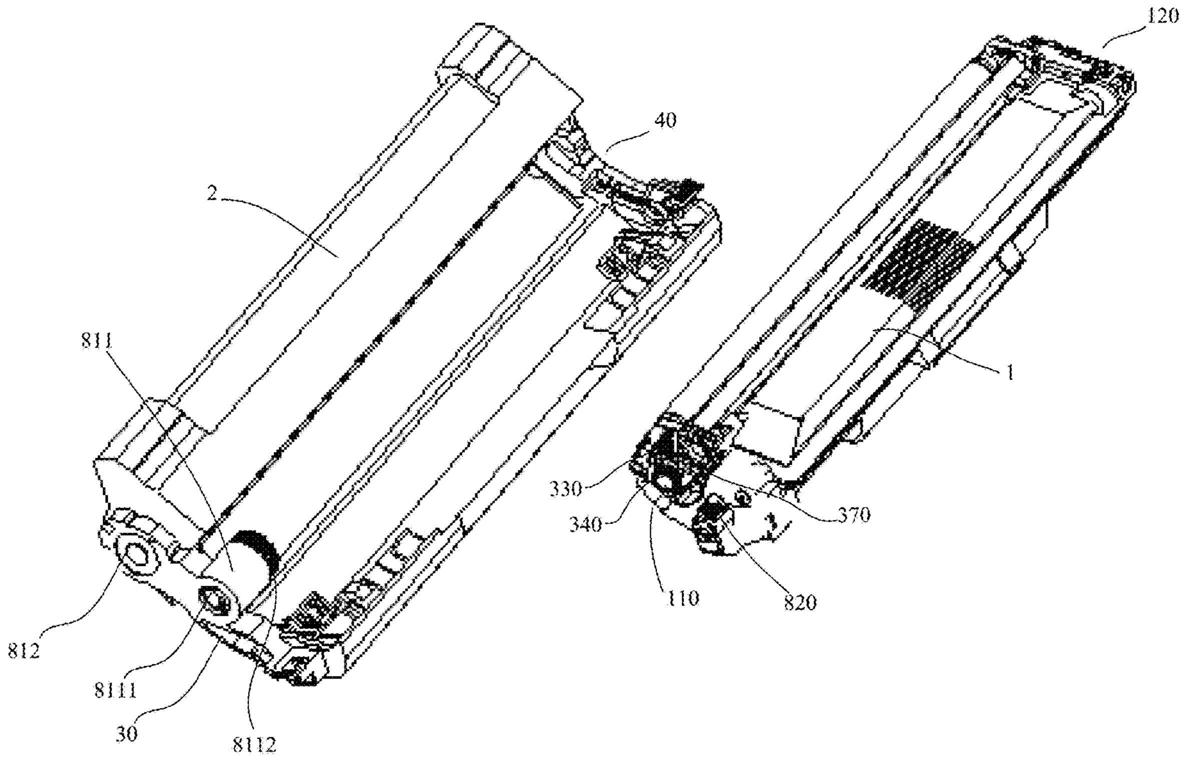
FIG. 23.1
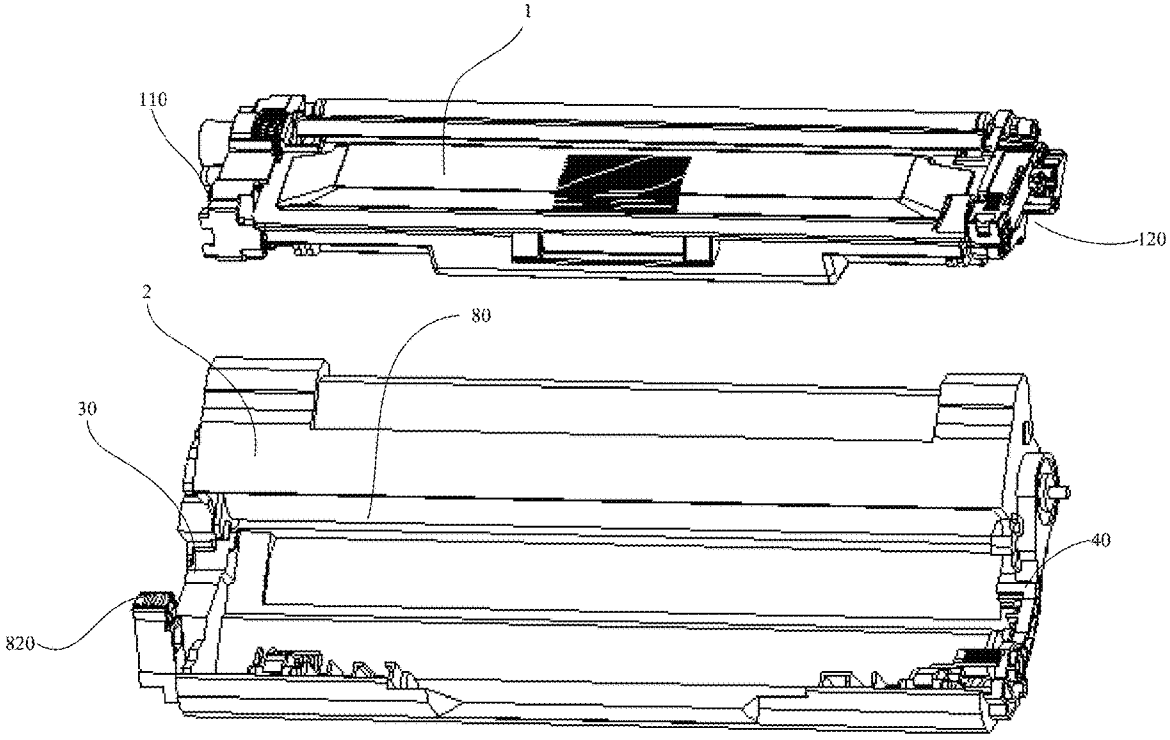
FIG. 23.2

DEVELOPING CARTRIDGE

CROSS-REFERENCES TO RELATED APPLICATIONS

This application is a continuation application of PCT application No. PCT/CN2022/139598, filed on Dec. 16, 2022, PCT application No. PCT/CN2023/106848, filed on Jul. 11, 2023, and PCT application No. PCT/CN2023/087921, filed on Apr. 12, 2023, which further claim priority to Chinese Patent Application No. 202221791169.X, filed on Jul. 11, 2022, Chinese Patent Application No. 202222050794.5, filed on Aug. 4, 2022, Chinese Patent Application No. 202222146027.4, filed on Aug. 15, 2022, Chinese Patent Application No. 202222217669.9, filed on Aug. 22, 2022, Chinese Patent Application No. 202222316708.0, filed on Aug. 31, 2022, Chinese Patent Application No. 202222587340.1, filed on Sep. 28, 2022, Chinese Patent Application No. 202222522985.7, filed on Sep. 22, 2022, Chinese Patent Application No. 202222564932.1, filed on Sep. 26, 2022, Chinese Patent Application No. 202222730289.5, filed on Oct. 14, 2022, Chinese Patent Application No. 202223298061.X, filed on Dec. 8, 2022, Chinese Patent Application No. 202223105178.1, filed on Nov. 17, 2022, Chinese Patent Application No. 202320064347.7, filed on Jan. 6, 2023, Chinese Patent Application No. 202320155353.3, filed on Jan. 18, 2023, Chinese Patent Application No. 202320200658.1, filed on Feb. 9, 2023, Chinese Patent Application No. 202320334037.2, filed on Feb. 24, 2023, Chinese Patent Application No. 202123195786.1, filed on Dec. 16, 2021, Chinese Patent Application No. 202220538877.6, filed on Mar. 11, 2022, Chinese Patent Application No. 202220696654.2, filed on Mar. 28, 2022, Chinese Patent Application No. 202220838764.8, filed on Apr. 12, 2022, Chinese Patent Application No. 202210303371.1, filed on Mar. 24, 2022, Chinese Patent Application No. 202220908818.3, filed on Apr. 19, 2022, Chinese Patent Application No. 202220996901.0, filed on Apr. 26, 2022, Chinese Patent Application No. 202220951969.7, filed on Apr. 22, 2022, Chinese Patent Application No. 202221127708.X, filed on May 10, 2022, Chinese Patent Application No. 202210553277.1, filed on May 20, 2022, Chinese Patent Application No. 202221363492.7, filed on Jun. 1, 2022, Chinese Patent Application No. 202220951609.7, filed on Apr. 22, 2022. Content of all of the above-listed applications is hereby incorporated by reference in its entirety.

FIELD OF THE TECHNOLOGY

The present invention relates to the field of electronic imaging technology and, more particularly, to a developing cartridge.

BACKGROUND OF THE DISCLOSURE

The developing cartridge is a removable part widely used in image forming device. After the printing consumables of the image forming devices are used up, new developing cartridges are needed to replace the used ones. In order to allow the image forming device to detect whether the developing cartridge is correct and whether it is old or new, a detected part will be provided on the developing cartridge. The detected part can touch the detecting part in the image forming device, causing the image forming device to detect whether the developing cartridge is installed correctly. The detected part can also be preset with different numbers of touches, touch speeds, and duration of each touch, so that the image forming device can detect a variety of information (such as new or old, model number, capacity, etc.).

At present, the developing cartridge is equipped with a large number of transmission structures, so that the detected part can make complex touching actions. However, the large number of transmission structures are not conducive to simplifying the structure of the developing cartridge, making it difficult to miniaturize the developing cartridge.

The disclosed method and apparatus are directed to solving one or more problems set forth above and other problems.

SUMMARY

According to one aspect of the present disclosure, a developing cartridge is provided. The developing cartridge includes a casing configured to accommodate developer and having a first side and a second side oppositely arranged in a first direction, the casing having a third side and a fourth side oppositely arranged in the second direction, the first direction and the second direction being intersected with each other; a developing roller rotatable about a first axis extending in the first direction, and being positioned at the third side; a coupling being positioned at the first side, and for receiving driving-force to rotate; a detected part movable according to rotation of the coupling, at least a part of the detected part being positioned at the second side; and a driving surface being inclined to the first direction, and including a first driving surface and a second driving surface. There is a first angle between the first driving surface and a base surface perpendicular to the first direction, and a second angle between the second driving surface and the base surface, and the first angle is greater than the second angle.

According to another aspect of the present disclosure, a developing cartridge is provided. The developing cartridge includes a casing configured to accommodate developer and having a first side and a second side oppositely arranged in a first direction, having a third side and a fourth side oppositely arranged in the second direction, and having a fifth side and a six side oppositely arranged in the third direction. The first direction, the second direction, and the third direction intersect with one another. The developing cartridge also includes a developing roller rotatable about a first axis extending in the first direction, being positioned at the third side; a coupling being positioned at the first side, for receiving driving-force to rotate; a detected part, at least a part of the detected part being positioned at the second side. At least one first transmission member rotatable about a rotation axis intersecting the first direction according to rotation of the coupling, the first transmission member being positioned at the fifth side, the first transmission member configured to transmit the driving-force to the detected part.

Other aspects of the present disclosure can be understood by those skilled in the art in light of the description, the claims, and the drawings of the present disclosure.

BRIEF DESCRIPTION OF THE DRAWINGS

FIG. 1.1 is a schematic structural diagram of a developing cartridge provided in Embodiment 1 of the present disclosure;

FIG. 1.2 is a schematic structural diagram of the developing cartridge installed on a drum cartridge provided in Embodiment 1 of the present disclosure;

FIG. 1.3 is a schematic structural diagram of the developing cartridge installed on a drum cartridge from another perspective provided in Embodiment 1 of the present disclosure;

FIG. 1.4 is a schematic structural diagram of a drum cartridge provided in Embodiment 1 of the present disclosure;

FIG. 1.5 is a schematic structural diagram of a developing cartridge from another perspective provided in Embodiment 1 of the present disclosure;

FIG. 1.6 is a cross-sectional view of a developing cartridge provided in Embodiment 1 of the present disclosure;

FIG. 1.7 is a partially exploded schematic diagram of a developing cartridge provided in Embodiment 1 of the present disclosure;

FIG. 1.8 is a side view of the first side of the developing cartridge after hiding a first protective cover provided in Embodiment 1 of the present disclosure;

FIG. 1.9 is an exploded schematic diagram of the second side of the developing cartridge provided in Embodiment 1 of the present disclosure;

FIG. 1.10 is a side view of the first side of the developing cartridge after hiding the first protective cover provided in Embodiment 1 of the present disclosure;

FIG. 1.11 is a schematic structural diagram of the developing cartridge with a viewing angle provided in Embodiment 1 of the present disclosure;

FIG. 1.12 is a side view of the second side of the developing cartridge provided in Embodiment 1 of the present disclosure;

FIG. 1.13 is another partially exploded schematic diagram of the developing cartridge provided in Embodiment 1 of the present disclosure.

FIG. 1.14 is a schematic structural diagram of a detected part in the detection position provided in Embodiment 1 of the present disclosure;

FIG. 1.15 is a schematic structural diagram of the detected part in the non-detecting position provided in Embodiment 1 of the present disclosure;

FIG. 1.16 is an exploded schematic diagram of the first rotating member and the first protective cover provided in Embodiment 1 of the present disclosure;

FIG. 1.17 is an exploded schematic view of the first rotating member and the first protective cover from another angle provided in Embodiment 1 of the present disclosure;

FIG. 1.18 is a schematic structural diagram of another drum cartridge provided in Embodiment 1 of the present disclosure;

FIG. 2.1 is an exploded schematic diagram of the first rotating member provided in Embodiment 2 of the present disclosure;

FIG. 2.2 is a schematic structural diagram of the first rotating member installed on the first protective cover provided in Embodiment 2 of the present disclosure;

FIG. 3.1 is a schematic structural diagram of the detected part in a detection position in the developing cartridge provided in Embodiment 3 of the present disclosure;

FIG. 3.2 is a schematic structural diagram of the detected part in a non-detecting position in the developing cartridge provided in Embodiment 3 of the present disclosure;

FIG. 3.3 is a schematic structural diagram of the connection between the detected part and the transmission part provided in Embodiment 3 of the present disclosure;

FIG. 4.1 is a schematic structural diagram of the developing cartridge provided in Embodiment 4 of the present disclosure;

FIG. 4.2 is a schematic structural diagram of the connection between the detected part and the transmission unit provided in Embodiment 4 of the present disclosure;

FIG. 4.3 is a schematic structural diagram of another first rotating member provided in Embodiment 4 of the present disclosure;

FIG. 5.1 is a schematic structural diagram of the developing cartridge installed on the drum cartridge according to Embodiment 5 of the present disclosure;

FIG. 5.2 is an enlarged view of B in FIG. 5.1;

FIG. 5.3 is an enlarged view of A in FIG. 5.1;

FIG. 5.4 is a schematic structural diagram of the connection between the detected part and the transmission unit provided in Embodiment 5 of the present disclosure;

FIG. 5.5 is a schematic structural diagram of the first rotating member provided in Embodiment 5 of the present disclosure;

FIG. 5.6 is a schematic structural diagram of the first rotating member from another angle provided in Embodiment 5 of the present disclosure;

FIG. 5.7 is a schematic structural diagram of another detected part and transmission part provided in Embodiment 5 of the present disclosure;

FIG. 5.8 is a schematic structural diagram of another first rotating member provided in Embodiment 5 of the present disclosure;

FIG. 6.1 is an exploded schematic diagram of the first side of the developing cartridge provided in Embodiment 6 of the present disclosure;

FIG. 6.2 is a schematic structural diagram of the first rotating member provided in Embodiment 6 of the present disclosure;

FIG. 6.3 is a schematic structural diagram of the linkage rod provided in Embodiment 6 of the present disclosure;

FIG. 6.4 is a schematic structural diagram of the linkage rod connecting the first rotating member and the second rotating member provided in Embodiment 6 of the present disclosure;

FIG. 6.5 is a schematic structural diagram of the first elastic member provided in Embodiment 6 of the present disclosure;

FIG. 6.6 is a schematic structural diagram of the contact between the first elastic member and the first rotating member provided in Embodiment 6 of the present disclosure;

FIG. 6.7 is a schematic structural diagram of the function of the first elastic member and the first rotating member provided in Embodiment 6 of the present disclosure;

FIG. 7.1 is an exploded schematic diagram of the first side of the developing cartridge provided in Embodiment 7 of the present disclosure;

FIG. 8.1 is a schematic structural diagram of the developing cartridge provided in Embodiment 8 of the present disclosure;

FIG. 8.2 is an exploded schematic diagram of the developing cartridge provided in Embodiment 8 of the present disclosure;

FIG. 8.3 is an exploded schematic diagram of the developing cartridge from another angle provided in Embodiment 8 of the present disclosure;

FIG. 8.4 is an exploded schematic diagram of the developing cartridge from another angle provided in Embodiment 8 of the present disclosure;

FIG. 8.5 is a side view of the first side after the first protective cover is hidden provided by Embodiment 8 of the present disclosure;

FIG. 8.6 is a schematic structural diagram of the connection between the detected part and the transmission unit provided in Embodiment 8 of the present disclosure;

FIG. 8.7 is a schematic structural diagram of the translational member not driven by the first rotating member provided in Embodiment 8 of the present disclosure;

FIG. 8.8 is a schematic structural diagram of the detected part without triggering the detecting part provided in Embodiment 8 of the present disclosure;

FIG. 8.9 is a schematic structural diagram of the translational member driven by the first rotating member provided in Embodiment 8 of the present disclosure;

FIG. 8.10 is a schematic structural diagram of the detected part triggering the detecting part provided in Embodiment 8 of the present disclosure;

FIG. 9.1 is a schematic structural diagram of the first protective cover provided in Embodiment 9 of the present disclosure;

FIG. 9.2 is a schematic structural diagram of the contact member provided in Embodiment 9 of the present disclosure;

FIG. 9.3 is a schematic structural diagram of the first rotating member provided in Embodiment 9 of the present disclosure;

FIG. 9.4 is a schematic structural diagram of the first rotating member from another angle provided in Embodiment 9 of the present disclosure;

FIG. 9.5 is an exploded schematic diagram of the developing cartridge provided in Embodiment 9 of the present disclosure;

FIG. 9.6 is a schematic structural diagram of the transmission member provided in Embodiment 9 of the present disclosure;

FIG. 9.7 is a schematic structural diagram of the transmission member being installed on the casing provided in Embodiment 9 of the present disclosure;

FIG. 10.1 is an exploded schematic diagram of the developing cartridge provided in Embodiment 10 of the present disclosure;

FIG. 10.2 is another exploded schematic diagram of the developing cartridge provided in Embodiment 10 of the present disclosure;

FIG. 10.3 is an exploded schematic diagram of another developing cartridge provided in Embodiment 10 of the present disclosure;

FIG. 11.1 is a schematic structural diagram of the developing cartridge provided in Embodiment 11 of the present disclosure;

FIG. 11.2 is a schematic structural diagram of the upper cover provided in Embodiment 11 of the present disclosure;

FIG. 11.3 is a schematic structural diagram of the transmission member provided in Embodiment 11 of the present disclosure;

FIG. 11.4 is a schematic structural diagram of the detected part provided in Embodiment 11 of the present disclosure;

FIG. 11.5 is a schematic structural diagram of the second side of the developing cartridge provided in Embodiment 11 of the present disclosure;

FIG. 12.1 is a schematic structural diagram of the developing cartridge provided in Embodiment 12 of the present disclosure;

FIG. 12.2 is a schematic structural diagram of the first side hiding the first protective cover provided in Embodiment 12 of the present disclosure;

FIG. 12.3 is a schematic structural diagram of the second side provided in Embodiment 12 of the present disclosure;

FIG. 12.4 is a schematic structural diagram of the contact between the first rotating member and the transmission member provided in Embodiment 12 of the present disclosure;

FIG. 12.5 is a schematic structural diagram of the contact between the first rotating member and the transmission member at another angle provided in Embodiment 12 of the present disclosure;

FIG. 12.6 is a schematic structural diagram of the interaction of the first rotating element and the accelerating element provided in Embodiment 12 of the present disclosure;

FIG. 12.7 is a schematic structural diagram of another position of the transmission member provided in Embodiment 12 of the present disclosure;

FIG. 13.1 is a schematic structural diagram of the developing cartridge provided in Embodiment 13 of the present disclosure;

FIG. 13.2 is an exploded schematic diagram of another detected part provided in Embodiment 13 of the present disclosure;

FIG. 14.1 is a schematic structural diagram of the developing cartridge provided in Embodiment 14 of the present disclosure;

FIG. 14.2 is a schematic structural diagram of the developing cartridge from another angle provided in Embodiment 14 of the present disclosure;

FIG. 15.1 is a schematic structural diagram of the developing cartridge provided in Embodiment 15 of the present disclosure;

FIG. 15.2 is a schematic structural diagram of some components of the second side provided in Embodiment 15 of the present disclosure;

FIG. 15.3 is a schematic structural diagram of another part of the second side provided in Embodiment 15 of the present disclosure;

FIG. 15.4 is a schematic structural diagram of the detected part at the detection position on the second protective cover provided in Embodiment 15 of the present disclosure;

FIG. 15.5 is a schematic structural diagram of the first rotating member that does not trigger the third rotating member provided in Embodiment 15 of the present disclosure;

FIG. 15.6 is a schematic structural diagram of the first rotating element about to trigger the third rotating element provided in Embodiment 15 of the present disclosure;

FIG. 16.1 is a schematic structural diagram of the photosensitive drum transmitting force to the transmission assembly provided in Embodiment 16 of the present disclosure;

FIG. 17.1 is a schematic structural diagram of the developing cartridge provided in Embodiment 17 of the present disclosure;

FIG. 17.2 is an exploded schematic diagram of the second side of the developing cartridge provided in Embodiment 17 of the present disclosure;

FIG. 17.3 is an exploded schematic diagram of the first side of the developing cartridge provided in Embodiment 17 of the present disclosure;

FIG. 17.4 is another exploded schematic diagram of the first side of the developing cartridge provided in Embodiment 17 of the present disclosure;

FIG. 17.5 is a schematic structural diagram of the connection between the detected part and the transmission unit provided in Embodiment 17 of the present disclosure;

FIG. 17.6 is a schematic structural diagram of the connection between the detected part and the second protective cover provided in Embodiment 17 of the present disclosure;

FIG. 17.7 is another exploded schematic diagram of the second side of the developing cartridge provided in Embodiment 17 of the present disclosure;

FIG. 17.8 is a schematic structural diagram of the transmission member without being driven provided in Embodiment 17 of the present disclosure;

FIG. 17.9 is a schematic structural diagram of the transmission member being driven provided in Embodiment 17 of the present disclosure;

FIG. 17.10 is an exploded schematic diagram of the casing provided in Embodiment 17 of the present disclosure;

FIG. 17.11 is a schematic structural diagram of another conductive assembly provided in Embodiment 17 of the present disclosure;

FIG. 18.1 is a schematic structural diagram of the developing cartridge provided in Embodiment 18 of the present disclosure;

FIG. 18.2 is an exploded schematic diagram of the first side of the developing cartridge provided in Embodiment 18 of the present disclosure;

FIG. 18.3 is a partially exploded schematic diagram of the developing cartridge provided in Embodiment 18 of the present disclosure;

FIG. 18.4 is an exploded schematic diagram of the second side of the developing cartridge provided in Embodiment 18 of the present disclosure;

FIG. 18.5 is a schematic structural diagram of the connection between the detected part and the transmission unit provided in Embodiment 18 of the present disclosure;

FIG. 18.6 is a schematic structural diagram of the detected part being driven by the translational member for the first time provided in Embodiment 18 of the present disclosure;

FIG. 18.7 is a schematic structural diagram of the detected part after being driven by the translational member for the first time provided in Embodiment 18 of the present disclosure;

FIG. 18.8 is a schematic structural diagram of the detected part after being driven by the translational member for the second time provided by Embodiment 18 of the present disclosure;

FIG. 19.1 is a schematic structural diagram of the developing cartridge provided in Embodiment 19 of the present disclosure;

FIG. 19.2 is an exploded schematic diagram of the developing cartridge provided in Embodiment 19 of the present disclosure;

FIG. 19.3 is a schematic structural diagram of the detected part in the non-detecting position provided in Embodiment 19 of the present disclosure;

FIG. 19.4 is a schematic structural diagram of the contact between the transmission member and the first rotating member provided in Embodiment 19 of the present disclosure;

FIG. 19.5 is a schematic structural diagram of the detected part in the detection position provided in Embodiment 19 of the present disclosure;

FIG. 20.1 is a schematic structural diagram of the developing cartridge provided in Embodiment 20 of the present disclosure;

FIG. 20.2 is an exploded schematic diagram of the first side of the developing cartridge provided in Embodiment 20 of the present disclosure;

FIG. 20.3 is an exploded schematic diagram of the first side of the developing cartridge from another angle provided by Embodiment 20 of the present disclosure;

FIG. 20.4 is a schematic structural diagram of the first rotating member and the third rotating member provided in Embodiment 20 of the present disclosure;

FIG. 20.5 is a schematic structural diagram of the first protective cover and transmission unit provided in Embodiment 20 of the present disclosure;

FIG. 20.6 is a schematic structural diagram of the second side of the developing cartridge provided in Embodiment 20 of the present disclosure;

FIG. 20.7 is an exploded schematic diagram of the second side of the developing cartridge provided in Embodiment 20 of the present disclosure;

FIG. 20.8 is a schematic structural diagram of another structure of the second side of the developing cartridge provided in Embodiment 20 of the present disclosure;

FIG. 20.9 is an exploded schematic diagram of another structure of the second side of the developing cartridge provided in Embodiment 20 of the present disclosure;

FIG. 21.1 is a schematic structural diagram of the developing cartridge with some hidden parts provided in Embodiment 21 of the present disclosure;

FIG. 21.2 is an exploded schematic diagram of the second side of the developing cartridge provided in Embodiment 21 of the present disclosure;

FIG. 21.3 is a side view of the second side of the developing cartridge provided in Embodiment 21 of the present disclosure;

FIG. 21.4 is a schematic structural diagram of the detected part and the first connecting member provided in Embodiment 21 of the present disclosure;

FIG. 21.5 is a schematic structural diagram of the detected part and the driving part provided in Embodiment 21 of the present disclosure;

FIG. 21.6 is a schematic structural diagram of the layer thickness regulating blade provided in Embodiment 21 of the present disclosure;

FIG. 21.7 is a cross-sectional view in the first direction of the developing cartridge provided in Embodiment 21 of the present disclosure;

FIG. 22.1 is a schematic structural diagram of the developing cartridge provided in Embodiment 22 of the present disclosure;

FIG. 22.2 is a schematic structural diagram of the first side of the developing cartridge with the first protective cover hidden provided by Embodiment 22 of the present disclosure;

FIG. 22.3 is a schematic structural diagram of the first rotating member provided in Embodiment 22 of the present disclosure;

FIG. 22.4 is an exploded schematic diagram of the second side provided in Embodiment 22 of the present disclosure;

FIG. 22.5 is a schematic structural diagram of the transition member provided in Embodiment 22 of the present disclosure;

FIG. 23.1 is a schematic structural diagram of a process cartridge provided in Embodiment 23 of the present disclosure; and FIG. 23.2 is a schematic structural diagram of another structure of a process cartridge provided in Embodiment 23 of the present disclosure.

DETAILED DESCRIPTION

To make the purposes, technical solutions, and advantages of the present disclosure clearer, the present disclosure will be further described in detail below together with the accompanying drawings. In the drawings, the same or similar reference numbers throughout may represent the same or similar components or components having the same or similar functions. The described embodiments are some, but not all, of the embodiments of the present disclosure. It should be understood that the specific embodiments described herein are only used to explain the present disclosure, and are not intended to limit the present disclosure. Based on the disclosed embodiments, other embodiments obtained by those of ordinary skill in the art without creative efforts fall within the scope of protection of this disclosure. The embodiments of the present disclosure will be described in detail below with reference to the accompanying drawings.

In the description of this disclosure, it should be noted that, unless otherwise clearly stated and limited, the terms "fixation", "coupled" and "connection" should be understood in a broad sense. For example, it can be a fixed connection or a connection through an intermediate, or it can be the internal connection between two components or the interaction between two components. For those of ordinary skill in the art, the specific meanings of the above terms in this disclosure can be understood according to specific circumstances.

In the description of this disclosure, it should be understood that the direction, orientation, or positional relationship indicated by the terms "upper", "lower", "front", "back", "vertical", "horizontal", "top", "bottom", "inner", and "outside", etc., is based on the direction, orientation, or positional relationship based on the drawings. It is only for the convenience of describing the present disclosure and simplifying the description. It does not indicate or imply that the device or element referred to must have a specific orientation or a structure or operation with the specific orientation. Therefore, they cannot be construed as a limitation on this disclosure. In this disclosure, the first direction is the left and right direction of the developing casing, the second direction is the front and rear direction of the casing, the third direction is the up and down direction of the casing, and the first direction, the second direction and the third direction intersect with each other, and preferably perpendicular to each other.

The terms "first", "second", and "third" (if present) in the description and claims of this disclosure and the above-mentioned drawings are used to distinguish similar objects and are not necessarily used to describe any specific sequence or any particular order.

Furthermore, the terms "including" and "having" and any variations thereof are intended to cover non-exclusive inclusions, e.g., a process, method, system, product, or display that encompasses a series of steps or units need not be limited to those expressly listed. Those steps or elements may instead include other steps or elements not expressly listed or inherent to the processes, methods, products or displays.

In the related art, the developing cartridge is provided with a large number of transmission structures, so that the detected part can make complex touching actions. But when more transmission structures are arranged at the non-driving end of the developing cartridge, that is, the end of the developing cartridge that is not used to receive the driving force from the image forming device, it generally increases the overall size of the developing cartridge. More transmission structures on the non-driving end make it more difficult to miniaturize the developing cartridge.

According to the present disclosure, if a transmission assembly is provided at the first side of the developing casing, the transmission assembly can receive the driving force of the image forming device and drive the developing assembly of the developing cartridge to move. The detected part is fully or partially disposed at the second side of the casing, and the transmission assembly can drive the detected part to move between the detection position and the non-detection position through the transmission unit. In this way, the image forming device can obtain information about the developing cartridge, and at the same time, the transmission structure on the second side of the casing can be simplified, thereby facilitating the miniaturization of the developing cartridge.

Accordingly, a developing cartridge is provided. The transmission assembly is arranged at the first side of the casing, and the detected part is fully or partially arranged at the second side of the casing. The driving force between the transmission assembly and the detected part is transmitted through the transmission unit. The transmission assembly can drive the developing assembly to move after receiving the driving force outputted from the image forming device. At the same time, the transmission assembly can also drive the detected part to move between the detection position and the non-detection position through the transmission unit. In this way, the transmission structure on the second side of the casing can be simplified, which is beneficial to miniaturization of the developing cartridge.

The technical solutions of the developing cartridge provided by embodiments of the present disclosure will be described in detail below with reference to the accompanying drawings.

Embodiment 1

As shown in FIGS. 1.1 to 1.18, a developing cartridge 1 is provided, and the developing cartridge 1 can be detachably installed on the drum cartridge 2 in the image forming device. The developing cartridge includes a casing 100, a developing assembly, a transmission assembly, a transmission unit, and a detected part 500.

Further, an image forming device is provided. The image forming device includes an installation compartment. The installation compartment is used to install the developing cartridge 1. A power supply terminal and a detecting part 10 are provided in the installation compartment. The power supply terminal is used to provide the developing cartridge 1 with electric power, and the detecting part 10 detects whether the developing cartridge installed in the installation chamber meets the requirements. The image forming device includes, for example, an electrophotographic copy machine, an electrophotographic printer (LED printer, laser printer, etc.), an electrophotographic printer type facsimile machine, and the like. The image forming device includes a driving-force output shaft. The driving-force output shaft is used to transmit the driving-force of the image forming device to the developing cartridge 1 to make the developing cartridge 1 operate. The developing cartridge 1 can be detachably installed to the image forming device together with the drum cartridge 2 while being installed on the drum cartridge 2. The detecting part 10 moves after being triggered by the developing cartridge 1, that is, moves from a non-triggering position to a triggering position.

As shown in FIGS. 1.2 to 1.4, the developing cartridge 1 is detachably installed on the drum cartridge 2. The developing cartridge 1 and the drum cartridge 2 together form the process cartridge. The drum cartridge 2 has a photosensitive drum 80. The drum cartridge 2 includes a right frame 30, a left frame 40, a front frame 50, a rear frame 60, and a bottom frame 70. The right frame 30 and the left frame 40 are arranged oppositely in the first direction. The front frame 50 and the rear frame 60 are arranged oppositely in the second direction. In the first direction, the bottom frame 70 is located between the right frame 30 and the left frame 40. The bottom frame 70 is located between the front frame 50 and the rear frame 60 in the second direction. In the second direction, the photosensitive drum 80 is disposed close to the front frame 50, and the photosensitive drum 80 is at least partially covered by the front frame 50. The front frame 50 may protect the photosensitive drum 80, and the photosensitive drum 80 can rotate relative to the front frame 50. The photosensitive drum 80 is used to receive the developer provided by the developing cartridge 1, to form an electrostatic latent image, and to display the image on the imaging sheet. The drum handle 61 is positioned at the rear frame 60 and can be held by the user. The drum cartridge 2 also includes a first guide part 31 and a second guide part 41. The first guide part 31 is positioned at the right frame 30, and the second guide part 41 is positioned at the left frame 40. The first guide part 31 and the second guide part 41 are used for guiding the developing cartridge 1 during the process where the developing cartridge 1 is mounted to the drum cartridge 2. The bottom frame 70 is provided with a first force applying member 71, a second force applying member 72, a first placement hole 73, a second placement hole 74, and a locking member 75. The first force applying member 71 and the second force applying member 72 are each provided with a force applying block and an elastic member such as a compression spring, or both the first force applying member 71 and the second force applying member 72 are elastic force applying members. The first force-applying member 71 and the second force-applying member 72 are both movable in the second direction relative to the drum cartridge 2. In the second direction, the first force applying member 71 and the second force applying member 72 are closer to the rear frame 60 than the front frame 50. The first placement hole 73 and the second placement hole 74 both pass through the bottom frame 70 in the third direction, and the first placement hole 73 is closer to the right frame 30 relative to the left frame 40 in the first direction. The locking member 75 is used to lock the developing cartridge 1 to prevent the developing cartridge 1 from being detached. When the drum cartridge 2 is installed in the developing cartridge 1, the right frame 30 is adjacent to the first side 110 of the casing 100, and the left frame 40 is adjacent to the second side 120 of the casing 100.

The casing 100 contains developer. The casing 100 has a first side 110 and a second side 120 that are oppositely arranged in the first direction. The casing 100 has a third side 130 and a fourth side 140 that are oppositely arranged in the second direction. The casing 100 has a fifth side 150 and a sixth side 160 oppositely arranged in the third direction. The casing 100 is provided with a developer outlet, the developer outlet is located close to the third side 130, and the developer outlet exposes the circumferential surface of the developing roller 210. The casing 100 is provided with a handle 141, and the handle 141 is located at the fourth side 140.

As shown in FIGS. 1.3 and 1.5, the sixth side 160 of the casing 100 is provided with a paper-guide plate 162. The paper-guide plate 162 extends in the first direction and is located between the first side 110 and the second side 120. When the developing cartridge 1 is installed on the drum cartridge 2 and together are installed in the image forming device, the paper-guide plate 162 is exposed through the second placement hole 74. When the image forming device is in a working state, the paper-guide plate 162 is used to guide sheet material.

As shown in FIG. 1.1 and FIG. 1.7, the casing 100 is provided with a second groove 131. The second groove 131 is a plurality of grooves arranged in the first direction and recessed in the third direction. The second groove 131 is used to enhance the strength of the casing 100.

As shown in FIG. 1.1, FIG. 1.6, and FIG. 1.7, the developing assembly includes a rotatable developing roller 210 disposed in the casing 100. The developing roller 210 is located at the third side 130 of the casing 100. The developing roller 210 extends in the first direction. The developing assembly also includes a developer feeding roller 260 and a agitator 270. The developing roller 210, the developer feeding roller 260, and the agitator 270 are all rotatably supported by the casing 100. The developer feeding roller 260 and the agitator 270 both extend in the first direction, and the rotation axes of the developing roller 210, the developer feeding roller 260, and the agitator 270 are all parallel to the first direction. The developing roller 210 is disposed at the developer outlet, and the developer feeding roller 260 is disposed immediately adjacent to the developing roller 210. The developer feeding roller 260 transfers developer to the developing roller 210, and the developing roller 210 contacts the photosensitive drum 80 to transfer the developer. The agitator 270 includes a agitator shaft and a agitator blade. Both ends of the agitator shaft are rotatably supported by the first side 110 and the second side 120 of the casing 100. The agitator blades are fixedly installed on the agitator shaft and move together with the agitator shaft. The agitator 270 is used to stir the developer in the casing 100 to prevent the developer from agglomerating.

As shown in FIG. 1.6, a partition wall 161 is provided on the side wall of the sixth side 160 of the casing 100. The partition wall 161 bulges upward in the third direction. A developer passage opening 193 is formed between the partition wall 161 and the side wall of the fifth side 150 of the casing 100 for the developer to pass through. The partition wall 161 divides the interior of the casing 100 into a developing chamber 192 and a developer containing chamber 191. The developer passage opening 193 connects/communicates the developing chamber 192 and the developer containing chamber 191. In the second direction, the developing chamber 192 is closer to the third side 130 than the developer containing chamber 191. The developing roller 210 and the developer feeding roller 260 are arranged in the developing chamber 192, and the agitator 270 is arranged in the developer containing chamber 191.

As shown in FIGS. 1.1, 1.6, and 1.7, the developing cartridge 1 also includes a layer thickness regulating blade 290, which is used to contact the developing roller 210 and control the thickness of the developer layer on the developing roller 210. The layer thickness regulating blade 290 extends in the first direction. The layer thickness regulating blade 290 includes a blade holder 280 and a blade 250. The blade 250 is connected to the blade holder 280 by welding or gluing. In one embodiment, welding is preferably used to make the blade 250 fixedly connected to the tool holder 280.

The blade holder 280 includes a second mounting part 281 and a third mounting part 282. The second mounting part 281 extends generally in the second direction. The third mounting part 282 is bent on the basis of the second mounting part 281, and generally extends in the third direction. The second mounting part 281 covers the second groove 131, that is, the second mounting part 281 is supported by the second groove 131 in the third direction. The third mounting part 282 is provided with a layer thickness regulating blade mounting hole 2823. In one embodiment, there are two layer thickness regulating blade mounting holes 2823, namely the fourth mounting hole 2821 and the fifth mounting hole 2822. In other embodiments, the layer thickness regulating blade mounting holes 2823 can be set according to actual needs. The fourth mounting hole 2821 and the fifth mounting hole 2822 both penetrate the third mounting part 282 in the second direction, and the blade holder 280 can be fixedly installed on the casing 100 through the layer thickness regulating blade mounting hole 2823. In the first direction, the blade 250 is located between the fourth mounting hole 2821 and the fifth mounting hole 2822.

The blade 250 extends generally in the third direction. The blade 250 includes a welding portion 251, a contact portion 252, and a bending portion 253. In the third direction, the welding portion 251 is located above the contact portion 252 and the bending portion 253. The blade 250 is fixedly connected to the blade holder 280 through the welding portion 251. The contact portion 252 is used to contact the developing roller 210 to control the thickness of the developer layer on the developing roller 210 to ensure that the developer transferred by the developing roller 210 is uniform each time. The bending part 253 is formed by bending on the basis of the contact part 252. In order to better guide the developer, the bending part 253 in one embodiment is lengthened and is relative long, and the angle between the bending part 253 and the contact part 252 is greater than 90°. In other embodiments, the bending part 253 may not be lengthened or the bending part 253 may be omitted.

In one embodiment, the layer thickness regulating blade 290 is a steel blade, that is, the blade holder 280 and the blade 250 are both made of steel material. In some embodiments, the layer thickness regulating blade 290 can be made of other materials.

In order to ensure that the blade 250 is welded to the blade holder 280 more stably, spot welding is used in one embodiment to ensure that the welding marks are more uniform. In other embodiments, other welding methods may be used.

As shown in FIG. 1.7, the developing roller 210 includes a roller body 211 and a roller shaft 212. The roller body 211 and the roller shaft 212 both extend in the first direction. The roller body 211 is sleeved on the roller shaft 212 and covers part of the roller shaft 212. The roller body 211 is used to receive the developer delivered by the developer feeding roller 260 and transfer the developer to the photosensitive drum 80. The roller shaft 212 is used to receive the driving force to cause the developing roller 210 to rotate. One end of the roller shaft 212 close to the first side 110 in the first direction is provided with a D-shaped port (not shown). The blade 250 is in contact with the roller body 211 to control the thickness of the developer layer on the roller body 211 of the developing roller 210. The roller body 211 is partly made of rubber and, when the roller body 211 comes into contact with the layer thickness regulating blade 290, the amount of rubber deformation of the roller body 211 at the contact location is consistent.

As shown in FIG. 1.7, the developing cartridge is also provided with a sealing member. The sealing member can be installed on the casing 100 by adhesive. The sealing member is used to prevent the developer in the casing 100 from leaking.

In one embodiment, the sealing member includes a first sealing member 7001, a second sealing member 7002, and a third sealing member 7003. In the third direction, the first sealing member 7001 is located above the second sealing member 7002 and the third sealing member 7003. The first sealing member 7001 is in the shape of a block extending in the first direction. The length of the first sealing member 7001 in the first direction is approximately equal to that of the roller body 211 of the developing roller 210. In the second direction, the first sealing member 7001 is closer to the sidewall of the third side 130 of the casing 100 than the blade 250 of the layer thickness regulating blade 290, and is used to prevent the developer from passing between the side wall of the third side 130 of the casing 100 and the layer thickness regulating blade 290. In one embodiment, the first sealing member 7001 includes a sponge and a felt, and the sponge and the felt are compressed by the layer thickness regulating blade 290 to the same amount.

The second sealing member 7002 and the third sealing member 7003 are respectively disposed close to the first side 110 and the second side 120 in the first direction. The second sealing member 7002 is in contact with the end of the roller body 211 close to the first side 110 in the first direction. The third sealing member 7003 is in contact with the end of the roller body 211 close to the second side 120 in the first direction. The second sealing member 7002 and the third sealing member 7003 both extend in the rotation direction of the developing roller 210, and the second sealing member 7002 and the third sealing member 7003 are used to prevent the developer from leaking from both ends of the developing roller 210. In the radial direction of the roller body 211, the roller body 211 at least partially overlaps with the second sealing member 7002 and the third sealing member 7003. In one embodiment, the second sealing member 7002 and the third sealing member 7003 both include felt and sponge. In the rotation direction of the developing roller 210, the felt and the sponge are level. The present disclosure does not limit the number of sealing members and the composition of the sealing member, which can be set according to actual needs.

As shown in FIG. 1.8, the developing cartridge also includes a first mounting bracket 117. The first mounting bracket 117 is detachably and fixedly mounted on the first side 110. The first mounting bracket 117 is used to support the developing roller 210 and the developer feeding roller 260. The first mounting bracket 117 includes a developing roller support hole 1171 and a developer feeding roller supporting hole 1172. The developing roller supporting hole 1171 and the developer feeding roller supporting hole 1172 both penetrate the first mounting bracket 117 in the first direction. The end of the roller shaft of the developing roller 210 close to the first side 110 passes through the developing roller support hole 1171 so that the developing gear 330 is fixedly installed on the roller shaft 212. The end of the developer feeding roller 260 shaft near the first side 110 passes through the developer feeding roller support hole 1172 so that the developer gear 340 is fixedly installed on the roller shaft of the developer feeding roller 260.

The first mounting bracket 117 is also provided with a first positioning hole 1174, a second positioning hole 1175, and a positioning buckle 1176. The first positioning hole 1174 and the second positioning hole 1175 are arranged opposite to each other with respect to the rotation axis of the developer feeding roller 260 and on the first mounting brackets 117 on both sides of the rotation axis of the roller 260. The first side 110 of the casing 100 is integrally formed with a positioning protrusion 116 that can be inserted into the first positioning hole 1174 and the second positioning hole 1175. The positioning buckle 1176 is integrally formed at the rear end of the first mounting bracket 117. The positioning buckle 1176 protrudes to the left from the first mounting bracket 117. The first side 110 of the casing 100 has a snap-on portion 118 integrally formed therein. The buckle 1176 can be engaged with the snap-on portion 118 of the first side 110 of the casing 100 to fix the first mounting bracket 117 to the first side 110 of the casing 100.

The first mounting bracket 117 is also provided with a fourth recessed portion 1173. A driving support shaft 1101 is integrally formed on the first side 110 of the casing 100. The driving support shaft 1101 protrudes to the right in the first direction from the first side 110 of the casing 100. The coupling 320 is rotatably installed on and supported by the driving support shaft 1101. The fourth recessed portion 1173 avoids the driving support shaft 1101 to avoid interference between the first mounting bracket 117 and the driving support shaft 1101.

As shown in FIGS. 1.1 and 1.9, the developing cartridge 1 also includes a conductive assembly 900. The conductive assembly 900 includes a conductive member 910 installed on the second side 120 of the casing 100. The conductive member 910 has a first electrical contact portion 911, a second electrical contact portion 912, and a third electrical contact portion 915. The first electrical contact portion 911 is used for electrical contact with the power supply terminal in the image forming device, the second electrical contact portion 912 is used for electrical contact with the developer feeding roller 260, and the third electrical contact portion 915 is used for electrical contact with the developing roller 210, thereby transmitting the electric power provided by the image forming device to the developing roller 210 and the developer feeding roller 260. In one embodiment, the conductive member 910 is preferably a conductive steel sheet, and may be a conductive resin or other metals in other embodiments.

As shown in FIG. 1.9, the developing cartridge 1 also includes a second mounting bracket 913. The second mounting bracket 913 is detachably and fixedly installed on the second side 120 of the casing 100 through fasteners or buckles. A first hole and a second hole are provided on the second mounting bracket 913, the left end of the developing roller 210 is inserted into the first hole, and the left end of the developer feeding roller 260 is inserted into the second hole. The left end surface of the second mounting bracket 913 is integrally provided with a guide protrusion 9131. The left end surface of the guide protrusion 9131 includes a first guide surface 91311 and a second guide surface 91312. In the second direction, the first guide surface 91311 is positioned at the front side of the second guide surface 91312, and the front end of the first guide surface 91311 is further to the right than the rear end. The front end of the second guide surface 91312 is connected to the rear end of the first guide surface 91311, and the front end of the second guide surface 91312 is further to the left than the rear end. The second mounting bracket 913 has a third mounting hole 91313. The first electrical contact portion 911 of the conductive member 910 is located in the third mounting hole 91313 and is exposed by the third mounting hole 91313 to the outside of the third mounting hole 91313. The contact portion 911 is inclined and parallel to the second guide surface 91312.

Through the above arrangement, when the developing cartridge 1 is installed into the image forming device, the power supply terminal in the image forming device first passes through the first guide surface 91311, because the front end of the first guide surface 91311 is closer to the right than the rear end, the power supply terminal is squeezed and elastically deformed. When the developing cartridge 1 is installed in place, the power supply terminal contacts the second guide surface 91312 and presses against the first electrical contact portion 911 under the action of elastic force. Because to the front end of the second guide surface 91312 is further to the left than the rear end, it can prevent the power supply terminal from swinging forward during operation of the developing cartridge and the image forming device, so that the power supply terminal remains pressed against the first electrical contact portion 911 to prevent the power supply terminal from swinging forward, avoiding poor electrical contact.

In another implementation of the conductive assembly 900, the first guide surface 91311 is perpendicular to the first direction, and the front end of the second guide surface 91312 is positioned at the left side of the first guide surface 91311, so that there is a step between the second guide surface 91312 and the first guide surface 91311.

As shown in FIGS. 1.8 and 1.10, the transmission assembly is disposed at the first side 110, and the transmission assembly is configured to drive the developing assembly to move after receiving the driving-force output from the image forming device. The transmission assembly includes a coupling 320 rotatably installed on the first side 110 of the casing 100. The coupling 320 is supported by the driving support shaft 1101, or may be rotatably supported by the first mounting bracket 117. The axis of rotation of the coupling 320 is parallel to the first direction. The coupling 320 includes a driving gear 322 and a force receiving part 321. The driving gear 322 is positioned at a side of the force receiving part 321 facing the first side 110 and is coaxially arranged with the force receiving part 321. The number of driving gears 322 may be one or multiple, and those skilled in the art can set the number according to actual needs. The driving gear 322 can be fixed to the force receiving part 321 through one-time molding or fastening with fasteners, which is not limited herein. The force receiving part 321 is used to couple with the driving-force output shaft on the image forming device to receive the driving-force output by the image forming device.

Viewed from the first direction, the blade holder 280 of the layer thickness regulating blade 290 is roughly L-shaped. If the L-shaped blade holder 280 is encircled to a complete rectangle, the rotation axis of the coupling 320 is not within the rectangular range. In one embodiment, the coupling 320 and the layer thickness regulating blade 290 do not completely overlap.

As shown in FIGS. 1.8 and 1.10, the transmission assembly also includes a developing gear 330, a developer feeding gear 340, and a agitator gear 310 that are rotatably installed on the first side 110. The developing gear 330 is fixedly connected to an end of the developing roller 210 close to the first side 110 of the casing 100, the developer feeding gear 340 is fixedly connected to an end of the developer feeding roller 260 close to the first side 110 of the casing 100, and the agitator gear 310 is fixedly connected to an end of the agitator 270 close to the first side 110 of the casing 100. The number of the agitator gears 310 may be one or multiple. When the number of the agitator gears 310 is multiple, the plurality of agitator gears 310 may be coaxially arranged, and the diameters of the plurality of agitator gears 310 may be different.

The transmission assembly also includes an idler gear, which is rotatably supported by the first side 110 of the casing 100. In other embodiments, a first protective cover 610 is provided on the first side 110, and the idler gear can also be rotatably supported by the first protective cover 610. The rotation axis of the idler gear is parallel to the first direction. In one embodiment, the idler gear includes a first idler gear 3501, a second idler gear 3502, and a third idler gear 3503. Those skilled in the art can set the number, size, shape, and specific position of the idler gear as needed, which is not limited herein.

The developing gear 330, the developer feeding gear 340, and the agitator gear 310 may directly mesh with the driving gear 322, or the driving gear 322 may mesh with one or more of the developing gear 330, the developer feeding gear 340, and the agitator gear 310 through the idler gear. In one embodiment, the driving gear 332 meshes with the developing gear 330, the developer feeding gear 340, and the first idler gear 3501 to transmit force. The developing gear 330 drives the developing roller 210 to rotate, the developer feeding gear 340 drives the developer feeding roller 260 to rotate, the first idler gear 3501 transmits driving force to the second idler gear 3502 and the third idler gear 3503, and the third idler gear 3503 transmits driving force to the agitator gear 310, and the agitator gear 310 drives the agitator 270 to rotate. In other embodiments, the driving gear 322 can also drive the developing gear 330, the developer feeding gear 340, and the agitator gear 310 to rotate through belt transmission or friction transmission, which is not limited herein.

As shown in FIGS. 1.11 and 1.16, a first protective cover 610 is installed on the first side 110 of the casing 100. The first protective cover 610 covers at least part of the transmission assembly, and the first protective cover 610 can protect the transmission assembly. The first protective cover 610 is provided with a first opening 614. The edge of the first opening 614 is provided with an annular protrusion. The annular protrusion can be used to protect the coupling 320. The first opening 614 allows the force receiving portion 321 of the coupling 320 to be exposed in the first direction, so as to facilitate the force receiving portion 321 to receive the driving-force output from the image forming device.

As shown in FIG. 1.11, a second protective cover 620 is installed on the second side 120 of the casing 100. The second protective cover 620 covers at least part of the second side 120 of the casing 100. The rear end of the first protective cover 610 is integrally formed with a forced push protrusion 616, and the rear end of the second protective cover 620 is integrally formed with a second forced push protrusion 629. In some implementations, the first forced pushing protrusion 616 and the second forced pushing protrusion 629 may also be directly disposed on the fourth side 140 of the casing 100. The first forced pushing protrusion 616 and the second forced pushing protrusion 629 may be U-shaped, C-shaped, or V-shaped protrusions toward the rear direction.

When the developing cartridge 1 is installed on the drum cartridge 2, the first forced pushing protrusion 616 and the second forced pushing protrusion 629 respectively contact the first force applying member 71 and the second force applying member 72 on the drum cartridge 2 and are subjected to the forward urging force provided by the first force applying member 71 and the second force applying member 72, which causes the first forced pushing protrusion 616 and the second forced pushing protrusion 629 to drive the entire developing cartridge 1 to move forward or have the ability or trend to move forward, causing the developing cartridge 1 to drive the developing roller 210 forward to abut against the photosensitive drum 80 on the drum cartridge 2, ensuring close contact between the developing roller 210 and the photosensitive drum 80.

As shown in FIG. 1.11, the first protective cover 610 is also provided with a second recessed portion 617, and the second recessed portion 617 is located between the rotation axis of the agitator gear 310 and the first forced push protrusion 616 in the second direction. The drum cartridge 2 is provided with a swingable operating member (not shown), and the second recessed portion 617 is used to avoid the operating member to prevent the first protective cover 610 from interfering with the operating member.

As shown in FIG. 1.12, the second protective cover 620 is provided with a third recessed portion 6201, and the second side 120 of the casing 100 is provided with a developer filling port 1206. The developer is filled into the casing 100 through the developer filling port 1206. A sealing cover 1207 for sealing the developer filling port 1206 is installed on the port 1206, and the third recessed portion 6201 avoids the sealing cover 1207 of the developer filling port 1206, so that the sealing cover 1207 can be removed without disassembling the second protective cover 620.

The second protective cover 620 is integrally formed with a sealing ring. The sealing ring is integrally formed and protrudes to the right from the right end of the second protective cover 620. The second side 120 of the casing 100 is integrally formed with a agitator frame support hole for supporting the rotation of the agitator 270. The agitator frame support hole is a through hole, and a sealing member is installed inside the agitator frame support hole of the. The sealing member is an annular ring set or sleeved on the left end of the agitator 270. The sealing member is preferably a sponge, and the sealing ring is inserted into the agitator frame support hole and in contact with the sealing member, thereby preventing the sealing member from coming out of the agitator frame support hole to the left.

As shown in FIGS. 1.5 and 1.11, the developing cartridge 1 also includes an identification assembly. The identification assembly includes a storage medium 820, an electrical contact surface 810, and a holder 830. The storage medium 820 is used to store the data of the developing cartridge 1. The electrical contact surface 810 is electrically connected to the storage medium 820. In one embodiment, a direct contact and integrated electrical connection is used, or it can be an indirect electrical connection transmitted through an intermediate piece. The contact surface 810 is used to contact and electrically connect with identification contact(s) in the image forming device. The holder 830 is detachably installed on the casing 100. The storage medium 820 and the electrical contact surface 810 are electrically connected and both are installed on the holder 830. The electrical contact surface 810 is closer to the rear side of the casing 100 than the central axis of the coupling 320. In a state where the developing cartridge is mounted on the drum cartridge, the storage medium 820 is exposed through the first placement hole 73 on the drum cartridge to contact the identification contact. The electrical contact surface 810 is located at the first side 110 and is disposed close to the third side 130.

As shown in FIG. 1.16, in some embodiments, the holder 830 may be partially or entirely disposed on the first protective cover 610.

As shown in FIG. 1.18, in other embodiments, the identification assembly is not provided on the developing cartridge 1, but is provided on the drum cartridge 2. The drum cartridge 2 is provided with a holder 830 at a position close to the right frame 30 in the first direction. That is, the holder 830 is closer to the right frame 30 than the left frame 40. The storage medium 820 and the electrical contact surface 810 electrically connected to the storage medium 820 are provided on the drum cartridge 2, and are further detachably installed on the holder 830. When the developing cartridge 1 is mounted on the drum cartridge 2, the developing cartridge 1 and the drum cartridge 2 together are mounted to the image forming device, and the electrical contact surface 810 of the storage medium 820 contacts the image forming device and transmits information about the developing cartridge to the image forming device. In the first direction, the storage medium 820 is juxtaposed with the second placement hole 74.

As shown in FIGS. 1.13 and 1.14, the detected part 500 is at least partially located at the second side 120. The detected part 500 is transmission connected with the transmission assembly through the transmission unit. The detected part 500 can move between the detection position and the non-detection position.

When the image forming device outputs force to the coupling 320 to drive the developing assembly to move, the transmission assembly can drive the detected part 500 to move between the detection position and the non-detection position through the transmission unit. When the detected part 500 is located at the detection position, the detected part 500 moves the detecting part 10 of the image forming device, causing the detection circuit in the image forming device to generate an electrical signal, so that the developing cartridge 1 is detected. When the detected part 500 is in the non-detection position, the detecting part 10 is reset and, at this time, the generation of electrical signals in the image forming device stops.

In an embodiment, the detected part 500 may be disposed on the drum cartridge 2, and the detected part 500 moves by receiving the driving force transmitted from the developing cartridge 1 and triggers the detecting part 10.

As shown in FIG. 1, and FIG. 1.13-FIG. 1.17, the transmission unit preferably includes a transmission part and a rotating part. In one embodiment, the rotating part is the first rotating part 410, the transmission part is a translational part 420, and the translational part 420 is preferably a rod shape, the first rotating member 410 is generally in an irregular cylindrical shape, and the first rotating member 410 includes a first cylinder 4131, a second cylinder 4132, and a third cylinder 4133 arranged coaxially. The axial directions of the first cylinder 4131, the second cylinder 4132, and the third cylinder 4133 are all parallel to the first direction. The diameter of the first cylinder 4131 is larger than that of the second cylinder 4132, and the diameter of the second cylinder 4132 is larger than that of the third cylinder 4133. There is a first interval in the radial direction between the circumferential surface of the first cylinder 4131 and the second cylinder 4132, and there is a second interval in the radial direction between the circumferential surface of the second cylinder 4132 and the circumferential surface of the third cylinder 4133. A second connecting portion 4134 is provided at the first interval to connect the left end of the first cylinder 4131 and the left end of the second cylinder 4132. The second connecting portion 4134 includes six evenly spaced ribs in the circumferential direction around the central axis of the first rotating member 410, spaced apart from each other in the circumferential direction. A third connection part 4135 is provided at the second interval to connect the right end of the second cylinder 4132 and the right end of the third cylinder 4133. The third connection part 4135 is in the shape of an annular sheet. The third connection part 4135 closes the right end of the second interval. The third cylinder 4133 is hollow inside, and is provided with a first mounting hole 4105 penetrating the first rotating member 410 in the first direction. The first mounting hole 4105 is preferably a round hole.

A gear portion 4104 is formed coaxially and integrally on the outer circumferential surface of the first cylinder 4131. The gear portion 4104 is located at an end of the first cylinder 4131 away from the first side 110 in the first direction. The gear portion 4104 includes a missing tooth portion 41041. The gear portion 4104 meshes with the agitator gear 310 so that the first rotating member 410 receives the driving force transmitted by the agitator gear 310 and rotates. When the missing tooth portion 41041 faces the agitator gear 310, the first rotating member 410 no longer rotates with the agitator gear 310. A first contact protrusion 412 is provided on the inner circumferential surface of the first cylinder 4131. The first contact protrusion 412 protrudes from the inner circumferential surface of the first cylinder 4131 in the radial direction toward the rotation axis of the first rotating member 410. The first contact protrusion 412 and the second connecting portion 4134 are spaced apart in the first direction, and the first contact protrusion 412 and the right end of the first cylinder 4131 are spaced apart in the first direction. In one embodiment, the first rotating member 410 is disposed at the first side 110 to receive the driving force transmitted by the transmission assembly. In other embodiments, the first rotating member 410 may also be disposed at the second side 120.

As shown in FIG. 1.16, the first rotating member 410 is provided with an identification portion 416. The identification portion 416 is located at the end surface of the first rotating member 410 away from the first side 110 in the first direction. In one embodiment, it is preferably located at the third connecting portion 4135, the identification portion 416 can be a groove or other pattern on the first rotating member 410, which is not limited herein.

The first protective cover 610 can be provided with a hole position corresponding to the marking portion 416. The marking portion 416 can be observed through the hole position, so as to determine whether the first rotating member 410 is installed correctly or rotated according to the position of the marking portion 416. Thus, it can be determined whether the developing cartridge 1 is operating normally.

As shown in FIG. 1.16 and FIG. 1.17, the first support column 720 is preferably provided on the first protective cover 610. The first support column 720 is formed by the first protective cover 610 extending in the first direction from its inner wall to the first side 110. The first support column 720 is provided with an internal threaded hole 721 inside the first support column 720. The first rotating member 410 can be sleeved on the first support column 720 through the first mounting hole 4105, so that the first rotating member 410 is rotatably supported by the first protective cover 610. That is, the first rotating member 410 is rotatably installed on the first protective cover 610 is put on. The length of the first supporting column 720 in the first direction is greater than that of the first rotating member 410 in the first direction, so that the first rotating member 410 can move in the first direction relative to the first supporting column 720. In some embodiments, the first support column 720 may also be provided on the casing 100.

A first screw 791 and a first elastic member 710 are also provided at the first side 110 of the casing 100. A nut 792 of the first screw 791 is preferably circular and has a radius larger than the radius of the first mounting hole 4105 of the second cylinder 4132. The first screw 791 is inserted into the first mounting hole 4105, and the first screw 791 is threadedly connected to the internal thread hole 721 of the first support column 720. That is, the first support column 720 and the first screw 113 can be coupled in the first mounting hole 4105. Because the nut 792 is larger than the first mounting hole 4105, when the first rotating member 410 is supported by the first support column 720 and the first screw

791 is threadedly connected to the threaded hole 721, the first rotating member 410 cannot be separated from the first support column 720, but is movable relative to the first support column 720.

The first elastic member 710 is preferably a compression spring, or may be other elastic media. The first elastic member 710 can be compressed and stretched in the first direction. One end of the first elastic member 710 close to the first side 110 of the casing 100 is in contact and connected to the nut 792 of the screw 79, and the other end is in contact with the first rotating member 410. The first elastic member 710 is maintained in a compressed state and has elastic force to extend in the first direction. The first elastic member 710 provides the rotating member 410 with elastic force to the right.

As shown in FIG. 1.17, the contact member 612 is provided on the side of the first protective cover 610 facing the first side 110. The contact member 612 includes a protruding portion, and there are multiple protruding portions. In one embodiment, the protruding portion preferably includes a first protruding portion 6123, a second protruding portion 6124, and a third protruding portion 6125. The first protruding portion 6123, the second protruding portion 6124, and the third protruding portion 6125 are spaced apart from each other in the circumferential direction and surround the first support column 720. The first protruding portion 6123, the second protrusion 6124, and the third protrusion 6125 are all in the shape of arcs with equal radii and the center of which coincides with the rotation axis of the first rotating member 410. The first protruding portion 6123, the second protruding portion 6124, and the third protruding portion 6125 all protrude leftwards in the first direction from the side of the first protective cover 610 facing the first side 110.

The side of the first protective cover 610 facing the first side 110 is an opposite surface, and the opposite surface is a plane perpendicular to the first direction. The first protruding part 6123 is provided with a first driving surface I1 and a first flat part 6127. In the rotation direction of the first rotating member 410, the distance from the upstream end of the first driving surface I1 to the opposite surface is smaller than the distance from the downstream end of the first driving surface I1 to the opposite surface. The first flat portion 6127 is located downstream of the first driving surface I1 in the rotation direction of the first rotating member 410, and the first flat portion 6127 is connected to the downstream end of the first driving surface I1. The left end of the first flat portion 6127 is the first interference surface, and the distance from the first interference surface to the opposite surface is equal to the distance from the downstream end of the first driving surface I1 to the opposite surface. The second protruding portion 6124 has a second driving surface I2 and a second tip T2, and the third protruding portion 6125 has a third driving surface I3 and a third tip T3. The first driving surface I1, the second driving surface I2, and the third driving surface I3 are all inclined surfaces inclined in the first direction. The third protruding part 6125 is located downstream of the second protruding part 6124 in the rotation direction of the first rotating member 410. The third protruding part 6125 and the second protruding part 6124 preferably have the same structure. Thus, only the structure of the second protruding part 6124 will be described herein.

The second protrusion 6124 is located downstream of the first protrusion 6123 in the rotation direction of the first rotating member 410, and the distance from the upstream end of the second driving surface I2 to the opposite surface is smaller than the distance from the downstream end of the second driving surface I2 to the opposite surface. The upstream end of the second tip T2 is connected to the downstream end of the second driving surface I2. The left end of the second tip T2 is the second interference surface, and the distance from the second interference surface to the opposite surface in the first direction is equal to the distance from the downstream end of the second driving surface I2 to the opposite surface.

There is a first slope between the first driving surface I1 and the opposite surface, a second slope between the second driving surface I2 and the opposite surface, and a third slope between the third driving surface I3 and the opposite surface. The first slope is greater than the second slope, and preferably the second slope is equal to the third slope. In one embodiment, the driving surface includes the first driving surface I1, the second driving surface I2, and the third driving surface I3. In other embodiments, the number of driving surfaces and the slope of the driving surface can be set according to actual requirements.

The first interference surface has a first arc length in the circumferential direction, the second interference surface has a second arc length in the circumferential direction, and the third interference surface has a third arc length in the circumferential direction. The first arc length is greater than the second arc length, and the second arc length is preferably equal to the third arc length. Viewed from the first direction, the projection of the movement trajectory of the first contact protrusion 412 overlaps with the first protrusion 6123, the second protrusion 6124 and the third protrusion 6125. That is, the first contact protrusion 412 is in contact with the contact member 612.

The casing 100 is provided with a limiting structure, and the translational member 420 is limited by the limiting structure. The limiting structure limits the degree of freedom of the translational member 420 to ensure the stability of the transmission of the translational member 420.

As shown in FIGS. 1.1, and 1.13-1.15, the translational member 420 is preferably disposed on the top of the developing cartridge 1, or may be disposed inside the developing cartridge 1. The translational member 420 includes a first rod portion 428, a first driven part 421, and a first force applying part 4201. The first rod portion 428 extends in the first direction and is used to connect the first driven part 421 and the first force applying part 4201. In one embodiment, the three parts are preferably formed integrally. The first driven part 421 is in the shape of a rectangular parallelepiped and is located at the right end of the first rod portion 428 (close to the first side 110 in the first direction). The first driven part 421 receives the force transmitted by the first rotating member 410 to cause the translational member 420 to move relative to the casing 100. The first force applying part 4201 is located at the left end of the first rod portion 428 (close to the second side 120 in the first direction). The first force applying part 4201 transmits force to the detected part 500. Thus, the detected part 500 moves relative to the casing 100.

The limiting structure includes a first guide portion 1591, a second guide portion 1592, and a third guide portion 1593 that are provided at the fifth side 150 of the casing 100 and protrudes from the casing 100. The first guide portion 1591 is a pair of guide ribs arranged oppositely in the second direction. The first guide portion 1591 extends in the first direction. The first driven part 421 is movably disposed in the first guide portion 1591. The first guide portion 1591 guides movement in the first direction and is restricted from movement in other directions. The first driven portion 421 is in contact with the second connecting portion 4134.

The second guide portion 1592 has the same structure as the third guide portion 1593. Taking the second guide portion 1592 as an example, the second guide portion 1592 is provided with a clamping opening, the clamping opening extends in the first direction, and the upper end of the clamping opening is provided with an installation opening. The size of the installation opening in the second direction is smaller than the size of the first rod portion 428 in the second direction. When the first rod portion 428 is installed into the clamping opening through the installation opening, the second guide portion 1592 is elastically deformed. When the first rod portion 428 is pressed into the clamping opening, the elastic deformation disappears so that the second guide portion 1592 clamps the first rod portion 428 in the clamping opening, preventing the first rod portion 428 from falling out of the second guide portion 1592 and the third guide portion 1593. The second guide portion 1592 and the third guide portion 1593 guide the first rod portion 428 to move in the first direction and limit movement in other directions. The second guide portion 1592 is connected with the first guide portion 1591 in the first direction, and the width of the first guide portion 1591 and the first driven part 421 in the second direction is greater than the width of the second guide portion 1592 in the second direction, which can ensure the movement range of the translational member 420. In some embodiments, the second guide portion 1592 and the third guide portion 1593 may be directly configured as a long guide rail groove extending in the first direction and connected with the first guide portion 1591.

The operation process of the developing cartridge provided in one embodiment is as follows:

The coupling 320 receives the driving-force output from the image forming device and then transmits the force to the developing roller 210, the developer feeding roller 260, and the agitator 270, so that the developing roller 210, the developer feeding roller 260, and the agitator 270 start to rotate. At the same time, because the agitator gear 310 meshes with the gear portion 4104 of the first rotating member 410, the first rotating member 410 receives the force transmitted by the agitator gear 310 and rotates. The first rotating member 410 rotates from the position where the gear portion 4104 meshes with the agitator gear 310 to the position where the gear part 4104 is not in contact with the agitator gear 310. The first rotating member 410 has a first position and a second position and, in the first direction, the first position is closer to the first side 110 than the second position. The translational member 420 has a third position and a fourth position. When the translational member 420 is in the fourth position, it is further to the left than when it is in the third position. The detected part 500 has a non-detection position and a detection position.

When the first rotating member 410 starts to rotate, the first rotating member 410 is in the first position, the first contact protrusion 412 is in contact with the first flat part 6127, and the first driven part 421 and the second connecting part 4134 are in a contact state. The translational member 420 is in the fourth position, and the detected part 500 is in the detection position.

During the rotation of the first rotating member 410, under the rightward elastic force exerted by the first elastic member 710, the first rotating member 410 has a tendency to move to the right in the first direction, thereby causing the first rotating member 410 to move to the right in the first direction. The first contact protrusion 412 is in contact with the first protrusion 6123, the second protrusion 6124, and the third protrusion 6125.

The first contact protrusion 412 first contacts the first interference surface on the first flat portion 6127. During the process of the first contact protrusion 412 contacting the first interference surface, the translational member 420 remains in the fourth position. The detected part 500 is maintained at the detection position, that is, the detected part 500 is maintained at a position where the detecting part 10 in the image forming device is triggered, so that a first electrical signal with a duration of A1 is generated in the image forming device.

Then, as the first rotating member 410 rotates, the first contact protrusion 412 loses contact with the first protrusion 6123, so that the first contact protrusion 412 falls into the gap between the first protrusion 6123 and the second protruding portion 6124 under the elastic force of the first elastic member 710. The first rotating member 410 moves to the right in the first direction. During the movement of the first rotating member 410, the detected part 500 moves to the non-detecting position. At this time, the detected part 500 no longer triggers the detecting part 10 in the image forming device, so that the image forming device stops generating electrical signals.

As the first rotating member 410 continues to rotate, the first contact protrusion 412 passes through the second driving surface I2 and interferes with the second driving surface I2. The second driving surface I2 exerts a reaction force on the first contact protrusion 412, so that the first contact protrusion 412 drives the entire first rotating member 410 to move left in the first direction. The second connecting portion 4134 pushes the first driven part 421 to move left, and the first driven part 421 drives the translational member 420 to entirely move to the left from the third position to the fourth position. The detected part 500 moves from the non-detection position to the detection position, causing the electrical signals to be generated in the image forming device for the second time, the second electrical signal.

The first contact protrusion 412 moves to contact the second interference surface of the second tip T2. Because the arc length of the second tip T2 is shorter than the arc length of the first flat portion 6127, the duration A2 of the second electrical signal is shorter than the duration of the primary electrical signal A1.

Further, as the first rotating member 410 continues to rotate, the first contact protrusion 412 loses contact with the second protrusion 6124. Under the elastic force of the first elastic member 710, the first contact protrusion 412 falls into the interval between the second protrusion 6124 and the third protrusion 6125, causing the first rotating member 410 to entirely move to the right. The detected part 500 moves to the non-detection position and no longer triggers the detecting part in the image forming device, and the image forming device stops generating electrical signals.

Further, as the first rotating member 410 continues to rotate, the first contact protrusion 412 passes the third protrusion 6125, and its movement process and principle are the same as when the first contact protrusion 412 passes the second protrusion 6124. The first contact protrusion 412 passes through the third protrusion 6125 and, when the protrusion 412 passes the third protrusion 6125, a third electrical signal is generated, and since the arc length of the third tip T3 is equal to the arc length of the second tip T2, the duration of the third electrical signal is A3=A2.

Further, as the first rotating member 410 continues to rotate, the first contact protrusion 412 falls into the gap between the third protrusion 6125 and the first protrusion 6123, and the first rotating member 410 moves to the right as a whole again, causing the translational member 420 moves to the third position, and the detected part 500 moves to the non-detection position, thereby ending the third electrical signal.

Further, as the first rotating member 410 continues to rotate, the first contact protrusion 412 passes the first driving surface I1. Since the rotating speed of the agitator gear 310 does not change, the rotating speed of the first rotating member 410 does not change, and the first rotating member 410 rotates at the same speed. Further, the slope of the driving surface I1 is greater than the slope of the second driving surface I2 and the slope of the third driving surface I3. Therefore, when the first contact protrusion 412 passes the first driving surface I1, the speed of the first rotating member 410 moving to the left is greater than the speed at which the first rotating member 410 as a whole moves to the left when the first contact protrusion 412 passes the second driving surface I2, or the speed at which the first rotating member 410 moves to the left when the first contact protrusion 412 passes through the third driving surface I3.

Because the first rotating member 410 moves to the left at a faster speed, the translational member 420 moves from the third position to the fourth position at a faster speed, thereby causing the detected part 500 to move from the non-detection position to the detection position at a faster speed, and triggers the detecting part 10 so that the image forming device generates a fourth electrical signal. That is, in one embodiment, the first driving surface I1 is an accelerating part that accelerates the movement of the first rotating member 410 in the first direction, and is further an accelerating part that causes the translational member 410 and the detected part 500 to move at a faster speed.

At the same time, the first rotating member 410 moves to a position where the gear portion 4104 is not in contact with the agitator gear 310, and the entire detection process is completed. The first rotating member 410 no longer rotates, so that the detected part 500 is maintained at the detection position.

There is also a limiting part 6129 on the contact member 612, and the limiting part 6129 is in the shape of a groove. When the detection is completed, the first contact protrusion 412 is located at the limiting part 6129 to prevent the first rotating member 410 from shaking movement when the developing cartridge 1 is operational in the image forming device, thereby causing the detected part 500 to accidentally touch the detecting part 10.

In some embodiments, the limiting part may be provided on the first rotating member 410. When the detection is completed, the first driven part 421 of the translational member 420 is located at the limiting part, and the translational member 420 limits the movement of the first rotating member 410.

Thus, under the action of the first driving surface I1 (acceleration part), the detected part 500 moves from the non-detection position to the detection position at the first speed V1 and causes the image forming device to generate a fourth electrical signal. Under the action of the second driving surface I2 and the third driving surface I3, the detected part 500 moves from the non-detection position to the detection position at the second speed V2 and the third speed V3, respectively, and causes the image forming device to generate the third electrical signal and the fourth electrical signal. The first speed V1 is greater than the second speed V2 and the third speed V3. In one embodiment, it is preferred that the second speed V2 and the third speed V3 are the same.

It can be seen that, when the first rotating member 410 moves in the first direction, to maintain the meshing relationship between the gear portion 4104 and the agitator gear 310 so that the first rotating member 410 keeps rotating, the teeth of the agitator gear 310 have a longer length in the first direction.

In an embodiment, the first force applying part 4201 of the translational member 410 may be used as the detected part 500 to directly move the detecting part 10.

The image forming device compares parameters such as the number of times, duration, and interval length of electrical signal generation, and the speed at which the detected part 500 moves from the non-detection position to the detection position with pre-stored parameters to determine related information such as the model, capacity, lifespan, and old/new part, etc., of the developing cartridge to achieve the detection function.

In other embodiments, the number of protrusions of the contact member 612 can be increased or reduced to change the number of times the electrical signal is generated. The arc length corresponding to the protrusions can be extended to change the duration of the electrical signal generation. The distance between two adjacent protrusions can be lengthened or shortened to change the duration of the interval (or interval length) between electrical signal generations. The slope of the inclined surface of the protrusion can be changed to change the speed at which the detected part 500 moves from the non-detection position to the detection position, thereby corresponding to different characteristics, such as the model, specification, life span and other information of the developing cartridge. This enables the image forming device to detect more information.

As shown in FIGS. 1.12 to 1.15, the detected part 500 is slidably installed on the casing 100, and the detected part 500 at least partially extends out of the second side 120. The end of the detected part 500 close to the first side 110 is in transmission connection with the translational member 420.

The detected part 500 is slidably installed on the fifth side 150 of the casing 100 in the second direction. The fifth side 150 of the casing 100 is provided with a fourth guide part 1594. The fourth guide part 1594 includes a pair of ribs arranged oppositely and spaced apart in the first direction and extending in the second direction. The detected part 500 is movably installed in the fourth guide part 1594. The detected part 500 can move in the second direction in the fourth guide part 1594, which restricts the movement of the detected part 500 in other directions. The detected part 500 has a detected portion 5007, which forms a rod-shaped protrusion structure. The detected portion 5007 is positioned at the left side of the detected part 500 and extends out of the fourth guide part 1594 and the second side 120. When the detected part 500 is located at the detection position, the detected portion 5007 contacts the detecting part 10 of the image forming device to move the detecting part 10, causing the image forming device to generate an electrical signal. When the detected part 500 is located at the non-detection position, the detected portion 5007 is out of contact with the detecting part of the image forming device.

A second elastic member 760 is connected between the detected part 500 and the casing 100. The second elastic member 760 is preferably a tension spring, or may be other elastic media. The second elastic member 760 can be stretched and retract in the second direction. The detected part 500 is also integrally formed with a first fixing column, and a second fixing column is integrally formed in the fourth guide part 1594. The second fixing column is located at the rear side of the detected part 500, and the front end of the second elastic member 760 is fixed on the first fixing column. The rear end of the second elastic member 760 is fixedly connected to the second fixing column. When the detected part 500 moves from the non-detection position to the detection position, the second elastic member 760 is stretched to have an elastic force. When the elastic force of the second elastic member 760 is released, the detected part 500 moves to the non-detection position.

When the translational member 420 is abutted by the first rotating member 410 and is displaced relative to the casing 100 in the first direction, the translational member 420 drives the detected part 500 to slide relative to the casing 100. Specifically, when the translational member 420 moves to the left in the first direction, the translational member 420 drives the detected part 500 to slide from the non-detection position to the detection position.

The first force-applying portion 4201 of the translational member 420 is provided with a pushing surface 427 that is inclined in the first direction. The pushing surface 427 has a front end and a rear end in the second direction, and the front end is further to the right than the rear end. That is, the pushing surface 427 extends leftward in the first direction and rearwardly in the second direction. When the detected part 500 is in the non-detection position, it is further back than when it is in the detection position. i.e., in the second direction the distance between the non-detection position and the developing roller 210 is greater than the distance between the detection-position and the developing roller 210. A first force-bearing end 5006 is provided on the right side of the detected part 500. The first force-bearing end 5006 is in contact with the pushing surface 427. The pushing surface 427 is used to move the detected part 500 from the non-detection position to the detection position. In some embodiments, the pushing surface 427 may be provided on the detected part 500, the extending direction of the pushing surface 427 is inclined to the first direction, and the pushing surface 427 is contacted by the first force applying part 4201 to cause the detected part 500 to move, or both the first force applying part 4201 and the detected part 500 are provided with pushing surfaces 427.

The detected portion 5007 and the first force-bearing end 5006 are preferably integrally formed with the main body of the detected part 500, or they may be combined separately.

When the translational member 420 is contacted by the first rotating member 410 and moves to the left in the first direction, the pushing surface 427 abuts the detected part 500 to drive the detected part 500 to slide forward in the second direction, so that the detected part 500 slides from the non-detection position to the detection position, and the second elastic member 760 accumulates elastic force.

When the translational member 420 loses contact with the first rotating member 410, the second elastic member 760 releases the elastic force and pulls the detected part 500 to move backward in the second direction, so that the detected part 500 moves from the detection position to the non-detection position. At the same time, the first force-bearing end 5006 exerts a reaction force on the pushing surface 427, causing the translational member 420 to move to the right in the first direction.

In some embodiments, a third elastic member that interacts with the translational member 420 may be provided. When the first rotating member 410 loses contact with the protrusion and moves to the right, the translational member 420 is under the action of the third elastic member to move to the right.

It can be seen that, in some embodiments, a cover plate can also be provided at the fifth side 15 of the casing 100. The cover plate is used to cover at least part of the transmission unit and the detected part 500. The cover plate can protect the transmission unit and the detected part 500.

In one embodiment, the first rotating member 410 that can rotate and reciprocate in the first direction drives the translational member 420 to reciprocate in the first direction and, at the same time, a first force-applying portion 4201 is provided on the translational member 420 to abut the detected part 500, so that the detected part 500 reciprocates in the second direction to trigger the detecting part 10 and to detach from the detecting part 10, thereby stably enabling the developing cartridge 1 to be detected by the image forming device.

The first rotating member 410 abuts on the driving surface with different slopes and has different movement speeds in the first direction, thereby changing the movement speeds of the translational member 420 and the detected part 500 to meet the detection requirements of the image forming device. . . . At the same time, in one embodiment, only the detected part 500 for triggering the detecting part 10 is at least partially disposed at the second side 120, which simplifies the structure of the second side 120, facilitating the miniaturization of the developing cartridge 1.

Embodiment 2

Except specifically stated, the structure in this embodiment is the same as that in Embodiment 1. The difference between Embodiment 2 and Embodiment 1 is that the structure of the first rotating member 410 is different.

As shown in FIGS. 2.1 and 2.2, the first rotating member 410 includes a first cylinder 4131, a second cylinder 4132, and a third cylinder 4133. The second cylinder 4132 and the third cylinder 4133 are integrally formed and supported by the first support column 720 to be rotatable and movable left and right. Hereinafter, the second cylinder 4132 is collectively referred to as the second cylinder 4132 and the third cylinder 4133. The first cylinder 4131 provided with the gear portion 4104 is slidably connected to the second cylinder 4132 and the third cylinder 4133 separately. Further, the inside of the first cylinder 4131 and the outside of the second cylinder 4132 are slidably connected.

The first cylinder 4131 is composed of an outer cylinder 444 and a gear part 4104. The left end of the second cylinder 4132 projects in the radial direction and away from the central axis of the second cylinder 4132 to integrally form an annular boss, and a relatively sliding connection can be produced between the annular boss and the circumferential surface of the outer cylinder 444 in the first direction. A sliding key 41421 is integrally formed in the radial direction on the circumferential surface of the annular boss, and the inner circumferential surface of the outer cylinder 444 is provided with a sliding groove 4441 that cooperates with the sliding key 41421 in the first direction. The sliding key 41421 is inserted into the sliding groove 4441 to connect the second cylinder 4132 with the first cylinder 4131. The second cylinder 4132 supports the first cylinder 4131 and can rotate following the first cylinder 4131. Because the length of the sliding groove 4441 in the first direction is greater than the length of the sliding key 41421, the sliding key 41421 can slide in the first direction relative to the sliding groove 4441, so that the second cylinder 4132 can reciprocate left and right in the first direction in the sliding groove 4441. When the first contact protrusion 412 rotates to abut with the protrusion of the contact member 612, the second cylinder 4132 moves to the left relative to the first cylinder 4131. When the first contact protrusion 412 rotates until it loses the abutting contact, the second cylinder 4132 moves to the right relative to the first cylinder 4131 under the action of the first elastic member 710.

In this structure, when the first cylinder 4131 receives the force transmitted by the agitator gear 310 and rotates, the second cylinder 4132, which is only used to drive the movement of the translational member 420, moves left and right, and the first cylinder 4131 does not move left and right, so that the meshing between the gear part 4104 and the agitator gear 310 is more stable.

Embodiment 3

Except specifically stated, the structure in this embodiment is the same as that in Embodiment 1. The difference between Embodiment 3 and Embodiment 1 is that the structure of the transmission unit is different.

As shown in FIGS. 3.1 to 3.3, the transmission unit also includes a pivoting member 480 that is rotationally installed on the casing 100. One end of the pivoting member 480 is connected to the other end of the translational member 420, and the other end of the pivoting member 480 is connected to the detected part 500. That is, in one embodiment, the pivoting member 480 is another transmission member. In one embodiment, there is more than one pivoting member 480.

A second rotation shaft 1501 is detachably and fixedly installed on the upper surface of the fifth side 150 of the casing 100. The pivoting member 480 is pivotably installed on the second rotation shaft 1501. The swing axis of the pivoting member 480 intersects with the first direction and the second direction, and the swing axis of the pivoting member 480 preferably has an inclined angle with the third direction, such that the right end of the pivoting member 480 is located above the left end of the pivoting member 480 in the third direction. The swing axis of the pivoting member 480 may also be parallel to the third direction, or the left end of the pivoting member 480 may be higher than the right end of the pivoting member 480 in the third direction.

The translational member 420 extends in the first direction and is movably located at the fifth side 150. An end of the translational member 420 close to the second side 120 is provided with a first force applying part 4201. The first force applying part 4201 appears a through hole that runs through the front and back in the second direction.

In the first direction, the pivoting member 480 is located between the first side 110 and the second side 120, and may also be partially extended from the second side 120. The pivoting member 480 has a third arm 481, a third pivoting portion 483, and a fourth arm 482. The third arm 481 and the fourth arm 482 are all integrally formed with the third pivoting portion 483. The angle between the third arm 481 and the fourth arm 482 is preferably about 90°. In other embodiments, the angle between the third arm 481 and the fourth arm 482 can also be set to other angles. The third arm 481 is inserted into the first force applying part 4201 to be rotatably connected with the translational member 420.

A first force-bearing end 5006 is provided on the right side of the detected part 500. The first force-bearing end 5006 is in the shape of a column protruding downward in the third direction. A U-shaped opening is provided on the fourth arm 482, and the first force-bearing end 5006 is clamped by the U-shaped opening on the fourth arm 482.

When the translational member 420 moves to the left in the first direction, the first force-applying part 4201 of the translational member 420 pushes the third arm 481, so that the third arm 481 drives the pivoting member 480 in the second rotation axis 1501. The fourth arm 482 swings in the counterclockwise direction, so that the fourth arm 482 pushes the detected part 500 to displace relative to the casing 100 in the second direction, thereby causing the detected part 500 to move from the non-detection position to the detection position.

In one embodiment, the translational member 420 and the detected part 500 are transmitted through the pivoting member 480, which can prevent the detected part 500 from getting stuck when it is driven by the translational member 420. Further, the transmission ratio between the gear and the rotating member can be more easily adjusted, as only the length ratio between the third arm 481 and the fourth arm 482 needs to be changed.

Embodiment 4

Except specifically stated, the structure in this embodiment is the same as that in Embodiment 1. The difference between Embodiment 4 and Embodiment 1 is that the structures of the detected part 500 and the transmission unit are different.

As shown in FIG. 4.1 and FIG. 4.2, in one embodiment, the detected part 500 can pivot relative to the casing 100. The detected part 500 includes a pivoting part 521, a first force-receiving part 5006, and a detected portion 5007. The rotating part 521 is preferably a cylindrical protrusion extending in the third direction. The pivoting part 521 is located between the first force-receiving part 5006 and the detected portion 5007. The first force-receiving part 5006 and the detected portion 5007 have an angle, and the preferred angle is 90°. The casing 100 is provided with a circular pivot hole, and the detected part 500 is inserted into the pivot hole through the pivoting part 521 to be installed on the casing 100. The first force-applying part 4201 of the translational member 420 is in the shape of a hole penetrating the front and back in the second direction. The first force-receiving part 5006 is in the shape of a fork. The first force-receiving part 5006 is inserted in the first force applying part 4210 and is clamped by the first force applying part 4210, making the translational member 420 and the detected member rotatably connected. When the translational member 420 is contacted by the first rotating member 410 and moves to the left in the first direction, the detected part 500 is driven by the translational member 420 to pivot with the pivoting part 521 as the pivot center. The pivoting axis is perpendicular to the first direction and, further, parallel to the third direction. The detected portion 5007 pivots in the R direction to move from the non-detection position to the detection position and to trigger the detecting part 10. In one embodiment, the second elastic member 770 is preferably a compression spring and acts on the translational member 420. When the translational member 420 loses contact with the first rotating member 410, the second elastic member 770 releases the elastic force to cause the translational member 420 to move to the right, thereby causing the translational member 420 to drive the detected portion 5007 to pivot in the L direction opposite to the R direction to move from the detection position to the non-detection position.

As shown in FIG. 4.2, the gear portion 4104 is located at the end of the first cylinder 4131 close to the first side 110 in the first direction, and the first contact protrusion 412 is further away from the first side 110 than the gear portion 4104 in the first direction. The first contact protrusion 412 is a cylindrical protrusion positioned at the outer circumferential surface of the first cylinder 4131 and protruding in the radial direction of the first cylinder 4131. The outer circumferential surface of the first contact protrusion 412 is in contact with various parts of the contact member 612, so that the contacting effect of the contact member 612 on the first rotating member 410 is smoother, thereby making the detection process more stable.

As shown in FIG. 4.3, in another embodiment, the first contact protrusion 412 protrudes radially from the first cylinder 4131 and extends in the first direction. In the first direction, the first contact protrusion 412 extends from the end of the first barrel 4131 away from the first side 110 in the first direction to the gear portion 4104, and the width of the first protrusion 412 gradually increases in the circumferential direction. Preferably, the extended end of the first contact protrusion 412 is in contact with the gear portion 4104. The first contact protrusion 412 includes a contact arc surface. The contact arc is an arc surface generated when the first contact protrusion 412 extends in the first direction. The contact arc surface can facilitate the contact between the first contact protrusion 412 and the contact member 612, and the extension of the first contact protrusion 412 in the first direction and the circumferential direction can make the first contact protrusion 412 more stable, preventing the first contact protrusion 412 from breaking or fracturing during the contact with the contact member 612.

Embodiment 5

Except specifically stated, the structure in this embodiment is the same as that in Embodiment 1. The difference between Embodiment 5 and Embodiment 1 is that the structures of the detected part 500 and the transmission unit are different, and the first protective cover 410 is not provided with a contact member.

As shown in FIGS. 5.1 to 5.4, the first rotating member 410 is rotatably installed on the casing 100 through the first mounting hole 4105, or can be installed on the first protective cover 610. The first rotating member 410 includes an inclined pushing block (protrusion) and a gear portion 4104, the inclined pushing block is positioned at one side of the first rotating member 410 facing the first side 110 in the first direction, and the gear portion 4104 is positioned at the other side of the first rotating member 410. In one embodiment, the gear portion 4104 is preferably a sheave, or it may be an ordinary gear as in Embodiment 1. The gear portion 4104 receives the force transmitted by the transmission assembly to rotate the first rotating member 410. The gear portion 4104 is provided with a missing tooth portion for disconnecting the transmission from the transmission assembly. There are multiple inclined pushing blocks, and the inclined pushing blocks follow the rotation of the first rotating member 410 to rotate. In one embodiment, the first inclined pushing block 2051 and the second inclined pushing block 2052 are used as examples. In the rotation direction of the first rotating member 410, the first inclined pushing block 2051 and the second inclined pushing block 2052 are spaced apart and have different corresponding central angles. There is a first notch 2053 between the first inclined pushing block 2051 and the second inclined pushing block 2052. The first inclined pushing block 2051 and the second inclined pushing block 2052 protrude toward the first side 110 in the first direction, relative to the first rotating member 410. The first inclined pushing block 2051 is provided with a first driving surface 20511, and the second inclined pushing block 2052 is provided with a second driving surface. The first driving surface 20511 and the second driving surface 20521 are both inclined surfaces, inclined relative to the first direction, and may also be arc surfaces.

As shown in FIG. 5.5 and FIG. 5.6, there is a first angle $\theta 1$ between the first driving surface 20511 and the end surface of the first rotating member 410 in the first direction (e.g., a base surface or a flat plane). There is a second angle $\theta 2$ between the second driving surface 20521 and the end surface of the first rotating member 410 in the first direction. The first angle $\theta 1$ and the second angle $\theta 2$ are both acute angles, the second angle $\theta 2$ is smaller than the first angle $\theta 1$, preferably the range of the first angle $\theta 1$ is 50°~70°, and the range of the second angle $\theta 2$ is 35°~50°. The end surface of the first rotating member 410 in the first direction is a plane perpendicular to the first direction.

The first driven part 421 of the translational member 420 (an end close to the first side 110 in the first direction) is in driving contact with the first rotating member 410. The first driven part 421 is provided with a first driven surface 4211. A driven surface 4211 is preferably an inclined surface, and may also be a curved surface or a straight surface. The first driven surface 4211 is sequentially driven by the first driving surface 20511 and the second driving surface 20521. Further, when the first rotating member 410 rotates, the first driving surface 4211 and a second driving surface 20521 successively contact the first driven surface 4211, so that the translational member 420 receives the contact force transmitted by the first rotating member 410 and moves in the first direction, and further moves left in the first direction.

That is, in one embodiment, the first rotating member 410 does not need to move in the first direction, and the driving surface directly interacts with the translational member 420, so that the translational member 420 moves in the first direction.

The casing 100 is also provided with a second elastic member. The second elastic member interacts with the translational member 420 to cause the translational member 420 to reciprocate in the first direction. The second elastic member is preferably a compression spring, and may also be other elastic media. When the first driven part 421 is contacted by the first inclined pushing block 2051 and moves leftward in the first direction at the second speed V2, the second elastic member deforms and accumulates elastic force, and the first rotating member 410 continues to rotate so that the first driven part 421 loses contact with the first inclined pushing block 2051. At this time, the second elastic member releases the elastic force so that the translational member 420 moves to the right in the first direction and is located in the first notch 2053.

Further, a mounting slot is provided in the translational member 420, and the casing 100 is provided with a mounting protrusion extending into the mounting slot. One end of the second elastic member abuts the mounting protrusion, and the other end abuts the mounting slot. The mounting protrusion can provide a limit for the sliding movement of the translational member 420 and can also be used to support the seventh elastic member 187.

The transmission unit also includes a connecting rod 204 disposed close to the second side 120. One end of the connecting rod 204 is rotatably connected to the first force-applying portion 4201 of the translational member 420, and its rotation axis intersects the first direction and the second direction, preferably parallel to the three directions, and the other end is connected to the detected part 500. When the translational member 420 slides to the left in the first direction, the translational member 420 drives the connecting rod 204 to rotate, and then the connecting rod 204 drives the detected part 500 to slide forward in the second direction to move from the non-detection position to the detection position, so that the detected part 500 triggers the detecting part 10. When the translational member 420 slides to the right in the first direction, the translational member 420 drives the connecting rod 204 to move in the reverse direction and causes the detected part 500 to slide backward in the second direction to move from the detection position to the non-detection position. That is, in one embodiment, the connecting rod 204 is another transmission member in the transmission unit. In one embodiment, there is more than one connecting rod 204.

Because the rotation speed of the first rotating member 410 remains unchanged, and the inclination angle of the second driving surface 20521 is larger than that of the first driving surface 20511, when the first driven part 421 is abutted by the second inclined pushing block 2051, and moves to the left in the first direction at the first speed V1, the first speed V1 is greater than the second speed V2, thereby causing the detected part 500 to trigger the detecting part 100 at a faster speed. That is, in one embodiment, the second driving surface 20521 is an acceleration part that causes the translational member 420 and the detected part 500 to move at a faster speed.

It can be seen that an inclined pushing block (the third inclined pushing block 2054 in the FIG. 5.4) can also be added to the first rotating member 410 as needed. The corresponding angle of the inclined pushing block and the angle between the driving surface and the first rotating member 410 can be set according actual needs.

As shown in FIG. 5.7, in another embodiment, the first driven part 421 has a smooth tip shape, the detected part 500 is directly and rotatably connected to the first force applying part 4201, and the detected part 500 is directly driven by the translational member 420 to rotate. The axis of rotation is perpendicular to or slightly inclined to the first direction. The second elastic member 770 acts on the translational member 420 to make the translational member 420 move to the right in the first direction, causing the translational member 420 to drive the detected part 500 to move from the detection position to the non-detection position. This structure can simplify the structure of the developing cartridge 1.

As shown in FIG. 5.8, regarding another structure of the first rotating member 410, in addition to the inclined pushing block, the first rotating member 410 is also provided with a limiting part 4107. The limiting part 4107 is groove-shaped and faces the first side 110. When the detection is completed, the first driven part 421 of the translational member 420 is located in the limiting part 4107, and the first driven part 421 abuts the limiting part 4107. That is, the first rotating member 410 is limited by the translational member 420.

When the first rotating member 410 is disturbed by external factors such as the shaking of the casing 100, the first rotating member 410 is limited by the translational member 420 and cannot produce non-preset rotation, thus preventing the gear portion 4104 from meshing with the agitator gear 310 again to rotate, causing the detected part 500 to move unexpectedly, which further causes the detected part 500 to accidentally touch the detecting part 10.

When the first rotating member 410 needs to be reset, the user only needs to turn the first rotating member 410 by hand in the rotation direction of the first rotating member 410 so that the limiting part 4107 overcomes the elastic force of the second elastic member 770 and pushes the translational member 420 to move to the left in the first direction, so that the gear portion 4104 meshes with the agitator gear 310 again, and receives driving force to rotate.

In this structure, the gear arrangement in the transmission assembly may be the same as in the above embodiments, or may be different, as long as the transmission of force can be achieved.

Embodiment 6

Except specifically stated, the structure in this embodiment is the same as that in Embodiment 5. The difference between Embodiment 6 and Embodiment 5 is that the structure of the transmission unit is different.

As shown in FIG. 6.1, the rotating member includes a first rotating member 410 and a second rotating member 450. The first rotating member 450 is rotatably mounted on the first side 110. The agitator gear 310 meshes with the second rotating member 450. The second rotating member 450 is connected to the first rotating member 410 in transmission.

As shown in FIG. 6.1, the second rotating member 450 includes a second mounting hole 455, a gear portion 4104, and a missing tooth portion 41041. The second rotating member 450 is rotatably and fixedly installed on the first side 110 of the casing 100 through the second mounting hole 455, and the second rotating member 450 can be limited by screws or other auxiliary components to prevent it from falling off from the casing 100. The gear portion 4104 has teeth arranged around part of the circumference of the second rotating member 450. The gear portion 4104 and the missing tooth portion 41041 are jointly arranged around the circumference of the second rotating member 450. That is, the second rotating member 450 is an incomplete gear (missing teeth). The gear portion 4104 of the second rotating member 450 can mesh with the agitator gear 310 and cause the second rotating member 450 to rotate following the agitator gear 310. When the missing tooth portion 41041 faces the agitator gear 310, the second rotating member 450 is disengaged from the agitator gear 310 and, thus, no longer follow the agitator gear 310 to rotate.

As shown in FIG. 6.1 and FIG. 6.2, the first rotating member 410 is rotatably installed on the first side 110 of the casing 100. The first rotating member 410 is provided with a first mounting hole 4105, and the first rotating member 410 is rotatably fixed on the first side 110 of the casing 100 through the first mounting hole 4105. The first rotating member 410 can be limited through screws or other auxiliary components to prevent it from falling off the casing 100.

In one embodiment, the position of the transmission unit on the casing 100 can be set as needed. The second rotating member 450 receives the force transmitted by the transmission assembly to rotate and drives the first rotating member 410 to rotate relative to the casing 100. The first rotating member 410 drives the transmission member to move relative to the casing 100 when rotating, and drives the detected part 500 to move relative to the casing 100 through the transmission member, so that the image forming device can obtain information about the developing cartridge.

The first rotating member 410 is provided with a protruding portion on one side toward the first side 110. The protruding portion contacts the transmission member to drive the transmission member to move. In one embodiment, it is preferred that the protruding portions have the first protrusion 4171, the second protrusion 4172, and the third protrusion 4173 disposed at intervals on and protruding toward the first side 110. The number of the protrusions can be set according to actual needs. The first protrusion 4171 is provided with a first flat surface 41711 that contacts the transmission member.

As shown in FIG. 6.1, FIG. 6.3, and FIG. 6.4, the transmission unit also includes a linkage rod 460 for connecting the second rotating member 450 and the first rotating member 410. One end of the linkage rod 460 is rotatably connected to the second rotating member 450, and the other end is rotatably connected to the first rotating member 410.

A first connecting hole 4108 is provided on the first rotating member 410, and the first connecting hole 4108 and the first mounting hole 4105 are radially spaced apart. The second rotating member 450 is provided with a second connecting hole 454, and the second connecting hole 454 and the second mounting hole 455 are spaced apart in the radial direction.

The linkage rod 460 includes an integrally formed first linkage part 461, a second linkage part 462, and a connecting body 463. The first linkage part 461 and the second linkage part 462 are columnar protrusions extending in the first direction from the connection body 463 to the direction close to the first side 110. The first linkage part 461 and the second linkage part 462 are respectively positioned at two ends of the connecting body 463. The first linkage part 461 includes two first elastic blocks 4611. The two first elastic blocks 4611 are symmetrically arranged around the first linkage part 461. The first elastic block 4611 has a first wedge-shaped part 46112. The first wedge-shaped part 46112 is formed by the first elastic block 4611 extending outward of the circumference. The first guide surface 46111 is an inclined surface on the first wedge-shaped portion 46112. The extension direction of the first guide surface 46111 is inclined to the first direction and away from the circumference of the first linkage portion 461. The second linkage part 462 includes two second elastic blocks 4621. The two second elastic blocks 4621 are symmetrically arranged around the second linkage part 462. The second elastic block 4621 has a second wedge-shaped part 46212. The second wedge-shaped part 46212 is formed by the second elastic block 4621 extending outward of the circumference. The second guide surface 46211 is an inclined surface on the second wedge-shaped portion 46212. The extension direction of the second guide surface 46211 is inclined to the first direction and away from the circumference of the second linkage portion 462. In other embodiments, both the first linkage part 461 and the second linkage part 462 may be made of elastic materials.

The first linkage part 461 of the linkage rod 460 can be inserted into the second connection hole 454 of the second rotating member 450 through the first guide surface 46111 of the first elastic block 4611, and the first wedge-shaped part 46112 is used to limit it and prevent it from falling off. The second rotating member 450 can rotate relative to the first linkage part 461. The second linkage part 462 can use the second guide surface 46211 of the second elastic block 4621 to be inserted into the first connection hole 4108 of the first rotating member 410, and use the second wedge-shaped part 46212 to limit it and prevent it from falling off. The first rotating member 410 can rotate relative to the second linkage portion 462. The linkage rod 460 serves as the linkage device between the second rotating member 450 and the first rotating member 410 and, when the second rotating member 450 meshes with the agitator gear 310 and follows the rotation of the agitator gear 310 to rotate, the first rotating member 410 also synchronously follows the second rotating member 450, through the linkage rod 460, to rotate.

As shown in FIG. 6.2, the first rotating member 410 also includes a prestressing block 41017. The prestressing block 41017 is a block positioned at the outer surface of the connecting column 41016 and extending outward from the outer surface of the connecting column 41016 in the radial direction. The prestressing block 41017 includes a first side 41018 and a second side. The first side 41018 and the second side are two opposite surfaces on the prestressing block 41017.

As shown in FIGS. 6.5 to 6.7, the developing cartridge 1 also includes a first elastic member 730. The first elastic member 730 is preferably a torsion spring. One end of the first elastic member 730 is connected to the first rotating member 410. The first elastic member 730 is configured to drive the first rotating member 410 to rotate. By providing the first elastic member 730, the first rotating member 410 can be prevented from reversing.

The first elastic member 730 is provided at the first side 110 of the casing 100. The first elastic member 730 includes a fixing part 731 and a prestressing part 732. The prestressing part 732 is formed by extending the fixing part 731 backward in the second direction. After the first elastic member 730 is fixedly installed on the first side 110 of the casing 100 through the fixing part 731, the prestressing part 732 contacts the first rotating member 410. The prestressing part 732 contacts the first rotating member 410 and deforms to form a preset angle α relative to the second direction. In the third direction, the end of the prestressing part 732 close to the fixing part 731 is lower than the end far away from the fixing part 731. With the rotation of the first rotating member 410, the magnitude of the preset angle α between the prestressing part 732 and the second direction also changes accordingly, and the distance between the two ends of the prestressing part 732 in the third direction also changes accordingly.

As shown in FIGS. 6.6 and 6.7, the developing cartridge 1 is installed to the image forming device. When the coupling 320 does not receive the driving-force output from the image forming device, the prestressing part 732 abuts the outer surface of the connecting column 41016 of the first rotating member 410. At this time, in the rotation direction of the first rotating member 410, the prestressing part 732 is located upstream of the prestressing block 41017, and the predetermined angle α is the first angle. After the coupling 320 receives the driving-force output from the image forming device, the force is transmitted through the agitator gear 310. The second rotating member 450 rotates following the agitator gear 310 and causes the first rotating member 410 to start rotating through the linkage rod 460. It can be seen that, when the first rotating member 410 follows the second rotating member 450 to rotate through the linkage rod 460, the second rotating member 450 and the first rotating member 410 are also rotating relative to the linkage rod 460.

As the first rotating member 410 rotates following the second rotating member 450, the prestressing part 732 at first stays contacting the outer surface of the connecting column 41016. At this time, the predetermined angle α between the prestressing part 732 and the second direction does not change. As the first rotating member 410 rotates, the prestressing part 732 no longer abuts the outer surface of the connecting column 41016, but the prestressing block 41017 rotates from the downstream of the prestressing part 732 to abut against the prestressing part 732, causing the prestressing part 732 to contact the first side 41018 of the prestressing block 41017. When the first rotating member 410 continues to rotate, the prestressing part 732 remains in contact with the first side 41018 of the prestressing block 41017, and the predetermined angle α between the prestressing part 732 and the second direction gradually increases. During the process when the prestressing part 732 abuts the outer surface of the connecting column 41016 to when the prestressing part 732 abuts the first side 41018 of the prestressing block 41017, the second rotating member 450 and the first rotating member 410 also rotate relative to the linkage rod 460. When the first rotating member 410 continues to rotate, the first side surface 41018 first contacts the prestressing part 732 and, then, the second side surface contacts the prestressing part 732, where the preset angle α reaches the maximum value. That is, the preset angle α is the second angle and, at the same time, the second connection hole 454 and the second mounting hole 455 of the second rotating member 450, and the first connecting hole 4108 and the first mounting hole 4105 of the first rotating member 410 are positioned at the same straight line, and the second rotating member 450 has the possibility of reversing. To prevent the first rotating member 410 from reversing, the prestressing part 732 abuts on the second side 41019 to exert an elastic force on the first rotating member 410 so that the first rotating member 410 continues to rotate. The first rotating member 410 continues to rotate, the prestressing part 732 contacts the outer surface of the connecting column 41016 again, and the preset angle α gradually decreases to the first angle. When the second rotating member 450 no longer rotates, the first rotating member 410 no longer rotates as well.

Through the above arrangement, when the second connecting hole 454 and the second mounting hole 455 of the second rotating member 450, and the first connecting hole 4108 and the first mounting hole 4105 of the first rotating member 410 are positioned at the same straight line, the first rotating member 410 is provided with a pre-stress that can cause the first rotating member 410 to continue to rotate, so that the contact between the transmission member and the first rotating member 410 can proceed smoothly, thus ensuring the smooth completion of the entire detection process.

The first rotating member 410 is provided with a limiting part 4174. The limiting part 4174 is groove-shaped. After the detection is completed, the first driven part 421 of the translational member 420 is located at the limiting part 4174. The interaction between the limiting part 4174 and the first driven part 421 prevents the two from generating unnecessary motion after the detection is completed. That is, the translational member 420 prevents the first rotating member 410 from rotating in a rocking manner.

In some embodiments, the first rotating member 410 may also be transmissionly connected to the second rotating member 450 through gear meshing or belt transmission.

Embodiment 7

Except specifically stated, the structure in this embodiment is the same as that in Embodiment 5. The difference between Embodiment 7 and Embodiment 5 is that the structure of the transmission unit is different.

As shown in FIG. 7.1, the translational member 420 is provided with a first driven part 421 for contacting the first rotating member 410. The first driven part 421 includes a first driven surface 4211. The first driven surface 4211 extends downward in the third direction, and the first driven surface 4211 protrudes downward relative to the first rod portion 428.

The first rotating member 410 is provided with a first groove 418. The first groove 418 surrounds the first rotating member 410 in the rotation direction of the first rotating member 410 and is concaved in the radial direction. A plurality of grooves 418 protrude in the first direction and are located in the first groove 418, and the first groove 418 reciprocally protrudes and retracts in the first direction while extending in the rotation direction to form a plurality of protruding portions, and the plurality of protruding portions are spaced apart in the rotation direction. The plurality of protrusions protrude to different degrees in the first direction. The plurality of protrusions are each provided with a driving surface. The driving surfaces intersect with the end surface of the first rotating member 410 and the degrees of intersection are different. The first driven surface 4211 is inserted into the first groove 418 and contacts each protruding portion. When the first rotating member 410 rotates, the first driven surface 4211 is abutted by the driving surface so that the translational member 420 moves in the first direction. The moving speed of the translational member 420 is determined according to the degree of intersection between the driving surface and the end surface of the first rotating member 410.

Embodiment 8

Except specifically stated, the structure in this embodiment is the same as that in Embodiment 5. The difference between Embodiment 8 and Embodiment 5 is that the structure of the transmission unit is different.

As shown in FIGS. 8.1 to 8.10, in one embodiment, the translational member 420 is at least partially located inside the casing 100 to be protected by the casing 100. A inclined surface or a driven slope is provided at the first driven part 421, and the driven slope extends away from the developing roller 210, and the front end of the driven slope is further to the right than the rear end. The driven slope is used to be contacted by the first rotating member 410 to cause the translational member 410 to move in the first direction. In one embodiment, the detected part 500 is preferably formed integrally with the translational member 420 and is located at the end of the second side 120 of the translational member 420. In other embodiments, it may be connected separately. The detected portion 5007 on the detected part 500 protrudes in the first direction away from the second side 120 relative to the detected part 500 and is tip-shaped. The front end of the detected portion 5007 is further to the right than the rear end. In the second direction, the detected portion 5007 is closer to the developing roller 210 than the first rod portion.

The first rotating member 410 may be coaxially arranged with any gear in the transmission assembly, or may not be coaxially arranged. The first rotating member 410 is provided with a radially protruding driving protrusion 4100, and the driving protrusion 4100 is provided with a plurality of protrusions arranged at intervals in the rotation direction of the first rotating member 410. The projection of at least one driving protrusion 4100 in the first direction is fan-shaped. When the first rotating member 410 receives force and rotates, the plurality of driving protrusions 4100 abuts the driven slope in sequence to move the translational member 420 in the first direction, thereby causing the detected portion 5007 to move and trigger the detecting part 10. The second elastic member 770 acts on the translational member 420 so that the translational member 420 can reciprocate back and forth in the first direction. The second elastic member 770 may act on the end of the translational member 420 located at the first side 110, or may act on the end of the translational member 420 located at the second side 120, or interact with the detected part 500.

Another difference between Embodiment 8 and Embodiment 5 is that the accelerating part is not a slope or a curved surface. The first rotating member 410 is provided with a first meshing part and a second meshing part. The first meshing part and the second meshing parts have different diameters and different lengths in the circumferential direction, and are arranged left and right in the first direction. The first rotating member 410 receives driving force by meshing with the gears in the transmission assembly through the first meshing part and the second meshing part sequentially, and changes the rotation speed of the first rotating member 410 according to different meshing, thereby changing the movement speed of the translational member 420 and the detected part 500.

Embodiment 9

Except specifically stated, the structure in this embodiment is the same as that in Embodiment 1. The difference between Embodiment 9 and Embodiment 1 is that the structures of the detected part 500 and the transmission unit are different.

As shown in FIG. 9.1, the first protective cover 610 is provided with a hole 613. The hole 613 is located at the rear end of the first protective cover 610 in the second direction and penetrates the first protective cover 610 in the third direction. The rotating member 410 is exposed through the hole 613, and the installation and rotation of the first rotating member 410 and the contact status between the transmission member and the first rotating member 410 can be observed through the hole 613. The contact member 612 is installed on the first protective cover 610. The contact member 612 is an annular structure on the side of the first protective cover 610 facing the first side 110.

As shown in FIG. 9.2, the contact member 612 also includes a first protrusion 6123 and a second protrusion 6124. The first driving surface I1 is provided on the first protrusion 6123, and the second driving surface I2 is provided on the second protrusion 6124. On the other hand, the first protrusion 6123 and the second protrusion 6124 have different lengths in the rotation direction of the first rotating member 410. The first protrusion 6123 also includes a first flat portion 6127. The first flat portion 6127 is an end surface of the first protrusion 6123 that is perpendicular to the first direction.

When the first contact protrusion 412 abuts one end of the first protrusion 6123 or the second protrusion 6124 toward the first side 110, the first rotating member 410 moves and cause the detected part 500 to move to the detection position through the transmission member, and the detection circuitry within the image forming device generates electrical signals.

The contact member 612 also includes a third protrusion 6125, and the third protrusion 6125 also has a third driving surface I3. In the rotation direction of the first rotating member 410, the distance between the first protrusion 6123 and the second protrusion 6124 is the first recessed position B1, the distance between the second protrusion 6124 and the third protrusion 6425 is the second recessed position B2, and the distance between the third protrusion 6125 and the first protrusion 6123 is the third recessed position B3. The first driving surface I1, the second driving surface I2, and the third driving surface I3 are all inclined surfaces or arc surfaces. There is a first angle θ1 between the first driving surface I1 and the third recessed position B3, there is a second angle θ2 between the second driving surface I2 and the third recessed positions B3, and there is a third angle θ3 between the third driving surface I3 and the second recessed position B2. The first angle θ1, the second angle θ2, and the third angle θ3 are obtuse angles. The angle of the first angle θ1 is smaller than the angle of the second angle θ2 and the angle of the third angle θ3, or it can be understood as the angle between the first driving surface I1 and the end surface of the first rotating member 410 in the first direction is smaller than the angle between the second driving surface I2 and the third driving surface I3 and the end surface of the first rotating member 410 in the first direction.

In another embodiment, the first angle θ1, the second angle θ2, and the third angle θ3 are acute angles, so the angle of the first angle θ1 is greater than the angle of the second angle θ2 and the angle of the third angle θ3.

The contact member 612 is also provided with a limiting part 6129. The limiting part 6129 is a recessed portion positioned at the first protrusion 6123 and recessed in a direction away from the first side 110.

As shown in FIGS. 9.2 and 9.3, in one embodiment, the contact member 612 is provided with a reset protrusion 6126, and the first rotating member 410 is also provided with a second contact protrusion 415. The reset protrusion 6126 is configured to abut the second contact protrusion 415, and the reset protrusion 6126 provides the second contact protrusion 415 with force to rotate the first rotating member 410. The reset protrusion 6126 is located inside the first flat portion 6127. The reset protrusion 6126 has an ascending surface 61261 and a descending surface 61262, wherein the ascending surface 61261 extends in the direction close to the first side 110 in the rotation direction of the first rotating member 410, and the descending surface 61262 extends in the direction away from the first side 110 in the rotation direction of the first rotating member 410. The ascending surface 61261 and the descending surface 61262 may be inclined surfaces or arc surfaces.

As shown in FIGS. 9.3-9.5, the first rotating member 410 is rotatably installed at the first side 110. The first rotating member 410 includes a gear portion 4104, a first cylinder 4131, a contact surface 4106, a second cylinder 4132, a third cylinder 4133, a first mounting hole 4105, a first contact protrusion 412, a second contact protrusion 415, and a second acceleration part 41013.

The gear portion 4104 is provided with a missing tooth portion 41041. The gear portion 4104 can mesh with the agitator gear 310 to receive the force transmitted by the agitator gear 310, causing the first rotating member 410 to rotate. The missing tooth portion 41041 allows the first rotating member 410 to disengage with the agitator gear 310 and to stop rotating. The contact surface 4106 is an end surface of the first rotating member 410 facing the first side 110.

Both the first contact protrusion 412 and the second contact protrusion 415 protrude radially outward from the circumferential surface of the second cylinder 4132 (or the first contact protrusion 412 may be formed on the circumferential surface of the first cylinder 4131 protrudes radially inward from the inner circumferential surface). That is, the first contact protrusion 412 and the second contact protrusion 415 are located radially inside the first cylinder 4131 and outside the second cylinder 4132. The rotation radius of the first contact protrusion 412 is greater than the rotation radius of the second contact protrusion 415. In the first direction, the end of the second contact protrusion 415 is further away from the first side 110 than the end of the first contact protrusion 412. The second contact protrusion 415 is used to abut the reset protrusion 6126. The first contact protrusion 412 is used to interact with the contact member 612 on the first protective cover 610. When the first contact protrusion 412 contacts the third protrusion 6125, the second protrusion 6124, and the first protrusion 6123, the first rotating member 410 has a first position in the first direction. When the first contact protrusion 412 abuts the first recessed position B1, the second recessed position B2, and the third recessed position B3, the first rotating member 410 has a second position in the first direction. The first position is closer to the first side 110 than the second position in the first direction.

As shown in FIG. 9.5, the casing 100 includes an upper cover 170. The fifth side 150 of the casing 100 is formed on the upper cover 170. The upper cover 170 includes a first support column 720, a second support column 176, a first guide rail 152, a first mounting buckle 1702, and a third groove 1703. The first support column 720 is located at the first side 110 and is a cylindrical protrusion protruding away from the first side 110 in the first direction. The first mounting hole 4105 of the first rotating member 410 is installed on the first support column 720. The rotating member 410 can rotate relative to the first support column 720 and move in the first direction. The second support column 176 is a cylindrical protrusion protruding upward in the third direction and is located between the first side 110 and the second side 120 in the first direction. The first guide rail 152 is a curved strip groove extending generally in the second direction and recessed in the third direction. The first guide rail 152 is provided with a first positioning protrusion extending in the second direction from the rear wall of the first guide rail 152. In one embodiment, the first guide rail 152 is closer to the first side 110 than to the second side 120 in the first direction. In other embodiments, the first guide rail 152 can be closer to the second side 120 than to the first side 110 in the first direction, or the distance to the first side 110 is the same as the distance to the second side 120.

The first mounting buckles 1702 are buckles that protrude upward in the third direction. In one embodiment, the number of the first mounting buckles 1702 is six. Other numbers may also be used according to actual needs. The third grooves 1703 are a plurality of grooves that are recessed downward in the third direction. The plurality of grooves are arranged in the first direction. The third grooves 1703 are used to further enhance the strength of the casing 100.

The developing cartridge 1 also includes a cover plate 194. The cover plate 194 is located above the upper cover 170 in the third direction. The cover plate 194 is provided with a second mounting buckle 1941 that cooperates with the first mounting buckle 1702. The cover plate 194 is detachably installed on the upper cover 170.

As shown in FIGS. 9.5 to 9.7, in one embodiment, the transmission member is a swing member 430, which may be a rod. The swing member 430 includes a first force-bearing end 43913, a first pivot part 4393, a guide protrusion 432, a first connecting section 4391, and a second connecting section 4392. The first pivot part 4393 is provided with a third positioning hole. The third positioning hole is a through hole that penetrates the swing member 430 in the third direction. The third positioning hole is sleeved on the second support column 176 so that the swing member 430 is installed. The first force-bearing end 43913 is located at the right end of the swing member 430 in the first direction. The first force-bearing end 43913 is used to be contacted by the first rotating member 410 so that the swing member 430 swings with the third positioning hole as a swing point. The first force-receiving end 43913 includes a second force-receiving part 43914 and a fifth limiting part 43915. The second force-receiving part 43914 is an inclined surface extending backward in the second direction and rightward in the first direction. That is, the extension direction of the second force-receiving portion 43914 has an angle with the first direction, and the second force-receiving portion 43914 is in contact with the contact surface 4106 of the first rotating member 410.

When the first rotating member 410 moves from the second position to the first position in the first direction, the first force-bearing end 43913 of the swinging member 430 is contacted by the first rotating member 410 and swings in a direction away from the developing roller 201. The entire swinging member 430 swings around the first pivot portion 4393.

The swing axis of the swing member 430 intersects with the first direction, and is preferably parallel to the third direction. The cover plate 194 can protect the swing member 430.

The guide protrusion 432 is a protrusion protruding toward the fifth side 150 in the second direction, and the guide protrusion 432 is closer to the first force-bearing end 43913. When the swing member 430 is installed on the upper cover 170, the guide protrusion 432 is located in the first guide rail 152, so that the swing member 430 is guided and restricted by the first guide rail 152. The first connecting section 4391 is located between the first pivot part 4393 and the first force-bearing end 43913 in the first direction, and the second connecting section 4392 is located between the first pivot part 4393 and the swinging member 430 in the first direction. That is, the length of the first connecting section 4391 and the second connecting section 4392 depends on whether the first pivot part 4393 is closer to the first side 110 or to the second side 120 in the first direction. It can be seen that the positions of the first pivot part 4393 and the second support column 176, and the inclination angle of the second force-receiving part 43914 is not limited herein. When the first pivot part 4393 and the second support column 176 are closer to the first side 110, i.e., the shorter the length of the first connecting section 4391 is, the smaller the angle between the extension direction of the second force-receiving part 43914 and the first direction. When the first pivot part 4393 and the second support column 176 are closer to the second side 120, that is, the shorter the length of the second connecting section 4392 is, the larger the angle between the extension direction of the second force-receiving portion 43914 and the first direction is.

In other embodiments, a positioning hole(s) may be provided on the upper cover 170, and a positioning column(s) matching the positioning holes may be provided on the swinging member 430.

In other embodiments, positioning holes may be provided on the upper cover 170, and positioning columns matching the positioning holes may be provided on the swinging member 430.

As shown in FIG. 9.5, the developing cartridge 1 also includes a first elastic member 710 and a second elastic member 770. In one embodiment, the first elastic member 710 and the second elastic member 770 are preferably compression springs, but may also be other elastic media. The second elastic member 770 is located in the first guide rail 152. One end of the second elastic member 770 close to the fourth side 140 in the second direction is sleeved on the first positioning protrusion and abuts against the side wall of the first guide rail 152. One end of the second elastic member 770 away from the fourth side 140 in the second direction is sleeved on the guide protrusion 432 and abuts the swing member 430, and the second elastic member 770 is generally compressed or stretched in the second direction.

The second elastic member 770 is used to make the swinging member 430 swing in the opposite direction again when it loses contact with the first rotating member 410, that is, the first force-bearing end 43913 is contacted by the first rotating member 410 and moves closer to the developing roller 201, causing the second elastic member 770 to provide, when the swing member 430 reset to a position without the contact, elastic force for the swing member 430 to swing in the opposite direction.

The first elastic member 710 is installed on the first support column 720 in the first direction and is supported by the first support column 720. The first elastic member 710 is in contact with the side wall of the first side 110 at one end close to the first side 110 in the first direction, and the end away from the first side 110 is in contact with the first rotating member 410. The first elastic member 710 is compressed or stretched in the first direction. The first elastic member 710 is used to drive the first rotating member 410 to move rightward in the first direction.

As shown in FIGS. 9.5 to 9.7, in one embodiment, the detected part 500 is preferably integrally formed with the swinging member 430 to simplify the structure of the developing cartridge 1. The detected part 500 is the swinging member 430 located at the end of the second side 120 of the casing 100. That is, the detected part 500 and the first force-bearing end 43913 are respectively located at the two ends of the swinging member 430 in the first direction. In some embodiments, the detected part 500 may also be connected in combination with the swinging member 430. When the first force-receiving end 43913 is contacted and swings in a direction away from the developing roller 201, the detected part 500 swings in a direction closer to the developing roller 201 and moves from the non-detection position to the detection position. In some embodiments, the detected part 500 may also be connected in combination with the swinging member 430.

The following is the operation process of the developing cartridge according to one embodiment. In one embodiment, the transmission unit includes a first rotating member 410 and a swinging member 430.

The developing cartridge 1 and the drum cartridge 2 are installed into the image forming device. Before the developing cartridge starts operating, that is, when the coupling 320 does not receive the driving-force output from the image forming device, the gear portion 4104 of the first rotating member 410 and the agitator gear 310 engages, the first contact protrusion 412 of the first rotating member 410 contacts the first flat portion 6127 and is located at the first position in the first direction, the first rotating member 410 and the swinging member 430 are in a contact state, and the detected part 500 is located at the detection position. The detected part 500 is in contact with the detecting part in the image forming device. The detecting part is located at the triggering position after being triggered by the detected part 500, which is the first trigger. The second elastic member 770 is abutted by the swinging member 430 and is in a compressed state, and the first elastic member 710 is abutted by the first rotating member 410 and is in a compressed state.

When the coupling 320 receives the driving-force output from the image forming device, the first rotating member 410 starts to rotate following the agitator gear 310. During the process where the first contact protrusion 412 contacts the first flat portion 6127, the first rotating member 410 remains in the first position in the first direction, the first rotating member 410 remains in meshing with the agitator gear 310, and the first rotating member 410 remains in contact with the swinging member 430, so that the detected part 500 is located at the detection position.

When the first rotating member 410 continues to rotate, the first contact protrusion 412 is out of contact with the first flat portion 6127, and the first rotating member 410 moves to the right in the first direction under the elastic action of the first elastic member 710. When the first contact protrusion 412 contacts the first recessing position B1, the first rotating member 410 is located at the second position. It can be seen that the first rotating member 410 always maintains meshing with the agitator gear 310 when moving in the first direction. When the first rotating member 410 moves rightward in the first direction, the contact surface 4106 moves upward in the extension direction of the second force receiving portion 43914, so the degree of abutment on the swing member 430 gradually decreases. Further, under the elastic action of the second elastic member 770, the first force-bearing end 43913 swings in a direction close to the developing roller 210 around the first pivot portion 4393, and the detected part 500 swings in a direction away from the developing roller 210 to move from the detection position to the non-detection position. The fifth limiting portion 43915 is used to prevent the first rotating member 410 from disengaging from the first force-receiving end 43913 after moving to the right in the first direction.

The first rotating member 410 continues to rotate, and the first contact protrusion 412 moves from contacting the first recessed position B1 to contacting the second driving surface I2. Since the second driving surface I2 extends toward the direction close to the first side 110 in the rotation direction of the first rotating member 410, the first contact protrusion 412 moves to the left in the first direction during the process of contacting the second driving surface I2, that is, moving from the second position to the first position. The first elastic member 710 is compressed. At the same time, the contact surface 4106 moves on the second force-receiving part 43914 in the direction opposite to the extension direction of the second force-receiving part 43914, and gradually increases the degree of abutment with the swinging member 430, so that the first force-receiving end 43913 swings around the first pivot part 4393 away from the developing roller 210, thereby causing the detected part 500 to swing to the detection position. The second elastic member 770 is compressed by the swinging member 430. When the first contact protrusion 412 contacts the second protrusion 6124, the first rotating member 410 is in the first position, and the detecting part contacts the detected part 500 and is in the trigger position, which is the second trigger. It is also possible that the first rotating member 410 is located at the first position when the first contact protrusion 412 is in contact with the second driving surface I2.

The first rotating member 410 continues to rotate, and the first contact protrusion 412 and the third protrusion 6125 are out of contact. The first rotating member 410 moves to the right in the first direction under the elastic action of the first elastic member 710. When the contact protrusion 412 abuts the second recessed position B2, the first rotating member 410 is located at the second position. At the same time, the first force-bearing end 43913 of the swing member 430 swings around the first pivot portion 4393 in the direction close to the developing roller 201 under the elastic action of the second elastic member 770. The swing member 430 drives the detected part 500 to move from the detection position to the non-detection position.

The first rotating member 410 continues to rotate, and the first contact protrusion 412 moves from contacting the second recessed position B2 to contacting the third driving surface I3. The process is the same as contacting the second driving surface I2, the details of which is not repeated herein. The detected part 500 moves to the detection position again, and the detecting part contacts the detected part 500 and is at the triggering position, which is the third trigger. When the first contact protrusion 412 is out of contact with the third protrusion 6125 and is located in the third recessed position B3, the detected part 500 swings to the non-detection position again.

The first rotating member 410 continues to rotate, and the first contact protrusion 412 moves from being in contact with the third recessed position B3 to being in contact with the third driving surface I3. During the process where the first contact protrusion 412 contacts with the third driving surface I3 to move to the left in the first direction, i.e., moving from the second position to the first position, the first elastic member 710 is compressed. The detected part 500 moves from the non-detection position to the detection position. When the first contact protrusion 412 contacts the first protrusion 6123, the first rotating member 410 is in the first position, the detected part 500 is in the detection position, and the detecting part contacts the detected part 500 and is in the triggering position, which is the fourth trigger.

The time duration for the first contact protrusion 412 to move from the first recessed position B1 to the second protrusion 6124 is the second time interval, and the swing member has the second speed V2. The time duration for the first contact protrusion 412 to move from the second recessed position B2 to the third protrusion 6125 is the third time interval, and the member has the third speed V3. The time duration for the first contact protrusion 412 to move from the third recessed position B3 to the first protrusion 6123 is the first time interval, and the swing member has the first speed V1.

Because the first angle θ1 is smaller than the second angle θ2 and the third angle θ3, the rotation speed of the first rotating member 410 remains unchanged, and the distance moved in the first direction remains unchanged. The first time interval is shorter than the second time interval and the third time interval, and the first speed V1 is larger than the second speed V2 and the third speed V3. That is, the first driving surface I1 is the first acceleration part.

It can be seen that the second acceleration part 41013 is located at the left end of the first rotating member 410 and is in the shape of a groove recessed to the right. The second acceleration part 41013 includes an acceleration slope 41015, and the upstream end of the acceleration slope 41015 is in the rotation direction of the first rotation member 410 is closer to the first side 110 in the first direction than the downstream end, so that when the second force receiving portion 43914 contacts the acceleration slope 41015, it can be further accelerated to force the swing member 430 to obtain a faster swing speed. Illustratively, while the first contact protrusion 412 on the first rotating member 410 moves along the first driving surface I1, the second force-receiving portion 43914 moves along the acceleration slope 41015. The above arrangement further accelerates the movement speed of the swinging member 430 and the detected part 500 to meet the recognition requirements of the image forming device. That is, in one embodiment, the acceleration part includes the first driving surface I1 positioned at the contact member 612 and the second accelerating part 41013 positioned at the first rotating member 410.

When the missing tooth portion 41041 of the first rotating member 410 faces the agitator gear 310, the first rotating member 410 no longer rotates following the agitator gear 310. The first rotating member 410 remains in contact with the swinging member 430, the detected part 500 is located at the detection position, and the image forming device completes the identification of the developing cartridge 1.

When it is necessary to reset the first rotating member 410 and the swinging member 430, it only need to manually continue to rotate the first rotating member 410 in the rotation direction of the first rotating member 410. While the first rotating member 410 is rotating, the second contact protrusion 415 first moves on the rising surface 61261 in the extending direction of the rising surface 61261, that is, the first rotating member 410 is contacted by the rising surface 61261. When the first rotating member 410 continues to rotate, the second contacting protrusion 415 moves from the rising surface 61261 move to the descending surface 61262 from the rising surface 61261 and move in the extension direction of the descending surface 61262. At the same time, the first force-bearing end 43913 of the swing member 430 swings under the elastic action of the second elastic member 770 and exerts a reverse contact force on the first rotating member 410. At this time, the descending surface 61262 of the reset protrusion 6126 provides the second contact protrusion 415 with a force to rotate the first rotating member 410. Under the joint action of the swinging member 430, the first elastic member 710, and the descending surface 61262, the tooth portion of the first rotating member 410 meshes with the agitator gear 310. After the reset is completed, the first contact protrusion 412 contacts the first flat portion 6127 again.

That is, in one embodiment, the transmission member is used to transmit force from the first side 110 to the second side 120. The transmission member transmits the force from the first side 110 to the second side 120 by swinging or rotating. The rotation axes of the transmission member are not parallel to the first direction, the transmission member does not rotate in the first direction and, further, the rotation axis of the transmission member is parallel to the third direction. There may be one or more transmission members. The plurality of transmission members contact each other to transmit force, and sequentially transmit the force from the first side 110 to the second side 120, thereby allowing the detected part 500 to receive the force and move.

Embodiment 10

Except specifically stated, the structure in this embodiment is the same as that in Embodiment 9. The difference between Embodiment 10 and Embodiment 9 is that the structures of the detected part 500 and the transmission unit are different.

As shown in FIGS. 10.1 and 10.2, in one embodiment, the second elastic member 770 is a tension spring, and the second elastic member 770 is connected between the swinging member 430 and the casing 100.

In the first direction, the distance from the pivot center of the swing member 430 to the first side 110 is smaller than the distance to the second side 120, and the detected part 500 and the swing member 430 are combined and connected as separate components.

The casing 100 is provided with two first guide rails 152 for guiding the first connecting section 4391 and the second connecting section 4392 respectively. Adaptably, the swinging member 430 is provided with two guide protrusions 432, where the shape of the first guide rail 152 is not limited here.

There is an angle between the first connecting section 4391 and the second connecting section 4392. In one embodiment, the angle is 10°. In other embodiments, the angle can also be set to other angles.

The casing 100 is provided with a third limiting part 1502 and a fourth limiting part 1503 for providing stability of the transmission unit. The third limiting part 1502 and the fourth limiting part 1503 are provided on the fifth side 150 of the casing 100 through a one-time molding process. The third limiting part 1502 and the fourth limiting part 1503 are respectively provided with second limiting groove 15021 and third limiting groove 15031 extending in the second direction. The first connecting section 4391 is located in the second limiting groove 15021 and can move relative to the second limiting groove 15021. The second connecting section 4392 is located in the third limiting groove 15031 and can move relative to the third limiting groove 15031. The second limiting groove 15021 and the third limiting groove 15031 are used to limit the movement of the swinging member 430 in the third direction, preventing the swinging member 430 from coming out of the developing cartridge 1 during movement, and improving transmission stability.

As shown in FIG. 10.3, the detected part 500 is installed on the end of the swinging member 430 located at the second side 120 of the casing 100. The detected part 500 and the swinging member 430 are two independent parts.

The end of the second connecting section 4392 of the swing member 430 is provided with a mounting slot 431. The mounting slot 431 is trapezoidal. The left end of the mounting slot 431 is open and the right end is closed. The size of the left end of the mounting slot 431 is smaller than the size of the right end of the mounting slot 431. The detected part 500 is slidably mounted on the casing 100 in the second direction. The right end of the detected part 500 extends into the mounting slot 431 and can swing in the mounting slot 431. There is a gap between the bottom of the mounting slot 431 and the right end of the detected part 500. Those skilled in the art can set the size of the gap as needed. The specific size is to ensure that the swing member 430 will not interfere with the detected part 500 during the swing process.

This structure ensures that the detecting part of the image forming device can be reliably moved when the detected part 500 is located at the detection position, and can reduce the space occupied by the detected part 500 at the second side 120 in movement, thereby facilitating the miniaturization of the developing cartridge.

A limiting plate 570 is provided on the detected part 500, and a third elastic member 740 is provided between the bottom of the mounting slot 431 and an end of the detected part 500 that extends into the mounting slot 431. One end of the third elastic member 740 is connected to the detected part 500 and the other end is connected to the swinging member 430. The third elastic member 740 is used to drive the limiting plate 570 to abut or contact the casing 100.

The limiting plate 570 is located in the middle of the detected part 500. The right end of the limiting plate 570 is provided with a mounting arm 5008. The mounting arm 5008 is inserted into the mounting slot 431 through the opening at the left end of the mounting slot 431. Since the mounting slot 431 is trapezoidal, the mounting arm 5008 can swing in the mounting slot 431. A second positioning column 5009 is integrally formed on the mounting arm 5008, and a third positioning column 43921 is integrally formed in the mounting slot 431. The third elastic member 740 is connected between the second positioning column 5009 and the third positioning column 43921. One end of the third elastic member 740 is fixedly connected to the second positioning column 5009, and the other end is fixedly connected to the third positioning column 43921.

The limiting plate 570 is pressed against the fourth limiting portion 1503 under the elastic force of the third elastic member 740 so that it can move linearly in the front-rear direction along the fourth limiting portion 1503. The mounting arm 5008 passes through the third limiting groove 15031 is then inserted into the mounting slot 431.

When the swing member 430 swings, the mounting arm 5008 is driven by the second connecting section 4392 to move in the front and rear direction, and the mounting arm 5008 can move in the first direction relative to the mounting slot 431. At the same time, because the mounting slot 431 is trapezoidal, the mounting arm 5008 can swing in the mounting slot 431 to prevent the mounting arm 5008 from getting stuck in the mounting slot 431.

The upper end of the mounting slot 431 is open, so that the upper end of the mounting slot 431 is not closed, and the mounting arm 5008 is exposed outside the mounting slot 431, thereby facilitating installation of the third elastic member 740 on the second positioning column 5009 and the third positioning column 43921 when the mounting arm 5008 is inserted into the mounting slot 431.

In this structure, the cooperation between the limiting plate 570 and the fourth limiting part 1503 on the casing 100 can guide and limit the detected part 500, and the elastic force of the third elastic member 740 is used to prevent the limiting plate 570 from falling off the fourth limiting portion 1503.

The detected part 500 provided in one embodiment is also applicable to other developing cartridges having a swinging member 430.

Embodiment 11

Except specifically stated, the structure in this embodiment is the same as that in Embodiment 9. The difference between Embodiment 11 and Embodiment 9 is that the structures of the detected part 500 and the transmission unit are different, and the swing axis of the swinging member 430 is different from the first swing axis. direction crosses the third direction.

As shown in FIGS. 11.1 and 11.2, the upper cover 170 includes a first side wall 177 located at the first side 110 of the casing 100, and a second side wall 178 located at the second side 120 of the casing 100. The first side wall 177 is provided with the first support column 720 is integrally formed with the upper cover 170. The first support column 720 extends from the first side all 177 in the first direction away from the first side wall 177. The first support column 720 rotatably supports the first rotating member 410. The second side wall 178 is provided with a third support column 780 and a connecting post 1710 that are integrally formed with the upper cover 170. The third support column 780 and the connecting post 1710 both extend from the second side wall 178 in the first direction away from the second side wall 178. The third support column 780 includes a first mounting portion 781 and a first base 782. The first mounting portion 781 is further away from the second side wall 178 than the first base 782 in the first direction. The connecting post 1710 includes a second limiting protrusion 17101, a first connecting portion 17102, and a second base 17103. The first connecting portion 17102 is located between the second limiting protrusion 17101 and the second base 17103 in the first direction. The upper cover 170 is also provided with a receiving groove 179 and a second supporting column 176 located at the rear end of the upper cover 170. The second supporting column 176 is located in the receiving groove 179. In the first direction, the second support column 176 is closer to the first side wall 177 than the second side wall 178. Since the first side wall 177 is located at the first side 110 of the casing 100, the second side wall 178 is located at the second side 120 of the casing 100, the second support column 176 is closer to the first side 110 than the second side 120. That is, the distance from the second support column 176 to the first side 110 is not greater than the distance from the second support column 176 to the second side 120.

As shown in FIGS. 11.1 and 11.3, the swinging member 430 is located at the fifth side 150 of the casing 100 and is detachably installed on the upper cover 170. The swinging member 430 includes a second rod portion 434, a clamping part 435, and a second driven part 433. The second rod portion 434 is located in the receiving groove 179 of the upper cover 170 but does not completely directly contact the bottom of the receiving groove 179, that is, the swinging member 430 is in a suspended state relative to the receiving groove 179. The clamping portion 435 is movably combined with the second support column 176 of the upper cover 170, and the distance from the clamping portion 435 to the first side 110 is no greater than the distance from the clamping portion 435 to the second side 120. The swinging member 430 can be clamped on the second support column 176 using the engaging portion 435 so that both ends of the swinging member 430 swing in a direction close to the bottom of the receiving groove 179 and in a direction away from the bottom of the receiving groove 179. The swinging axis of the swinging member 430 intersects with the first direction and the third direction, and preferably parallel to the second direction. That is, the clamping portion 435 and the second support column 176 can serve as the fulcrum of the swinging member 430 so that the second driven portion 433 swings. The second driven part 433 is an end of the swinging member 430 close to the first side 110 of the casing 100. The second driven part 433 is used to contact the first rotating member 410, thereby causing the swinging rod 430 to move relative to the casing 100.

As shown in FIGS. 11.1 and 11.3-11.5, the detected part 500 is rotatably mounted on the second side 120, the rotation axis of the detected part 500 is parallel to the first direction, and one end of the detected part 500 is movably connected to the swinging member 430.

The swinging member 430 includes a second rod portion 434. One end of the second rod portion 434 close to the second side 120 of the casing 100 is a placement end 436. The placement end 436 of the swinging member 430 can swing up and down. The placement end 436 includes a placement platform 4361, an insertion protrusion 4362, a connection protrusion 4363, and an inclined portion 4364. The inclined portion 4364 is used to connect the placement platform 4361 and the second rod portion 434. There is a block on the placement platform 4361, and the insertion protrusion 4362 is positioned at the block and extends to the left in the first direction. The connecting protrusion 4363 is positioned at the lower surface of the inclined portion 4364 and extends to the right in the first direction, and a limiting block (not shown) is provided at an end of the connecting protrusion 4363 close to the second side 120.

As shown in FIGS. 11.4 and 11.5, the detected part 500 includes a mounting through hole 501, a movable groove 502, a placement portion 503 and a contact portion 504. The contact portion 504 is used to contact the detecting part in the image forming device so that the developing cartridge is recognized by the image forming device. The placement portion 503 is in contact with the placement platform 4361. That is, the placement platform 4361 of the swinging member 430 is used to place the detected part 500. The first mounting portion 781 of the third support column 780 is inserted into the mounting through hole 501 so that the detected part 500 can be supported by the upper cover 170 and the detected part 500 can rotate using the first mounting portion 781 of the third support column 780 as the pivot point. The length of the movable groove 502 in the second direction is greater than the length in the third direction. The insertion protrusion 4362 on the swinging member 430 can be inserted into the movable groove 502 and move in the movable groove 502. That is, the swinging member 430 and the detected part 500 can be connected by inserting the insertion protrusion 4362 into the movable groove 502 and placing the placing part 503 on the placing platform 4361.

As shown in FIG. 11.5, the second side 120 of the casing 100 is also provided with a second elastic member 770. The second elastic member 770 is preferably a tension spring, and the second elastic member 770 can be stretched. A connecting post 1710 is provided on the second side wall 178 of the upper cover 170. The connecting post 1710 includes a second limiting protrusion 17101, a first connecting part 17102, and a second base 17103. In the first direction, the first connecting part 17102 is located between the second limiting protrusion 17101 and the second base 17103, and the second base 17103 is connected to the second side wall 178. One end of the second elastic member 770 is connected to the connecting protrusion 4363 on the swinging member 430 and a limiting block is used to prevent the second elastic member 770 from falling off. The other end is connected to the first connecting portion 17102 of the connecting post 1710. The second limiting protrusion 17101 prevents the second elastic member 770 from falling off. Since the upper cover 170 is fixedly installed on the casing 100, the end of the second elastic member 770 connected to the first connecting portion 17102 does not move, but the swinging member 430 swings to cause the second elastic member 770 connected one end of the connecting protrusion 4363 to move, thereby causing the second elastic member 770 to be stretched.

When the placement end 436 of the swinging member 430 is in an upward swing state, the detected part 500 rotates from the non-detection position to the detection position. After the detected part 500 rotates to the detection position, the contact portion 504 of the detected part 500 contacts with the detecting part in the image forming device, and the second elastic member 770 is in a stretched state.

When the first rotating member 410 stops exerting force on the swinging member 430, the second elastic member 770 uses its own elastic force to return to the unstretched state and drives the placement end 436 of the swinging member 430 to swing downward. At this time, the detected part 500 moves from the detection position to the non-detection position.

Embodiment 12

Except specifically stated, the structure in this embodiment is the same as that in Embodiment 9. The difference between Embodiment 12 and Embodiment 9 is that the structures of the detected part 500 and the transmission unit are different.

As shown in FIGS. 12.1 to 12.6, in one embodiment, only one idler gear 350 is provided between the agitator gear 310 and the driving gear 322, and the transmission assembly is also provided with a second idler gear 370. The second idler gear 370 meshes with the agitator gear 310. To receive force, the second idler gear 370 includes a first tooth portion and a second tooth portion. The first tooth portion meshes with the agitator gear 310 and the second tooth portion is a pin wheel. The first rotating member 410 no longer meshes directly with the agitator gear 310, but receives the force transmitted by the agitator gear 310 through the second idler gear 370. Correspondingly, the meshing portion 4104 of the first rotating member 410 is also a pin wheel, and the meshing portion 4104 meshes with the second tooth portion of the second idler gear 370.

The first rotating member 410 is provided with a protrusion for driving the swinging member 430 to move. The protrusion protrudes toward the first side 110. The protrusion and the gear portion 4104 are respectively located at two end surfaces of the first rotating member 410 in the first direction. The protrusion rotates following the rotation of the first rotating member 410. The protrusion preferably includes a first protrusion 6123, a second protrusion 6124, and a third protrusion 6125 spaced apart in the rotation direction of the first rotating member 410. In the rotation direction, the length of the first protrusion 6123 is larger than the length of the second protrusion 6124 and the length the third protrusion 6125.

The first rotating member 410 is integrally formed with a sleeve 299 coaxially, and the first rotating member 410 is rotatably mounted on the casing 100 through the sleeve 299. The accelerating protrusion 297 is provided on the sleeve 299. The accelerating protrusion 297 extends in the radial direction of the first rotating member 410. The accelerating protrusion 297 has an arc surface.

The first side 110 is also provided with an accelerating member used in conjunction with the accelerating protrusion 297. The accelerating member 190 is preferably a torsion spring. One end of the accelerating member 190 is a fixed end, and the other end of the accelerating member 190 is an accelerating end. The fixed end is used to make the accelerating member 190 be fixedly installed on the casing 100. The first side 110 is integrally formed with a limiting protrusion. The fixed end of the accelerating member 190 is provided with a first bending portion. The limiting protrusion is used to block the movement of the first bending portion to position the fixed end. The accelerating end of the accelerating member 190 extends rearward in a direction away from the developing roller 210. The accelerating end of the accelerating member 190 abuts the outer surface of the sleeve 299. The accelerating end of the accelerating member 190 is integrally formed with a second bending portion. The bending angle of the second bending portion is the same as the angle between the arc surface on the accelerating protrusion 297 and the circumferential surface of the sleeve 299, so that the second bending portion can be snapped into the angle between the arc surface on the accelerating protrusion 297 and the circumferential surface of the sleeve 299, thereby positioning the first rotating member 410, and preventing the first rotating member 410 from self-rotating due to influence from external vibration or shaking.

As shown in FIGS. 12.1 to 12.3, the swinging member 430 is swingably disposed at the fifth side 150 of the casing 100. The casing 100 is provided with a groove for facilitating the swinging of the swinging member 430 and preventing the swinging member 430 from detaching. The swinging member 430 is located in the groove, the swinging member 430 is driven by the first rotating member 410 to swing around an axis parallel to the third direction, or cross the third direction. Further, the first side of the swinging member 430 located at the first side 110 is contacted by the protrusion of the first rotating member 410 to swing relative to the casing 100.

The second elastic member 770 is disposed close to the second side 120. The second elastic member 770 is preferably a compression spring. The second elastic member 770 interacts with the swinging member 430. A mounting base 7601 is provided at the second side 120. The second elastic member 770 is located in the mounting base 7601. A support portion is provided on the swinging member 430. One end of the second elastic member 770 is in contact with the mounting base 7601, and the other end is in contact with the support portion. Then, the second elastic member 770 is abutted by the swing member 460 and is compressed to accumulate elastic force. The second elastic member 770 releases the elastic force to cause the swing member 460 to swing.

The detected part 500 is at least partially located at the second side 120. In one embodiment, the detected part 500 is preferably integrally formed at the second side of the swinging member 430 close to the second side 120. In some embodiments, the swinging member 430 and the detected part 500 may be connected separate parts.

When the swinging member 430 is contacted by the protrusion, the swinging member 430 has an angle with the first direction, the second elastic member 770 is compressed, and the detected part 500 is in the detection position and contacts the detecting part 10. The projection of the first side of the swinging member 430 in the third direction is located behind the projection of the rotation axis of the first rotating member 410 in the third direction.

When the swinging member 430 is not in contact with the protrusion, the swinging member 430 is parallel to the first direction, the second elastic member 770 releases at least part of its elastic force, and the detected part 500 is in the non-detecting position and is out of contact with the detecting part 10. The projection of the first side of the swinging member 430 in the third direction preferably overlaps with the projection of the rotation axis of the first rotating member 410 in the third direction. In the second direction, the detected part 500 is farther away from the developing roller 210 in the non-detection position than in the detection position.

The following is the operation process of the developing cartridge 1 according to one embodiment.

As shown in FIG. 12.4-FIG. 12.6, the developing cartridge 1 is installed to the drum cartridge 2 and together installed into the image forming device. When the developing cartridge 1 does not receive force, the first rotating member 410 is in the initial position and is engaged with the second idler gear 370, the first protrusion 6123 contacts the first side of the swing member 410, the detected part 500 contacts the detecting part 10 in the detection position, and the second elastic member 770 is compressed.

After the developing cartridge 1 receives force, the first rotating member 410 begins to rotate, thereby causing the first side of the swinging member 430 to disengage from the first protrusion 6123. The swinging member 410 swings under the action of the second elastic member 770, and the detected part 500 swings from the detection position to the non-detection position.

The first rotating member 410 continues to rotate, the first side of the swinging member 410 is contacted by the second protrusion 6124 and swings at the second speed, the second elastic member 770 is compressed, and the detected part 500 moves from the non-detection to the detection position at the second speed.

The first rotating member 410 continues to rotate, the first side of the swinging member 430 is out of contact with the second protrusion 6124, the swinging member 410 swings under the action of the second elastic member 770, and the detected part 500 swings from the detection position to the non-detection position.

The first rotating member 410 continues to rotate, the first side of the swinging member 410 is contacted by the third protrusion 6125 and swings at the second speed again, the second elastic member 770 is compressed, and the detected part 500 swings from non-detection to the detection position at the second speed.

The first rotating member 410 continues to rotate, the first side of the swinging member 430 is out of contact with the third protrusion 6125, the swinging member 410 swings under the action of the second elastic member 770, and the detected part 500 swings from the detection position to the non-detection position.

The first rotating member 410 continues to rotate, and the accelerating protrusion 297 contacts the accelerating end of the accelerating member 190, causing the accelerating member 190 to elastically deform and accumulate elastic force. When the first rotating member 410 rotates to the missing tooth portion and faces the second idler gear 370, the first rotating member 410 no longer receives the force transmitted by the second idler 370 and rotates. At this time, the accelerating member 190 releases the elastic force, and the accelerating end of the accelerating member 190 pushes the arc surface on the accelerating protrusion 297, so that the first rotating member 410 continues to rotate at a faster speed. The first protrusion 6123 contacts the swinging member 430 again, the swinging member 430 swings at the first speed, and the detected part 500 swings from the non-detection position to the detection position at the first speed, and maintains at the detection position, the first speed is greater than the second speed.

That is, in one embodiment, the torsion spring releases the elastic force to cause the first rotating member 410 to rotate at a faster speed, thereby allowing the detected part 500 to trigger the detecting part 10 at a faster speed, allowing the image forming device to identify the developing cartridge 1.

As shown in FIG. 12.7, in another embodiment, the swinging member 430 is disposed inside the casing 10 so that the swinging member is better protected by the casing 10, and an opening is provided on the casing 100 so that the swinging member 430 is driven by the first rotating member 410 and drives the detected part 500 to move. The first rotating member 410 may also receive force to rotate by being contacted by the protrusions, and the detected part 500 may also be contacted by the second side of the swinging member 430 to translate in the second direction to trigger the detecting part 10.

Embodiment 13

Except specifically stated, the structure in this embodiment is the same as that in Embodiment 12. The difference between Embodiment 13 and Embodiment 12 is that the structures of the detected part 500 and the transmission unit are different.

As shown in FIG. 13.1, in one embodiment, the rotating rod 400 extends in the first direction. The first side of the rotating rod 400 located at the first side 110 is connected to the first rotating member 410, and the second side located at the second side 120 is connected to the detected part 500, or the rotating rod 400 is integrally formed with the detected part 500. The rotating rod 400 receives the force transmitted by the first rotating member 410 to rotate, and drives the detected part 500 to rotate. The rotation axis of the detected part 500 is parallel to the first direction.

The detected part 500 is provided with a detected protrusion for triggering the detecting part 10. The detected protrusion protrudes from the detected part in the first direction. There are multiple detected protrusions, and the plurality of detected protrusions are arranged at intervals in the rotation direction. When the detected part 500 rotates, the detected protrusions trigger the detecting part 10 in sequence.

In some embodiments, the rotating rod 400 may be coaxially disposed with the agitator 270 or both may be integrally disposed, further simplifying the structure of the developing cartridge 1.

As shown in FIG. 13.2, in other embodiments, the detected part 500 does not rotate. The detected part 500 is driven by the rotating rod 400 to slide relative to the casing 100 and triggers the detecting part 10. The rotating rod 400 is provided with a driving part 4001 at the second side 120. The driving part 4001 is provided with a plurality of driving protrusions protruding in the first direction. When the rotating rod 410 rotates, the driving protrusions abut the detected part 500, so that the detected part 500 moves forward in the second direction to trigger the detecting part 10. The detected part 500 is connected with a restoring part 5000, which is preferably a tension spring. The restoring part 5000 is used to make the detected part 500 move backward in the second direction, so that the detected part 500 can be abutted by the driving protrusion to trigger the detecting part 10 multiple times.

In another embodiment, the detected part 500 is driven by the rotating rod 400 to swing, and its swing axis is perpendicular to the first direction, preferably parallel to the second direction.

Embodiment 14

Except specifically stated, the structure in this embodiment is the same as that in Embodiment 12. The difference between Embodiment 14 and Embodiment 12 is that the structures of the detected part 500 and the transmission unit are different.

As shown in FIGS. 14.1 and 14.2, the transmission unit in one embodiment includes a first rotating member 410 and a second rotating member 402 both located at the first side 110, and the second rotating member 402 receives the force transmitted by the first rotating member 410 to move. The second rotating member 402 is preferably a swing rod, the swing axis of which is parallel to or slightly crosses the first direction.

The second rotating part 402 is provided with a first swinging part 4021 at one end in the first direction and a second swing part 4022 at the other end. The first swinging part 4021 is used to contact the protrusion on the first rotating member 410. The second swing part 4022 is used to drive the detected part 500 to move relative to the casing 100. The position where the second swing part 4022 contacts the detected part 500 is located between the first side 110 and the second side 120 of the casing 100. Preferably, the distance between the second swing part 4022 and the first side 110 in the first direction is greater than the distance between the second swing portion 4022 to the second side 120. The cross-sectional shapes of the first swinging part 4021 and the second swing part 4022 are both cam shapes. The first swinging part 4021 and the second swing part 4022 are both arranged on the circumferential surface of the second rotating member 402 and protrude in the radical direction of the second rotating member 402.

The detected part 500 is formed into a rod-shaped structure. The detected part 500 extends in the first direction. The detected part 500 includes a first force-bearing end 5006 and a detected portion 5007 respectively located at the first force-bearing end 5006 and the detected portion 5007 at the two ends of the detected part 500 in the first direction. The first force-bearing end 5006 is disposed close to the first side 110, and the detected portion 5007 is located at the second side 120 and at least partially extends out of the second side 120. When the first swinging part 4021 contacts the protrusion on the first rotating member 410, the second rotating member 402 rotates following the rotation of the first rotating member 410, so that the second swinging part 4022 drives the detected part 500 to move to the detection position, causing the detected portion 5007 to push the detecting part 10 of the image forming device so that the image forming device generates an electrical signal.

A second elastic member 770, preferably a tension spring, is connected between the detected part 500 and the casing 100. When the detected part 500 slides from the non-detection position to the detection position, the second elastic member 770 is stretched and generates an elastic force. The second elastic member 770 releases the elastic force so that the detected part slides from the detection position to the non-detection position, and the second rotating member 402 and the second elastic member 770 cause the detected part 500 to reciprocate in the second direction.

The casing 100 is provided with guide members 1506 extending in the second direction. The guide members 1506 are provided on both sides of the casing 100. There is a hollow rectangular hole in the middle of the guide member 1506. The two ends of the detected part 500 are respectively provided in the rectangular hole. The guide member 1506 has the function of guiding the movement of the detected part 500. The detected part 500 can base the guide member 1506 to perform reciprocating motion, ensuring the movement direction of the detected part 500, thereby ensuring that the detected part 500 can be stable when moving to push the detecting part 10 to cause the image forming device to generate an electrical signal.

The second rotating member 402 is sleeved with a third elastic member 750, which is preferably a torsion spring. One end of the third elastic member 750 is connected to the first swinging part 4021, and the other end is connected to the first protective cover 610. The second rotating member 402 compresses the third elastic member 750 when rotating, causing the third elastic member 750 to generate elastic force. When the first rotating member 410 rotates until the protrusion is out of contact with the first swinging part 4021, the third elastic member 750 releases the elastic force to reset the second rotating member 402.

In one embodiment, when the transmission assembly drives the first rotating member 410 to rotate, the protrusion on the first rotating member 410 interferes with the first swinging part 4021 on the second rotating member 402, causing the second rotating member 402 to rotate relative to the casing 100, and causing the second swing portion 4022 on the second rotating member 402 to drive the detected part 500 to move relative to the casing 100, so that the image forming device can obtain information about the developing cartridge.

In some embodiments, the first rotating member 410 may directly drive the detected part 500.

Embodiment 15

Except specifically stated, the structure in this embodiment is the same as that in Embodiment 1. The difference between Embodiment 15 and Embodiment 1 is that the structures of the detected part 500 and the transmission unit are different.

As shown in FIGS. 15.1 to 15.6, in one embodiment, the transmission unit includes a transmission member, a first rotating member 410, and a second idler gear 370. Both the first rotating member 40 and the second idler gear 370 are rotatably arranged on the second side 120, and their rotation axis is parallel to the first direction. In some embodiments, the first rotating member 40 and the second idler gear 370 may also be disposed at the first side 110. The transmission member is preferably the agitator 270. The second idler gear 370 is set on one end of the agitator 270 at the second side 120 and rotates with the agitator 270. In some embodiments, its axis of rotation can also be set separately from the agitator 270. The second idler gear 370 is a sheave wheel. The second idler gear 370 transmits force to the first rotating member 410 to rotate the first rotating member 410, or the first rotating member 410 is directly sleeved on the agitator 270.

The first rotating member 410 is provided with a first protrusion 381 and a second protrusion 382 protruding in the first direction, and a third protrusion 383 protruding in the radial direction. The rotation radius of the third protrusion 383 is larger than that of the first protrusion 381 and the second protrusion 383. The first protrusion 381 and the second protrusion 382 are used to drive the detected part, and the central angle of the first protrusion 381 is greater than the corresponding central angle of the second protrusion 382.

As shown in FIG. 15.1, FIG. 15.2, and FIG. 15.3, a first slider 207*a* and a second slider 207*b* are also provided at the second side 120. The first slider 207*a* is the detected part in one embodiment.

The second protective cover 620 is provided with a guide rail 6202 extending in the second direction, and both the first slider 207*a* and the second slider 207*b* are slidably installed in the guide rail 6202. The first slider 207*a* is closer to the developing roller 210 in the second direction than the second slider 207*b*. The end of the first slider 207*a* close to the developing roller 210 in the second direction is the detected portion 5007. The guide rail 6202 is integrally formed with a support seat extending in the first direction. The first slider 207*a* is provided with a mounting recessed hole 207*c*. The support seat extends into the mounting recessed hole 207*c*. The first elastic member 188 is installed on the support seat between the side walls of the mounting recessed hole 207*c*. The first elastic member 188 is used to reset the first slider 207*a*. A second lever 207*a*1 (first force-bearing end) is integrally formed on the first slider 207*a*, and the second lever 207*a*1 is located within the movement trajectory of the first protrusion 381 and the second protrusion 382.

The end of the guide rail 6202 away from the developing roller 210 in the second direction is integrally formed with a support plate 121*a*. The end of the guide rail 6202 close to the developing roller 210 in the second direction is an opening for the detected portion 5007 to extend. The support seat is located between the support plate 121*a* and the opening in the second direction. The second slider 207*b* has a mounting slot integrally formed in the second direction. One end of the mounting slot close to the support plate 121*a* is not closed. A second elastic member 189 is installed in the mounting slot. One end of the second elastic member 189 is in contact with one end of the mounting slot away from the support plate 121*a* in the second direction, and the other end of the second elastic member 189 abuts with the support plate 121*a*. The elastic coefficient of the second elastic member 189 is greater than that of the first elastic member 188. The second slider 207*b* has a first limiting opening 121*b*, and the first limiting opening 121*b* is positioned at the lower side wall of the mounting slot. A second limiting opening is opened in the slide rail, and the second limiting opening is located in the slide rail between the support seat and the support plate 121*a*. An end of the second slider 207*b* close to the support plate 121*a* is integrally formed with a first limiting protrusion 207*b*1, and the guide rail 6202 is integrally formed with a second limiting protrusion 207*b*2 that matches the first limiting protrusion 207*b*1.

As shown in FIGS. 15.3 and 15.5, a third rotating member 208*a* is also provided at the second side 120. The third rotating member 208*a* serves as a rotatable support for the second protective cover 620. The rotational axis of the third rotating member 208*a* is parallel to the first direction, and the third rotating member 208*a* is located below the second limiting opening. The third rotating member 208*a* is cylindrical, and a third limiting protrusion 207*b*3 is integrally formed on the circumferential surface of the third rotating member 208*a*. A driven protrusion 209*c*1 is also integrally formed on the circumferential surface of the third rotating member 208*a*, and the driven protrusion 209*c*1 is located within the movement trajectory of the third protrusion 383. A reset arm 331 is integrally formed on the circumferential surface of the third rotating member 208*a*. The end of the reset arm 331 away from the third rotating member 208*a* is integrally formed with a stopper 332. The second protective cover 620 has a reset hole for the reset arm 331 to extend. The size of the reset opening is smaller than the size of the stopper 332, so that the stopper 332 cannot pass through the reset opening.

The third rotating member 208*a*, the second slider 207*b*, and the second elastic member 189 constitute the transmission assembly 208.

The first slider 207*a* has a third state and a fourth state.

In the third state, the detected portion 5007 of the first slider 207*a* extends out of the slide groove, and the first elastic member 188 is compressed and accumulates elastic force.

In the fourth state, the detected portion 5007 of the first slider 207*a* is further away from the developing roller 210 than in the third state, and the first elastic member 188 releases at least part of the elastic force.

The following is the operation process of the developing cartridge 1 according to one embodiment.

The developing cartridge 1 has a factory default state. In the factory default state, the second lever 207*a*1 contacts the first protrusion 381 and is position-limited, so that the first slider 207*a* remains in the third state and cannot be reset under the action of the first elastic member 188. At the same time, the first limiting opening 121*b* and the second limiting opening are in an aligned position, the second elastic member 189 is in a compressed state, the third limiting protrusion 207*b*3 is inserted into the first limiting opening 121*b* and the second limiting opening, and the third limiting protrusions 207*b*3 abut against the side wall of the second limiting opening on the side away from the support plate 121*a* in the second direction. As a result, the second slider 207*b* is caught and limited by the third limiting protrusion 207*b*3, so that the elastic force of the second elastic member 189 cannot be released.

When the developing cartridge 1 is installed on the drum cartridge 2 in the image forming device, the detected portion 5007 on the developing cartridge 1 in the initial state is in a state of extending out of the slide rail. Therefore, during the process of installation of the developing cartridge 1 on the drum cartridge, the detected portion 5007 pushes the detecting part 10 in the image forming device for the first time, causing the detecting part 10 to generate an electrical signal, thereby causing the image forming device to detect that the developing cartridge 1 is installed.

As shown in FIGS. 15.3 to 15.6, when the developing cartridge 1 receives the driving-force output from the image forming device, the first rotating member 410 starts to rotate following the agitator 270.

As the first rotating member 410 rotates, when the first protrusion 381 is out of contact with the second lever 207*a*1, under the elastic force of the first elastic member 188, the first slider 207*a* moves to the fourth state, where the detected part 5007 no longer pushes the detecting part 10.

As the first rotating member 410 rotates, the second protrusion 382 contacts the second lever 207*a*1, and the second protrusion 382 pushes the second lever 207*a*1 to move in the second direction toward the developing roller 210, so that the first slider 207*a* moves to the third state again, and the detected portion 5007 pushes the detecting part 10 for the second time.

As the first rotating member 410 rotates, the second protrusion 382 no longer contacts the second lever 207*a*1. Under the elastic force of the first elastic member 188, the first slider 207*a* moves to the fourth state, where the detected part 5007 no longer pushes the detecting part 10.

As the first rotating member 410 rotates, the third protrusion 383 moves the driven protrusion 209*c*1, thereby driving the third rotating member 208*a* to rotate counterclockwise, so that the third rotating member 208*a* drives the third limiting protrusion 207*b*3 to rotate counterclockwise. The third limiting protrusion 207*b*3 is moved out from the first limiting opening 121*b* and the second limiting opening, so that the second slider 207*b* is no longer limited by the third limiting protrusion 207*b*3, and the elastic force accumulated in the second elastic member 189 is released. Under the elastic force of the second elastic member 189, the second slider 207*b* moves along the slide rail to the position where the first limiting protrusion 207*b*1 and the second limiting protrusion 207*b*2 are in contact. During the movement of the second slider 207*b*, the second slider 207*b* hits the first slider 207*a*, causing the first slider 207*a* to move to the third state again, and the detected portion 5007 pushes the detecting part 10 for the third time. At the same time, the elastic coefficient of the second elastic member 189 is greater than that of the first elastic member 188. Therefore, the elastic force of the first elastic member 188 cannot overcome the elastic force of the second elastic member 189, so that the first slider 207*a* cannot be reset, so that the first slider 207*a* remains in the third state, and the detected portion 5007 continues to push the detecting part 10. At the same time, the first protrusion 381 and the second protrusion 382 can no longer contact the second lever 207*a*1, completing the detection process.

By selecting the second elastic member 189 with a larger elastic coefficient, the movement speed of the first slider 207*a* after being hit by the second slider 207*b* is the first speed, which is greater than the second speed of the first slider 207*a* when the first slider 207*a* is pushed by the first protrusion 381 and the second protrusion 382. Optionally, a second elastic member 189 with a smaller elastic coefficient can also be used, so that the second speed is greater than the first speed. Through the above design, the first slider 207*a* can be made to have different movement speeds, and the image forming device can detect changes in the movement speed of the first slider 207*a*, thereby detecting the information of the developing cartridge.

When the third rotating member 208*a* rotates, it will drive the reset arm 331 to make a circular motion together, so that the reset arm 331 drives the stopper 332 to move toward the second protective cover 620. When it is necessary to reset the transmission unit and the detected part, it is only necessary to first rotate the third rotating member 208*a* to the initial position, and then press the second slider 207*b* into the slide rail, so that the first limit opening 121*b* and the second limiting openings are aligned, and then the stopper 332 is pulled, so that the reset arm 331 pulls the third rotating member 208*a* to rotate, and the third rotating member 208*a* drives the third limiting protrusion 207*b*3 to snap into the first limiting opening 121*b* and the second limiting opening again. The reset of the first slider 207*a* and the second slider 207*b* is completed. Preferably, the reset arm 331 can be made of elastic material. When the third rotating member 208*a* is rotated by the third protrusion 383, the reset arm 331 elastically deforms and accumulates elastic force. When the first limiting opening 121*b* is aligned with the second limiting opening, under the elastic action of the reset arm 331, the third rotating member 208*a* automatically rotates, so that the third limiting protrusion 207*b*3 automatically snaps into the first limiting opening 121*b* and the second limiting opening 121*b*, completing the reset.

Embodiment 16

Except specifically stated, the structure in this embodiment is the same as that in Embodiment 1. The difference between Embodiment 16 and Embodiment 1 is that the position of the transmission assembly is different.

As shown in FIG. 16.1, the developing cartridge 1 and drum cartridge 2, the developing gear 330, the developer feeding gear 340, and the agitator gear 310 are respectively positioned at the ends of the developing roller 210, the developer feeding roller 260, and the agitator 270 located at the second side 120 in the first direction. The idler gear 350 is rotatably disposed at the second side 120.

The photosensitive drum 80 is provided with a first gear 801 and a second gear 802 at two ends in the first direction. When the developing cartridge 1 is installed on the drum cartridge 2, the first gear 801 is close to the first side 110 of the developing cartridge 1, and the second gear 802 is close to the second side 120. The photosensitive drum 80 receives the driving-force output from the image forming device and rotates to receive the developer delivered by the developing cartridge 1. The second gear 802 meshes with the developing gear 330 to transmit force. That is, in one embodiment, the developing gear 330 serves as the coupling of the developing cartridge 1, and the developing gear 330 transmits force to the remaining gears and the developing assembly.

The detected part 500 receives the force transmitted by the developing gear 330 to move and trigger the detecting part 10. The detected part 500 is located at the second side 120, that is, the detected part 500 and the coupling are positioned at the same side of the developing cartridge 1.

In some embodiments, the developing gear 310 is located at the first side 110 and the photosensitive drum 80 is only provided with a first gear 801, the developing gear 310 is meshed with the first gear 801 to receive force.

Embodiment 17

Except specifically stated, the structure in this embodiment is the same as that in Embodiment 1. The difference between Embodiment 17 and Embodiment 1 is that the structure of the detected part and the transmission unit are different.

As shown in FIGS. 17.1 to 17.10, in one embodiment, another developing cartridge 1 is provided. The cover 1601 is located at the bottom of the casing 100, that is, the sixth side 160. The cover 1601 is fixed on the casing 100 by welding or glue.

The holder 830 is detachably installed on the first protective cover 310 to be installed on the casing 100. It can also be directly installed on the casing 100. The storage medium 820 is fixedly installed on the holder 830. In the second direction, the distance between the electrical contact surface 810 of the storage medium 820 and the fourth side 140 is smaller than the distance between the electrical contact surface 810 and the third side 130. The electrical contact surface 810 is located behind the coupling 320 in the second direction.

A second mounting bracket 1202 is detachably installed on the second side 120 of the casing 100. The second mounting bracket 1202 has a conductive hole 12021 for the first electrical contact portion 911 to extend out. The conductive member 910 of the conductive assembly 900 can be installed on the second mounting bracket 1202. The second mounting bracket 1202 is used to rotatably support the left end of the developing roller 210 and the developer feeding roller 260. The second mounting bracket 1202 is detachably installed on the second side 120, therefore the developing roller 210 and the developer feeding roller 260 are indirectly supported by the second side 120.

In one embodiment, the conductive member 910 of the conductive assembly 900 may be a conductive steel sheet. The conductive member 910 includes a first electrical contact portion 911 and a second electrical contact part 912. The first electrical contact portion 911 is in contact with and electrically connected to the second protective cover 620 on the casing 100. The second electrical contact part 912 is in contact with and electrically connected to the developer feeding roller 260. The developer feeding roller 260 is electrically connected to the developing roller 210 for transmission electrical force. The conductive member 910 is fixed on the second side 120 by the second mounting bracket 1202. The first electrical contact portion 911 of the conductive member 910 is in the shape of a raised sheet. After the second protective cover 620 is installed on the second side 120, the second protective cover 620 presses on the first electrical contact portion 911, so that the first electrical contact portion 911 is elastically deformed, and the first electrical contact portion 911 and the second protective cover 620 are kept in close contact under the action of elastic force to avoid poor contact.

The first rotating member is coaxially arranged with the agitator shaft 220 of the agitator 270, and is used to provide rotational force for the agitator shaft 220. The agitator shaft 220 is formed into a hollow columnar structure. The first rod portion 428 of the translational member 420 is located in the agitator shaft 220. The first rod portion 428 extends in the first direction and penetrates the casing 100, and is in a sliding fit with the agitator shaft 220, the first rod portion 428, and the agitator shaft 220. The first rod portion 428 does not rotate with the agitator shaft 220. The above arrangement is beneficial to reducing the space occupied by the transmission member inside the casing 100, and can also reduce the contact between the first rod portion 428 and the developer. In some embodiments, the first rod portion 428 may not be disposed inside the agitator shaft 220, but may be disposed in parallel inside the casing 110.

As shown in FIGS. 17.3 and 17.4, the transmission assembly includes a agitator gear 310 that is rotatably mounted on the first side 110. In one embodiment, the agitator gear 310 is the first rotating member. In some embodiments, the first rotating member can also be provided separately. The agitator gear 310 is provided with a second transmission protrusion 312, that is, a protrusion. The second transmission protrusion 312 can be integrally formed with the agitator gear 310, or can be combined snap-fit. The second transmission protrusion 312 is provided with a second transmission surface 3121, that is, a driving surface. The second transmission protrusion 312 extends in the circumferential direction of the agitator gear 310. The second transmission protrusion 312 protrudes leftward out of the left end of the agitator gear 310 in the first direction. That is, the protrusion protrudes to the left in the first direction and continuously extends in the rotation direction of the agitator gear 310. The second transmission surface 3121 extends continuously in a curved shape, or may also extend in a bent manner. In the rotation direction of the agitator gear 310, the starting end of the extension of the second transmission surface 3121 is closer to the end surface of the agitator gear 310 facing away from the first side 110 in the first direction than the ending end. In one embodiment, the coupling 320 is provided with two driving gears 322. The two driving gears 322 are arranged in the first direction, and the diameters of the two driving gears 322 are different. The two driving gears 322 are respectively meshing with different gears in the transmission assembly to transmit driving force.

The translational member 420 extends in the first direction, and the translational member 420 is capable of displacing relative to the casing 100 in the first direction. The second transmission protrusion 312 is configured to abut one end of the translational member 420.

The first side 110 of the casing 100 is provided with a first through hole penetrating the first side 110 in the first direction, and the second side 120 is provided with a second through hole penetrating the second side 120 in the first direction. The first through hole and the second through hole are coaxially arranged. The translational member 420 is in the shape of a long cylindrical rod. The translational member 420 moves in the first direction and is inserted into the first through hole and the second through hole, and is supported by the first through hole and the second through hole. The right end of the translational member 420 is integrally formed with a first driven part 421. The first driven part 421 protrudes from the circumferential surface of the translational member 420 in the radial direction of the translational member 420. The first driven part 421 is located at the first side 110 and is located outside the casing 100 through the first through hole.

The translational member 420 has a preparation position and a contact position. In the preparation position, the first driven part 421 on the translational member 420 is in contact with the left end surface of the agitator gear 310 or the starting end of the second transmission surface 3121. In the contact position, the translational member 420 is in contact with the end of the second transmission surface 3121. When the translational member 420 is in the preparation position, the entire translational member 420 is further to the right than when it is in the contact position. When the developing cartridge is in the factory default state, the translational member 420 is in the preparation position.

As shown in FIG. 17.5, when the developing cartridge 1 is in operation, the force receiving part 321 receives the driving-force output from the image forming device and rotates, thereby driving the developing roller 210, the developer feeding roller 260, and the agitator 270 to rotate. During the rotation of the agitator gear 310, the second transmission protrusion 312 rotates together with the agitator gear 310, so that the agitator gear 310 rotates from the left end surface of the agitator gear 310 or in contact with the first driven part 421 to the second transmission protrusion 312. The extending starting end of the second transmission surface 3121 contacts the first driven part 421 and then rotates until the end of the second transmission surface 3121 contacts the first driven part 421. The agitator gear 310 contacts the first driven part 421 from the left end surface. During the contact movement, when the end of the second transmission surface 3121 comes into contact with the first driven part 421, the first driven part 421 is driven by the second transmission surface 3121 to drive the translational member 420 to move from the preparation position to the contact position. And the translational member 420 is stopped at the contact position. The translational member 420 causes the detected part 500 to move relative to the casing 100 during the movement.

As shown in FIG. 17.1, FIG. 17.2, and FIG. 17.5-FIG. 17.7, a second protective cover 620 is provided on the second side 120, and the detected part 500 is rotationally installed on the second protective cover 620. The rotation axis of the detected part 500 is perpendicular to the first direction. The transmission unit also includes a slider 490 installed at the other end of the translational member 420. The slider 490 is provided with a push protrusion 491, and the push protrusion 491 is configured to push the detected part 500 to rotate to the detection position.

The detected part 500 is a lever structure, and the detected part 500 includes a second pivot part 520, a first arm 510, and a second arm 530. The second protective cover 620 is detachably installed on the second side 120. The second protective cover 620 is integrally provided with two third support seats 628. The third support seats 628 are each provided with support openings 6281. The support openings 6281 are formed to penetrate the third support seat 628 in the second direction, and the right end of the support opening 6281 is not closed. The second pivot part 520 can be pressed from the right end of the support opening 6281 to enter the support opening 6281. The second pivot part 520 is rotatably installed in the support opening 6281 and is rotatably supported by the third support seat 628. The second pivot part 520 can rotate around a rotation axis perpendicular to the first direction. In one embodiment, the rotation axis of the second pivot part 520 is parallel to the second direction. In other embodiments, the axis of rotation of the second pivot part 520 can also be in other directions.

The second side 120 of the casing 100 is integrally provided with a blocking column 1203. The blocking column 1203 protrudes leftward out of the second side 120 in the first direction. After the second pivot portion 520 of the detected part 500 is installed into the support opening 6281, the second protective cover 620 is fastened on the second side 120, the blocking column 1203 blocks the right end opening of the support opening 6281, so that the second pivot part 520 is prevented from falling off from the support opening 6281.

One end of the translational member 420 located at the second side 120 is the first force applying part 4201. The first force applying part 4201 can at least partially extend out the casing 100. The slider 490 and the first force applying part 4201 realize force transmission. It is fixedly installed on the first force applying part 4201, and the slider 490 can move together with the translational member 420. The slider 490 includes an integrally formed main body portion 492, an extension portion 493, a second guide portion 494, and a pushing protrusion 491. The main body part 492 is provided with a fixing hole 4921 for the first force applying part 4201 to insert. The first force applying part 4201 is provided with a buckle that can produce elastic deformation in the radial direction of the translational member 420. After the first force applying part 4201 is inserted into the fixing hole 4921, the buckle elastically deforms. After the first force-applying part 4201 extends out of the fixing hole 4921, the elastic deformation of the buckle disappears and the first force-applying part 4201 buckles the fixing hole 4921 to prevent the slider 490 from falling off the translational member 420. The extension portion 493 is integrally formed and extends downward from the lower surface of the main body portion 492. The left end of the extension portion 493 is integrally connected to the second guide portion 494. The second guide portion 494 has an outer circumferential surface with a central axis parallel to the first direction. The second protective cover 620 is integrally provided with a second guide rail 626. The second guide rail 626 has an inner circumferential surface that matches the outer circumferential surface of the second guide portion 494. The second guide portion 494 can slide in the first direction in the second guide rail 626 and be restricted to only moving in the first direction. The front end of the pushing protrusion 491 is provided with a pushing slope 4911, and the left end of the pushing slope 4911 is closer to the upper side than the right end.

The first arm 510 is integrally connected to the right side of the second pivot part 520, the second arm 530 is integrally connected to the left side of the second pivot part 520, and the second protective cover 620 is provided with a window 622 for the second arm 530 to extend out. The first arm 510 is provided with a matching slope 511 that matches the pushing slope 4911, so that the contact and force transmission between the first arm 510 and the pushing protrusion 491 are smooth. The second protective cover 620 is also integrally provided with a mounting surface 627, and a second elastic member 760 is fixedly installed on the mounting surface 627. The second elastic member 760 is located below the first arm 510. When the detected part 500 is in the detection position, the pushing protrusion 491 contacts the first arm 510, and the second arm 530 contacts the detecting part 10 in the image forming device and pushes the detecting part 10 so that the detecting part 10 is displaced, thereby causing the image forming device to generate an electrical signal. That is, in one embodiment, the second arm 530 is the detected portion. When the detected part 500 is in the non-detection position, the second arm 530 is in contact with the detecting part 10, but the second arm 530 cannot move the detecting part to a position where an electrical signal is generated in the image forming device. The second elastic member 760 is preferably a sponge. In other embodiments, the second elastic member 760 may also be a compression spring or other parts. When the detected part 500 rotates from the non-detecting position to the detecting position, the second elastic member 760 is compressed and accumulates elastic force. The second elastic part 760 releases the elastic force so that the detected part 500 rotates from the detecting position to the non-detecting position.

In one embodiment, the detected part 500 and the second protective cover 620 are made of conductive materials. The second arm 530 of the detected part 500 is in contact with and electrically connected to the power supply terminal in the image forming device, thereby receiving electrical power and transmitting the electrical power through the third support seat 628 to the second protective cover 620. The second protective cover 620 transmits the power to the conductive member 910 through the first electrical contact portion 911, the conductive member 910 transmits the power to the developer feeding roller 260 through the second electrical contact portion 912, the developer feeding roller 260 transmits the force to the developing roller 210, so that both the developing roller 210 and the developer feeding roller 260 receive electric power provided by the image forming device. In some embodiments, it may also be an electrical receiving member that is separately provided for contacting the power supply terminal, and the electrical receiving member is electrically connected to the developing roller 210.

As shown in FIGS. 17.8 and 17.9, during the process of the translational member 420 moving from the preparation position to the contact position, the slider 490 receives the driving force transmitted by the translational member 420 and follows the translational member 420 to move leftward in the first direction. At the same time, with the cooperation of the second guide part 494 and the second guide rail 626, the slider 490 can only move in the first direction. The push protrusion 491 moves to the left together with the slider 490, so that the push slope 4911 on the push protrusion 491 contacts the matching slope 511 on the first arm 510, thereby causing the first arm 510 to rotate around the second pivot portion 520 to swing downward and to cause the second elastic member 760 to be compressed to produce elastic deformation. The first arm 510 swings downward to cause the second pivot portion 520 to drive the second arm 530 to swing upward, thereby causing the second arm 530 to push the detecting part 10 in the image forming device to the position where an electrical signal can be generated in the image forming device. The electrical signal is the generated in the image forming device, thereby allowing the image forming device to identify the developing cartridge.

In other embodiments, the number of the pushing protrusions 491 may be two or more, with intervals provided between the plurality of pushing protrusions 491, and each pushing protrusion 491 can push the first arm 510 down once when passing through the first arm 510, causing the second arm 530 to swing upward once, thereby generating an electrical signal in the image forming device. The number of times the electrical signal is generated enables the image forming device to determine more information about the developing cartridge (such as model number, capacity, life), and the time interval between two adjacent electrical signals can be adjusted by adjusting the size of the interval between adjacent push protrusions 491. The time duration during which the detected part 500 stays in the detection position can be adjusted by adjusting the size of the push protrusion 491. By adjusting the above parameters, the image forming device can determine different information related to the developing cartridge, which can greatly expand the richness of information, allowing the detection assembly to record more information related to the developing cartridge and provide it to the image forming device, facilitating the image forming device to judge the information of the developing cartridge and display it to the user, such as the remaining life, whether it is old or new, whether the model of the developing cartridge matches the model of the image forming device, etc., thereby improving the user experience.

The detected part 500 provided in one embodiment is also suitable for other developing cartridges with a translational member 420, and the translational member 420 does not rotate relative to the casing.

As shown in FIG. 17.11, in another embodiment, the conductive member 910 further includes a second electrical contact portion 912 and a third electrical contact portion 915. The second electrical contact portion 912 is in contact with the developer feeding roller 260 to transmit electrical force. The layer thickness regulating blade 290 is at least partially made of conductive material. The third electrical contact portion 915 is in contact with the layer thickness regulating blade 290 to transmit electric force. The layer thickness regulating blade 290 is in contact with the developing roller 210 to transmit electric force, thereby realizing the electrical connection between the developing roller 210 and the conductive member 290.

Embodiment 18

Except specifically stated, the structure in this embodiment is the same as that in Embodiment 17. The difference between Embodiment 18 and Embodiment 17 is that the structure of the detected part and the transmission unit are different.

As shown in FIG. 18.1 and FIG. 18.2, the first rotating member 410 is transmissionally connected to the agitator gear 310 as separate part. The first transmission protrusion 417 is an annular structure protruding on the outer wall of the first rotating member 410. The transmission unit includes the translational member 420 extends in the first direction. The translational member 420 can be displaced relative to the casing 100 in the first direction. The first transmission protrusion 417 abuts one end of the translational member 420.

The first transmission protrusion 417 extends in the radial direction of the first rotating member 410 toward the axis direction away from the first rotating member 410. In one embodiment, the connecting rod 419 is disposed on the side of the main body of the first rotating member 410 facing away from the first side 110. The connecting rod 419 can also be disposed on the first transmission protrusion 417, which is not limited herein. The agitator gear 310 and the first rotating member 410 have a connected state and a separated state. In the connected state, the agitator gear 310 rotates to drive the first rotating member 410 to move so that the first rotating member 410 moves closer to the first side 110 of the casing 100. In the separated state, the first rotating member 410 does not follow the rotation of the agitator gear 310 to make any movement, and the two are in the separated state.

The transmission unit also includes a support member 470 installed on the first side 110. The support member 470 is sleeved on the outside of the agitator shaft, and the support member 470 does not rotate together with the agitator shaft. The first rotating member 410 is sleeved on the support member 470. At least one of the first rotating member 410 and the support member 470 has a separation slope that intersects with the first direction. The first rotating member 410 and the support member 470 are connected through the separation slope, so that the first rotating member 410 can be displaced relative to the casing 100 in the first direction.

When the first rotating member 410 rotates relative to the casing 100, under the action of the separation slope, the first rotating member 410 can be displaced relative to the casing 100 in the first direction, and then the first rotating member 410 can be separated from the transmission assembly, completing the detection process of the developing cartridge 1.

A threaded portion 471 is provided on the outer circumferential surface of the support member 470, and the separation slope is provided on the threaded portion 471. A first protruding rib 4109 threadedly connected to the threaded portion 471 is provided on the inner circumferential surface of the first rotating member 410.

The first protruding rib 4109 can extend into the interior of the threaded portion 471 and move in the extending direction of the threaded portion 471. The support member 470 forms a hollow cylindrical structure, and the support member 470 is fixedly connected to the first side 110 of the casing 100. The first rotating member 410 is movably disposed on the support member 470. The support member 470 can support the first rotating member 410 to rotate thereon, and at the same time, can allow the first rotating member 410 to move relative thereto in the first direction. The main body part of the first rotating member 410 forms a cylindrical structure that is sleeved outside the support member 470. The inner diameter of the cylindrical structure is larger than the outer diameter of the support member 470. The support member 470 is also provided with a fixed arm 472 that can be fixedly connected to the first side 110 of the casing 100. That is, the support member 470 is fixedly connected to the first side 110 through the fixed arm 472. The first transmission protrusion 417 is provided on the outer wall of the first rotating member 410, and the first transmission protrusion 417 is located at an end of the main body portion of the first rotating member 410 close to the first side 110.

In other embodiments, the threaded portion 471 can also be provided on the inner wall of the main body of the first rotating member 410, and the first rib 4109 can be provided on the outer surface of the support member 470, which can also realize axial movement of the rotating member on the support member 470.

When the first protruding rib 4109 extends into the threaded portion 471, the threaded portion 471 can guide and limit the first protruding rib 4109. The first rotating member 410 can stably displace relative to the casing 100 in the first direction when rotating.

The translational member 420 forms a rod-shaped structure extending in the first direction. The translational member 420 is at least partially located outside the casing 100. The casing 100 is provided with a second slide groove 158 within which the translational member 420 can move. The second slide groove 158 is provided with two second limiting portions 1581 that can prevent the translational member 420 from being detached from the second slide groove 158. The second slide groove 158 is a recessed groove provided on the surface of the casing 100. The two ends of the recessed groove respectively have a through hole for the translational member 420 to pass through, and the positions of the two through holes form the second limiting portions 1581 respectively. The portion of the translational member 420 located at the first side 110 of the casing 100 is provided with a first driven part 421 that can abut with the first transmission protrusion 417.

When the first rotating member 410 rotates relative to the casing 100, the first rotating member 410 synchronously displaces relative to the casing 100 in the first direction, and the first transmission protrusion 417 on the first rotating member 410 pushes the translational member 420 to move in the first direction and relative to the casing 100, so that the detected part 500 moves relative to the casing 100, and the image forming device can obtain information about the developing cartridge.

As shown in FIGS. 18.3 to 18.5, the developing cartridge 1 also includes a turning protrusion 1211. The turning protrusion 1211 is displaced relative to the casing 100 in the first direction as the translational member 420 moves. The detected part 500 is driven by the turning protrusion 1211 to be displaced in a direction intersecting the first direction.

When the translational member 420 moves, it drives the turning protrusion 1211 to move, and the turning protrusion 1211 drives the detected part 500 to move relative to the casing 100, so that the image forming device can obtain information about the developing cartridge.

A second protective cover 620 is provided on the second side 120, and a window 622 is provided on the second protective cover 620. The detected part 500 penetrates through the window 622 and is slidably connected to the second protective cover 620. The turning protrusion 1211 is provided at one end of the translational member 420 facing the second side 120. The detected part 500 is provided with a first matching protrusion 560. At least one of the turning protrusion 1211 and the first matching protrusion 560 has a third transmission surface 1221 inclined relative to the first direction. In one embodiment, both are provided with the third transmission surface 1221. The turning protrusion 1211 is used to push the first matching protrusion 560 to drive the detected part 500 to slide.

The second protective cover 620 is detachably mounted on the second side 120 of the casing 100. The detected part 500 extends out of the window 622. The second protective cover 620 is provided with a first guide part 623 at the window 622, capable of guiding the movement of the detected part 500. The detected part 500 is provided with a first limiting groove 507 matching the first guide part 623.

The part of the translational member 420 located at the second side 120 of the casing 100 is connected to a driving arm 4210 that can drive the detected part 500 to move in the first guide part 623. The driving arm 4210 includes a first connecting arm 42101 and a second connecting arm 42102 connected to the first connecting arm 42101. The first connecting arm 42101 is substantially parallel to the end surface of the second side 120 of the casing 100. The second connecting arm 42102 extends in a direction away from the second side 120. The turning protrusion 1211 is provided on the upper end surface of the second connecting arm 42102. The first matching protrusions 560 are provided on the lower end surface of the detected part 500. The number of the first matching protrusions 560 can be set as needed. In one embodiment, two first matching protrusions 560 are provided and, when the translational member 420 drives the turning protrusion 1211, the detected part 500 can be driven to move up and down twice along the first guide portion 623. That is, it can be detected twice by the detecting device in the image forming device.

When the translational member 420 is displaced relative to the casing 100 in the first direction, the turning protrusion 1211 will interfere with the first matching protrusion 560, causing the detected part 500 to move from the non-detection position to the detection position through the third transmission surface 1221.

When the two first matching protrusions 560 are provided on the lower end surface of the detected part 500 and the translational member 420 moves from the first side 110 toward the second side 120 in the first direction, the turning protrusion 1211 on the second connecting arm 42102 first moves against the first matching protrusion 560 to cause the detected part 500 to move from the non-detection position to the detection position, being detected for the first time. When the turning protrusion 1211 moves between the two first matching protrusions 560, the detected part 500 moves from the detection position to the non-detection position, and the detection circuit in the image forming device stops generating electrical signals. As the translational member 420 continues to move, the turning protrusion 1211 of the second connecting arm 42102 moves against the second first matching protrusion 560, so that the detected part 500 moves from the non-detection position to the detection position, being detected for the second time.

The developing cartridge 1 also includes a second elastic member 760. The second elastic member 760 is connected to the detected part 500. The second elastic member 760 is configured to drive the detected part 500 to move to the non-detection position.

The second elastic member 760 may be a spring, and the spring is connected between the upper end surface of the detected part 500 and the second protective cover 620. In other embodiments, the gravity of the detected part 500 itself can be used to cause the detected part 500 to move from the detection position to the non-detection position when the first matching protrusion 560 is disengaged from the turning protrusion 1211.

The operation principle of the developing cartridge provided in one embodiment is described as follows.

As shown in FIG. 18.6, when the developing cartridge 1 receives external driving force, the agitator gear 310 and the first rotating member 410 are in a connected state, and the connecting rod 419 of the first rotating member 410 is always in the through hole 311 of the agitator gear 310. When the agitator gear 310 rotates, it drives the first rotating member 410 to rotate. Since the first protruding rib 4109 of the first rotating member 410 cooperates with the threaded portion 471 of the support member 470, the first rotating member 410 moves in the first direction, so that the first transmission protrusion 417 abuts against the first driven part 421.

As shown in FIG. 18.7, when the first rotating member 410 further moves toward the first side 110 of the casing 100, the first transmission protrusion 417 pushes the first driven part 421 to move toward the second side 120 of the casing 100, thereby pushing the translational member 420 to be displaced relative to the casing 100 in a first direction, so that the detected part 500 moves relative to the casing 100 in the third direction and triggers the detecting part 10.

As shown in FIG. 18.8, as the agitator gear 310 rotates, the first rotating member 410 further moves toward the first side of the casing 100, and the first rotating member 410 moves away from the agitator gear 310 during axial movement, so that the agitator gear 310 and the first rotating member 410 are in a separated state. That is, the connecting rod 419 of the first rotating member 410 is detached from the through hole 311 of the agitator gear 310, and the two are in a separated state. At this time, the position of the detected part 500 is fixed. The detection process of the developing cartridge is completed, and the information of the developing cartridge is also transmitted to the image forming device, so that the developing cartridge can be used normally.

During resetting, the developing cartridge and drum cartridge need to be taken out from the image forming device, and the detected part 500 is moved to disengage the first matching protrusion 560 from the turning protrusion 1211. At this time, the driving arm 4210 is pushed toward the second side 120 of the casing 100, and the first matching protrusion 560 returns to the position in contact with the first turning protrusion 1211, completing the reset.

Embodiment 19

Except specifically stated, the structure in this embodiment is the same as that in Embodiment 18. The difference between Embodiment 19 and Embodiment 18 is that the structure of the detected part and the transmission unit are different.

As shown in FIGS. 19.1 and 19.2, the transmission unit includes a swinging member 430 that is pivotably mounted on the casing 100. The first transmission protrusion 417 is configured as one end pushing the swinging member 430 to drive the swinging member 430 relative to the casing 100 to swing.

The casing 100 is provided with a swing slot 156 on which the swinging member 430 can move. The swing slot 156 is provided with a first rotation shaft 157 around which the swinging member 430 can rotate and swing. The first rotation shaft 157 is in the swing slot 156 protrudes outward, and the swing rod has an shaft hole that matches the first rotation shaft 157. The rotating shaft can also be arranged on the swing rod, and the swing groove 156 is provided with a shaft hole for the rotating shaft to be inserted. The swing grooves 156 are arranged oppositely in the second direction. The swing grooves 156 extend toward the first side 110 of the casing 100 while extending toward the fourth side 140 of the casing 100. The swing grooves 156 extend toward the second side 120 of the casing 100. direction while extending toward the third side 130 of the casing 100. The swing axis of the swinging member 430 intersects with any tangent line on the rotation trajectory of the first rotating member 410. The swinging member 430 is provided with second protruding ribs 437. There are two second protruding ribs 437, which are respectively disposed on both sides of the first rotation shaft 157 on the swinging member 430 to enhance the structural stability of the swinging rod.

As shown in FIG. 19.1, the first protective cover 610 is provided with a first limiting member 615 capable of limiting one end of the swinging member 430, and the second protective cover 620 is provided with a first limiting member 615 capable of limiting the other end of the swinging member 430. The second limiting member 621 can ensure that the swinging member 430 always moves within the swing groove 156.

The end of the swinging member 430 located at the first side 110 of the casing 100 is provided with a first driven portion 438 that can abut against the first transmission protrusion 417, and the first driven portion 438 is configured as an arc surface that can abut against the first transmission protrusion 417.

When the first rotating member 410 rotates, the block-shaped first transmission protrusion 417 interferes with the end of the swinging member 430, thereby driving the swinging member 430 to swing relative to the casing 100, causing the detected part 500 to move relative to the casing 100.

As shown in FIGS. 19.1 and 19.2, the detected part 500 is arranged at one end of the swinging member 430 at the second side 120 of the casing 100, and the detected part 500 is positioned at the side of the swinging member 430. The detected part 500 and the swinging member 430 can be formed by one-piece molding or can be combined as separate parts. The detected part 500 includes a sloped portion 506 and a curved portion 505. One end of the sloped portion 506 is connected to the swinging member 430, and the other end of the sloped portion 506 is connected to the curved portion 505. During the movement of the detected part 500, the curved part 505 can be directly detected by the detecting part 10 in the image forming device. That is, the curved part 505 is the detected part, and the outer surface of the curved part 505 is an arc surface to ensure contact with the detection device and to protect the detection device when contacting the detection device, increasing the service life.

Through the above arrangement, when the swinging member 430 swings relative to the casing 100, the detected part 500 and the swinging member 430 move synchronously, and the transmission structure is simple and stable.

As shown in FIG. 19.3, when the developing cartridge 1 does not receive external driving force, the agitator gear 310 and the first rotating member 410 are in a connected state, and the detected part 500 does not trigger the detecting part 10.

As shown in FIGS. 19.4 and 19.5, the developing cartridge 1 receives external driving force, the first rotating member 310 rotates following the agitator gear 310, the first rotating member 410 moves in the first direction, and the first transmission protrusion 417 abuts against the arc surface of the first driven part 438. When the first rotating member 410 further moves toward the first side 110 of the casing 100, the first transmission protrusion 417 pushes the first driven part 438 to swing toward the rear of the casing 100, causing the swinging member 430 to swing around the first rotation shaft 157, thereby driving the detected part 500 to move to the detection position and triggering the detecting part 10.

Embodiment 20

Except specifically stated, the structure in this embodiment is the same as that in Embodiment 17. The difference between Embodiment 20 and Embodiment 17 is that the structure of the detected part and the transmission unit are different.

As shown in FIGS. 20.1 to 20.9, in one embodiment, the transmission unit of the developing cartridge 1 includes a first rotating member 410 and a third rotating member 440. The first side 110 of the casing 100 is provided with a first protective cover 610, and the first protective cover 610 is provided with a contact member 612. A first protrusion 6123 is provided on the contact member 612. The third rotating member 440 is located outside the first rotating member 410 and is slidingly connected to the first rotating member 410. The first protrusion 6123 abuts the first rotating member 410. An end of the first rotating member 410 away from the contact member 612 is drivingly connected to the detected part 500.

As shown in FIGS. 20.1 to 20.5, the first rotating member 410 can move in the first direction and is supported by the outer surface of the fifth side 150 of the casing 100 (it can also be located inside the casing 100). A second slide groove 158 is integrally formed on the outer surface of the fifth side 150 of the casing 100, and the second slide groove 158 extends in the first direction. The first rotating member 410 is disposed in the second slide groove 158. The first rotating member 410 is cylindrical. The first side 110 of the casing 100 has a first support hole. The first rotating member 410 passes through the first support hole and is movably supported by the first support hole. The first support hole is aligned with the second slide groove 158 in the first direction.

The part of the first rotating member 410 extending out of the second slide groove 158 passes through the third rotating member 440. The third rotating member 440 is in the shape of a hollow cylinder. A gear portion 4104 is integrally formed on the circumferential surface of the third rotating member 440. In one embodiment, the gear portion 4104 is provided with multiple teeth (that is, in one embodiment, the third rotating member 440 may not be configured as an incomplete gear), and the gear portion 4104 meshes with the agitator gear 310.

The first contact protrusion 412 is positioned at the circumferential surface of the portion of the first rotating member 410 that protrudes from the second slide groove 158. A sliding key 41421 is protruding from the circumferential surface of the portion of the first rotating member 410 that protrudes out the second slide groove 158. The sliding key 41421 and the first contact protrusion 412 can be provided on the first rotating member 410 through an integral molding process, or they can be combined separately. The third rotating member 440 has two sliding grooves 4441, one of which cooperates with the sliding key 41421, and the other sliding groove 4441 cooperates with the first contact protrusion 412. The sliding key 41421 and the first contact protrusion 412 can respectively move in the first direction relative to the corresponding sliding key 41421. The first contact protrusion 412 is further away from the first side 110 of the casing 100 than the sliding key 41421 in the first direction. The first rotating member 410 is rotatably supported by the third rotating member 440. The first rotating member 410 can rotate together with the third rotating member 440.

As shown in FIGS. 20.1 to 20.3, the first protective cover 610 is removably and fixedly installed on the first side 110 of the casing 100. The first protective cover 610 covers the transmission assembly to protect the transmission assembly. The first protective cover 610 is provided with the contact member 612 on a side facing the casing 100 in the first direction. The contact member 612 includes an annular portion and a first protrusion 6123 integrally formed on one end of the annular portion facing the casing 100 in the first direction. The first protrusion 6123 is provided with a first driving surface I1, and the annular portion is aligned with the first contact protrusion 412 on the first rotating member 410 in the first direction. The upstream portion of the surface I1 in the rotation direction of the first contact protrusion 412 is farther from the casing 100 than the downstream portion. The first driving surface I1 is used to interfere with the first contact protrusion 412 and thereby provide an action force in the first direction for the first rotating member 410.

When the coupling 320 receives the driving-force output from the image forming device and drives the agitator gear 310 to rotate, the agitator gear 310 can drive the third rotating member 440 to rotate. The first rotating member 410 and the third rotating member 440 rotate synchronously. The interference between the contact member 612 and the first rotating member 410 causes the first rotating member 410 to displace relative to the casing 100 in the first direction.

The transmission unit also includes a translational member 420. One end of the first rotating member 410 away from the contact member 612 abuts one end of the translational member 420, which is the first driven part. The other end of the translational member 420 is transmissionally connected to the detected part 500, which is the first force applying part, and the first driven part and the first force applying part are the two ends of the translational member 420 in the first direction.

The translational member 420 is in the shape of a cylindrical rod, and the translational member 420 is accommodated in the second slide groove 158. In the first direction, the first driven part of the translational member 420 is closer to the first side 110 of the casing 100 than the second side 120 of the casing 100. The first force-applying portion of the translational member 420 extends beyond the second side 120 of the casing 100. The first rotating member 410 is aligned with the translational member 420 in the first direction, and one end of the first rotating member 410 away from the first protective cover 610 is in contact with the first driven part of the translational member 420. When the first rotating member 410 is displaced relative to the casing 100 in the first direction, the first rotating member 410 drives the detected part 500 to move relative to the casing 100 through the translational member 420, thereby causing the detected part 500 to trigger the detecting part 10.

When the coupling 320 receives force and rotates, the force is transmitted to the agitator gear 310. The agitator gear 310 drives the third rotating member 440 to rotate. The third rotating member 440 drives the first rotating member 410 to rotate through the cooperation of the sliding groove 4441 and the sliding key 41421. The first contact protrusion 412 rotates in the rotation direction with the first rotating member 410, and the first contact protrusion 412 moves along the side of the contact member 612 toward the first side 110 and interferes with the first driving surface I1 of the first protrusion 6123, so that the first contact protrusion 412 receives the force provided by the first driving surface I1 and drives the first rotating member 410 to move leftward relative to the casing 100 in the first direction. The first rotating member 410 pushes the translational member 420 to move leftward relative to the casing 100 in the first direction. The first translational member 420 causes the detected part 500 to move relative to the casing 100 and triggers the detecting part 10 so that the image forming device generates an electrical signal, and the image forming device can obtain information about the developing cartridge 1.

When the used developing cartridge 1 is installed into the image forming device again, the translational member 420 has moved from the first side 110 of the casing 100 to the second side 120 of the casing 100 (the left direction in the first direction) to the maximum value. Thus, the detected part 500 cannot move and the image forming device cannot generate an electrical signal. Therefore, it can be determined that the developing cartridge is a previously used developing cartridge 1.

As shown in FIG. 20.1, and FIG. 20.6-FIG. 20.7, the detected part 500 is slidably installed on the second side 120. The second side 120 is provided with a driving part 121 and a second matching protrusion 122. The turning protrusion 1211 is provided on the driving part 121. The driving part 121 can be displaced relative to the casing 100 in the first direction, and the second matching protrusion 122 is configured to push the turning protrusion 1211 to drive the driving part 121 to be displaced in a direction intersecting the first direction. The driving part 121 is configured to drive the detected part 500 to slide relative to the casing 100. At least one of the turning protrusion 1211 and the second matching protrusion 122 has a third transmission surface 1221 that is inclined relative to the first direction.

There is an angle between the sliding direction of the detected part 500 and the first direction. That is, the detected part 500 can be displaced relative to the casing 100 in a direction intersecting the first direction. The driving part 121 is slidably mounted on the detected part 500 in the first direction.

The second side 120 of the casing 100 is integrally formed with a guide portion 128. The guide portion 128 protrudes from the second side 120 of the casing 100 in the first direction and away from the casing 100. A guide groove 128 is formed on the guide portion 128. In one embodiment, the second guide groove 1281 is preferably a dovetail groove. The extension direction of the second guide groove 1281 is the fourth direction. The fourth direction is not orthogonal to the second direction or the third direction, and the fourth direction is orthogonal to the first direction. In one embodiment, the angle between the fourth direction and the second direction is preferably about 38°, and the angle between the fourth direction and the third direction is preferably about 51°. The detected part 500 is slidably installed on the second guide groove 1281. The detected part 500 is integrally formed with a guide protrusion 5001 that cooperates with the second guide groove 1281. The guide protrusion 5001 cooperates with the second guide groove 1281 so that the detected part 500 can move in the fourth direction. The detected protrusion 508 (i.e., the detected portion) is integrally formed on the detected part 500. The detected protrusion 508 protrudes from the detected part 500 in the first direction away from the casing 100. The detected protrusion 508 is used to contact the detecting part 10 in the image forming device and to move the detecting part 10 so that an electrical signal is generated in the image forming device to detect the developing cartridge 1. The second side 120 of the casing 100 is also integrally formed with a first positioning column 127 extending in the first direction away from the casing 100. A second elastic member 760 is fixedly connected to the first positioning column 127. In one embodiment, the second elastic member 760 is a tension spring. One end of the second elastic member 760 is fixedly connected to the first positioning column 127 and the other end is fixedly connected to the detected part 500.

The detected part 500 is integrally formed with a third sliding groove 509 extending in the first direction, and the driving part 121 is slidably installed in the third sliding groove 509. The driving part 121 includes a cylinder, a sliding part 1212, and two turning protrusions 1211. The sliding part 1212 and the two turning protrusions 1211 are both disposed on the circumferential surface of the cylinder. The sliding part 1212 is slidingly connected to the third slide groove 509, one of the turning protrusions 1211 is farther from the second side 120 of the casing 100 in the first direction than the other turning protrusion 1211.

A second support hole is opened on the second side 120 of the casing 100. The second support hole is aligned with the second sliding groove 158 in the first direction. The first force-applying part of the translational member 420 is movably supported by the second support hole and extends out of the second slide groove 158 through the second support hole. The driving part 121 is aligned with the first force-applying portion of the translational member 420 in the first direction.

An interfering portion 126 is integrally formed on the second side 120 of the casing 100. The interfering portion 126 protrudes out the second side 120 of the casing 100 in the first direction and away from the casing 100. The interfering portion 126 is provided with second matching protrusions 122. The number of the second matching protrusions 122 is preferably two. The two second matching protrusions 122 are positioned at the movement trajectories of the two turning protrusions 1211 in one-to-one correspondence. Each turning protrusion 1211 and each second matching protrusion 122 are provided with a third driving surface 1221. In other embodiments, the third driving surface 1221 may be provided only on the turning protrusion 1211, or the third driving surface 1221 may be provided only on the second matching protrusion 122

When the translational member 420 is displaced relative to the casing 100 in the first direction, the translational member 420 drives the driving part 121 to synchronously displace relative to the casing 100 in the first direction and, through the matching between the turning protrusion 1211 and the second matching protrusion 122, drives the detected part 500 to be displaced relative to the casing 100 in a direction crossing the first direction.

When the translational member 420 moves to the left in the first direction, the driving part 121 moves together with the translational member 420. One of the turning protrusions 1211 first interferes with the corresponding second matching protrusion 122 on the interfering portion 126. Under the action of the third driving surface 1221, the detected part 500 is driven to move in the fourth direction. That is, the detected part 500 moves from the non-detection position to the detection position, and the detected protrusion 508 on the detected part 500 moves the detecting part in the image forming device, causing the electrical signal to be generated in the image forming device for the first time.

As the driving part 121 continues to move, the second matching protrusion 122 and the turning protrusion 1211 are separated from each other. Under the elastic force of the second elastic member 760, the detected part 500 is reset in the fourth direction. That is, the detected part 500 moves from the detection point back to the non-detection position, and the image forming device stops generating the electrical signal.

As the driving part 121 continues to move, another turning protrusion 1211 interferes with another second matching protrusion 122 and, under the action of the third driving surface 1221, the detected part 500 is driven to move from the non-detection position to the detection position again. The electrical signal is generated within the image forming device for the second time.

As the driving part 121 continues to move, the other turning protrusion 1211 and the other second matching protrusion 122 are separated from each other. Under the elastic force of the second elastic member 760, the detected part 500 moves from the detection position to the non-detection position. The image forming device stops generating electrical signals, thereby completing the detection process. At this time, the translational member 420 moves to the maximum value.

The image forming device determines the information of the developing cartridge 1 (such as newness, model, capacity, life, etc.) based on the number, intervals, and duration of electrical signal generation. The distance between the detected protrusion 508 and the developing roller 210 when the detected part 500 is in the non-detection position is smaller than the distance between the detected protrusion 508 and the developing roller 210 when the detected part 500 is in the detection position.

In other embodiments, more turning protrusions 1211 can be provided on the driving part 121 to set different times of generation of the electrical signals, and the spacing between the turning protrusions 1211 can also be adjusted to set the interval time between electrical signal generations. The moving speed of the translational member 420 or the length of the second matching protrusion 122 is used to adjust the duration of the electrical signal generation.

As shown in FIGS. 20.8 and 20.9, the number of the turning protrusions 1211 is one, and the number of the second matching protrusions 122 is multiple. The plurality of second matching protrusions 122 are arranged at intervals in the first direction. The plurality of second matching protrusions 122 are positioned at the movement trajectory of the turning protrusion 1211.

The number of the second matching protrusions 122 may be two, and one of the second matching protrusions 122 is closer to the casing 100 than the other second matching protrusion 122 in the first direction. The driving part 121 is also provided with a second driven portion 1213 aligned with the translational member 420 in the first direction, and the second guide groove 1281 extends in a direction parallel to the second direction. The detected part 500 is slidably installed on the second guide groove 1281 through the guide protrusion 5001 and can move in the second direction.

This structure can simplify the structure of the driving part 121, facilitate the production and manufacturing of the developing cartridge 1, help reducing the space occupied by the transmission structure at the second side 120 of the casing 100, and facilitate the miniaturization of the developing cartridge 1.

The developing cartridge 1 also includes a power supply assembly. The power supply assembly includes a conductive protrusion 5002 disposed on the detected part 500. The conductive protrusion 5002 protrudes from the detected part 500 in the first direction away from the casing 100. In the second direction, the conductive protrusion 5002 is further away from the developing roller 210 than the detected protrusion 508. The power supply assembly also includes a conductive member 910 disposed at the second side 120 of the casing 100. The conductive member 910 is electrically connected to the developing roller 210 and the developer feeding roller 260. The conductive member 910 is provided with a first electrical contact portion 911. In one embodiment, the conductive member 910 is a metal sheet, the first electrical contact portion 911 is a bent contact pin integrally formed with the conductive part 910, and the first electrical contact portion 911 is elastic, and the first electrical contact portion 911 abuts the detected part 500 and produces elastic deformation to ensure close contact with the detected part 500 during its movement. In one embodiment, the detected part 500 is made of conductive material, such as conductive resin.

When the translational member 420 moves from the first side 110 to the second side 120 in the first direction, the translational member 420 pushes the second driven portion 1213 on the driving part 121 to the left in the first direction, so that the driving part 121 moves leftward in the first direction, and the turning protrusion 1211 passes the second matching protrusion 122 that is closer to the casing 100 and interferes with the second matching protrusion 122, causing the driving part 121 to drive the detected part 500 to move in the second direction, along the second guide groove 1281, from the non-detection position to the detection position, thereby causing the image forming device to generate an electrical signal.

During the detection process, the conductive protrusion 5002 remains in contact with the power supply terminal in the image forming device, and transmits the electric power to the conductive assembly 910 through the detected part 500 and then to the developing roller 210 and the developer feeding roller 260, so that the developing roller 210 and the developer feeding roller 260 is charged and can absorb the developer.

In addition, in one embodiment, the second side 120 of the casing 100 can also be provided with a second protective cover 620. The second protective cover 620 covers at least part of the detected part 500, the driving part 121, the second elastic member 760, the conductive assembly 910 and the like, to protect those components. The second protective cover 620 is provided with an opening for the detected protrusion 508 and the conductive protrusion 5002 to extend out of the second protective cover 620.

Embodiment 21

Except specifically stated, the structure in this embodiment is the same as that in Embodiment 20. The difference between Embodiment 21 and Embodiment 20 is that the structures of the detected part and the transmission unit are different.

As shown in FIGS. 21.1 to 21.7, in one embodiment, the coupling 320 includes a driving gear 322 and a force receiving part 321. The force receiving part 321 includes a cylindrical portion, a first recessed portion, and a force receiving protrusion. The cylindrical portion and the driving gear 322 are arranged coaxially. The first recessed portion is a cylindrical recessed space formed by recessing from the right end of the cylindrical portion to the left. The force receiving protrusion is integrally formed in the first recessed portion. The outer circumferential surface of the cylindrical portion is the force receiving surface 3211. The force receiving surface 3211 is used to receive the backward thrust exerted by the image forming device to move the developing cartridge 1 backward so that the developing roller 210 no longer contacts the photosensitive drum 80.

The transmission unit includes a first rotating member 410 and a translational member 420 that is drivingly connected to the first rotating member 410. The first rotating member 410 and the translational member 420 are disposed inside the casing 100. The inside of the agitator shaft 220 of the agitator 270 is hollow. The first rotating member 410 and the translational member 420 are movably supported by the agitator shaft 220. The translational member 420 is aligned with the first rotating member 410 in the first direction, so that the left end of the first rotating member 410 can push the right end of the translational member 420. In some embodiments, an additional support shaft may be provided to support the first rotating member 410 and the translational member 420, thereby protecting the first rotating member 410 and the translational member 420 from being easily damaged. That is, in one embodiment, the third rotating member is no longer provided separately, the agitator gear 310 can be the third rotating member, and the first rotating member 410 and the agitator gear 310 rotate coaxially.

The first rotating member 410 is provided with a tapered portion 41020 at one end away from the contact member 612. The tapered portion 41020 abuts against the translational member 420. The tapered portion 41020 is integrally formed at the left end of the first rotating member 410. The tapered portion 41020 extends in the first direction and the portion 41020 has a gradually decreasing radius from left to right. The left end, i.e., the small diameter end of the tapered portion 41020 abuts the right end of the translational member 420. Through the above arrangement, the contact area between the first rotating member 410 and the translational member 420 can be reduced, and the friction between the first rotating member 410 and the translational member 420 can be reduced, so that the transmission unit can perform transmission more smoothly.

The contact position between the left end of the first rotating member 410 and the right end of the translational member 420 is preferably in the middle of the casing 100 in the first direction, that is, a position from ¼ to ¾ of the length of the casing 100 in the first direction. The length of the first rotating member 410 in the first direction and the length of the translational member 420 in the first direction are both greater than ¼ of the length of the casing 100 in the first direction.

This structure prevents the translational member 420 or the first rotating member 410 from being too long, causing the first rotating member 410 or the translational member 420 to be easily bent in the direction crossing the first direction, thereby improving the transmission stability of the transmission unit.

When the first rotating member 410 is displaced relative to the casing 100 in the first direction, the translational member 420 can be pushed to move synchronously with the first rotating member 410, and the movement of the translational member 420 causes the detected part 500 to move.

As shown in FIGS. 21.2 and 21.3, the second side 120 of the casing 100 is detachably installed with a second connecting part 640 (second mounting bracket). The second connecting part 640 rotatably supports the left end of the developing roller 210 and the developer feeding roller 260. The second side 120 of the casing 100 is integrally formed with a first joint portion 129 that protrudes to the left from the second side 120 of the casing 100. The first joint portion 129 is used to receive a backward thrust from the image forming device to cause the developing cartridge 1 to move backward so that the developing roller 210 and the photosensitive drum 80 are no longer in contact. The second connecting member 640 has a through hole for the first joint part 129 to pass through, and the first joint part 129 is inserted into and extends out of the through hole. The first joint portion 129 is located between the rotation axis of the developing roller 210 and the detected protrusion 508 of the detected part 500 in the second direction.

In one embodiment, the force receiving surface 3211 can be regarded as the second joint part. Under the joint action of the force receiving surface and the first joint part 129, the force on both sides of the developing cartridge is ensured to be balanced, and preventing the developing cartridge 1 from swerving during the separation process of the developing roller 210 and the photosensitive drum 80.

The conductive member 910 is supported by the second connecting member 640 and the casing 100, and is located between the second connecting member 640 and the casing 100 in the first direction. The conductive member 910 includes a first electrical contact portion 911, a second electrical contact portion 912, and a third electrical contact portion 915. The second electrical contact portion 912 and the third electrical contact portion 915 are in contact with the developer feeding roller 260 and the developing roller 210 respectively.

As shown in FIGS. 21.2 to 21.5, the second protective cover 620 is provided with second matching protrusions 122. Preferably, the number of the second matching protrusions 122 is two. The two second matching protrusions 122 are arranged at intervals in the first direction, and are all provided with a third driving surface 1221. The extension direction of the third driving surface 1221 intersects the first direction and the third direction. It is preferable that the third driving surface 1221 extends to the left in the second direction while extending upward in the third direction.

The first connecting member 630 is detachably mounted on the second side 120 of the casing 100. The first connecting member 630 is provided with a guide portion 128, and the guide portion 128 is provided with a second guide groove 1281. The second guide groove 1281 is preferably a dovetail groove. The extension direction of the second guide groove 1281 intersects the first direction and the second direction, and is preferably parallel to the third direction. The first connecting member 630 has a guide hole 632 for the translational member 420 to pass in the first direction. The projections of the translational member 420 and the guide hole 632 in the first direction are both D-shaped. The translational member 420 can move in the first direction and is supported and position-limited by the guide hole 632, thereby preventing the translational member 420 from rotating. The guide portion 128 is also provided with a conductive opening 1282 connected with the second guide groove 1281.

The detected part 500 is slidably mounted on the first connecting member 630 in the third direction. The detected part 500 includes a guide protrusion 5001 extending in the third direction. The guide protrusion 5001 slidingly matches with the second guide groove 1281 so that the detected part 500 can slide along the second guide groove 1281 in the third direction. The front end surface of the guide protrusion 5001 is integrally formed with a forwardly protruding conductive rib 5003. The conductive rib 5003 moves in the third direction along the second guide groove 1281 following the movement of the detected part 500. The conductive rib 5003 remains at least partially exposed by the conductive opening 1282 during the movement process. The first electrical contact portion 911 of the conductive member 910 is inserted into the conductive opening 1282 and pressed against the left end surface of the conductive rib 5003 under the action of elastic force.

The rear edge of the second connector 640 is integrally formed with a pressing portion 641 that protrudes and extends backward. The pressing portion 641 is used to press the first electrical contact portion 911 against the conductive rib 5003 to ensure stable contact between the conductive assembly 910 and the detected part 500. The pressing part 641 is positioned at the left side of the first electrical contact portion 911 in the first direction, and the first electrical contact portion 911 is positioned at the left side of the conductive rib 5003. The projection of the pressing portion 641 in the direction is at least partially overlaps with the projection of the first electrical contact portion 911 and the conductive rib 5003 in the first direction.

The front end surface of the driving part 121 is provided with a sliding portion 1212. The sliding portion 1212 is a wedge-shaped protrusion extending in the first direction. The rear end surface of the detected part 500 is also provided with a third sliding groove 509 extending in the first direction. The sliding part 1212 is inserted into the third sliding groove 509 and can move in the first direction relative to the third sliding groove 509, and the third sliding groove 509 and the sliding portion 1212 are cooperatively arranged in the third direction. In the second direction, the driving part 121 is at least partially located behind the detected part 500. The driving part 121 is supported by the detected part 500 and further supported by the first connecting member 630, or may be directly supported by the first connecting member 630.

The driving part 121 is also provided with a turning protrusion 1211 and a second driven portion 1213. The turning protrusion 1211 is located at the rear end of the driving part 121 and is used to cooperate with the second matching protrusion 122 to cause the driving part 121 to change the direction of movement. The turning protrusion 1211 is provided with an inclined surface that cooperates with the third driving surface 1221, so that the turning protrusion 121 and the second matching protrusion 122 can cooperate more smoothly. It is also possible that at least one of the turning protrusion 1211 and the second matching protrusion 122 is provided with an inclined surface, and the extension direction of the inclined surface intersects the second direction and the third direction. The second driven portion 1213 is an end of the driving part 121 close to the first side 110 in the first direction, preferably in the shape of a bump. The second driven portion 1213 is used to be contacted by the translational member 420 so that the driving part 121 moves relative to the casing 10, and the driving part 121 moves in the first direction in the third sliding groove 509. That is, the driving part 121 follows the translational member 420 to move in the first direction.

When the driving part 121 moves in the first direction to the position where the turning protrusion 121 and one of the second matching protrusions 122 are in contact, the driving part 121 is acted upon by the third driving surface 1221 and moves to the left in the first direction while simultaneously moves upward in the third direction, and the driving part 121 drives the detected part 500 to move upward in the third direction in the second guide groove 1281, so that the detected protrusion 508 triggers the detecting part 10.

The second elastic member 760 is preferably a compression spring. It is located in the gap between the top of the detected part 500 and the top of the first connecting member 630 and can be compressed and stretched in the third direction. When the detected part 500 moves upward in the third direction, the second elastic member 760 is compressed. When the driving part 121 is driven by the translational member 420 and continues to move in the first direction, the turning protrusion 121 and the second matching protrusion 122 are out of contact, causing the driving part 121 to fall to the gap between the two second matching protrusions 122. The detected part 500 moves upward and downward in the third direction under the action of the elastic force released by the second elastic member 760, and the detected protrusion 508 is separated from and triggers the detecting part 10.

Since there are two second matching protrusions 122, in one embodiment, the detected part 500 can reciprocate up and down twice in the third direction and trigger the detecting part 10 twice.

In one embodiment, the detected part 500 is made of conductive material. The detected protrusion 508 is provided with an electrical receiving surface 5082. The inclination direction of the electrical receiving surface 5082 is set such that the front end is higher than the rear end. The electrical receiving surface 5082 is in contact with the power supply terminal in the image forming device to receive electric w, the detected part 500 transmits the electric power to the conductive assembly 900 and then to the developing roller 210 and the developer feeding roller 260.

During the detection process, the detected protrusion 508 always keeps in contact with the detecting part 10, and the electrical receiving surface 5082 always keeps in contact with the power supply terminal, so that the power supply is stable.

In another embodiment, the detected part 500 may also be driven by the translational member 420 to swing and trigger the detecting part 10, and the swing axis of the detected part 500 intersects with the first direction.

As shown in FIGS. 21.6 and 20.7, in one embodiment, the layer thickness regulating blade 290 includes a blade holder 280 and a blade 250. One end of the blade 250 is in contact with the circumferential surface of the developing roller 210 and the other end is fixedly connected to the blade holder 280. The blade holder 280 is detachably and fixedly installed on and supported by the fifth side 150 of the casing 100, and the blade holder 280 is located at the developer outlet. The blade holder 280 includes a second mounting part 281 and a third mounting part 282. The second mounting part 281 extends generally in the second direction, and the third mounting part 282 extends generally in the third direction. The upper end of the second mounting part 281 is integrally connected to the front end of the third mounting part 282 to form the blade holder 280 with an L-shaped projection on the first direction. The blade 250 is welded to the third mounting part 282. The third mounting part 282 is also provided with a layer thickness regulating blade mounting hole 2823. The third mounting part 282 is fixed to the third side 130 of the casing 100 through the layer thickness regulating blade mounting hole 2823. The left and right ends of the third mounting part 282 are integrally formed with positioning grooves 2824. The first side 110 of the casing 100 has a first inner surface opposite to the second side 120 in the first direction, and the second side 120 has a second inner surface opposite to the first side 110 in the first direction. A first positioning rib 1110 is integrally formed on the first inner surface, and a second positioning rib is integrally formed on the second inner surface. The first positioning rib 1110 and the second positioning rib are respectively matching with the positioning grooves 2824 on the left end and the right end of the third mounting portion 282, so as to position and support the blade holder 280. The lower end of the third mounting part 282 is also integrally provided with a buckle part 2825. The buckle part 2825 extends backward from the lower end of the third mounting part 282. The buckle part 2825 and the second mounting part 281 clamp the third side 130 of the casing 100. When the third side 130 of the casing 100 is subjected to an external force, the third side 130 of the casing 100 is supported by the buckle 2825, so that the external force received by the third side 130 is transmitted to the blade holder 280, thereby preventing the third side 130 of the casing 100 from being deformed, which may cause the developer to be squeezed out, resulting in developer leakage.

Embodiment 22

Except specifically stated, the structure in this embodiment is the same as that in Embodiment 21. The difference between Embodiment 22 and Embodiment 21 is that the structures of the detected part and the transmission unit are different.

As shown in FIGS. 22.1 to 22.5, the transmission unit includes a first rotating member 410 and a transmission part. The transmission part is a flexible part 401. The flexible part 401 is transmission connected to the detected part 500 and the first rotating member 410 respectively.

The first rotating member 410 is located at the first side 110 of the casing 100, and the first rotating member 410 is rotatably supported by the first side 110. The first side 110 is provided with a first support column 720 protruding in the first direction. The first rotating member 410 is sleeved on the first support column 720 and rotates around the first support column 720. The first rotating member 410 includes a first cylinder. A gear portion 4104 is integrally formed coaxially on the first cylinder. The gear portion 4104 is provided at an end of the first cylinder away from the first side 110 in the first direction. The gear portion 4104 meshes with the agitator gear 310, the gear portion 4104 has a missing tooth portion 41041. When the first rotating member 410 rotates to a position where the missing tooth portion 41041 faces the agitator gear 310, it is out of mesh with the agitator gear 310 and can no longer be driven to rotate by the agitator gear 310. Optionally, the gear portion 4104 can also mesh with other gears of the transmission assembly to receive force.

The flexible part 401 can be a rope, a thread, or a wire, which is flexible and capable of bending. The flexible part 410 transmits force from the first rotating member 410 to the detected part 500. In one embodiment, the length of the flexible part 401 is preferably longer than the length of the casing 100, and the flexible part 401 can extend from the first side 110 of the casing 100 to the second side 120.

The end of the flexible member 401 can be wrapped around the first rotating member 410, or part of the flexible member 401 is positioned at the movement trajectory of the first rotating member 410, so that the first rotating member 410 can interfere with the flexible member 401, thereby driving the flexible member 401 to move relative to the casing 100.

The transmission between the first rotating member 410 and the detected part 500 is through the flexible part 401. Compared with other transmission parts, the arrangement of the flexible part 401 is more flexible, and the flexible part 401 occupies a relatively smaller space, facilitating the miniaturization of the developing cartridge 1.

As shown in FIGS. 22.2 and 22.3, a first driving part 4110 is provided on the side of the first rotating member 410 toward the first side 110. The first driving part 4110 is a protrusion of the first cylinder protruding in the first direction facing toward the casing 100. The projection of the first driving part 4110 in the first direction is at least partially located outside the projection of the first cylinder in the first direction. The first driving part 4110 is used to interfere with the flexible part 401 when the first rotating member 410 rotates, so as to drive the flexible part 401 to move, and then drive the detected part 500 to move relative to the casing 100 through the flexible part 401.

The projection of the flexible member 401 in the first direction and the projection of the movement trajectory of the first driving part 4110 in the first direction at least partially overlap.

Through the above arrangement, the first driving part 4110 can interfere with the flexible part 401 and move the flexible part 401 when the first rotating member 410 rotates. Moreover, no other structure is required between the first rotating member 410 and the flexible part 401 to allow the flexible part 401 to move, which is beneficial to simplifying the space occupied by the transmission structure at the first side 110.

In other embodiments, an intermediate part can be provided between the flexible part 401 and the first rotating piece 410. When the first driving part 4110 rotates with the first rotating member 410, the intermediate part can be moved, and the intermediate part may interfere with the flexible part 401 and cause the flexible part 401 to move.

As shown in FIG. 22.2, a first limiting block 4011 is provided at one end of the flexible part 401, a limiting bump 111 is installed on the first side 110, and a first limiting hole 1111 is provided on the limiting bump 111. The flexible part 401 penetrates the first limiting hole 1111, the size of the first limiting block 4011 is larger than the size of the first limiting hole 1111.

The first limiting block 4011 is fixedly connected to the flexible part 401. The limiting bump 111 is provided on the first side 110 of the casing 100 through an integral molding process and protrudes in the first direction. The limiting bump 111 is also provided with a first insertion opening 1112. The flexible part 401 can be inserted into the first limiting hole 1111 through the first insertion opening 1112. The first insertion opening 1112 is connected with the first limiting hole 1111 and the first insertion opening 1112 is positioned at a side away from the casing 100 in the first direction compared to the first limiting hole 1111. The size of the flexible part 401 is smaller than the size of the first limiting block 4011. After the flexible part 401 is inserted into the first limiting hole 1111 from the first insertion opening 1112, when the flexible part 401 moves, the first limiting block 4011 abuts the first limiting hole 1111. Because the size of the first limiting block 4011 is larger than the first limiting hole 1111, the flexible part 401 will not protrude from the first limiting hole 1111.

The cooperation between the first limiting block 4011 and the limiting bump 111 is used to limit one end of the flexible part 401 toward the first side 110, to ensure that the first driving part 4110 can drive the flexible part 401 to move relative to the casing 100 when there is interference between the first driving part 4110 and the flexible part 401.

As shown in FIG. 22.2, the first side 110 is provided with a locking protrusion 112. The end of the locking protrusion 112 away from the first side 110 is provided with a guide slope 1121. The guide slope 1121 is configured to guide the flexible part 401 to cross the locking protrusion 112.

The locking protrusion 112 is provided on the first side 110 of the casing 100 through an integral molding process. The locking protrusion 112 protrudes in the first direction away from the casing 100 on the first side 110. The guide slope 1121 is located at the end of the locking protrusion 112 away from the casing 100 in the first direction. The end of the guide slope 1121 close to the flexible part 401 is closer to the casing 100 in the first direction than the end of the guide slope 1121 away from the flexible part 401. Before the flexible part 401 is driven by the first driving part 4110, the flexible part 401 is positioned at one side of the locking protrusion 112. When the flexible part 401 is driven by the first driving part 4110 and moves, the flexible part 401 contacts the guide slope 1121 of the locking protrusion 112, and is driven to move along the guide slope 1121, and then crosses the guide slope 1121, and is blocked on the lower side of the locking protrusion 112. The flexible part 401 breaks away from the movement trajectory of the first driving part 4110 and can no longer be driven by the first driving part 4110.

With this structure, the image forming device can obtain the old/new information of the developing cartridge 1. When the developing cartridge 1 completes the detection process, under the obstruction of the locking protrusion 112, the flexible part 401 breaks away from the movement trajectory of the first driving part 4110. When the developing cartridge 1 is loaded into the image forming device again after the detection process is completed, the flexible part 401 cannot move again, so the image forming device cannot generate an electrical signal, so that the image forming device determines that the developing cartridge is an old or used developing cartridge.

As shown in FIGS. 22.4 and 22.5, the detected part 500 is rotatably mounted on the second side 120, and a transition part 123 is rotatably mounted on the second side 120. The rotation axis of the transition part 123 is perpendicular to the first direction, preferably parallel to the second side. The other end of the flexible part 401 is wrapped around the transition part 123. The transition part 123 is provided with a toggle protrusion 1231 for toggling or triggering the detected part 500.

The detected part 500 and the transition part 123 are both rotatably mounted on the second protective cover 620. The second protective cover 620 is provided with a first pillar 624 and a second pillar 625 extending in the second direction. In the first direction, the second pillar 625 is further away from the second side 120 of the casing 100 than the first pillar 624. The transition part 123 is rotatably sleeved on the first pillar 624. The transition part 123 includes a second cylinder with a groove 1233 on its outer circumferential surface. The second side 120 of the flexible part 401 is wrapped around the groove 1233. The toggle protrusion 1231 is positioned at the outer circumferential surface of the transition part 123 and protrudes in the radial direction of the transition part 123, and the number of the toggle protrusion 1231 is at least one. In one embodiment, the number of the toggle protrusions 1231 is two, which are distributed at intervals along the circumference of the transition part 123. When the transition part 123 is driven to rotate by the flexible part 401, the toggle protrusions 1231 also rotate synchronously.

The detected part 500 is rotatably sleeved on the second pillar 625, and the rotation axis of the detected part 500 is perpendicular to the first direction and parallel to the rotation axis of the transition part 123. The detected part 500 includes a first force-bearing end 5006 and a detected portion 5007. The first force-receiving end 5006 and the detected portion 5007 are respectively positioned at different sides of the rotation axis of the detected part 500. When the detected part 500 rotates, the first force-receiving end 5006 and the detected portion 5007 have opposite motion trajectories. In the first direction, the first force-receiving end 5006 is closer to the casing 100 than the detected portion 5007. The projection of the first force-bearing end 5006 of the detected part 500 is at least partially overlaps with the projection of the motion trajectory of the toggle protrusion 1231. When the transition part 123 is driven to rotate by the flexible part 401, the toggle protrusion 1231 contacts the first force-bearing end 5006 to rotate the detected part 500, so that the detected portion 5007 contacts the detecting part 10 of the image forming device.

Through the above arrangement, when the flexible part 401 moves relative to the casing 100, the flexible part 401 drives the transition part 123 to rotate relative to the casing 100, and the toggle protrusion 1231 on the transition part 123 toggles the detected part 500 so that the detected part 500 moves relative to the casing 100.

As shown in FIG. 22.4, the other end of the flexible part 401 is provided with a second limiting block 4012, the transition part 123 is provided with a second limiting hole 1232, and the other end of the flexible part 401 passes through the second limiting hole 1232. The second limiting block 4012 abuts the transition part 123.

The second limiting block 4012 is fixedly installed on the other end of the flexible part 401. The second limiting hole 1232 is disposed on the side wall of the groove 1233. A second insertion opening 1234 is also provided on the side wall of the groove 1233. The insertion opening 1234 is connected with the second limiting hole 1232. The second insertion opening 1234 allows the flexible part 401 to pass through the second insertion opening 1234 and enter the second limiting hole 1232. The second insertion opening 1234 is smaller than the second limiting hole 1232. The size of the second limiting hole 1232 is smaller than the size of the second limiting block 4012. The above arrangement allows the flexible part 401 to not come out of the transition part 123 when the movement of the flexible part 401 drives the transition part 123 to rotate.

As shown in FIGS. 22.1 to 22.3, the casing 100 is provided with a first guide groove 153 extending in the first direction. The first guide groove 153 is provided on the surface of the fifth side 150 of the casing 100. The first guide groove 153 penetrates the first side 110 and the second side 120 of the casing 100, and the flexible part 401 is installed in the first guide groove 153 and can slide along the first guide groove 153. A fourth limiting protrusion 114 is provided on one end of the first guide groove 153 close to the first side 110. A fourth limiting hole 1141 is disposed on the fourth limiting protrusion 114. The first side of the flexible part 401 passes through the fourth limiting hole 1141. A third limiting protrusion 1201 is provided on one end of the first guide groove 153 close to the second side 120. The third limiting protrusion 1201 has a third limiting hole 12011. The second side of the flexible part 401 passes through the third limiting hole 12011, so as to prevent the flexible part 401 from coming out of the first guide groove 153.

By setting the first guide groove 153 to limit the position of the flexible part 401, the stability of the transmission of the flexible part 401 can be ensured.

In some embodiments, the developing cartridge 1 may further include a second elastic member. The second elastic member is used to restore or maintain the detected part 500 in the non-detection position without by the action force of the transition part 123. The second elastic member may be a torsion spring, a tension spring, a compression spring, or other components.

When the first rotating member 410 is driven by the agitator gear 310 to rotate, the first driving part 4110 is in contact with the flexible part 401. Because one end of the flexible part 401 is limited by the first limiting block 4011 and the first limiting hole 1111, the flexible part 401 is pulled and moved under the extrusion of the first driving part 4110, so that the other end of the flexible part 401 drives the transition part 123 to rotate. The two toggle protrusions 1231 on the transition part 123 successively engage with the first force-bearing end 5006 of the detecting part 500 and exert force on it, causing the detected part 500 to rotate from the non-detection position to the detection position to trigger the detecting part 10. In one embodiment, two toggle protrusions 1231 are provided, so the detected part 500 can trigger the detecting part 10 twice, causing the image forming device to generate electrical signals twice. The second elastic member is used to move the detected part 500 from the detection position to the non-detection position, so that the detecting part 10 is untriggered.

When both toggle protrusions 1231 contacted with the detected part 500, the flexible part 401 is pushed along the guide slope 1121 to the side of the locking protrusion 112 away from the first rotating member 410 and is blocked by the locking protrusion 112. The flexible part 401 breaks away from the movement trajectory of the first driving part 4110 to prevent the flexible part 401 from moving again, thereby completing the detection process.

Each toggle protrusion 1231 drives the detected portion 5007 of the detected part 500 to contact the detecting part once, causing the image forming device to generate an electrical signal. That is, the number of times of generating electrical signals is determined by the number of toggle protrusions 1231. Different models of the developing cartridges can be provided with different numbers of toggle protrusions 1231 to enable the image forming device to identify different developing cartridges based on different times of generating electrical signals.

In other embodiments, the detected part 500 may not be provided, and the toggle protrusions 1231 on the transition part 123 can directly toggle the detecting part 10 in the image forming device to contact and cause displacement of the detecting part.

Embodiment 23

Unless otherwise specified, one embodiment is the same as Embodiment 17. The difference between Embodiment 23 and Embodiment 17 is that another process cartridge is disclosed.

As shown in FIG. 23.1, the process cartridge includes a developing cartridge 1 and a drum cartridge 2. The drum cartridge 2 is provided with a first coupling 811 and a second coupling 812. The first coupling 811 and the second coupling 812 both are located at the right frame 30 of the drum cartridge. The second coupling 812 receives the driving-force output from the image forming device and drives the photosensitive drum 80 to rotate. The first coupling 812 is used to receive the driving-force output by the image forming device and drive the components on the developing cartridge 1 to move. The first coupling includes a force receiving part 8111 and a driving gear 8112. The force receiving part 8111 is used to receive the driving-force output by the image forming device and cause the first coupling 811 to rotate.

The developing cartridge 1 includes a transmission assembly and a storage medium 820 that stores information on the developing cartridge 1 or information on the process cartridge. When the developing cartridge 1 is installed on the drum cartridge 2, the right frame 30 of the drum cartridge 2 is adjacent to the first side of the developing cartridge 1. The driving gear 8112 meshes with a gear of the transmission assembly and drives it to rotate. The driving gear 8112 can directly meshes with the developing gear 330, the developer feeding gear 340, and the agitator gear 370, or it can mesh with them indirectly through an intermediate gear, thereby causing the other components in the developing cartridge 1 to move.

As shown in FIG. 23.2, in another type of process cartridge, the first coupling is provided on the developing cartridge 1. The developing cartridge 1 directly receives the driving-force output from the image forming device. The drum cartridge 2 is provided with the storage medium 820. The storage medium 820 is used to store information on the developing cartridge 1 or process cartridge, and the storage medium 820 is used for the image forming device to read the information.

In an embodiment, the first coupling 811 and the storage medium 820 are both disposed on the drum cartridge 2, so that the structure of the developing cartridge 1 is simplified.

In this disclosure, various structures in the above embodiments can be combined to complete the required functions of the developing cartridge 1.

Finally, it should be noted that the above embodiments are only used to illustrate the technical solutions of the present disclosure, but not to limit it. Although the present disclosure has been described in detail with reference to the foregoing embodiments, those of ordinary skill in the art should understand that: the technical solutions described in the foregoing embodiments can still be modified, or some or all of the technical features can be equivalently replaced; and these modifications or substitutions do not substantially deviate from the scope of the corresponding technical solutions of the embodiments of the present disclosure.

What is claimed is:

1. A developing cartridge, comprising:

a casing configured to accommodate developer and having a first side and a second side oppositely arranged in a first direction, the casing having a third side and a fourth side oppositely arranged in the second direction, the first direction and the second direction being intersected with each other;

a developing roller rotatable about a first axis extending in the first direction, and being positioned at the third side;

a coupling being positioned at the first side, and for receiving driving-force to rotate;

a detected part movable according to rotation of the coupling, at least a part of the detected part being positioned at the second side; and a driving surface being inclined to the first direction, and including a first driving surface and a second driving surface, wherein there is a first angle between the first driving surface and a base surface perpendicular to the first direction, and a second angle between the second driving surface and the base surface, and the first angle is greater than the second angle.

2. The developing cartridge according to claim 1, wherein:

the first driving surface causes the detected part to move at a first speed, the second driving surface causes the detected part to move at a second speed, and the first speed is greater than the second speed.

3. The developing cartridge according to claim 1, wherein the first angle is 50° to 70°.

4. The developing cartridge according to claim 1, wherein the second angle is 35°~50°.

5. The developing cartridge according to claim 1, further comprising:

a transmission unit includes a first rotating member and a transmission member, the first rotating member receives the driving-force transmitted from the coupling and rotates about a second axis extending in the first direction; and the transmission member receives the driving-force from the first rotating member and transmits the driving-force to the detected part.

6. The developing cartridge according to claim 5, wherein the transmission member is driven by the first rotating member to move in the first direction or in a direction intersecting the first direction.

7. The developing cartridge according to claim 6, wherein:

the detected part moves in the second direction driven by the transmission member and has a first position and second position;

when the detected part at the first position, there is a first distance between the first the detected part and the developing roller in the second direction;

when the detected part at the second position, there is a second distance between the detected part and the developing roller in the second direction, the first distance is greater than the second distance.

8. The developing cartridge according to claim 6, wherein:

the first rotating member is positioned at a first side;

the transmission member includes a first driven part and a first force applying part farther away from the first side in the first direction than the first driven part; and the first rotating member, the first driven part, the first force applying part, and the detected part are arranged sequentially in the first direction.

9. The developing cartridge according to claim 8, further comprising an elastic member that interacts with the transmission member, wherein the elastic member forces the transmission member to move toward the first side in the first direction.

10. The developing cartridge according to claim 6, wherein the driving surface is provided on the first rotating member, and the driving surface drives the transmission member to move in the first direction according to rotation of the first rotating member.

11. The developing cartridge according to claim 10, wherein the first rotating member is provided with a limiting part, the limiting part is groove-shaped, and when the transmission member is in contact with the limiting part, the transmission member limits the first rotating member.

12. The developing cartridge according to claim 1, further comprising a conductive member electrically connected to the developing roller, the conductive member including a first electrical contact portion receiving electric power, and a second electrical contact portion different from the first electrical contact portion.

13. The developing cartridge according to claim 12, further comprising a layer thickness regulating blade, wherein the layer thickness regulating blade is in contact with the developing roller, at least a portion of the layer thickness regulating blade is made of a conductive material, the layer thickness regulating blade is in contact with the second electrical contact portion, and the conductive member is electrically connected to the developing roller through the layer thickness regulating blade.

14. A developing cartridge, comprising:

a casing configured to accommodate developer and having a first side and a second side oppositely arranged in a first direction, the casing having a third side and a fourth side oppositely arranged in the second direction, the casing having a fifth side and a six side oppositely arranged in the third direction, wherein the first direction, the second direction, and the third direction intersect with one another;

a developing roller rotatable about a first axis extending in the first direction, being positioned at the third side;

a coupling being positioned at the first side, for receiving driving-force to rotate;

a detected part, at least a part of the detected part being positioned at the second side; and wherein at least one first transmission member rotatable about a rotation axis intersecting the first direction according to rotation of the coupling, the first transmission member being positioned at the fifth side, the first transmission member configured to transmit the driving-force to the detected part.

15. The developing cartridge according to claim 14, further comprising a first rotating member positioned at the first side, wherein the first rotating member rotates according to the rotation of the coupling; a rotation axis of the first rotating member is parallel to the first direction, and the first rotating member transmits the driving-force to the first transmission member.

16. The developing cartridge according to claim 15, further comprising a second transmission member, wherein:

the second transmission member is positioned at the fifth side;

the second transmission member receives the driving-force transmitted from the first rotating member and moves;

the second transmission member transmits the driving-force to the first transmission member to rotate the first transmission member; and the rotation axis of the first transmission member is parallel to the third direction.

17. The developing cartridge according to claim 15, wherein the first transmission member is positioned between the first side and the second side in the first direction.

18. The developing cartridge according to claim 14, further comprising a conductive member electrically connected to the developing roller, the conductive member including a first electrical contact portion receiving electric power, and a second electrical contact portion different from the first electrical contact portion.

19. The developing cartridge according to claim 18, further comprising a layer thickness regulating blade, wherein the layer thickness regulating blade is in contact with the developing roller, at least a portion of the layer thickness regulating blade is made of a conductive material, the layer thickness regulating blade is in contact with the second electrical contact portion, and the conductive member is electrically connected to the developing roller through the layer thickness regulating blade.

* * * * *